United States Patent
Holcomb et al.

(10) Patent No.: US 11,813,672 B2
(45) Date of Patent: Nov. 14, 2023

(54) SYSTEM AND METHOD FOR MANUFACTURING A PART

(71) Applicant: GRID LOGIC INCORPORATED, Lapeer, MI (US)

(72) Inventors: Matthew J. Holcomb, Metamora, MI (US); Ira James Holcomb, Jr., Shelby Township, MI (US)

(73) Assignee: GRID LOGIC INCORPORATED, Lapeer, MI (US)

(*) Notice: Subject to any disclaimer, the term of this patent is extended or adjusted under 35 U.S.C. 154(b) by 244 days.

(21) Appl. No.: 17/315,093

(22) Filed: May 7, 2021

(65) Prior Publication Data

US 2021/0346963 A1    Nov. 11, 2021

Related U.S. Application Data

(60) Provisional application No. 63/058,047, filed on Jul. 29, 2020, provisional application No. 63/021,843, filed on May 8, 2020.

(51) Int. Cl.

| | | |
|---|---|---|
| *B22F 12/53* | (2021.01) | |
| *B33Y 40/00* | (2020.01) | |
| *B22F 12/52* | (2021.01) | |
| *B22F 12/00* | (2021.01) | |
| *B33Y 30/00* | (2015.01) | |
| *B22F 12/30* | (2021.01) | |
| *B22F 10/12* | (2021.01) | |
| *B33Y 10/00* | (2015.01) | |

(52) U.S. Cl.
CPC ............ *B22F 12/53* (2021.01); *B22F 12/222* (2021.01); *B22F 12/30* (2021.01); *B22F 12/52* (2021.01); *B33Y 30/00* (2014.12); *B33Y 40/00* (2014.12); *B22F 10/12* (2021.01); *B33Y 10/00* (2014.12)

(58) Field of Classification Search
CPC .......... B22F 12/53; B22F 12/52; B22F 12/30; B22F 12/222; B22F 12/55; B33Y 30/00; B33Y 40/00; B33Y 10/00
USPC ......... 266/287, 236; 419/1, 61, 66; 222/590, 222/591, 593
See application file for complete search history.

(56) References Cited

U.S. PATENT DOCUMENTS

| | | |
|---|---|---|
| 2,622,238 A | 12/1952 | Boltson |
| 2,870,418 A | 1/1959 | Hewitt, Jr. |
| 3,241,956 A | 3/1966 | Inoue |
| 3,427,710 A | 2/1969 | Williams |
| 3,704,600 A | 12/1972 | Prast et al. |
| 4,087,322 A | 5/1978 | Marcus |

(Continued)

FOREIGN PATENT DOCUMENTS

| | | |
|---|---|---|
| DE | 1020080027315 A1 | 12/2009 |
| DE | 102010038249 | 4/2012 |

OTHER PUBLICATIONS

"Communication Pursuant to Article 94(3) EPC dated Jul. 23, 2020", European Patent Application No. 17748302.1, (7 pages).

(Continued)

*Primary Examiner* — Jessee R Roe
*Assistant Examiner* — Michael Aboagye
(74) *Attorney, Agent, or Firm* — Stephen M. De Klerk

(57) ABSTRACT

The invention relates to a manufacturing system including a holder suitable to hold first particles of a first powder in proximity to one another, and a connection scheme which, when employed, connects the first particles to one another to form a part.

6 Claims, 96 Drawing Sheets

(56) References Cited

U.S. PATENT DOCUMENTS

| | | | |
|---|---|---|---|
| 4,231,796 A | 11/1980 | Clark et al. | |
| 4,255,494 A | 3/1981 | Reen et al. | |
| 4,305,784 A | 12/1981 | Ohkawa | |
| 4,521,659 A | 6/1985 | Buckley et al. | |
| 4,528,532 A | 7/1985 | Keim | |
| 4,688,132 A | 8/1987 | Dustman | |
| 4,785,243 A | 11/1988 | Abramczyk et al. | |
| 5,076,869 A | 12/1991 | Bourell et al. | |
| 5,147,587 A | 9/1992 | Marcus et al. | |
| 5,389,408 A | 2/1995 | Devolk | |
| 5,446,379 A | 8/1995 | Machi | |
| 5,555,481 A | 9/1996 | Rock et al. | |
| 5,640,667 A | 6/1997 | Freitag et al. | |
| 5,675,306 A | 10/1997 | Diaz | |
| 5,874,713 A | 2/1999 | Cydzik | |
| 5,963,771 A | 10/1999 | Chan et al. | |
| 5,965,282 A | 10/1999 | Baermann | |
| 5,965,959 A | 10/1999 | Gamble et al. | |
| 6,031,215 A | 2/2000 | Nanataki et al. | |
| 6,066,285 A | 5/2000 | Kumar | |
| 6,069,479 A | 5/2000 | Taicher et al. | |
| 6,078,781 A | 6/2000 | Takagi et al. | |
| 6,150,809 A | 11/2000 | Tiernan et al. | |
| 6,157,094 A | 12/2000 | Gamble et al. | |
| 6,417,754 B1 | 7/2002 | Bernhardt et al. | |
| 6,489,701 B1 | 12/2002 | Gamble et al. | |
| 6,533,995 B1 | 3/2003 | Wullenweber et al. | |
| 6,664,875 B2 | 12/2003 | Yuan et al. | |
| 6,809,618 B2 | 10/2004 | Leghissa et al. | |
| 6,875,966 B1 | 4/2005 | Barber et al. | |
| 7,038,178 B2 | 5/2006 | Suzuki | |
| 7,378,376 B2 | 5/2008 | Holcomb | |
| 7,723,653 B2 | 5/2010 | Clark et al. | |
| 7,767,941 B2 | 8/2010 | Kagan | |
| 7,864,013 B2 | 1/2011 | Muelleman | |
| 8,316,683 B2 | 11/2012 | Tomizawa et al. | |
| 8,334,747 B2 | 12/2012 | Matsumoto | |
| 8,382,834 B2 | 2/2013 | Prescott | |
| 8,444,800 B2 | 5/2013 | Nagaura et al. | |
| 8,606,160 B2 | 12/2013 | Nakase et al. | |
| 8,732,939 B2 | 5/2014 | Uchida | |
| 8,738,147 B2 | 5/2014 | Hasints | |
| 9,261,573 B1 | 2/2016 | Radparvar et al. | |
| 9,457,403 B2 | 10/2016 | Holcomb | |
| 9,636,868 B2 * | 5/2017 | Crump | B29C 64/112 |
| 10,259,072 B2 | 4/2019 | Holcomb | |
| 10,576,542 B2 * | 3/2020 | Holcomb | B33Y 10/00 |
| 11,135,643 B2 | 10/2021 | Holcomb et al. | |
| 11,198,178 B2 * | 12/2021 | Xu | B33Y 70/00 |
| 11,446,739 B2 * | 9/2022 | Holcomb | B33Y 10/00 |
| 2001/0050448 A1 | 12/2001 | Kubo et al. | |
| 2002/0105114 A1 | 8/2002 | Kubo et al. | |
| 2002/0121953 A1 | 9/2002 | Ries et al. | |
| 2002/0171521 A1 | 11/2002 | Ries | |
| 2003/0024916 A1 | 2/2003 | Wright et al. | |
| 2004/0099983 A1 | 5/2004 | Dirscherl | |
| 2004/0189427 A1 | 9/2004 | Leghissa et al. | |
| 2004/0191406 A1 | 9/2004 | Crum et al. | |
| 2004/0192558 A1 | 9/2004 | Holcomb | |
| 2004/0222789 A1 | 11/2004 | Pinsky et al. | |
| 2005/0253594 A1 | 11/2005 | Eberhardt et al. | |
| 2006/0124631 A1 | 6/2006 | Alfredeen | |
| 2007/0022823 A1 | 2/2007 | Knill et al. | |
| 2007/0085534 A1 | 4/2007 | Seki et al. | |
| 2007/0235445 A1 | 10/2007 | Wilgen et al. | |
| 2007/0241482 A1 | 10/2007 | Giller et al. | |
| 2008/0145566 A1 | 6/2008 | Cretegny et al. | |
| 2009/0085511 A1 | 4/2009 | Meinke et al. | |
| 2009/0295407 A1 | 12/2009 | Blew et al. | |
| 2010/0015002 A1 | 1/2010 | Barrera et al. | |
| 2011/0297658 A1 | 12/2011 | Peters et al. | |
| 2012/0329659 A1 | 12/2012 | Holcomb | |
| 2013/0189385 A1 | 7/2013 | Zoppas et al. | |
| 2013/0329659 A1 | 12/2013 | Holcomb | |
| 2014/0163717 A1 | 6/2014 | Das et al. | |
| 2014/0228671 A1 | 8/2014 | Subramaniam et al. | |
| 2014/0314964 A1 | 10/2014 | Ackelid | |
| 2014/0361464 A1 | 12/2014 | Holcomb | |
| 2015/0008928 A1 | 1/2015 | Miles et al. | |
| 2015/0296571 A1 | 10/2015 | Holcomb | |
| 2015/0322799 A1 | 11/2015 | Xu | |
| 2015/0367448 A1 | 12/2015 | Buller et al. | |
| 2017/0072614 A1 | 3/2017 | Lind et al. | |
| 2017/0173887 A1 | 6/2017 | Myerberg et al. | |
| 2017/0216915 A1 | 8/2017 | Holcomb et al. | |
| 2018/0154573 A1 * | 6/2018 | Miles | H05K 3/1241 |
| 2019/0047089 A1 | 2/2019 | Riemann | |

OTHER PUBLICATIONS

"Extended European Search Report dated Jul. 19, 2019", European Patent Application No. 17748302.1, (10 pages).

"Final Office Action dated Dec. 13, 2018", U.S. Appl. No. 14/502,665, (7 pages).

"Final Office Action dated Feb. 19, 2019", U.S. Appl. No. 15/167,257, (18 pages).

"Final Office Action dated Mar. 25, 2021", U.S. Appl. No. 16/202,453, (16 pages).

"First Office Action dated Mar. 3, 2020 with English translation", Chinese Patent Application No. 201780008924.8, (47 pages).

"International Search Report and Written Opinion dated Dec. 31, 2014", International Patent Application No. PCT/US14/58389 with International Filing Date of Sep. 30, 2014, (8 pages).

"International Search Report and Written Opinion dated May 11, 2022", International Patent Application No. PCT/US2021/031402, (18 pages).

"International Search Report and Written Opinion dated May 25, 2017", International PCT Patent Application No. PCT/US201/016574 with International Filing Date of Feb. 3, 2017, (17 pages).

"Invitation to Pay Additional Fees p PCT Article 17(3)(a) and Rules 40.1 and 40.2(e) dated Apr. 2, 2017", International PCT Patent Application No. PCT/US17/16574 with International Filing Date of Feb. 3, 2017, (3 pages).

"Materials safety data sheet for carbon nanotubes", supplied by Cheap Tubes Inc. Revision Date: Apr. 13, 2015, (9 pages).

"Non Final Office Action dated Feb. 22, 2018", U.S. Appl. No. 14/459,096, (10 pages).

"Non Final Office Action dated Jun. 12, 2017", U.S. Appl. No. 14/300,621, (9 pages).

"Non Final Office Action dated Oct. 26, 2020", U.S. Appl. No. 16/202,453, (23 pages).

"Non Final Office Action dated Oct. 27, 2021", U.S. Appl. No. 16/751,009, (7 pages).

"Physical properties of titanium and its alloys", Total Materia. http://www.totalmateria.com/Articles122.htm. Published May 2005. Accessed Dec. 29, 2016., (2 pages).

Agarwal, D., "Microwave sintering of ceramics, composites and metal powders. Sintering of advanced materials", Woodhead Publishing. 2010. (Year: 2010), pp. 222-248.

Popovic, Zoya, et al., ""The Skin Effect", Introductory Electromagnetics", Chapter 20, Prentice-Hall. (Year: 1999), pp. 382-392.

* cited by examiner

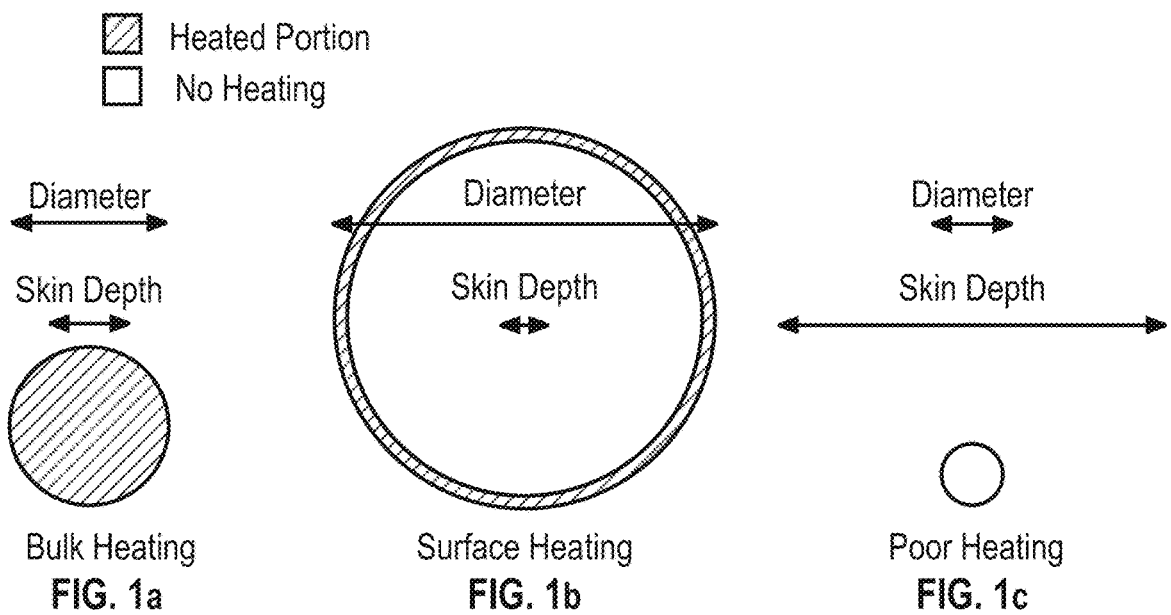
FIG. 1a Bulk Heating
FIG. 1b Surface Heating
FIG. 1c Poor Heating
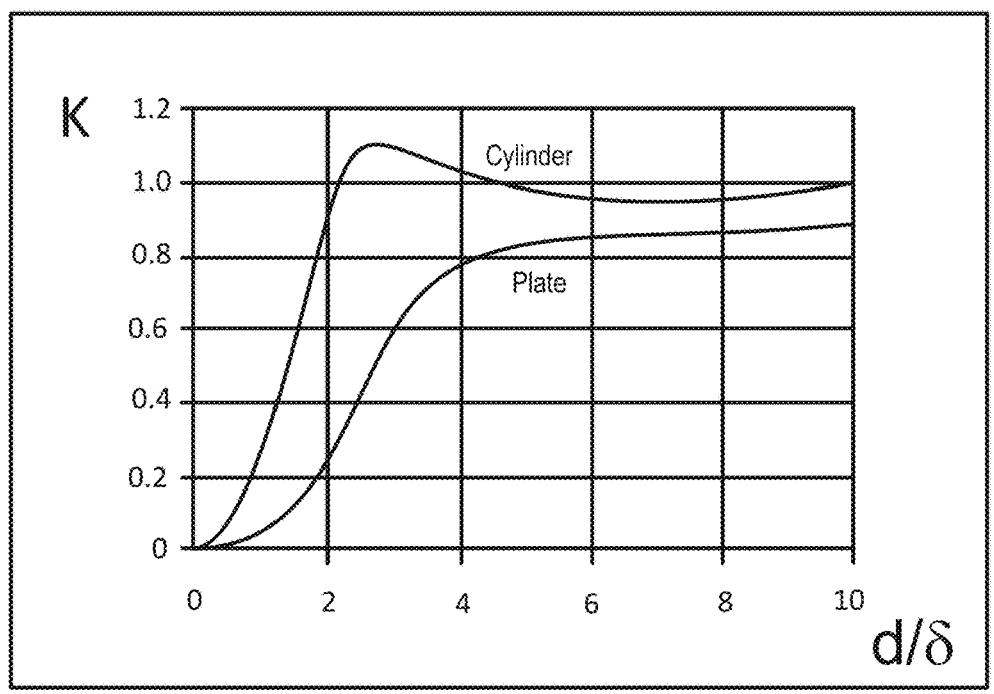
FIG 2

FIG. 3a
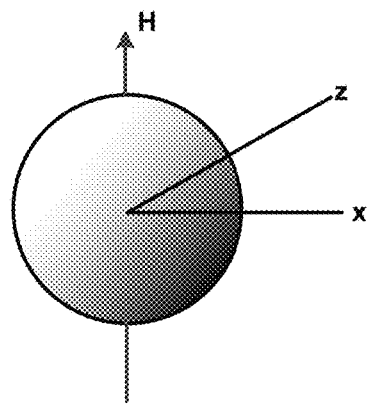
FIG. 3b                                FIG. 3c
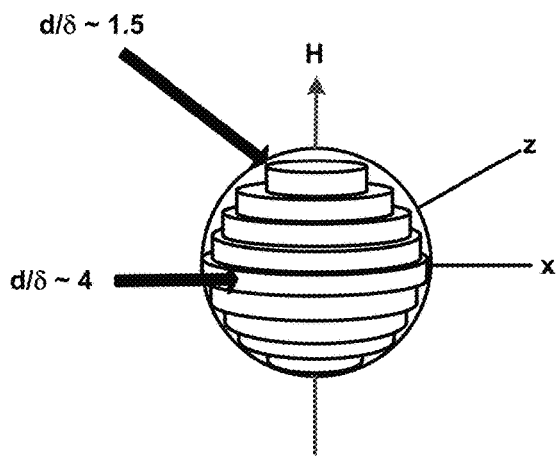              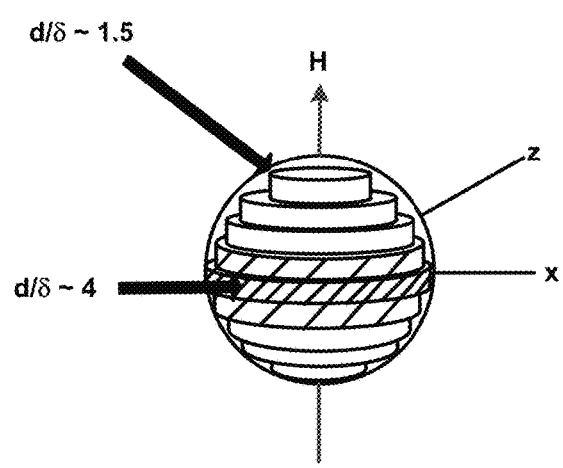
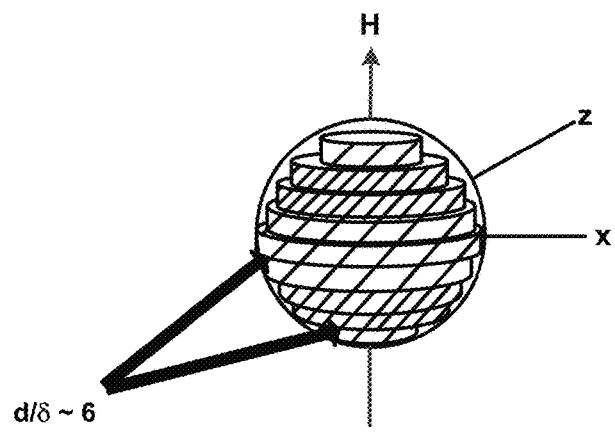
FIG. 4

2 µΩ cm    20 µΩ cm

50 μm     100 μm

Normalized MgB₂/Ga ScNc particle size distribution

Geldart classification scheme for powders

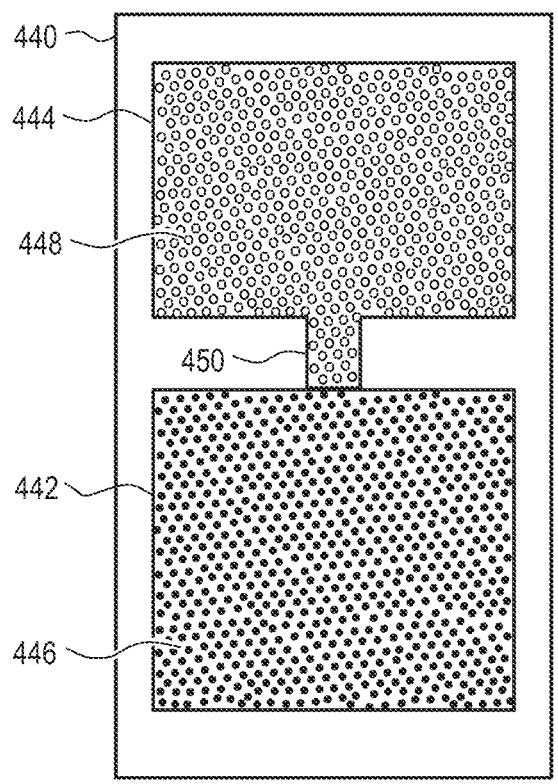
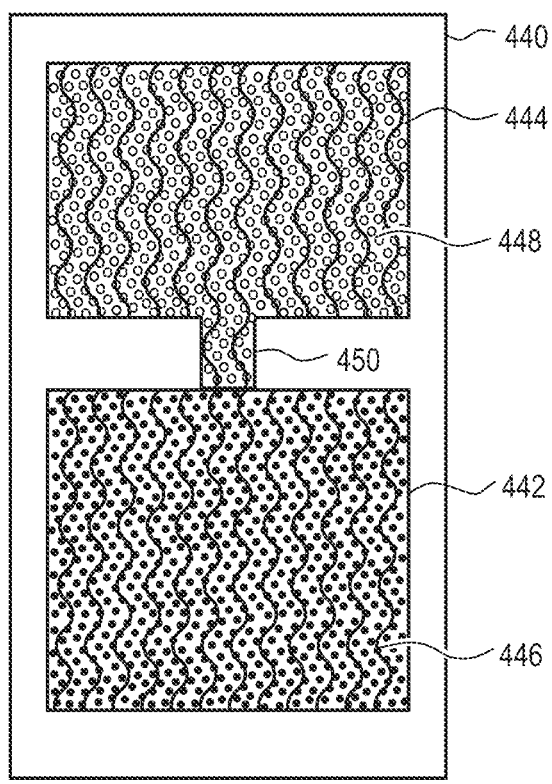
FIG. 48a  FIG. 48b
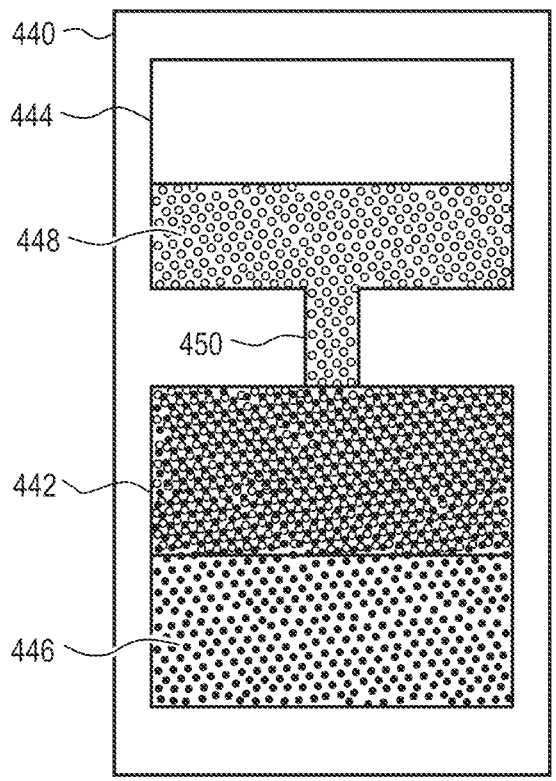
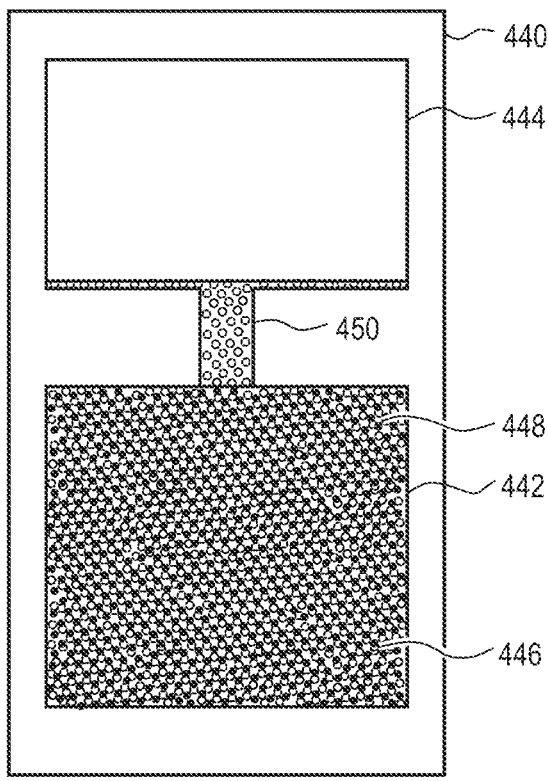
FIG. 48c  FIG. 48d

    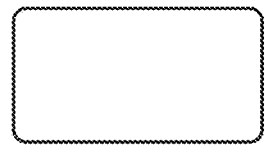
CAD Model
FIG. 55a
Near Net Shape Model
FIG. 55b
Near Net Shape AM Tool Path
FIG. 55c
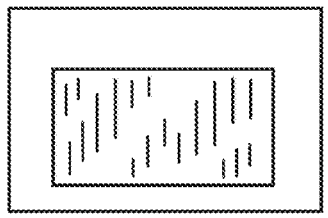  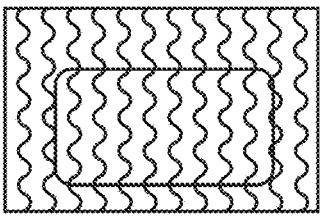  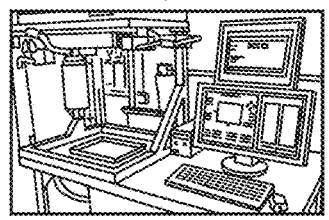
Green Part Machining
FIG. 55f
Heating / Sintering
FIG. 55e
OPL Print
FIG. 55d
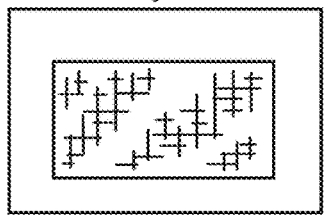  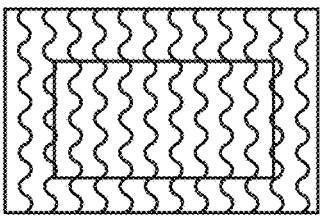  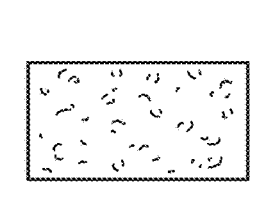
Infiltration If Needed
FIG. 55g
Additional Heat Treatment / Post Machining If Necessary
FIG. 55h
Final Part
FIG. 55i
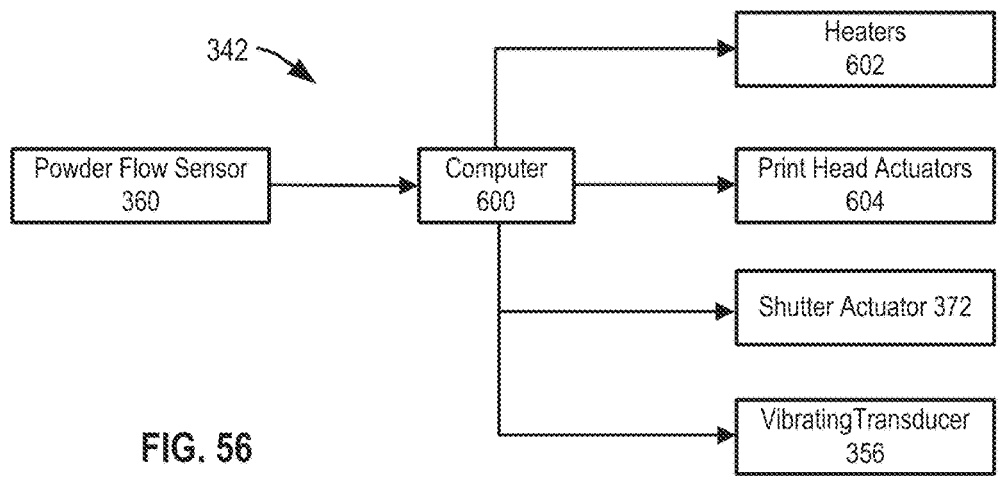
FIG. 56

Layer-by Layer Additive Manufacturing Process
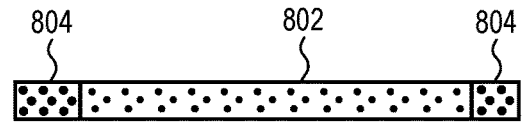
FIG. 63A
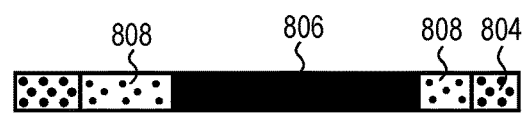
FIG. 63B
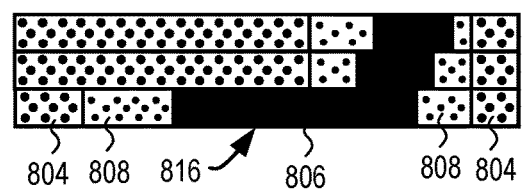
FIG. 63C
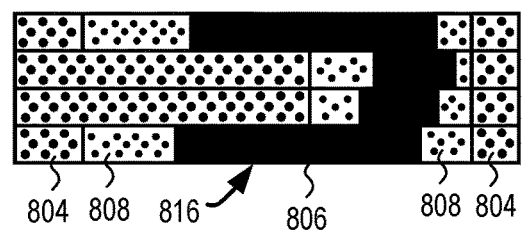
FIG. 63D
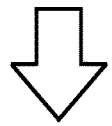
Loose "Support" and "part" powders
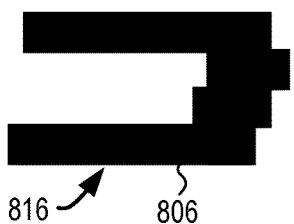 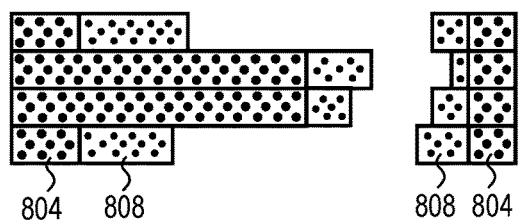
FIG. 63E
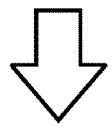
Separate Powders
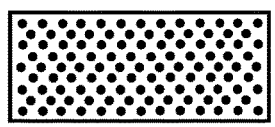 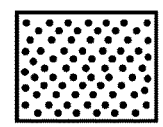
FIG. 63F
"Support" Powder   "Part" Powder Print ――
Laser ┈┈

OPL Toolpath
- A* Pathfinding
- Minimize nozzle closures
- Skip "non-supporting" infill layers
- 3mm ID printhead Print ――
Laser ┈┈

"Donut" Shape

OPL Toolpath
- A* Pathfinding
- Minimize nozzle closures
- Skip "non-supporting" infill layers
- 25mm ID printhead

| M code | Axis | Output Pin | Description | Powder |
|---|---|---|---|---|
| 10 | X | A-0 | 5mm Valve ON | 1 |
| 11 | X | A-0 | 5mm Valve OFF | 1 |
| 12 | X | B-1 | 5mm Screed ON | 1 |
| 13 | X | B-1 | 5mm Screed OFF | 1 |
| 14 | X | E-4 | 25mm Valve ON | 1 |
| 15 | X | E-4 | 25mm Valve OFF | 1 |
| 16 | X | F-5 | 25mm Screed ON | 1 |
| 17 | X | F-5 | 25mm Screed OFF | 1 |
| 18 | Y | A-0 | 5mm Valve ON | 2 |
| 19 | Y | A-0 | 5mm Valve OFF | 2 |
| 20 | Y | B-1 | 5mm Screed ON | 2 |
| 21 | Y | B-1 | 5mm Screed OFF | 2 |
| 22 | Y | E-4 | 25mm Valve ON | 2 |
| 23 | Y | E-4 | 25mm Valve OFF | 2 |
| 24 | Y | F-5 | 25mm Screed ON | 2 |
| 25 | Y | F-5 | 25mm Screed OFF | 2 |

M-codes for OPL Printhead

OPL Print/Sinter SiC/Si Powder

Infiltrate With Resin/Pyrolize

Initiate Reaction

Reaction Bonded Si/SiC Part

OPL Print/Sinter

Infiltrate With Al Alloy

Initiate SHS of γ-TiAl

γ-TiAl Part

Large-scale OPL Mold Fabrication

- Zircon Bulk Density: ~2700 kg/m$^3$
- Total Volume: 0.23 m$^3$ (8 cubic feet)
- Zircon Mass: 621 kg (1370 lbs.)
- Thermal Diffusivity $$a = \frac{k}{\rho c_p}$$

where $k$ = Thermal Conductivity, $\rho$ = Density, $c_p$ = Specific Heat Capacity

- Copper: 111 mm$^3$/s
- Steel: ~15mm$^2$/s
- Loose Dry Sand: 0.4 mm$^2$/s

Transient 3D Model Calculations

- Zircon Bulk Density: ~2700 kg/m$^3$
- Total Volume: 0.23 m$^3$ (8 cubic feet)
- Zircon Mass: 621 kg (1370 lbs.)
- Thermal Diffusivity: 0.4 mm$^2$/s
- Heating Cycle
  - Ramp to 750°C: 12 hours
  - Soak at 750°C
- Temperature Probe Location
  - Furnace (source)
  - 10mm inside the cube (near the wall)
  - ~300mm inside the cube (center)

M-138 Field Sterilizer (Autoclave)

M-138 Field Sterilizer (Autoclave)

Alternative Mold Set Methods

- Chemical Set: Dry Steam
  - OPL Print
    - Test Gear (2 part)
  - Part
    - 120μm polyethylene powder
  - Mold
    - Zircon with 2% by mass Sodium Silicate
- Process: M-138 Autoclave
  - 20 minutes at ~120°C (18 psig)
  - "Slow Exhaust" ~30 minutes
  - 5 minute dry

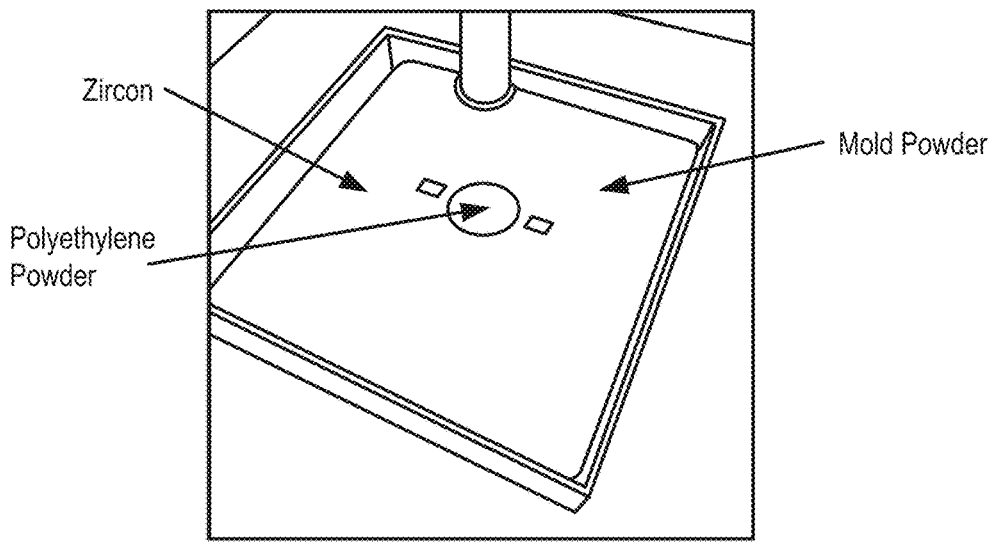
OPL Print: Test Gear Mold
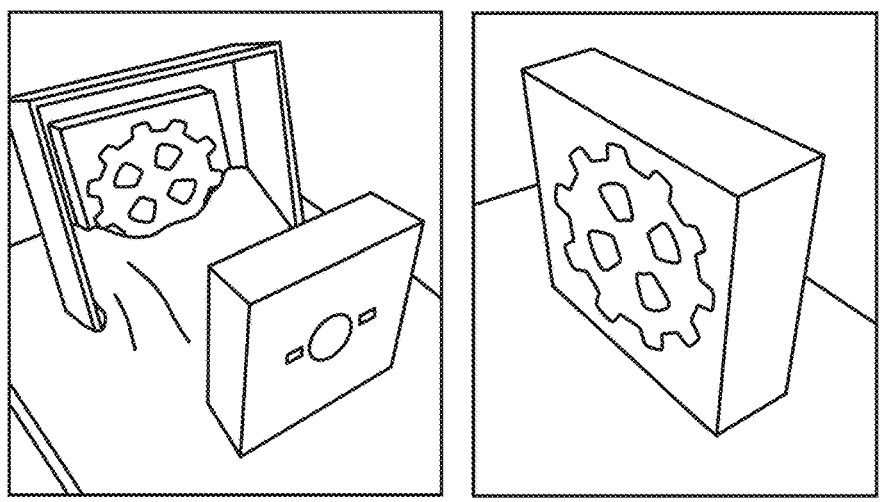
OPL Mold after Autoclave Processing
Alternate Mold Set Methods
- Chemical Set: Dry Steam
  - 20 minutes at ~120°C
  - "Slow Exhaust" ~30 minutes
  - 5 minutes dry
- Results
  - Very good bonding of mold material
  - No consolidation of polyethylene powder
  - Process is not limited by the thermal diffusion of zircon
  - Provisional patent filed on process
FIG. 89

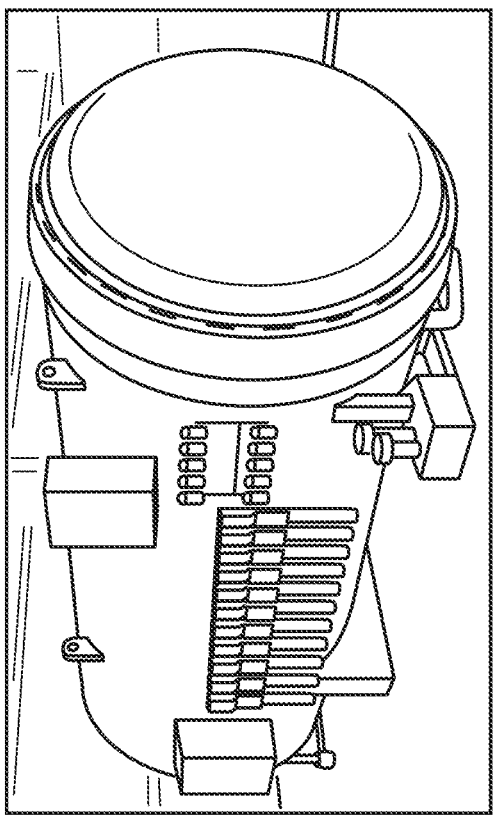
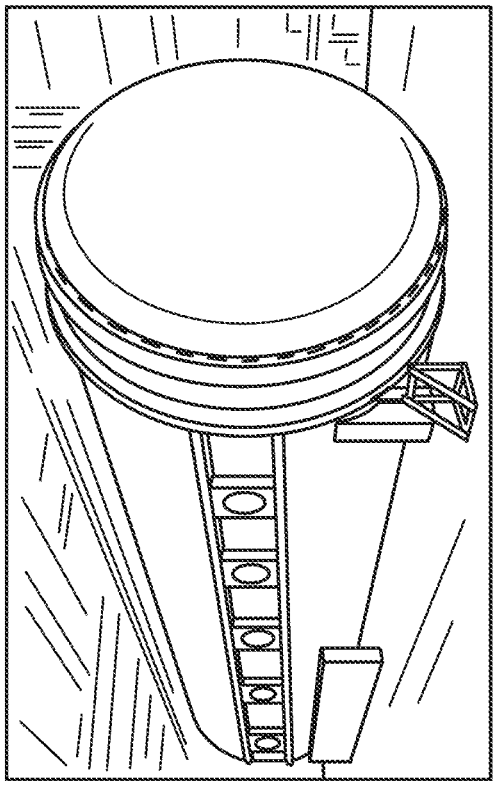
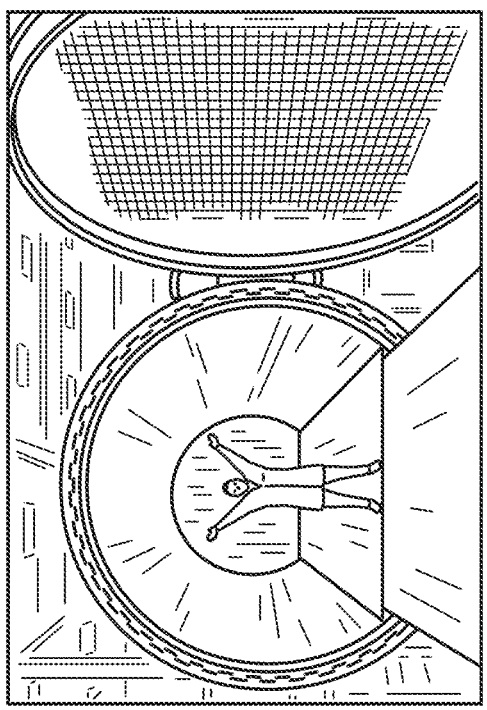
FIG. 90

SYSTEM AND METHOD FOR MANUFACTURING A PART

CROSS-REFERENCE TO RELATED APPLICATIONS

This application claims priority from U.S. Provisional Patent Application No. 63/021,843, filed on May 8, 2020 and U.S. Provisional Patent Application No. 63/058,047 filed on Jul. 29, 2020, each of which is incorporated herein by reference in their entirety.

STATEMENT REGARDING FEDERALLY SPONSORED RESEARCH OR DEVELOPMENT

Certain aspects of this invention were developed with support from the U.S. Government. The U.S. Government may have rights in certain of these inventions.

BACKGROUND OF THE INVENTION

1). Field of the Invention

This invention relates to a system and method for manufacturing a part.

2). Discussion of Related Art

It has become common place to fabricate three-dimensional components using Computer Numerical Control (CNC) systems. State of the art solid freeform fabrication (SFF) methods span a number of technologies including stereolithography, 3D printing, selective laser sintering, direct metal deposition, electron beam melting, and microplasma powder deposition. Thermoplastic-based SFF technologies allow designers to verify product design with three-dimensional models at an early stage, but are not capable of fabricating high-strength end products. In principle, metal-based SFF technologies allow for the rapid manufacture of structurally sound, dimensionally accurate metallic parts directly from computer aided design (CAD) models. Laser-based SFF technologies are highly dependent on specific process parameters to achieve structurally sound parts. These process parameters are specific to the composition, morphology, and materials properties of the metallic powder, as well as the characteristics of the laser beam used to consolidate the powder. Selective Laser Sintering (SLS) and Direct Metal Deposition (DMD) are examples of three-dimensional additive manufacturing systems wherein a high power laser is used to fuse components or particles, such as metal powders or ceramic/metal composite powders, to one another as a means of building up a macroscopic part. These components or particles to be fused may be located in a dense particle bed, as in SLS, or may be entrained in a gas flow and fused in a weld pool on the surface of the part being manufactured, as in DMD. However, in both SLS and DMD technologies, the entire unfused components or particles that comprise the powdered material are heated indiscriminately by the high intensity laser beam. In certain applications, such as when the powdered material includes a ceramic component, the laser may cause thermal decomposition of the ceramic part resulting in the degradation of the physical characteristics of the macroscopic part.

Additive Manufacturing (AM) is a manufacturing process in which complex parts are fabricated by the fusing together of small individual components to create a large macroscopic part. Typically, the small individual components are particles in a powder of a specific material. In powder bed AM systems, for example, complex parts are usually fabricated through the layer-by-layer consolidation of the particles in a powder bed. This consolidation can be realized through the input of energy to the particles, which causes the particles to heat, sinter, and/or melt together or otherwise connect to one another to form a dense solid. Energy can be delivered to the particles by using a laser, electron beam, or by exposing the material to a high frequency magnetic field.

In conventional powder bed AM, each layer of powder is consolidated sequentially to form the complex part. An earlier layer holds a subsequent layer that is deposited. During the fabrication process, particles of the topmost layer of loose powder are fused to both the parent part (i.e. the substrate or an earlier layer) and the neighboring loose particles. This is accomplished by using spatially compact energy sources (e.g. laser, electron beam, high frequency magnetic fields, etc.) to locally consolidate the particles in a specific pattern defined by a two-dimensional cross section of the three-dimensional (3D) part.

In order to overcome the current technology limitations of additive manufacturing and enable the low cost manufacture of specialized metal parts, a new approach is needed. Ideally, this AM approach will possess the following characteristics:

Open-Environment Operation. Most AM systems require the use of a controlled atmosphere build chamber for the layer-by-layer fusion of the metal powder or printing of a binder to produce the metal part. This requirement severely limits the flexibility of the process, especially if parts need to be fabricated in factory environments, depots, or Forward Operating Bases (FOBs).

Scalable Build Envelope. The need for a controlled atmosphere build chamber limits the overall size of the parts that can be fabricated and prevents the system from being easily scaled to very large parts.

Low Operations Burden. Many AM systems are complex machines with a myriad of operating parameters that ultimately effect the quality of the additively manufactured part. In addition, these systems require constant monitoring, frequent maintenance, and skilled technicians to run efficiently, which add considerable cost to the final part produced.

Part Qualification. Unlike metal parts that are fabricated using casting and/or conventional subtractive machining, AM parts are fabricated through as-yet unqualified processes for many applications, which may delay the adoption of these parts.

SUMMARY OF THE INVENTION

The invention provides a manufacturing system including a holder suitable to hold first particles of a first powder in proximity to one another, and a connection scheme which, when employed, connects the first particles to one another to form a part.

The system may further include a support structure, at least one powder hopper for holding the first powder, a print head having a first nozzle for directing the first powder from the at least one powder hopper onto a substrate, the first nozzle having a lower surface that is sufficiently near the substrate for the first powder to flow out of the first nozzle and stop flowing out of the first nozzle when there is no more room below the first nozzle, a print head actuator, and a computer that is programmable to cause movement of the print head actuator for the print head actuator to move the print head relative to the support structure, causing the first powder to resume flow out of the first nozzle.

The system may further include a first regulating apparatus for regulating flow of the first powder through the first nozzle.

The system may further include that the first regulating apparatus includes a first powder container to hold the first powder, and a first nozzle actuator that has a portion connected to the first nozzle and operable to move the first nozzle between a first position wherein an upper end of the first nozzle is above an upper surface of a volume of the first powder in the first powder container so that the first powder cannot drop into the upper end of the first nozzle and a second position wherein the upper end of the first nozzle is dropped relative to the first position so that the first powder in the first powder container flows into the first nozzle.

The system may further include that the first nozzle is a first inner nozzle and the print head has a first outer nozzle, the first outer nozzle positioned around the first inner nozzle, further including a first nozzle actuator, wherein the computer is programmable to cause movement of the first nozzle actuator, causing movement of the first inner nozzle and first outer nozzle relative to one another between a first position wherein the first powder flowing through the first inner nozzle does not reach the first outer nozzle and a second position wherein the first powder flowing through the first inner nozzle flows laterally and does reach the first outer nozzle and powder stops flowing out of the first outer nozzle when there is no more room below the first outer nozzle and wherein said movement of the print head relative to the support structure caused the first powder to resume flow out of the first outer nozzle.

The system may further include that center lines of the first inner nozzle and first outer nozzle are concentric.

The system may further include that a center line of the first inner nozzle is offset relative to a center line of the first outer nozzle.

The system may further include that the first nozzle is a first inner nozzle and the print head defines a first outer chamber around the first inner nozzle, and a first outer nozzle out of the first outer chamber, further including a first nozzle actuator, wherein the computer is programmable to cause movement of the first nozzle actuator, causing movement of the first inner nozzle and the first outer chamber relative to one another between a first position wherein the first powder flowing through the inner nozzle does not reach the first outer chamber and a second position wherein the first powder flowing through the first inner nozzle flows laterally and does reach the first outer chamber and flows out of the first outer chamber through the first outer nozzle simultaneously with the first powder flowing out of the first inner nozzle, the first powder stops flowing out of the first outer chamber through the first outer nozzle when there is no more room below the first outer nozzle and wherein said movement of the print head relative to the support structure causes the first powder to resume flow out of the first outer nozzle.

The system may further include that the print head defines at least one first restricted flow passage connecting the first outer chamber to the first outer nozzle, the at least one first restricted flow passage having a smaller cross-section than the first outer nozzle to restrict flow of the first powder.

The system may further include that the print head defines a plurality of first restricted flow passages out of the outer chamber.

The system may further include that the first outer nozzle is an annular nozzle around the first inner nozzle and the plurality of first restricted flow passages connect the first outer chamber with the first outer nozzle.

The system may further include that the print head has a second nozzle for directing the first powder from the at least one powder hopper onto the substrate, the second nozzle having a lower surface that is sufficiently near the substrate for the first powder to flow out of the second nozzle and stop flowing out of the second nozzle when there is no more room below the second nozzle, wherein movement of the print head relative to the support structure causes the first powder to resume flow out of the second nozzle.

The system may further include a first regulating apparatus for regulating flow of the first powder through the first nozzle, and a second regulating apparatus for regulating flow of the first powder through the second nozzle.

The system may further include that the first nozzle is a first inner nozzle and the print head has an outer nozzle, the outer nozzle positioned around the first inner nozzle, the print head further including a first powder container to hold the first powder, a first inner nozzle powder valve, a first inner nozzle actuator that has a portion connected to the first inner nozzle powder valve and operable to move the first inner nozzle powder valve between an upper position wherein an upper end of the first inner nozzle powder valve is above an upper surface of a volume of the first powder in the first powder container so that the first powder cannot drop into the upper end of the first inner nozzle powder valve and a lower position wherein the upper end of the first inner nozzle powder valve is dropped relative to the upper position so that the first powder in the first powder container flows into the first inner nozzle, a first outer nozzle powder valve, and a first outer nozzle actuator that has a portion connected to the first outer nozzle powder valve and operable to move the first outer nozzle powder valve between an upper position wherein an upper end of the first outer nozzle powder valve is above an upper surface of a volume of the first powder in the first powder container so that the first powder cannot drop into the upper end of the first outer nozzle and a lower position wherein the upper end of the first outer nozzle powder valve is dropped relative to the upper position so that the first powder in the first powder container flows into the outer nozzle.

The print head may further include a second inner nozzle, a powder selector actuator connected to the outer nozzle and operable to move the outer nozzle relatively between a first powder position wherein the outer nozzle is around the first inner nozzle and a second powder position wherein the outer nozzle is around the second inner nozzle, a second powder container to hold the second powder, a second inner nozzle powder valve, a second inner nozzle actuator that has a portion connected to the second inner nozzle powder valve and operable to move the second inner nozzle powder valve between an upper position wherein an upper end of the second inner nozzle powder valve is above an upper surface of a volume of the second powder in the second powder container so that the second powder cannot drop into the upper end of the second inner nozzle and a lower position wherein the upper end of the second inner nozzle powder valve is dropped relative to the upper position so that the first powder in the second powder container flows into the second inner nozzle, a second outer nozzle powder valve, and a second outer nozzle actuator that has a portion connected to the second outer nozzle powder valve and operable to move the second outer nozzle powder valve between an upper position wherein an upper end of the second outer nozzle powder valve is above an upper surface of a volume of the second powder in the second powder container so that the second powder cannot drop into the upper end of the second outer nozzle and a lower position wherein the upper end of the second outer nozzle powder valve is dropped relative to the upper position so that the first powder in the second powder container flows into the outer nozzle.

The system may further include that the at least one powder hopper includes a first powder hopper for holding a first powder that flows through the first powder container, and a second powder hopper for holding a second powder that flows through the second powder container.

The system may further include a first powder container to hold the first powder, a first nozzle, and a first nozzle actuator that has a portion connected to the first nozzle and operable to move the first nozzle between a first position wherein an upper end of the first nozzle is above an upper surface of a volume of the first powder in the first powder container so that the first powder cannot drop into the upper end of the first nozzle and a second position wherein the upper end of the first nozzle is dropped relative to the first position so that the first powder in the first powder container flows into the first nozzle.

The system may further include that the first nozzle is mounted to the first powder container for vertical movement between the first position and the second position.

The system may further include a first connecting piece having a lower portion secured to the first nozzle and an upper portion located higher than the upper end of the first nozzle, the first nozzle actuator being attached to the upper portion of the first connecting piece.

The system may further include that the first connecting piece and the first nozzle are made out of a common piece of material to form a valve piece.

The system may further include a first seal piece connected between the first powder container and the first nozzle.

The system may further include a bellows connected between the first powder container and the first nozzle.

The system may further include a print head frame, the first nozzle actuator having a portion connected to the print head frame to move the first nozzle relative to the print head frame.

The system may further include a print head frame, the first nozzle actuator being connected through the print head frame to the first nozzle and having a portion connected to the first powder container to move the first powder container relative to the first nozzle.

The system may further include a deposition system that includes a first hopper for a first powder having first particles of a first material, a first nozzle through which the first powder flows out of the first hopper to form a first volume, a second hopper for a second powder having second particles of a second material, a second nozzle through which the second powder flows out of the second hopper to form a second volume in contact with the first volume with an interface between the first and second volumes, the second particles forming at least part of a holder suitable to hold first particles in proximity to one another, and a plasma source which, when employed, exposes at least the first particles to a plasma that heats the first particles to connect the first particles to one another, wherein the first material is a positive material and the second material is a negative material so that the positive material preferentially connects the first particles to one another to a greater extent than the negative material connecting the second particles to one another, the positive material forming the part with an edge of the part defined by the interface.

The system may further include that the plasma is generated by adding energy to a gas to ionizing the gas to create ions and electrons, whereafter the plasma penetrates between the first particles, whereafter the ions and electrons recombine to release energy.

The system may further include that the gas is nitrogen gas.

The system may further include that the second particles are exposed to the plasma.

The system may further include that the deposition system includes a support structure, a print head through which the first powder and the second powder are deposited, a print head actuator, and a computer that is programmable to cause movement of the print head actuator for the print head actuator to move the first and second nozzles relative to the support structure to deposit a plurality of layers on one another, wherein at least a first of the layers includes a portion of the first material and a portion of the second material and at least a second of the layers includes a portion of the first material and a portion of the second material, wherein the first material of the second layer is in contact with the first material of the first layer, wherein the plasma source, when employed, connects the particles of the first material of the second layer to the first material of the first layer.

The system may further include that the print head actuator is programmable to move the first and second nozzles relative to the support structure to deposit the second volume is within the first volume.

The system may further include that the print head actuator is programmable to move the first and second nozzles relative to the support structure so that the first volume entirely encloses the second volume.

The system may further include that the print head print head actuator is programmable to move the first and second nozzles relative to the support structure so that the first and second layers have different thicknesses.

The system may further include a heater positioned to heat the first layer to consolidate the particles of the first material of the first layer before depositing the second layer on the first layer, and heat the second layer, after depositing the second layer on the first layer, to consolidate the particles of the first material of the second layer.

The system may further include a machining apparatus to machine the part.

The system may further include that the part is a green part with structural integrity, further including a heater for heat treatment of the green part to form heat treated part.

The system may further include that the deposition system includes a print head through which the first powder and the second powder are deposited, a print head actuator, and a computer that is programmable to cause movement of the print head actuator for the print head actuator to move the print head relative to the support structure to deposit the first material through the first nozzle.

The system may further include that the second powder is deposited through the print head.

The system may further include that the first and second powders are simultaneously deposited onto the substrate through the print head.

The system may further include that the negative material includes Tungsten, Zircon, Silicon Carbide, Alumina, WC, or Chromite.

The system may further include that the positive material includes Iron, copper, aluminum, titanium or a ceramic.

The system may further include that the first and second powders are deposited at the same time with an interface between the first powders where the first powders meet.

The system may further include a sensor positioned to measure an electrical impedance over the first particles.

The system may further include that the sensor measures the electrical impedance as the electrical impedance changes.

The system may further include that the electrical impedance changes over time as the first particles are connected to one another.

The system may further include that the first particles are of a first material and connecting the first particles leaves voids within the first material, further including a first holding structure for holding the first particles within a first volume, wherein the first particles are of a first material and connecting the first particles leaves voids within the first material, a second holding structure holding an infiltration material within a second volume, and an infiltration system directing the infiltration material into the voids so that the second material infiltrates the first material, wherein the electrical impedance changes over time as the infiltration material infiltrates the first particles.

The system may further include that the connection scheme includes a heater positioned to heat the first particles to connect the first particles to one another.

The system may further include a passage with a smaller cross-section than the second volume connecting the second volume to the first volume for directing the infiltration material from the second volume through the passage into the first volume.

The system may further include a heater positioned to heat the infiltration material so that the infiltration material melts and flows into the first material.

The system may further include a heater positioned to heat the first particles to a first temperature to sinter the first particles, to connect the first particles to one another, and to heat the infiltration material to a second temperature that is higher than the first temperature so that the infiltration material melts and flows into the first material.

The system may further include a holder formed out of a negative material to define the first and second volumes, the negative material being removable from the first material after the infiltration.

The system may further include that connecting the first particles leaves voids within the first material, further including a first holding structure for holding the first particles within a first volume, wherein the first particles are of a first material and connecting the first particles leaves voids within the first material, a second holding structure holding an infiltration material within a second volume, an infiltration system directing the infiltration material into the voids so that the second material infiltrates the first material to form a pre-reaction mixture, the first material including silicon carbide, one of the first material and second material including carbon, and the other one of the first material and second material including silicon, and a heater positioned to heat the silicon carbide, carbon and silicon to form reaction bonded silicon carbide.

The system may further include that the silicon and the carbon are heated to below the melting temperature of silicon of 1450 degrees Celsius to form the reaction bonded silicon carbide.

The system may further include that the first particles are of a first material that includes silicon, further including a heater positioned to heat the infiltration material to decompose the infiltration material into at least the carbon.

The system may further include that the first material includes a mixture of silicon and silicon carbide particles.

The system may further include that the first material includes a silicon to silicon carbide ratio of approximately 40% to 60% by volume.

The system may further include that the infiltration material is a Phenolic resin.

The system may further include that the infiltration material is Phenol-formaldehyde.

The system may further include that the Phenolic resin is cured at approximately 150 degrees Celsius, followed by slow heating to increase a temperature of the resist by approximately 2 degrees Celsius per minute to 700 degrees Celsius followed by a dwell of approximately 2 hours in a nitrogen ambient.

The system may further include that the first particles are of a first material that includes carbon, and the infiltration material includes silicon.

The system may further include that the first material includes a mixture of silicon carbide and elemental carbon particles.

The system may further include that the heater is positioned to heat the first particles to connect the first particles to one another.

The system may further include a passage with a smaller cross-section than the second volume connecting the second volume to the first volume for directing the infiltration material from the second volume through the passage into the first volume.

The system may further include a heater positioned to heat the infiltration material so that the infiltration material melts and flows into the first material.

The system may further include a heater positioned to heat the first particles to a first temperature to sinter the first particles, to connect the first particles to one another, and to heat the infiltration material to a second temperature that is higher than the first temperature so that the infiltration material melts and flows into the first material.

The system may further include that connecting the first particles leaves voids within the first material, further including a first holding structure for holding the first particles within a first volume, wherein the first particles are of a first material and connecting the first particles leaves voids within the first material, a second holding structure holding a second material within a second volume, an infiltration system directing the second material into the voids so that the second material infiltrates the first material to form a pre-reaction mixture that includes aluminum and titanium, and a heater positioned to heat the aluminum and the titanium to form γ-TiAl.

The system may further include that the first material includes the titanium, and the infiltration material includes the aluminum.

The system may further include that the heater initiates self-propagating high temperature synthesis (SHS) causing combustion to form the γ-TiAl.

The system may further include that the heater is positioned to heat the first particles to connect the first particles to one another.

The system may further include a passage with a smaller cross-section than the second volume connecting the second volume to the first volume for directing the infiltration material from the second volume through the passage into the first volume.

The system may further include a heater positioned to heat the infiltration material so that the infiltration material melts and flows into the first material.

The system may further include a heater positioned to heat the first particles to a first temperature to sinter the first particles, to connect the first particles to one another, and to heat the infiltration material to a second temperature that is higher than the first temperature so that the infiltration material melts and flows into the first material.

The system may further include that connecting the first particles leaves voids within the first material, further including a first holding structure for holding the first particles within a first volume, wherein the first particles are of a first material and connecting the first particles leaves voids within the first material, a second holding structure holding an infiltration material within a second volume, an infiltration system directing the infiltration material into the voids so that the second material infiltrates the first material to form a pre-reaction mixture that includes the first material and the infiltration material, and a heater positioned to heat the first material and the infiltration material to form a reaction bonded material.

The system may further include a part fabrication apparatus, a machining apparatus and a computer that may include a processor, a computer readable medium connected to the processor, and a set of instructions on the computer readable medium. The set of instructions may include a CAD model storing module for storing an original CAD model with details of the part, a part fabrication module executable for the part fabrication apparatus to form and hold the first powder in a shape according to the CAD model before connecting the first particles of the first powder to one another to form a green part, and a machining module for the machining apparatus to machine the green part to the details of the original CAD model to form the part.

The system may further include that the part fabrication apparatus includes a print head, and a tool path module for developing a tool path based on the fabrication target model, the part fabrication module moving the print head relative to a substrate based on the tool path, the print head forming the shape according to the CAD model.

The system may further include that the part fabrication apparatus includes a deposition system that may include a first hopper for a first powder having first particles of a first material, a first nozzle through which the first powder flows out of the first hopper to form a first volume, a second hopper for a second powder having second particles of a second material, and a second nozzle through which the second powder flows out of the second hopper to form a second volume in contact with the first volume with an interface between the first and second volumes, the second particles forming at least part of a holder suitable to hold first particles in proximity to one another, the connection scheme, when employed, connects the particles to one another, wherein the first material is a positive material and the second material is a negative material so that the positive material preferentially connects the first particles to one another to a greater extent than the negative material connecting the second particles to one another, the positive material forming the part with an edge of the part defined by the interface, the part being removable from the second material.

The system may further include that the deposition system includes a support structure, a print head through which the first powder and the second powder are deposited, and a print head actuator, and a computer that is programmable to cause movement of the print head actuator for the print head actuator to move the first and second nozzles relative to the support structure to deposit a plurality of layers on one another, wherein at least a first of the layers includes a portion of the first material and a portion of the second material and at least a second of the layers includes a portion of the first material and a portion of the second material, wherein the first material of the second layer is in contact with the first material of the first layer, the connection scheme, when employed, connecting the particles of the first material of the second layer to the first material of the first layer.

The system may further include a computer including a processor or processors, a computer readable medium connected to the processor or processors, and a set of instructions on the computer readable medium. The set of instructions may include a CAD model storing module for storing a 3D CAD model with details of the part, and a tool path module for developing a tool path based on the 3D CAD model, wherein the tool path module is executable by the processor or processors to carry out a method including generating a plurality of 2D slices from the 3D CAD model, each 2D slice having at least one slice perimeter, performing, for each 2D slice, a 2D broadening of the perimeter based on a nozzle diameter to determine a broadened slice, generating, for each 2D slice, an infill of the broadened slice to form a print path of the tool path, and a build module that assembles the 2D slices after generating the infill for each 2D slice.

The method may further include receiving the nozzle diameter, the nozzle diameter being manually selectable.

The method may further include defining, for each 2D slice, a frontier based on the perimeter and a grid order, the frontier having interior and exterior points, wherein the broadening is based on the frontier.

The method may further include edge smoothing, for each 2D slice, the broadened slice.

The method may further include generating, for each 2D slice, a broadened perimeter based on the broadened slice after edge smoothing the slice.

The system may further include that the tool path module is distributed for execution between a first processor and a plurality of second processors, wherein the first processor generates the plurality or 2D slices and each second processor performs a broadening of at least one of the 2D slices.

The system may further include that the 2D slices are assembled by the first processor.

The system may further include that each second processor executes a method including generating, for the respective 2D slice, an infill of the broadened slice, and defining, for the respective 2D slice, a frontier based on the perimeter and a grid order, the frontier having interior and exterior points, wherein the broadening is based on the frontier.

The system may further include that the method executed by the respective second processor includes edge smoothing, for the respective 2D slice, the broadened slice.

The system may further include that the method executed by the respective second processor includes generating, for the respective 2D slice, a broadened perimeter based on the broadened slice after edge smoothing the slice.

The system may further include a print head, and the target fabrication module moving the print head relative to a substrate based on the tool path, the print head forming the shape according to the print path of the tool path.

The method may further include generating, for each 2D slice, a sintering path within the broadened slice.

The system may further include a laser source, and the target fabrication module moving the laser source relative to the broadened slice based on the sintering path of the tool path, the laser source forming the shape according to the sintering path of the tool path.

The system may further include a frame, a first nozzle mounted to the frame, a substrate mounted to the frame, a first powder container to hold the first powder, a first powder valve, a first actuator that has a portion connected to the first inner nozzle powder valve, a computer including a processor, a computer readable medium connected to the processor, a set of instructions on the computer readable medium, to carry out a method including moving the first actuator to move the first powder valve between a first position wherein the first powder cannot enter into a first end of the first nozzle and a second position wherein the first powder in the first powder container flows into the first nozzle, moving the first nozzle relatively from a starting point of a first shape over the substrate to an end point of the first shape over the substrate, the first nozzle having a lower surface that is sufficiently near the substrate for powder to flow out of the first nozzle and stop flowing out of the first nozzle when there is no more room below the first nozzle, moving, after the first nozzle has reached the end point of the first shape, the first actuator to move the first powder valve from the second position to the first position, moving the first nozzle relatively from the end point of the first shape over the substrate to an outside location to perform a nozzle clearing move over the substrate to empty the first powder valve while the first powder valve is in the second position, and a connection scheme which, when employed, connects the first particles to one another to form a part.

The system may further include a second powder container to hold a second powder, a second powder valve, a second actuator that has a portion connected to the second powder valve, the method including moving the second actuator to move the second powder valve between a respective first position wherein the second powder cannot enter into a respective first end of the second nozzle and a respective second position wherein the first powder in the second powder container flows into the second nozzle, moving the second nozzle relatively from a starting point of a second shape over the substrate to an end point of the second shape over the substrate, the second nozzle having a lower surface that is sufficiently near the substrate for powder to flow out of the second nozzle and stop flowing out of the second nozzle when there is no more room below the second nozzle, moving, after the second nozzle has reached the end point of the second shape, the second actuator to move the second powder valve from the respective second position to the respective first position, and moving the second nozzle relatively from the end point of the second shape over the substrate to an outside location to perform a nozzle clearing move over the substrate to empty the second powder valve while the second powder valve is in the second position.

The system may further include that the nozzle clearing move of the second nozzle completes the second shape.

The system may further include moving the first actuator to move the first powder valve between a first position wherein the first powder cannot enter into a first end of the first nozzle and a second position wherein the first powder in the first powder container flows into the first nozzle, moving the first nozzle relatively from a starting point of a second shape over the second shape to an end point of the second shape over the second shape, the first nozzle having a lower surface that is sufficiently near the second shape for powder to flow out of the first nozzle and stop flowing out of the first nozzle when there is no more room below the first nozzle, moving, after the first nozzle has reached the end point of the second shape, the first actuator to move the first powder valve from the second position to the first position, and moving the first nozzle relatively from the end point of the second shape over the substrate to an outside location to perform a nozzle clearing move over the substrate to empty the first powder valve while the first powder valve is in the second position.

The system may further include a first hopper to hold a mold-forming material, a second hopper to hold a sacrificial material, a manufacturing system operable to form a first layer, the first layer including a first quantity of the mold-forming material from the first hopper and a first quantity of the sacrificial material from the second hopper, and to form a second layer on the first layer, the second layer including a second quantity of the mold-forming material from the first hopper and a second quantity of the sacrificial material from the second hopper, a gas generation system positioned to introduce gas into and set the mold-forming material of the first and second layers, a removal system operable to remove the sacrificial material from the first and second layers to leave a void with a shape defined by a mold structure formed by the mold-forming material of the first and second layers, and a filling system operable to fill the void with a part-forming material to form the part defined by the shape of the mold structure, the mold structure being removable from the part to free the part from the mold structure.

The system may further include that the mold-forming material includes a granular material and a binder, and the gas activates the binder to set the mold-forming material.

The system may further include that the gas is steam.

The system may further include that the granular material is zircon sand, and the binder is sodium silicate.

The system may further include that the sacrificial material is removed by washing the sacrificial material out of the void with water.

The system may further include that the sacrificial material is melted out.

The system may further include that the manufacturing system is operable to form a third layer on the second layer, the third layer including a third quantity of the mold-forming material from the first hopper and a third quantity of the sacrificial material from the second hopper, and the removal system is operable to remove the sacrificial material from the third layer to leave the void with the shape defined by the mold structure third layer.

The invention also provides a manufacturing method including holding first particles of a first powder in proximity to one another, and connecting the first particles to one another to form a part.

The method may further include that the first powder is deposited by holding the first powder in at least one powder hopper, directing the first powder from the at least one powder hopper through a first nozzle of a print head onto a substrate, the first nozzle having a lower surface that is sufficiently near the substrate for powder to flow out of the first nozzle and stop flowing out of the first nozzle when there is no more room below the first nozzle, and moving the print head relative to the substrate, causing the first powder to resume flow out of the first nozzle.

The method may further include regulating flow of the first powder through the first nozzle.

The method may further include that flow of the first powder through the first nozzle is regulated by moving the first nozzle between a first position wherein an upper end of the first nozzle is above an upper surface of a volume of the first powder so that the first powder cannot drop into the upper end of the first nozzle and a second position wherein the upper end of the first nozzle is dropped relative to the first position so that the first powder flows into the first nozzle.

The method may further include that the first nozzle is a first inner nozzle and the print head has a first outer nozzle, the first outer nozzle positioned around the first inner nozzle, further including moving the first inner nozzle and first outer nozzle relative to one another between a first position wherein the first powder flowing through the first inner nozzle does not reach the first outer nozzle and a second position wherein the first powder flowing through the first inner nozzle flows laterally and does reach the first outer nozzle and powder stops flowing out of the first outer nozzle when there is no more room below the first outer nozzle and wherein said movement of the print head relative to the support structure caused the first powder to resume flow out of the first outer nozzle.

The method may further include that center lines of the first inner nozzle and first outer nozzle are concentric.

The method may further include that a center line of the first inner nozzle is offset relative to a center line of the first outer nozzle.

The method may further include that the first nozzle is a first inner nozzle and the print head defines a first outer chamber around the first inner nozzle, and a first outer nozzle out of the first outer chamber, further including moving a first nozzle actuator, causing movement of the first inner nozzle and the first outer chamber relative to one another between a first position wherein the first powder flowing through the inner nozzle does not reach the first outer chamber and a second position wherein the first powder flowing through the first inner nozzle flows laterally and does reach the first outer chamber and flows out of the first outer chamber through the first outer nozzle simultaneously with the first powder flowing out of the first inner nozzle, the first powder stops flowing out of the first outer chamber through the first outer nozzle when there is no more room below the first outer nozzle and wherein said movement of the print head relative to the support structure causes the first powder to resume flow out of the first outer nozzle.

The method may further include that the print head defines at least one first restricted flow passage connecting the first outer chamber to the first outer nozzle, the at least one first restricted flow passage having a smaller cross-section than the first outer nozzle to restrict flow of the first powder.

The method may further include that the print head defines a plurality of first restricted flow passages out of the outer chamber.

The method may further include that the first outer nozzle is an annular nozzle around the first inner nozzle and the plurality of first restricted flow passages connect the first outer chamber with the first outer nozzle.

The method may further include that the print head has a second nozzle for directing the first powder from the at least one powder hopper onto the substrate, the second nozzle having a lower surface that is sufficiently near the substrate for the first powder to flow out of the second nozzle and stop flowing out of the second nozzle when there is no more room below the second nozzle, wherein movement of the print head relative to the support structure causes the first powder to resume flow out of the second nozzle.

The method may further include regulating flow of the first powder through the first nozzle with a first regulating apparatus, and regulating flow of the first powder through the second nozzle with a second regulating apparatus.

The method may further include that the first nozzle is a first inner nozzle and the print head has an outer nozzle, the outer nozzle positioned around the first inner nozzle, the print head further including moving a first inner nozzle powder valve between an upper position wherein an upper end of the first inner nozzle powder valve is above an upper surface of a volume of a first powder in the first powder container so that the first powder cannot drop into the upper end of the first inner nozzle powder valve and a lower position wherein the upper end of the first inner nozzle powder valve is dropped relative to the upper position so that the first powder in the first powder container flows into the first inner nozzle, and moving a first outer nozzle powder valve between an upper position wherein an upper end of the first outer nozzle powder valve is above an upper surface of a volume of a first powder in the first powder container so that the first powder cannot drop into the upper end of the first outer nozzle and a lower position wherein the upper end of the first outer nozzle powder valve is dropped relative to the upper position so that the first powder in the first powder container flows into the outer nozzle.

The method may further include moving the outer nozzle relatively between a first powder position wherein the outer nozzle is around the first inner nozzle and a second powder position wherein the outer nozzle is around the second inner nozzle, moving a second inner nozzle powder valve between an upper position wherein an upper end of the second inner nozzle powder valve is above an upper surface of a volume of a second powder in the second powder container so that the second powder cannot drop into the upper end of the second inner nozzle and a lower position wherein the upper end of the second inner nozzle powder valve is dropped relative to the upper position so that the first powder in the second powder container flows into the second inner nozzle, and moving a second outer nozzle powder valve between an upper position wherein an upper end of the second outer nozzle powder valve is above an upper surface of a volume of a second powder in the second powder container so that the second powder cannot drop into the upper end of the second outer nozzle and a lower position wherein the upper end of the second outer nozzle powder valve is dropped relative to the upper position so that the first powder in the second powder container flows into the outer nozzle.

The method may further include that the at least one powder hopper includes:
- a first powder hopper for holding a first powder that flows through the first nozzle, and a second powder hopper for holding a second powder that flows through the second nozzle.

The method may further include holding second particles of a second powder in proximity to one another, wherein the first and second powders form a first layer with a surface of the first layer being in a first plane at the first powder of the first layer and in a second plane at the second powder of the first layer, the first plane being spaced from the second powder of the first layer and the second powder remaining loose and supporting the first powder of the first layer, and removing the second powder of the first layer from the first powder of the first layer to leave the part formed by the first powder of the first layer after the first particles of the first powder of the first layer are connected to one another to form the part.

The method may further include moving a screed bar over the first layer to level the first powder of the first layer.

The method may further include that the second powder of the first layer is deposited before the first powder of the first layer.

The method may further include that the first powder of the first layer and the second powder of the first layer are different types of powder.

The method may further include that the first powder of the first layer and the second powder of the first layer have the same particle sizes or particle size distributions.

The method may further include that the first powder of the first layer and the second powder of the first layer differ from one another in material or material compositions.

The method may further include that the first powder of the first layer and the second powder of the first layer differ from one another in particle size or particle size distribution.

The method may further include that the first powder of the first layer and the second powder of the first layer are made of the same material or material composition.

The method may further include that the connection scheme includes exposing the first powder of the first layer to laser light.

The method may further include forming a second layer by holding first particles of the first powder in proximity to one another, and holding second particles of the second powder in proximity to one another, wherein the second layer has surface that is in a third plane at the first powder of the second layer and in a fourth plane at the second powder, the third plane being spaced from the second powder of the second plane and the second powder of the second layer remaining loose and supporting the first powder, connecting the first particles of the second layer to one another to form the part, and removing the second powder of the second layer from the first powder of the second layer to leave the part formed by the first powder of the second layer after the first particles of the first powder of the second layer are connected to one another to form the part.

The method may further include that the second powder of the first layer and the second powder of the second layer are removed after the part is formed from the first powder of the first layer and the first powder of the second layer.

The method may further include moving a screed bar over the second layer to level the first powder of the second layer.

The method may further include forming a first volume of the first powder having first particles of a first material in contact with a second volume of second powder having second particles of a second material with an interface between the first and second volumes, employing a connection scheme to connect particles of a first portion of the first volume to one another to form a part without connecting particles of a second portion of the first volume to one another, removing the second powder and the second portion of the first powder from the part, and separating the second powder and the second portion of the first powder from one another.

The method may further include that the second powder and the second portion of the first powder are magnetically separated.

The method may further include that the second powder and the second portion of the first powder are separated by subjecting the second powder and the second portion of the first powder to a high frequency magnetic field.

The method may further include that the second powder and the second portion of the first powder are separated based on their solubility in a solvent.

The method may further include that the second powder and the second portion of the first powder are separated based on their respective melting temperatures.

The method may further include that the second powder and the second portion of the first powder are separated based on particle size.

The method may further include that the particles of the first portion of the first volume are connected by heating the particles to consolidate the particles.

The method may further include that the particles are heated using induction heating, laser heating, high intensity light heating, radiant heating or electron beam heating.

The method may further include that the particles are selectively heated using induction heating and by tuning an induction frequency to heat the first particles.

The method may further include that the induction heating uses pulsed duty cycles to heat the first particles.

The method may further include depositing a plurality of layers on one another, wherein at least a first of the layers includes a portion of the first material and a portion of the second material and at least a second of the layers includes a portion of the first material and a portion of the second material, wherein the first material of the second layer is in contact with the first material of the first layer, and connecting the particles of the first material of the second layer to the first material of the first layer.

The method may further include heating the first layer to consolidate the particles of the first material of the first layer before depositing the second layer on the first layer, and heating the second layer, after depositing the second layer on the first layer, to consolidate the particles of the first material of the second layer.

The method may further include that flow of the first powder through a first nozzle is regulated by moving the first nozzle between a first position wherein an upper end of the first nozzle is above an upper surface of a volume of the first powder so that the first powder cannot drop into the upper end of the first nozzle and a second position wherein the upper end of the first nozzle is dropped relative to the first position so that the first powder flows into the first nozzle.

The method may further include that the first nozzle is mounted to the first powder container for vertical movement between the first position and the second position.

The method may further include that a first connecting piece having a lower portion is secured to the first nozzle and having an upper portion located higher than the upper end of the first nozzle, a first nozzle actuator being attached to the upper portion of the first connecting piece.

The method may further include that the first connecting piece and the first nozzle are made out of a common piece of material to form a valve piece.

The method may further include that a first seal piece connected between the first powder container and the first nozzle.

The method may further include that a bellows is connected between the first powder container and the first nozzle.

The method may further include that the first nozzle actuator has a portion connected to a print head frame to move the first nozzle relative to the print head frame.

The method may further include that the first nozzle actuator is connected through a print head frame to the first nozzle and has a portion connected to the first powder container to move the first powder container relative to the first nozzle.

The method may further include forming a first volume of first powder having first particles of a first material in contact with a second volume of second powder having second particles of a second material with an interface between the first and second volumes, and exposing the particles to a plasma from a plasma source to heat at least the first particles connect the first particles to one another, wherein the first material is a positive material and the second material is a negative material so that the positive material preferentially connects the first particles to one another to a greater extent than the negative material connecting the second particles to one another, the positive material forming the part with an edge of the part defined by the interface.

The method may further include that the plasma is generated by adding energy to a gas to ionizing the gas to create ions and electrons, whereafter the plasma penetrates between the first particles, whereafter the ions and electrons recombine to release energy.

The method may further include that the gas is nitrogen gas.

The method may further include that the second particles are exposed to the plasma.

The method may further include depositing a plurality of layers on one another, wherein at least a first of the layers includes a portion of the first material and a portion of the second material and at least a second of the layers includes a portion of the first material and a portion of the second material, wherein the first material of the second layer is in contact with the first material of the first layer, and connecting the particles of the first material of the second layer to the first material of the first layer by heating the particles with the plasma.

The method may further include that the second volume is within the first volume.

The method may further include that the first volume entirely encloses the second volume.

The method may further include that the first and second layers have different thicknesses.

The method may further include heating the first layer to consolidate the particles of the first material of the first layer before depositing the second layer on the first layer, and heating the second layer, after depositing the second layer on the first layer, to consolidate the particles of the first material of the second layer.

The method may further include machining the part.

The method may further include that the part is a green part with structural integrity, further including heat treating the green part to form heat treated part.

The method may further include that the first powder is deposited by holding the first powder in a first powder hopper, directing the first powder from the first powder hopper through a first nozzle of a print head onto a substrate, and moving the print head relative to the substrate.

The method may further include depositing a second powder by holding the second powder in a second powder hopper, and directing the second powder from the second powder hopper through a second nozzle of the print head onto the substrate.

The method may further include that the first and second powders are simultaneously deposited onto the substrate.

The method may further include that the negative material includes Tungsten, Zircon, Silicon Carbide, Alumina, WC, or Chromite.

The method may further include that the positive material includes Iron, copper, aluminum, titanium or a ceramic.

The method may further include that the first and second powders are deposited at the same time with an interface between the first powders where the first powders meet.

The method may further include measuring, with a sensor, an electrical impedance over the first particles.

The method may further include that the sensor measures the electrical impedance as the electrical impedance changes.

The method may further include that the electrical impedance changes over time as the first particles are connected to one another.

The method may further include holding the first particles within a first volume, wherein the first particles are of a first material and connecting the first particles leaves voids within the first material, holding an infiltration material within a second volume, and directing the infiltration material into the voids so that the second material infiltrates the first material, wherein the electrical impedance changes over time as the infiltration material infiltrates the first particles.

The method may further include that the first particles are connected to one another by heating the first particles to sinter the first particles.

The method may further include directing the infiltration material from the second volume through a passage with a smaller cross-section than the second volume into the first volume.

The method may further include heating the infiltration material so that the infiltration material melts and flows into the first material.

The method may further include that the first particles are connected to one another by heating the first particles to a first temperature to sinter the first particles, further including heating the infiltration material to a second temperature that is higher than the first temperature so that the infiltration material melts and flows into the first material.

The method may further include forming a holder that defines the first and second volumes out of a negative material, and removing the negative material from the first material after the infiltration.

The method may further include holding the first particles within a first volume, wherein the first particles are of a first material and connecting the first particles leaves voids within the first material, holding an infiltration material within a second volume, directing the infiltration material into the voids so that the second material infiltrates the first material, the first material including silicon carbide, one of the first material and second material including carbon, and the other one of the first material and second material including silicon, and heating the silicon carbide, carbon and silicon to form reaction bonded silicon carbide.

The method may further include that the silicon and the carbon are heated to below the melting temperature of Silicon of 1450 degrees Celsius to form the reaction bonded silicon carbide.

The method may further include that the first particles are of a first material that includes silicon, further including heating the infiltration material until the infiltration material decomposes into at least the carbon.

The method may further include that the first material includes a mixture of elemental silicon and silicon carbide particles.

The method may further include that the first material includes a silicon to silicon carbide ratio of approximately 40% to 60% by volume.

The method may further include that the infiltration material is a Phenolic resin.

The method may further include that the infiltration material is Phenol-formaldehyde.

The method may further include that the first particles are of a first material that includes carbon, and the infiltration material includes silicon.

The method may further include that the first material includes a mixture of silicon carbide and elemental carbon particles.

The method may further include that the first particles are connected to one another by heating the first particles to sinter the first particles.

The method may further include directing the infiltration material from the second volume through a passage with a smaller cross-section than the second volume into the first volume.

The method may further include heating the infiltration material so that the infiltration material melts and flows into the first material.

The method may further include that the first particles are connected to one another by heating the first particles to a first temperature to sinter the first particles, further including heating the infiltration material to a second temperature that is higher than the first temperature so that the infiltration material melts and flows into the first material.

The method may further include holding the first particles within a first volume, wherein the first particles are of a first material and connecting the first particles leaves voids within the first material, holding a second material within a second volume, directing the second material into the voids so that the second material infiltrates the first material to form a pre-reaction mixture that includes aluminum and titanium, and heating the aluminum and the titanium to form γ-TiAl.

The method may further include that the first material includes the titanium, and the infiltration material includes the aluminum.

The method may further include that the heating initiates self-propagating high temperature synthesis (SHS) causing combustion to form the γ-TiAl.

The method may further include that the first particles are connected to one another by heating the first particles to sinter the first particles.

The method may further include directing the infiltration material from the second volume through a passage with a smaller cross-section than the second volume into the first volume.

The method may further include heating the infiltration material so that the infiltration material melts and flows into the first material.

The method may further include that the first particles are connected to one another by heating the first particles to a first temperature to sinter the first particles, further including heating the infiltration material to a second temperature that is higher than the first temperature so that the infiltration material melts and flows into the first material.

The method may further include holding the first particles within a first volume, wherein the first particles are of a first material and connecting the first particles leaves voids within the first material, holding an infiltration material within a second volume, directing the infiltration material into the voids so that the second material infiltrates the first material to form a pre-reaction mixture that includes first material and the infiltration material, and heating the first material and the infiltration material to form a reaction bonded material.

The method may further include storing a CAD model with details of the part, wherein the first powder is formed and held in a shape according to the CAD model before connecting the first particles of the first powder to one another to form a green part, and machining the green part to the details of the original CAD model to form the part.

The method may further include developing a tool path based on the CAD model, and moving a print head relative to a substrate based on the tool path, the print head forming the shape according to the CAD model.

The method may further include forming a first volume of first powder having first particles of a first material in contact with a second volume of second powder having second particles of a second material with an interface between the first and second volumes, and the connection scheme connecting the particles to one another, wherein the first material is a positive material and the second material is a negative material so that the positive material preferentially connects the first particles to one another to a greater extent than the negative material connecting the second particles to one another, the positive material forming the part with an edge of the part defined by the interface.

The method may further include depositing a plurality of layers on one another, wherein at least a first of the layers includes a portion of the first material and a portion of the second material and at least a second of the layers includes a portion of the first material and a portion of the second material, wherein the first material of the second layer is in contact with the first material of the first layer, and connecting the particles of the first material of the second layer to the first material of the first layer.

The method may further include storing, with a processor or processors, a 3D CAD model on a storage medium with details of the part, and generating a plurality of 2D slices from the 3D CAD model, each 2D slice having at least one slice perimeter, performing, with the processor or processors, a 2D broadening of the perimeter based on a nozzle diameter to determine a broadened slice, generating, for each 2D slice, an infill of the broadened slice to form a print path of the tool path, and assembling the 2D slices after generating the infill for each 2D slice.

The method may further include receiving, with the processor or processors, the nozzle diameter, the nozzle diameter being manually selectable.

The method may further include defining, with the processor or processors, for each 2D slice, a frontier based on the perimeter and a grid order, the frontier having interior and exterior points, wherein the broadening is based on the frontier.

The method may further include edge smoothing, with the processor or processors, for each 2D slice, the broadened slice.

The method may further include generating, with the processor or processors, for each 2D slice, a broadened perimeter based on the broadened slice after edge smoothing the slice.

The method may further include that the tool path module is distributed for execution between a first processor and a plurality of second processors, wherein the first processor generates the plurality or 2D slices and each second processor performs a broadening of at least one of the 2D slices.

The method may further include that the 2D slices are assembled by the first processor.

The method may further include that each second processor executes a method including generating, for the respective 2D slice, an infill of the broadened slice, and defining, for the respective 2D slice, a frontier based on the perimeter and a grid order, the frontier having interior and exterior points, wherein the broadening is based on the frontier.

The method may further include that the method executed by the respective second processor includes edge smoothing, for the respective 2D slice, the broadened slice.

The method may further include that the method executed by the respective second processor includes generating, for the respective 2D slice, a broadened perimeter based on the broadened slice after edge smoothing the slice.

The method may further include moving a print head relative to a substrate based on the print path of the tool path, the print head forming the shape according to the fabrication target.

The method may further include generating, for each 2D slice, a sintering path within the broadened slice.

The method may further include moving a laser source relative to the broadened slice based on a tool path, the laser source forming the shape according to the sintering path of the tool path.

The method may further include moving a first actuator that has a portion connected to a first powder valve and operable to move the first powder valve between a first position wherein the first powder cannot enter into a first end of the first nozzle and a second position wherein the first powder in the first powder container flows into the first nozzle, moving the first nozzle relatively from a starting point of a first shape over a substrate to an end point of the first shape over the substrate, the first nozzle having a lower surface that is sufficiently near the substrate for powder to flow out of the first nozzle and stop flowing out of the first nozzle when there is no more room below the first nozzle, moving, after the first nozzle has reached the end point of the first shape, the first actuator to move the first powder valve from the second position to the first position, moving the first nozzle relatively from the end point of the first shape over the substrate to an outside location to perform a nozzle clearing move over the substrate to empty the first powder valve while the first powder valve is in the second position, and connecting the first particles to one another to form a part.

The method may further include moving a second actuator to move a second powder valve between a respective first position wherein a second powder cannot enter into a respective first end of the second nozzle and a respective second position wherein the first powder in the second powder container flows into the second nozzle, moving the second nozzle relatively from a starting point of a second shape over the substrate to an end point of the second shape over the substrate, the second nozzle having a lower surface that is sufficiently near the substrate for powder to flow out of the second nozzle and stop flowing out of the second nozzle when there is no more room below the second nozzle, moving, after the second nozzle has reached the end point of the second shape, the second actuator to move the second powder valve from the respective second position to the respective first position, and moving the second nozzle relatively from the end point of the second shape over the substrate to an outside location to perform a nozzle clearing move over the substrate to empty the second powder valve while the second powder valve is in the second position.

The method may further include that the nozzle clearing move of the second nozzle completes the second shape.

The method may further include moving the first actuator to move the first powder valve between a first position wherein the first powder cannot enter into a first end of the first nozzle and a second position wherein the first powder in the first powder container flows into the first nozzle, moving the first nozzle relatively from a starting point of a second shape over the second shape to an end point of the second shape over the second shape, the first nozzle having a lower surface that is sufficiently near the second shape for powder to flow out of the first nozzle and stop flowing out of the first nozzle when there is no more room below the first nozzle, moving, after the first nozzle has reached the end point of the second shape, the first actuator to move the first powder valve from the second position to the first position, and moving the first nozzle relatively from the end point of the second shape over the substrate to an outside location to perform a nozzle clearing move over the substrate to empty the first powder valve while the first powder valve is in the second position.

The method may further include holding a mold-forming material in a first hopper, holding a sacrificial material in a second hopper, forming a first layer, the first layer including a first quantity of the mold-forming material from the first hopper and a first quantity of the sacrificial material from the second hopper, forming a second layer on the first layer, the second layer including a second quantity of the mold-forming material from the first hopper and a second quantity of the sacrificial material from the second hopper, introducing gas into the mold-forming material to set the mold-forming material of the first and second layers, removing the sacrificial material from the first and second layers to leave a void with a shape defined by a mold structure formed by the mold-forming material of the first and second layers, filling the void with a part-forming material to form the part defined by the shape of the mold structure, and removing the mold structure from the part to free the part from the mold structure.

The method may further include that the mold-forming material includes a granular material and a binder, and the gas activates the binder to set the mold-forming material.

The method may further include that the gas is steam.

The method may further include that the granular material is zircon sand, and the binder is sodium silicate.

The method may further include that the sacrificial material is removed by washing the sacrificial material out of the void with water.

The method may further include that the sacrificial material is melted out.

The method may further include forming a third layer on the second layer, the third layer including a third quantity of the mold-forming material from the first hopper and a third quantity of the sacrificial material from the second hopper, and removing the sacrificial material from the third layer to leave the void with the shape defined by the mold structure third layer.

BRIEF DESCRIPTION OF THE DRAWINGS

The invention is further described by way of example with reference to the accompanying drawings, wherein:

FIGS. 1a-1c illustrate the effect of skin depth on the manner in which a small particle is heated;

FIG. 2 is a graph showing power transfer factor as it depends on "electrical dimension";

FIGS. 3a-3c are perspective views of a metallic sphere wherein the "electrical dimension" is not fixed;

FIG. 4 is perspective view of a metallic sphere wherein the "electrical dimension" is fixed;

FIGS. 48a-48d are cross-sectional side views of a manufacturing method according to the invention that includes an infusion of a material;

FIGS. 55a-55i include schematics that illustrate a manufacturing method that includes the design and manufacture of a near net shape part;

FIG. 56 is a block diagram illustrating control components of the system;

FIGS. 63a-63f are cross-sectional side views of a method of forming a part with the need for multi-material powder separation methods;

FIG. 89 includes partial perspective views and calculation that show the results of the steam processing of a typical 3D printed mold; and FIG. 90 includes perspective views that show a few examples of large-scale industrial autoclaves that can be used for this mold set process.

DETAILED DESCRIPTION OF THE INVENTION

Induction Heating of Fine Metal Powders

Figure 5A:
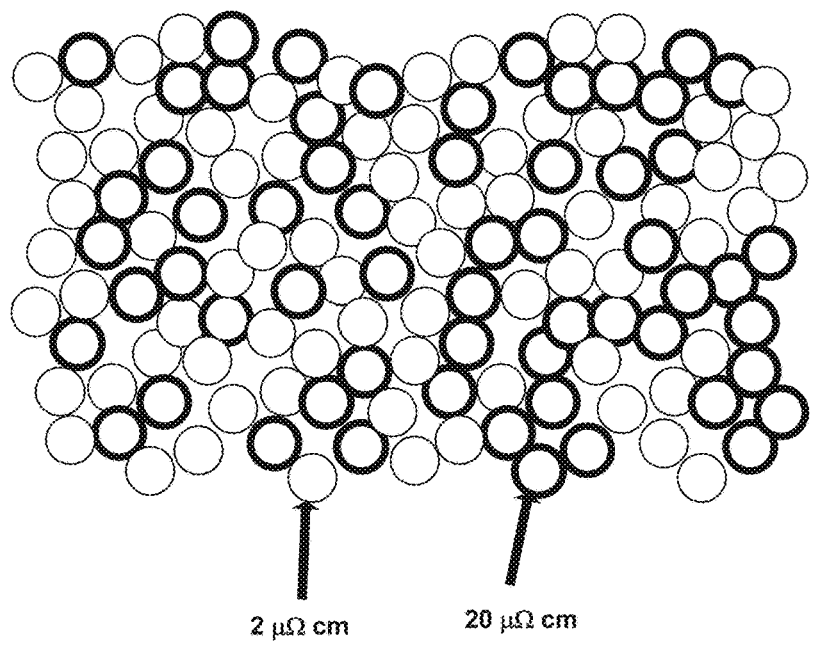
FIGS. 5a-5c are plan views illustrating the application of micro-inductive sintering (MIS) technology on an ideal mixture of mono-disperse metal powders.

Micro-Induction Sintering (MIS) is a new additive manufacturing process described herein in which a metallic powder is consolidated via high frequency induction heating. Unlike laser- or electron beam-based additive manufacturing techniques in which the metal powder is heated indiscriminately by an external energy source, the MIS technique allows for the selective heating of individual particles by tailoring the frequency of an applied magnetic field. A localized high frequency magnetic field is produced at the powder bed using a specifically designed flux concentrator (FC) system.

Heating of metallic particles by induction is a result of both Joule heating due to eddy currents in non-magnetic metallic particles and hysteresis loss in magnetic particles, both of which result from the application of a high frequency magnetic field. For non-magnetic metals, eddy currents flow within a certain distance from the surface of the material. The distance within the metal at which the eddy current is reduced to approximately 37% of the value at the surface is called the skin depth δ and can be written as, $$\delta = \sqrt{\frac{\rho}{\pi f \mu}} \quad [1]$$

where ρ is the resistivity and μ is the permeability of the material, and f is the selected frequency of the magnetic field. In order to heat a metal particle by induction, it is important to immerse the particle in a high frequency magnetic field such that the skin depth is less than one half the diameter of the particle. As shown in FIG. 1a, the dimension of the particle is approximately 2δ. In this case, the eddy currents penetrate deep into the particle and bulk heating occurs by induction. In FIG. 1b, the dimension of the part is much larger than δ. Here, only the surface of the part is heated via induction. In FIG. 1c, the skin depth is much larger than the dimension of the part and the eddy currents largely cancel in the particle. In this case, the part does not couple well to the alternating magnetic field and the material absorbs very little power.

For simple shaped (e.g. flat or cylindrical) materials placed in a uniform alternating magnetic field, the power absorbed by the part ($P_w$) can be written as:

$$P_w = \frac{\rho}{\delta} AKH^2 = AKH^2 \sqrt{\pi f \mu \rho} \quad [2]$$

where ρ is the resistivity of the material, δ is the skin depth, A is the surface of the part exposed to the magnetic field, K is a power transfer factor that depends on a geometry of the part relative to the applied magnetic field, and H is the magnetic field strength. In principle, it is possible to calculate the power absorbed by a given metallic part in an induction heating process using modern finite element analysis methods. As a rule of thumb, with a fixed resistivity, magnetic permeability, and part dimensions, the power absorbed by the part in an induction heating process increases with increasing frequency and magnetic field strength.

In equation [2], the only ill-defined quantities are A and K, which describes how well the high-frequency magnetic field couples to an individual part. For a given component geometry and form factor of the applied AC magnetic field, A can be calculated. The power transfer factor K, on the other hand, depends on the "electrical dimension" of the part being heated, which is defined as the ratio of the diameter (outside dimension) of the part to the skin depth, d/δ. This is shown in FIG. 2 for two limiting cases of a plate and a cylinder. In the plate geometry, for example, the power transfer factor K has a maximum for d/δ of approximately 3. In order to maximize the total transfer of power to the part, however, the "electrical dimension" of the part must be as low as possible while still maintaining a large K. In general, the maximum power transfer to bulk heat cylinders or plates is achieved when d/δ is approximately 4. This illustrates the critical relationship between the dimension of the part to be heated by induction and the frequency of the magnetic field.

Unlike plates or cylinders, metal powders typically used in additive manufacturing processes consist of spherical particles. Consider a metallic sphere immersed in a high frequency magnetic field as shown in FIG. 3a. In this case, the "electrical dimension" of the sphere is not fixed. This results in an additional frequency dependent component to K for spherical metal powders. To illustrate, consider the approximation to the spherical particle shown in FIG. 3b, which consists of a stack of circular plates with diameters that inscribe the surface of a sphere. Each circular plate is at right angles to a magnetic flux field line H forming an axis of the sphere. Within each layer in this approximation, the K for plates shown in FIG. 2 can be used to describe the efficiency of power transfer. For a fixed frequency such that d/δ=4, where d is the particle diameter, the power transfer factor is large and bulk heating of the plate occurs because the eddy currents flow around the perimeter and penetrate deep within the plate. As the effective diameter decreases towards the "poles" of the sphere, however, the "electrical dimension" of each plate decreases and the effective K decreases to zero. This means, that for a fixed induction heating frequency, the "equator" of the particle is heated, but the "poles" do not couple well to the applied magnetic field and are only heated by thermal conduction within the material. This is shown schematically in FIG. 3c where thicker cross-hatching at the equator of the sphere indicates the inhomogeneous heating of the spherical particle by induction for magnetic field frequencies such that d/δ=4.

The effective heating of spherical particles can be achieved by selecting the frequency of the applied magnetic field to maximize the overall power transfer to the particle. This is illustrated in FIG. 4, where the frequency is fixed such that d/δ~6. In this case, the power transfer factor is large above and below the "equator" and bulk heating of the "tropic" plates occurs because the eddy currents flow around the perimeter and penetrate deep within the plate. At the "equator", K is still large and d/δ is larger than 6, which results in the surface heating of the spherical particle at and near the equator in addition to the bulk heating at the "tropics".

In general, the reduced effective diameter near the "poles" of the spherical particle will require higher induction frequencies to cause bulk heating of the entire particle. It is estimated that the "electrical dimension" appropriate for the efficient heating of spherical metal particles will be between 4 and 8. The determination of the frequency dependent K appropriate for the bulk heating of spherical metal powders is of critical importance to the MIS additive manufacturing method. A detailed model of K for a sphere will guide the continued design of power supplies for the MIS flux concentrator.

Induction Heating of Composite Powders

Equations [1] and [2], along with the functional dependence of K(d/δ), provide a powerful toolbox for the selective heating of individual particles in composite materials. This is a distinctive advantage of the MIS method over competing metal-based additive manufacturing techniques such as selective laser sintering (SLS) and electron beam deposition (EBD). Here, we describe two conceptual composite architectures with an emphasis on the selective heating of individual components of the composite during the consolidation process.

Figure 5B:
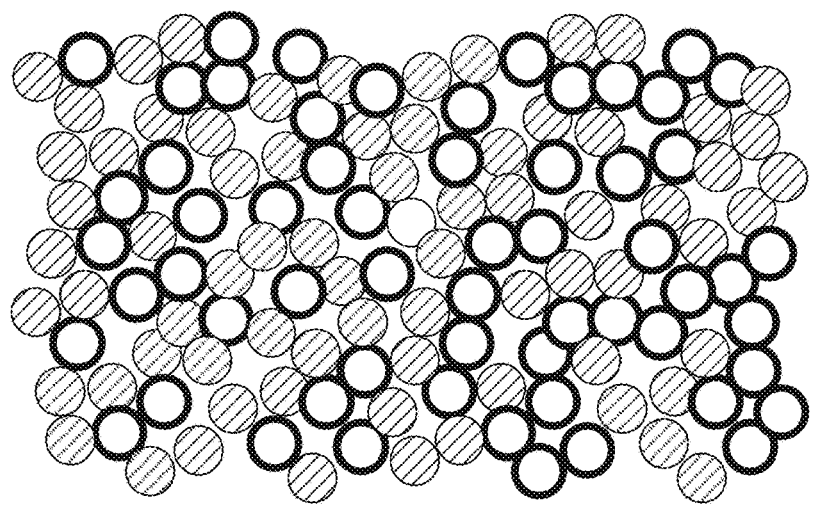
Figure 5C:
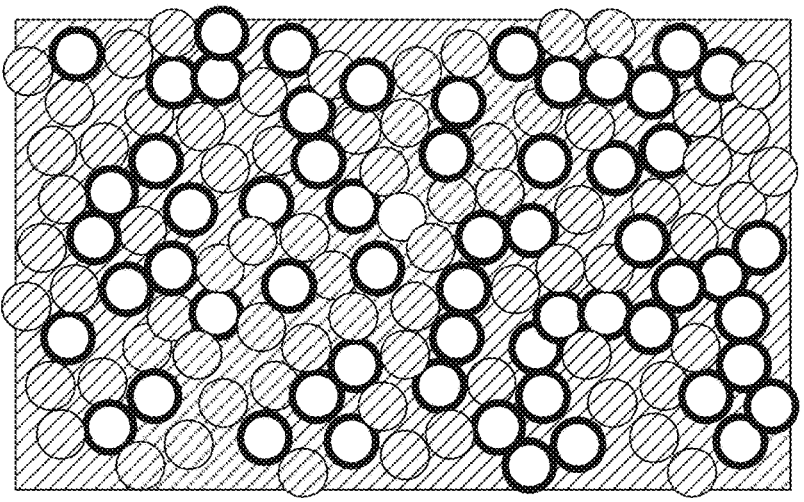

FIGS. 5a to 5c illustrate the application of MIS technology to an ideal mixture of mono-disperse metal powders. In FIG. 5a, it is seen that this mixture consists of two different materials (represented as solid circles and empty circles) with approximately the same particle size, but with different materials properties. In this example, the resistivity p of the grey particle is 10 times greater than the resistivity of the blue particle. Assuming that bulk heating of the particles occurs when d/δ is approximately 6 the ideal induction frequency can be written as, $$f = \frac{36\rho}{\pi\mu d^2} \quad [3]$$

where d is the diameter of the particle. Thus, for a given particle size and magnetic permeability, the ideal induction frequency to achieve bulk heating of a particle scales linearly with the resistivity of the material. In this case, the thin circle particles can be selectively heated in bulk using an oscillating magnetic field with a frequency 10 times smaller than that which would be used to bulk heat the thick circle particles. This is illustrated in FIG. 5b, which explicitly shows the selective heating of the thin circle particles. Note that the thick circle particles are also heated in this process, but only by conduction and convection heating that results from the selective induction heating of the thin circle particles. FIGS. 5a to 5c depict the heating of the thin circle particles in this example because the frequency of the magnetic field is set such that the "electrical dimension" at the "tropics" of the spherical particle is approximately 4. Referring to equation [1], the skin depth of the thick circle is approximately √10 ~3.2 times that of the thin circle particle at this frequency, as described with reference to FIG. 1c. Since the skin depth in the thick circle particle is much larger than the particle diameter, there is very poor coupling to the high frequency magnetic field and these particles are not heated directly by induction.

In this example, the consolidation of the composite is driven by the selective sintering of the thin circle particles, with the thick circle particles remaining as inclusions in the solid. This is illustrated in FIG. 5c that shows the consolidation of the thin circle particles with isolated thick circle particles in the composite. Note that upon consolidation of the thin circle particles, the effective domain size of the thin circle material increases, and the high frequency magnetic field tuned to the initial size of the thin circle particles no longer couples well to the thin circle material. In this case, the effective particle size is much larger than the skin depth at this frequency and the entire consolidated domain is heated at the surface as depicted schematically in FIG. 1b.

The coupling and de-coupling of the high frequency magnetic field based on the domain size of the metallic material allows for real-time diagnostics of the MIS consolidation process through the monitoring of the forward and reflected power to the powder bed. In addition, it allows for the rapid and automatic de-coupling of the external heat source (i.e. the high frequency magnetic field) upon consolidation of the particles. This is an important control feature in the consolidation of heat sensitive materials or composite materials that may degrade upon exposure to elevated temperatures.

Figure 6A:
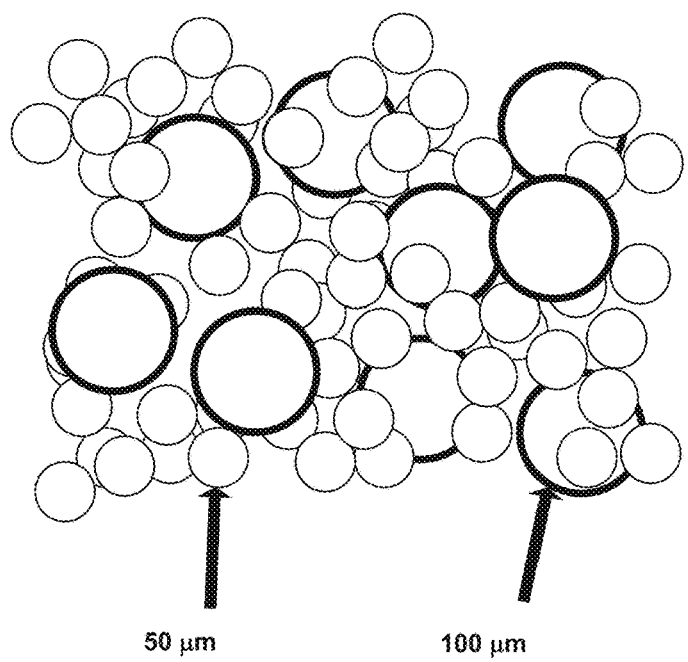
FIGS. 6a-6c illustrate the application of MIS technology on a bi-modal distribution of particles.
Figure 6B:
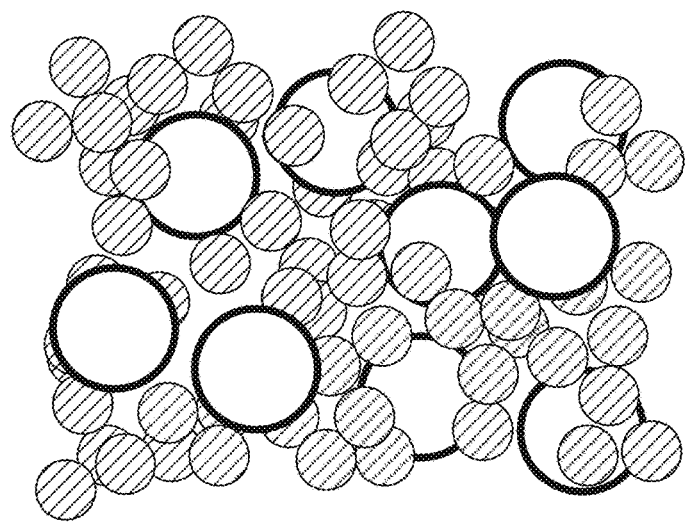
Figure 6C:
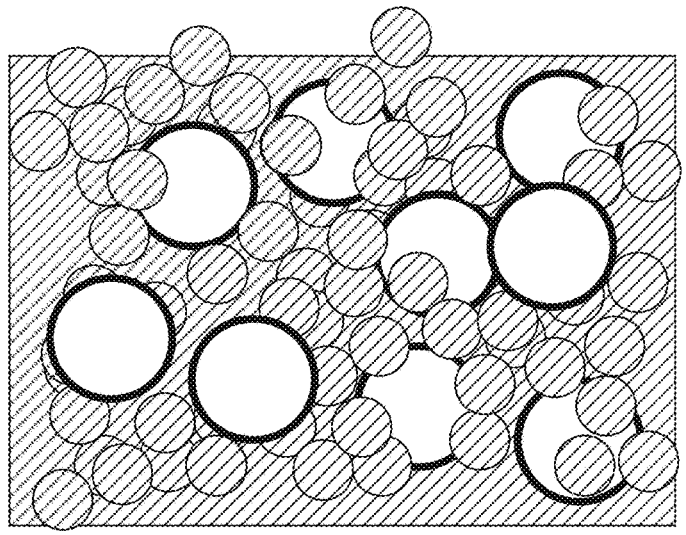

The previous example illustrates the selectivity that the MIS process has with powders that possess similar particle size distributions, but different materials properties. Here, we illustrate the selectivity of the MIS process simply based on the size of the particles in the powder. Consider the ideal metal powder shown in FIG. 6a, which consists of a bimodal distribution of particles with the larger of the two particles being approximately twice the diameter of the smaller particles. Again, the smaller particles can be selectively heated by the ideal induction frequency defined by equation [3], where it is seen that the ideal induction frequency varies as $d^{-2}$. Thus, a twofold increase in particle size implies a fourfold decrease in the frequency of the oscillating magnetic field necessary to achieve bulk heating. FIG. 6b illustrates the bulk heating of the smaller particles and the surface heating of the larger particles that is characteristic of the MIS process using narrow bandwidth fixed frequencies, with complete consolidation shown in FIG. 6c. As in the previous example, upon consolidation of the particles, the effective domain size of the material increases, and the high frequency magnetic field tuned to the initial diameter of the smaller particles becomes de-coupled from the consolidated material and the entire domain is heated by induction only at the surface.

In the composite architectures described above, the frequency of the induction heating process is used to selectively heat specific components of the composite based on the physical or materials characteristics of the powder. In the previous example, the small particles are selectively heated by induction, which results in the consolidation of the material. By changing the frequency of the magnetic field, however, the large particles could have been selectively heated by induction, which may lead to an improved density of the final part. In practice, the specific sintering characteristics of the material will determine the operating frequency and bandwidth of the MIS flux concentrator.

General Aspects of the MIS Process

Micro-Induction Sintering is a unique additive manufacturing process capable, in principle, of producing complex parts and components directly from advanced metal and ceramic/metal matrix composite powders. The MIS process, however, is not without limitations imposed by the radio frequency (RF) power electronics, the electrical characteristics of the flux concentrator, the specific sintering characteristics of the metallic powders, and the fundamental physics of induction heating. In general, the MIS process is viable within the following approximate operational parameters:

1) Materials with electrical resistivities between 1 μΩcm and 400 μΩcm.
2) Powders with particle sizes between 1 μm and 500 μm.
3) MIS-FC operational frequencies between 0.5 MHz and 3 GHz.

Figure 7:
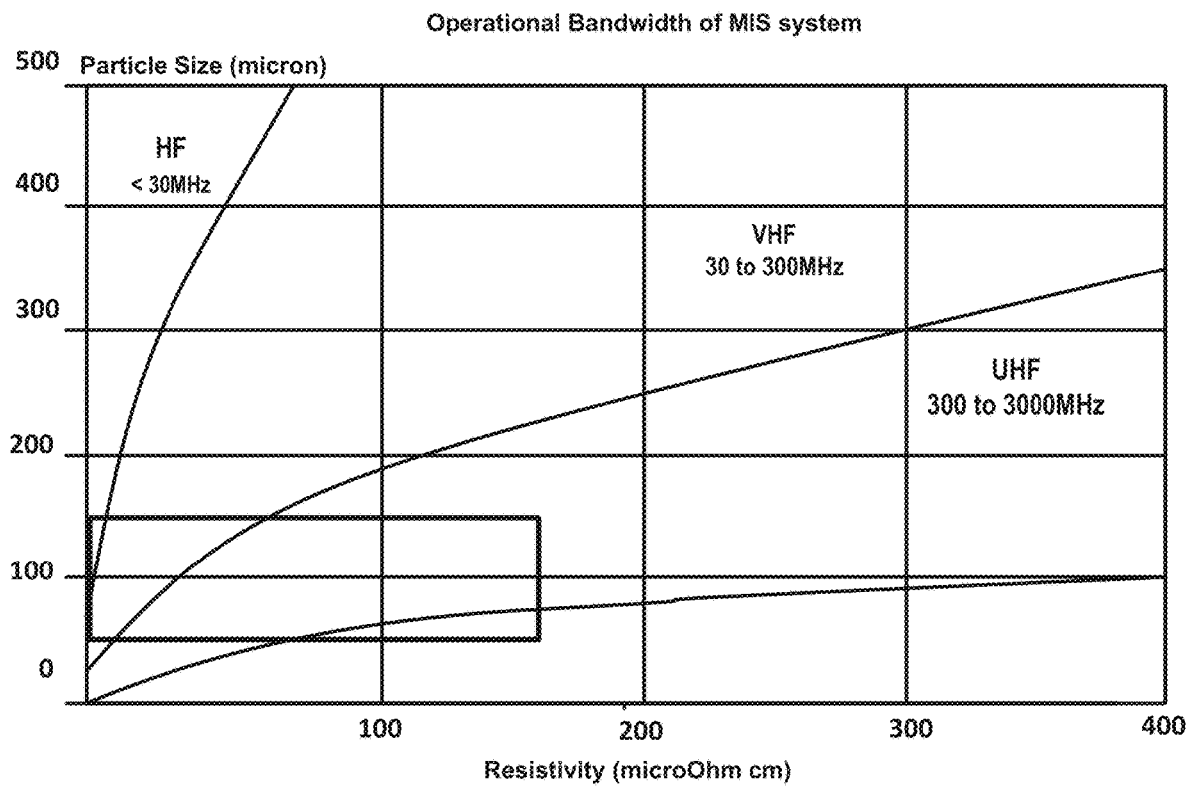
FIG. 7 is a graph illustrating the operational bandwidth of an MIS system.

Using this parameter space and equation [3], the operative phase space for the bulk heating of powders by high frequency induction can be determined. FIG. 7 illustrates the operational frequencies of the MIS system as a function of particle size and resistivity. There are three primary operational frequency bands show in the Figure:

1) High Frequency (HF)—frequencies less than 30 MHz and greater than 0.1 MHz.
2) Very High Frequency (VHF)—frequencies greater than 30 MHz and less than 300 MHz.
3) Ultra High Frequency (UHF)—frequencies greater than 300 MHz and less than 3 GHz.

The vast majority of materials used in additive manufacturing processes possess particle size distributions ranging between 50 μm and 150 μm with electrical resistivities less than 100 μΩcm. This operational space is highlighted by the box in FIG. 7, which shows that most materials can be heated by the MIS process in the VHF and UHF bands. Any material that falls below the UHF band is not a practical candidate for the MIS process based on the operational parameters listed above.

Figure 8:
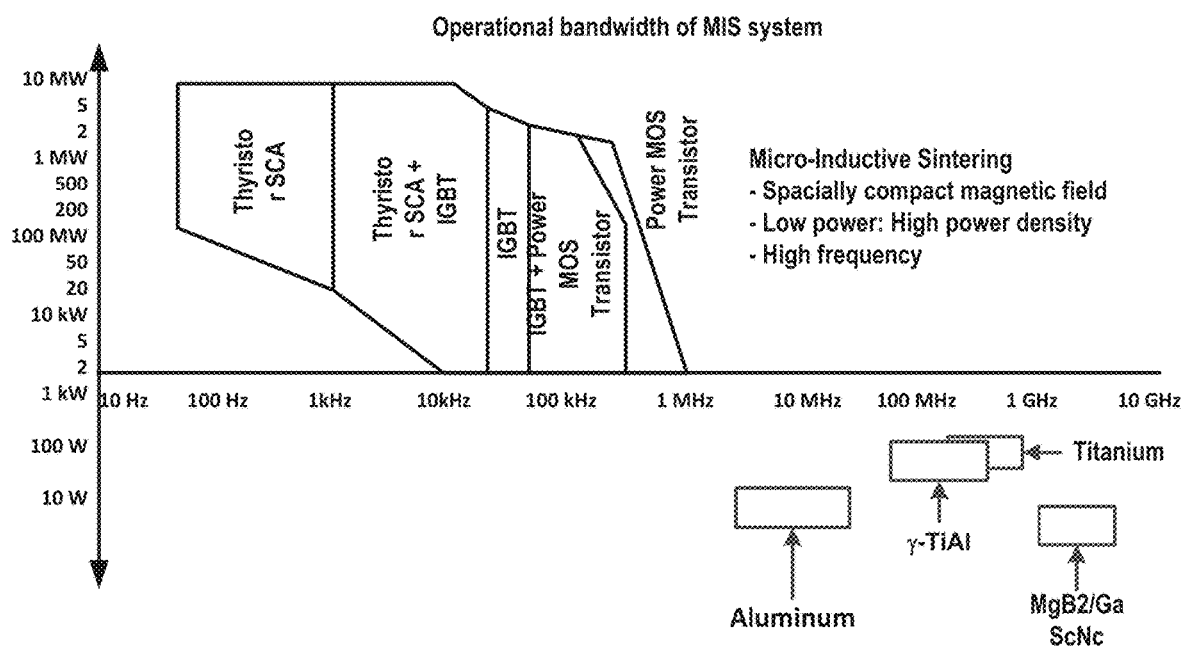
FIG. 8 is a graph illustrating the frequencies and power of commercially available power supplies and the frequencies and power required for MIS technology.

FIG. 8 shows a general list of commercially available power supplies for induction heating systems is shown in FIG. 8, where it is seen that the vast majority of commercial systems operate at frequencies less than 1 MHz and possess power levels up to 10 MW. In contrast, the heating and subsequent consolidation of fine metal powders requires a power supply with a bandwidth from greater than 1 MHz to nearly 5 GHz at power levels up to a few hundred watts. The highlighted areas in FIG. 8 shows the operating specifications of the power supply suitable for the MIS process based on commercial particle size distributions and the electrical properties of the materials. Note that the frequencies required to heat and sinter fine metal and ceramic/metal matrix powders using MIS are 10 to 1000 times higher than conventional induction heating frequencies.

The Evolution of the Flux Concentrator

A central component in the MIS additive manufacturing system is the flux concentrator. This component focuses a high frequency magnetic field into a spatially compact region on a powder bed, resulting in the rapid joule heating of the individual metallic particles and subsequent sintering and consolidation.

Based on MIS-FC concepts that are modeled on a 3D computer aided design (CAD) platform and include advanced 3D magnetic field calculations at both DC and MHz frequencies and models that incorporate the measured physical properties of the material used to fabricate the MIS-FC. The following characteristics for a flux concentrator suitable for the MIS process:

1) 1 mT magnetic flux density at 0.5 mm distance
2) Induction heating spatial resolution of approximately 1 mm
3) Operating frequencies from 0.5 MHz to approximately 3 GHz, preferable at least 1 MHz.
4) A coil having a diameter of less than 10 mm.
5) Inductance of less than approximately 10 nH, preferably less than 5 nH These performance characteristics not only determine the final configuration of the MIS-FC, but also the appropriate power supply for the MIS system.

The approach at the beginning of the development effort involved the use of magneto-dielectric materials and high amp-turn conductors to generate a localized, high frequency magnetic field at the air gap of the magnetic circuit. In general, the flux concentrators fabricated and tested along this path consisted of various permutations of the "horse shoe" design and the "pointed cylinder" design.

In our "horse shoe" shaped flux concentrators, a high current conductor that is located in the "yoke" of the "horse shoe" induces magnetic flux in the magneto-dielectric material. In this geometry, the flux density is increased as the cross-sectional area of the "horse shoe" arms decreases near the air gap in the magnetic circuit. At the air gap, the flux density "spills" out of the magneto-dielectric material and forms a localized high frequency magnetic field. The shape and magnitude of this high frequency magnetic field is determined by the shape of the "horse shoe" FC near the air gap, the amplitude of the current passing through the "yoke", and the electromagnetic properties of the magneto-dielectric material. In general, this FC configuration could achieve the target flux densities only at very high amp-turns. By increasing the number of turns through the "yoke", it was possible to significantly increase the flux density at the air gap and reduce the power requirements of the RF amplifier. Unfortunately, the increased number of turns in the "yoke" dramatically increased the inductance of the FC. This high inductance resulted in a MIS-FC with limited bandwidth that required a sophisticated multi-stage matching network. This approach was abandoned after we determined that the required flux densities could only be achieved at frequencies less than 100 MHz with very high RF power levels (e.g., greater than 500 W).

In our "pointed cylinder" shaped flux concentrators, several turns of a low current conductor wrapped around the cylindrical portion of the FC induces magnetic flux in the magneto-dielectric material. Similar to the "horse shoe" FC, the flux density is increased in this geometry as the cross-sectional area of the conical portion of the cylinder decreases near the very large air gap in the magnetic circuit. Near the point of the FC, the flux density "spills" out of the magneto-dielectric material and forms a localized high frequency magnetic field. The shape and magnitude of this high frequency magnetic field is determined by the shape of the cone, the amp-turns of the solenoid around the cylindrical portion of the FC, and the electromagnetic properties of the magneto-dielectric material. Overall, this FC configuration could achieve the target flux densities at modest currents. Unfortunately, this configuration has a very high inductance, which again resulted in a MIS-FC with limited bandwidth that required a sophisticated multi-stage matching network. In addition, we determined that the majority of the power from the RF amplifier was dissipated in the magneto-dielectric material through hysteresis. The magneto-dielectric material heated to approximately 400° C. after 30 seconds of 25 W RF power. This approach was abandoned after we determined that it was nearly impossible to keep the magneto-dielectric material cool during the MIS process.

In addition to these fundamental technical issues with the magneto-dielectric flux concentrators, we determined that the MIS of ScNc materials requires induction heating frequencies well in excess of 100 MHz. After an extensive search for high frequency magneto-dielectric material candidates, we established that no high permeability, low loss materials exist that are suitable for operation in an MIS flux concentrator. In the end, the technical push to VHF and UHF bands for the MIS of ScNc materials ultimately lead to the complete elimination of the magneto-dielectric material in the MIS-FC.

Air-Core Flux Concentrators

In our air-core flux concentrators, a high current conductor is shaped into a coil and the turns in the coil form a localized magnetic field. Early versions of the air-core flux concentrator were simply the "pointed cylinder" flux concentrator without the magneto-dielectric material. The removal of the magneto-dielectric material from the conical coil FC resulted in a significant decrease in the inductance of the FC, as well as a large decrease in the flux density at the "tip" of the coil. The shape and magnitude of this high frequency magnetic field is determined by the shape and amp-turns of the conical coil. Overall, this FC configuration could achieve the target flux densities only at high currents. Unfortunately, the magnetic field produced by the current in the turns that are far from the "tip" of the conical coil do not contribute much flux density at the "tip". This led to the development of the "pancake" coil in which there are only two turns in the flux concentrator. This configuration resulted in the highest flux density per amp-turn at that time. In order to achieve the required flux densities, we determined that any air-core FC must be energized through a high frequency tank circuit. These circuits consist of a bank of capacitors in parallel to the inductive flux concentrator. This approach was successful and established our design trend for future MIS flux concentrators, which is characterized by a resonant tank circuit with an inductive FC that has the lowest inductance possible. In other words, a MIS-FC with a single turn.

Figure 9A:
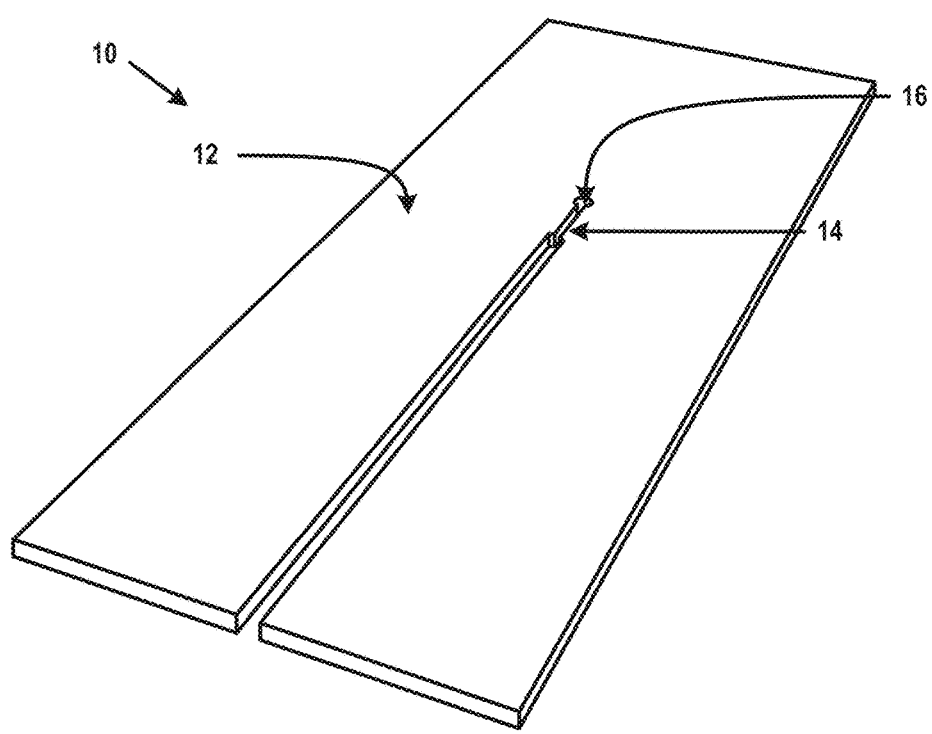
FIGS. 9a-9b are perspective and plan views, respectively, of a flux concentrator according to an embodiment of the invention.
Figure 9B:
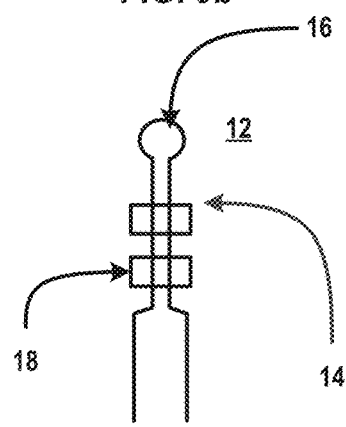

FIGS. 9a and 9b show an MIS-FCT air-core flux concentrator 10, according to an embodiment of the invention, that is fabricated from a 1 mm thick copper plate and that has a thin 0.25 mm slot 14 with a 1 mm diameter hole 16 at the end. The hole 16 is a single turn inductor with an inductance of approximately 1 to 1.5 nH, which is over 100 times lower inductance than previous MIS-FC geometries. This novel MIS-FC design concentrates the magnetic flux density within the hole 16 in the plate 12 with the appropriate placement of capacitors 18, and has several features that are ideal for use at very high frequencies. In particular, the very small inductance and parasitic capacitance allows for operation at frequencies well in excess of 1 GHz-over 2000 times higher frequencies than conventional RF induction heating. As will be shown, this is of critical importance for the MIS of metallic powders that consist of very small particles. Further, the solid-state design allows for the efficient removal of heat generated around the FC and the spatial resolution of the MIS process is determined by the diameter of the single turn inductor in the copper plate. The inductor formed by the hole 16 and capacitor 18 are in parallel in this configuration and thus form a very high frequency, micro-miniature induction heating tank circuit. The resonant frequency of the high frequency, micro-miniature tank circuit is determined by the inductance of the MIS-FC and the capacitance of the capacitor bank in parallel to the MIS-FC. The capacitance of the capacitor bank is a sum of the individual capacitances of the capacitors in parallel to the MIS-FC. The inductance of the MIS-FC is proportional to the area enclosed by the current loop that flows around the MIS-FC. Thus, the inductance is the sum of the inductance from the slot 14 and the circular loop 16, which comprises the MIS-FC. The slot inductance can be minimized by placing the capacitors very close to the circular loop 16, or by decreasing the width of the slot such that the area of the slot 14 between the capacitor bank and the circular loop 16 is much smaller than the area of the circular loop 16. In this manner, the inductance of the MIS-FC is primarily due to the inductance of the circular loop.

Figure 10:
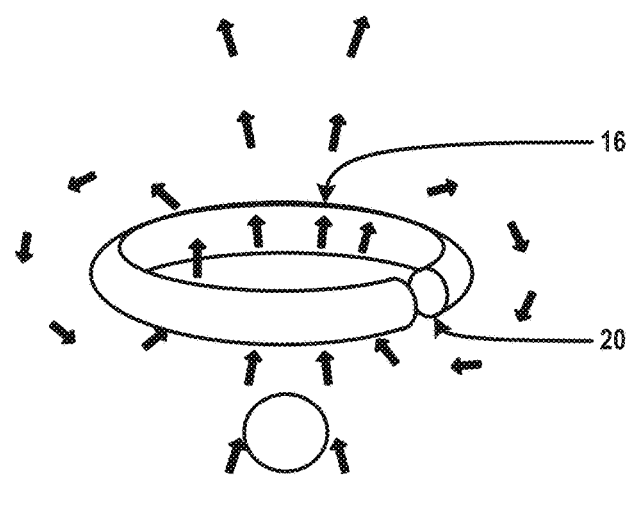
FIG. 10 is a perspective view illustrating a toroidal shape of magnetic flux lines that are created by a coil formed by a hole of the flux concentrator.

The MIS-FC circuit is driven by COTS RF amplifiers (ENI 3100L, Amplifier Research 100W1000B, or Milmega AS0825) with an output impedance of 50Ω and operating bandwidth from 250 kHz up to 2.5 GHz. These amplifiers are driven by a high frequency function generator (Rohde & Schwartz SMIQ03) capable of producing a swept high frequency sine wave from 300 kHz to 3.3 GHz. The amplifier is connected directly to the MIS-FC assembly via a high-power SMA cable. As shown in FIG. 10, the hole 16 forms a magnetic field with inner flux lines 20 that define a toroidal shape. The magnitude of the magnetic field changes as the magnetic flux changes in response to the alternating electric current. The flux lines 20 form circles with an edge of the hole 16 forming the coil that passes through centers of the circles. The part is preferably approximately 50 percent, e.g. between 45 percent and 55 percent, of a diameter of the coil from the coil. Closer than 50 percent results in more heating but less resolution. Further than 50 percent results in a dramatic drop-off of field strength but increased resolution.

MIS Tank Circuit

Figure 11:
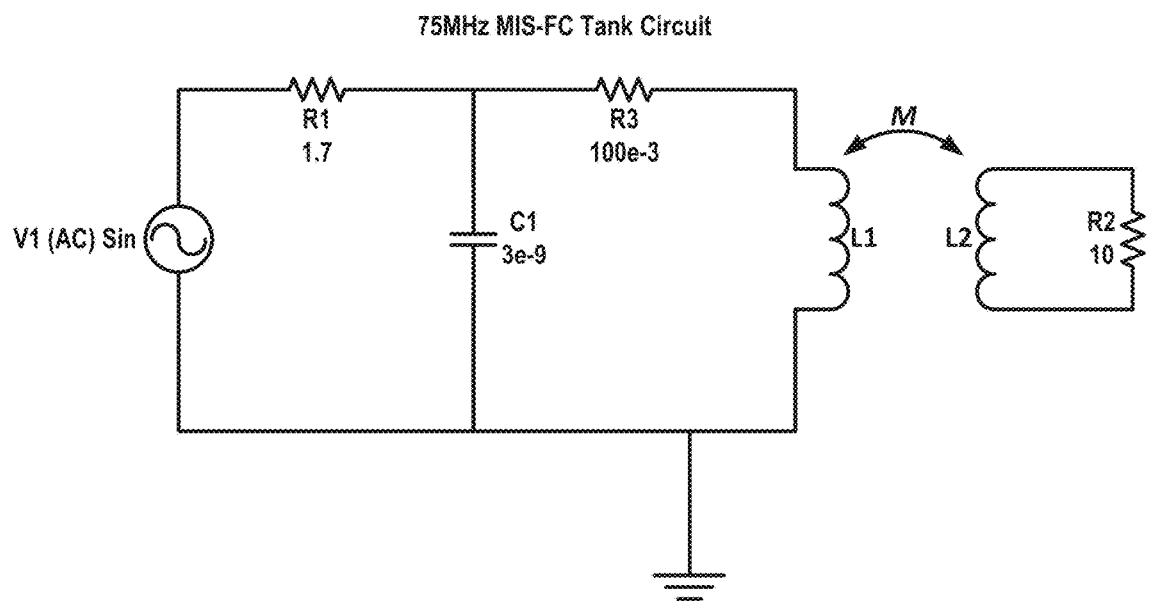
FIG. 11 is a circuit diagram that includes a tank circuit that is used for the flux concentrator.

The circuit diagram for a 75 MHz MIS-FC is shown in FIG. 11. This circuit is based on a parallel resonant tank circuit design that is typically used in induction heating power supplies. In this circuit diagram, however, the degree of coupling between the MIS-FC and the powder is explicitly described by the mutual inductance, M. Here, M is a function of the surface area of the particles exposed to the high frequency magnetic field and the skin depth of the metallic powder at the resonant frequency of the circuit. If the MIS-FC is too distant from the metal powder, or the skin depth is much larger than the particle size, M will tend to zero and the only load in the tank circuit will be due to the intrinsic AC resistance R3 of the copper of the plate 12. Reactive current in the tank portion of the circuit (i.e. between the capacitor and the MIS-FC inductor) is sharply peaked at the resonant frequency, which can be shown to be, $$f_R = \frac{1}{2\pi\sqrt{LC}} \quad [4]$$

where L is the inductance of the MIS-FC (L1 coil) and C is the capacitance of the capacitor bank (C1) in parallel to L. The capacitors of the capacitor bank collect charge and release the charge to the MIS-FC. A plurality of capacitors are mounted in parallel to the plate 12. At $f_R$, very large reactive currents flow between the capacitor bank and the MIS-FC, but the only power dissipated in the circuit is due to the resistive loss in R1 and R3 when K is zero. With a non-zero M, increased power is drawn from the power supply as power flows to the metal powder bed, R2. In general, the magnitude of these resistive and reactive currents depends on the voltage available from the RF power supply and the reactive current available from the capacitor at $f_R$. The MIS-FC tank circuit minimizes the power draw from the RF amplifier by operating near the resonant frequency at all times. A large coil would result in high inductance. High inductance would reduce resonance frequency for a fixed capacitor bank. A reduction in resonance frequency would result in a larger skin depth, which results in a larger outer dimension.

This circuit design not only maximizes the current flow to the MIS-FC, but also is critical to the potential real-time diagnostic features of the MIS process. If the resonant frequency of the circuit does not couple well with the particle size distribution of the powder (see Equations [1] and [2]), then there is a reduced resistive load in the circuit, which corresponds to the case where M is equal to zero. If the resonant frequency of the circuit couples well with the particle size distribution of the powder (i.e. M~1), however, an additional resistive load is introduced in the circuit and increased power will be drawn from the amplifier. In principle, this increased power will flow in the circuit only when the induction heating frequency (i.e. $f_R$) is such that the "electrical dimension" d/δ is approximately 4 to 6 (Assuming spherical particles and an ideal "electrical dimension" of 6 for the maximum power transfer to a sphere.). The frequency dependence of the real power provided by the RF amplifier using this circuit design can be directly related to the real-time diagnostics and qualification of the MIS method.

A convenient method to determine the power transfer from a source to a load is to measure the Voltage Standing Wave Ratio (VSWR) of a device under test (DUT). In this case, the DUT is the MIS-FC. The VSWR is a measure of the amplitude of the reflected RF wave relative to the incident RF wave between an RF power supply and a DUT. In general, the VSWR can be calculated by measuring the reflection coefficient F of a DUT, which can be written as, $$\Gamma = \frac{V_{reflected}}{V_{incident}} \quad [5]$$

where $V_{reflected}$ and $V_{incident}$ are the voltage of the reflected and incident waves, respectively. Using this definition of F, the VSWR can be written as, $$VSWR = \frac{1+|\Gamma|}{1-|\Gamma|} \quad [6]$$

where |Γ| is the absolute value of Γ. As Γ is always between 0 and 1, the VSWR has a minimum of unity, which corresponds to 100% power transferred from the source to the load.

Figure 12:
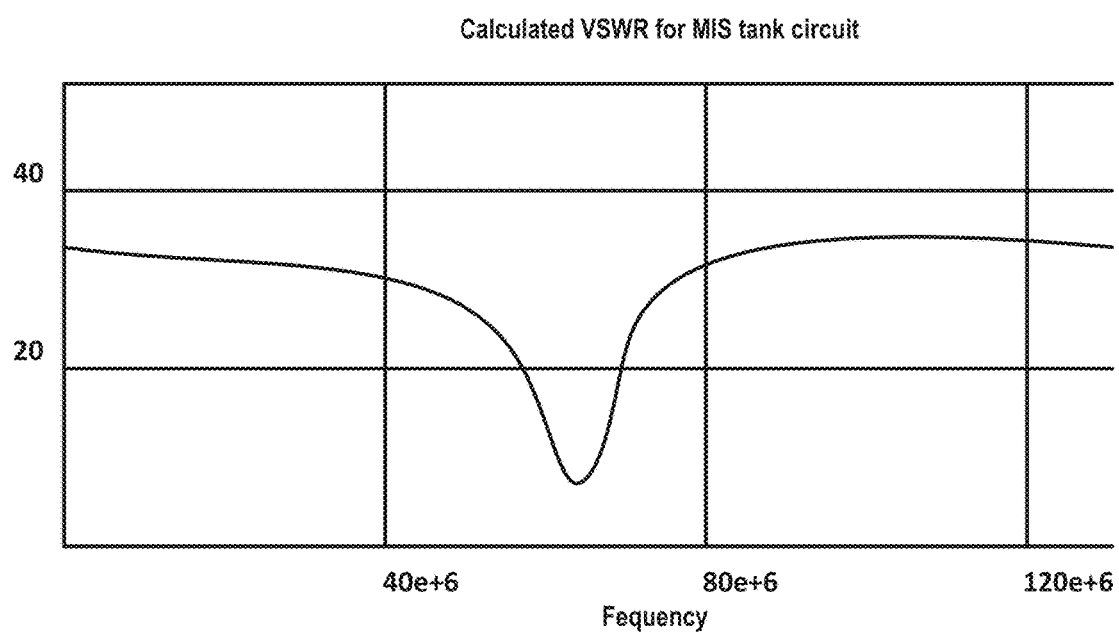
FIG. 12 is a graph illustrating calculated Voltage Standing Wave Ratio (VSWR) for an MIS tank circuit.

FIG. 12 shows the calculated VSWR of the MIS-FC circuit shown in FIG. 11 based on a source impedance of 50Ω. The VSWR has a minimum at the resonance frequency of the MIS-FC circuit, indicating the maximum power is transferred to the load at $f_R$. In this case, the VSWR has a minimum value of approximately 4, which corresponds to approximately 64% of the power transferred to the load with 36% reflected back to the power supply. Lower VSWRs can be obtained by using a matching circuit between the power supply and the tank circuit.

Figure 13:
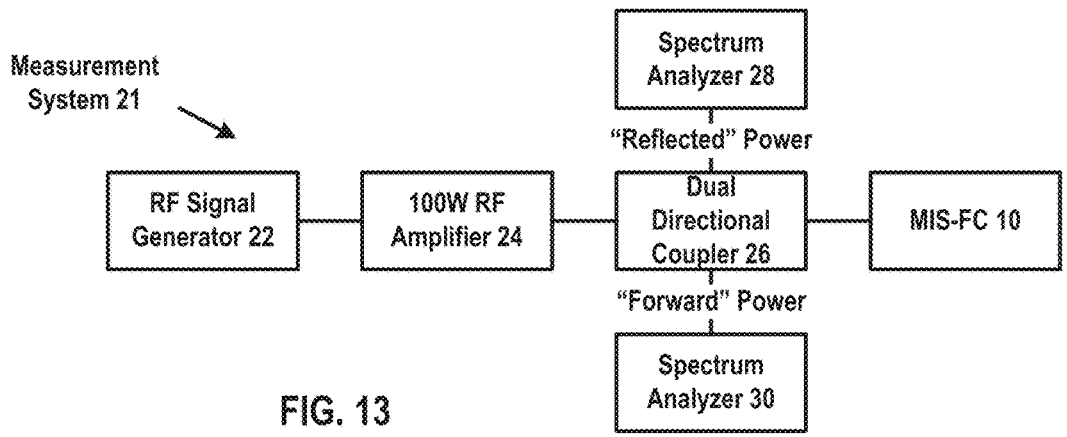
FIG. 13 is a block diagram illustrating a measurement system that carries out a VSWR procedure.
Figure 14:
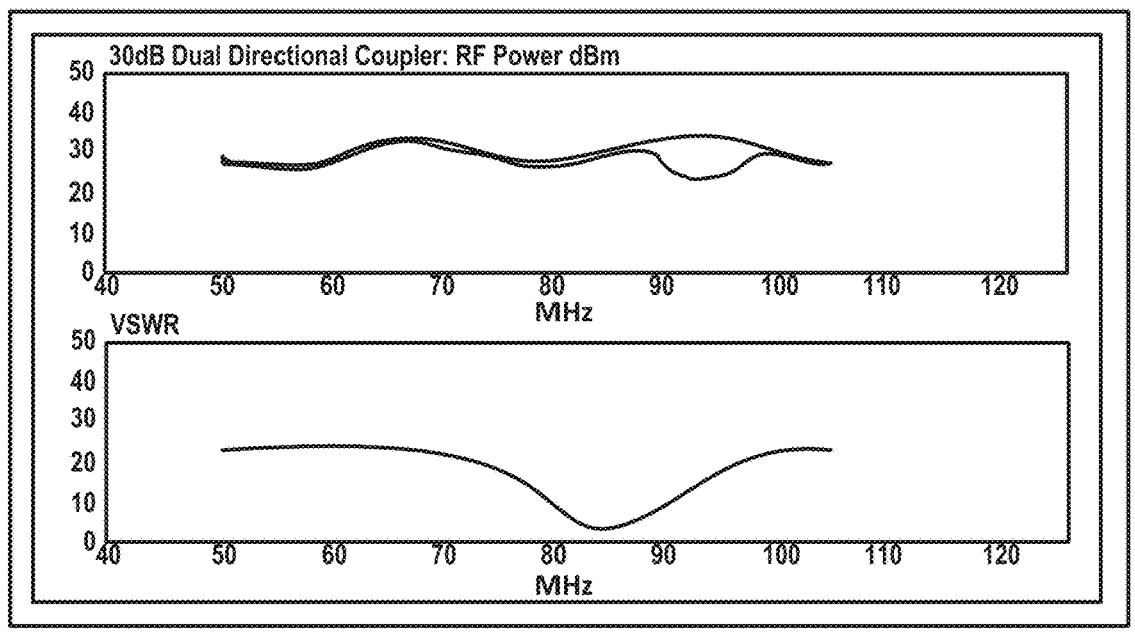
FIG. 14 is a screen shot generated by VSWR control code.

FIG. 13 shows a measurement system 21 that carries out a procedure to directly measure the VSWR of MIS-FC components in order to confirm the operation of these components for use in the MIS system. The measurement system 21 includes an RF signal generator 22, an amplifier 24, a dual directional coupler (DDC) 26, and two spectrum analyzers 28 and 30. The RF signal generator 22 drives a known RF sine wave to the amplifier 24, which is connected to the MIS-FC 10 through the DDC 26. The RF power available from the forward and reflected ports on the DDC 26 correspond to the incident and reflected power to the MIS-FC 10, which are measured by the two spectrum analyzers 28 and 30, respectively. The square root of the ratio of the reflected and incident power is equivalent to |Γ| from which the VSWR ratio is calculated. The VSWR measurements are completely automated by a control code developed specifically for the MIS system. A screen shot of the MIS-FC VSWR control code is shown in FIG. 14.

RF Flux Density Measurements of the "Solid-State" MIS-FC

Figure 15:
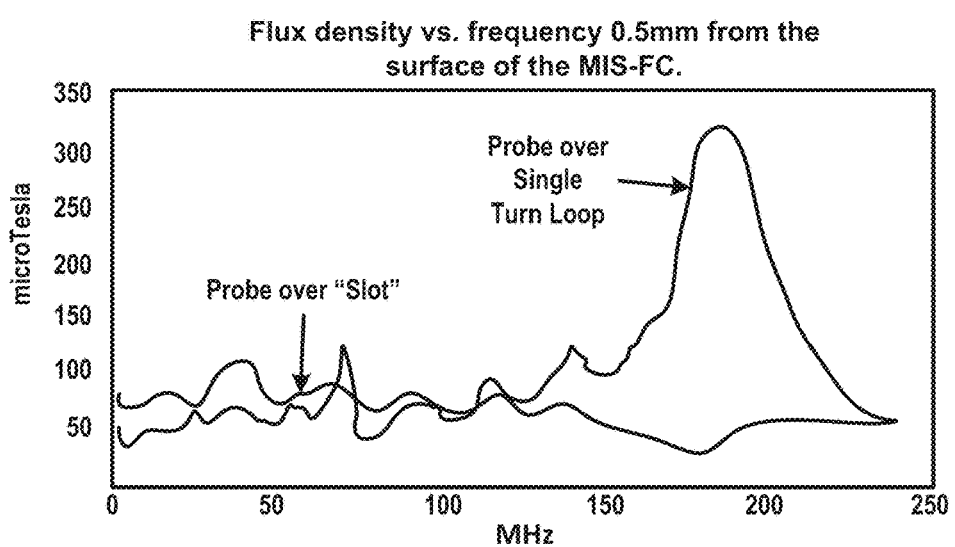
FIG. 15 is a graph showing flux density against frequency.

In addition to measuring the electrical properties of the MIS-FC and high current tank circuit, a control code is also used to measure the flux density of the MIS-FC as a function of frequency to confirm the concentration of flux density in the single turn loop of the MIS-FC. Using an RF signal generator, amplifier, and a small RF field probe (Beehive Electronics 100B Probe), we have confirmed that the high frequency magnetic field is located primarily above the single turn circular loop in the solid-state MIS-FC configuration. FIG. 15 shows the measured flux density versus frequency for a MIS-FC tank circuit with a resonant frequency of approximately 185 MHz. These data were obtained approximately 0.5 mm from the surface of the MIS-FC. The majority of the flux density is located above the circular loop, with very little flux density over the slot 14 outside of the tank circuit, thus confirming the concentration of the flux by the placement of the capacitor relative to the loop in the copper plate. Referring to Equation [2], there is nearly 40 times the power transfer over the single turn loop formed by the hole 16 as compared to the slot 14 in the MIS-FC at 185 MHz.

Figure 16A:
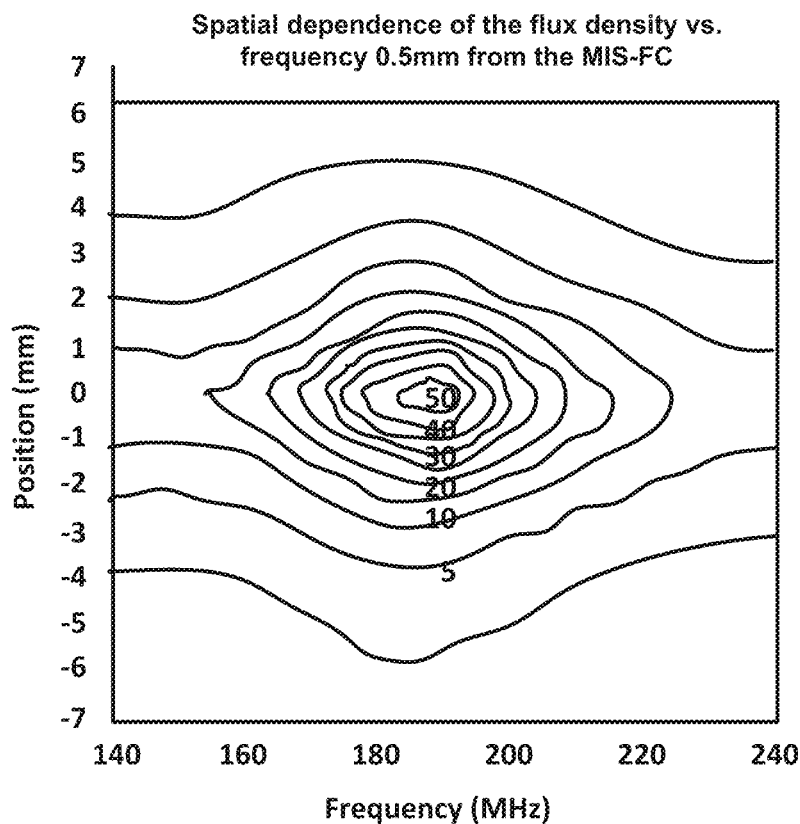
FIG. 16a-16b are top and perspective views illustrating spatial dependence of flux density against frequency.
Figure 16B:
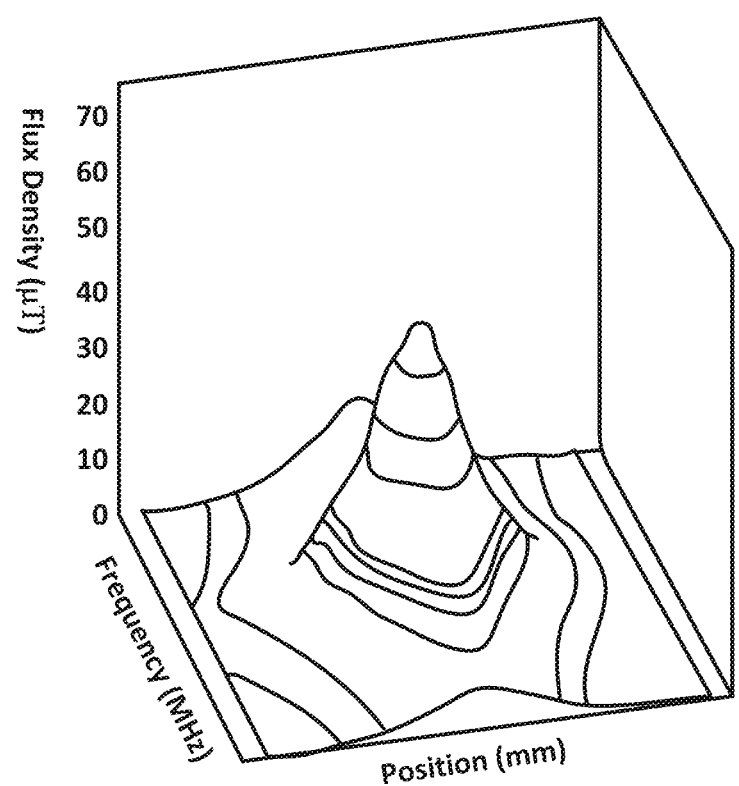

FIG. 16 shows the measured flux density as a function of frequency and position of the 185 MHz MIS-FC. The flux density is sharply peaked near the center of the loop with a full-width half-maximum of approximately 2 mm at 0.5 mm from the surface of the MIS-FC. Referring again to Equation [2], we can estimate the active heating zone to be approximately 1 mm in diameter because the power transfer by induction is proportional to the square of the flux density. This results in a very sharply peaked hot zone in the MIS-FC heating profile.

Figure 17:
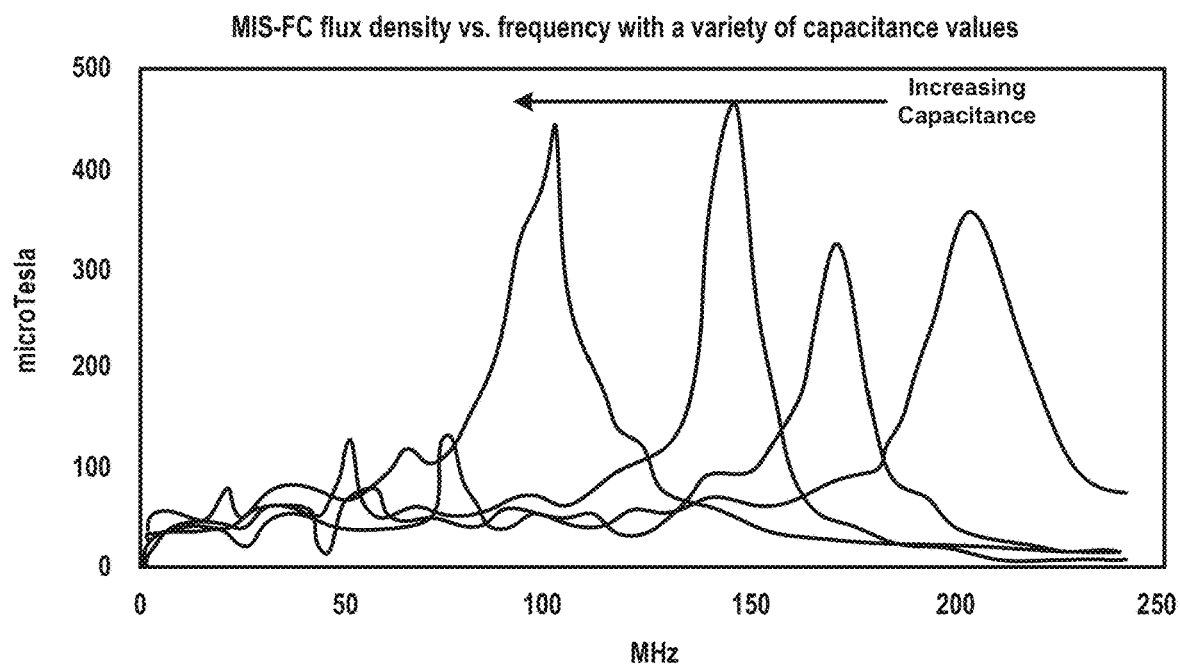
FIG. 17 is a graph illustrating flux density against frequency with a variety of capacitance values.

Early in the development of the MIS system, we focused on the development of a wide bandwidth MIS-FC as a means to couple effectively to all diameter particles in the metallic powder. While this approach is sound, in principle, it proved to be difficult to establish a low VSWR (i.e. high power transfer to the powder) over the entire bandwidth, in practice. As an alternative, the MIS-FC is designed to operate at sufficiently high frequencies such that the vast majority of particles in a given size distribution are heated by either bulk or surface heating. In this manner, a fixed parallel capacitor tank circuit can be designed specific to each powder. The resonant frequency of the MIS-FC component is easily adjusted by changing the capacitance in the tank circuit. This is illustrated in FIG. 17 that shows the measured flux density at the MIS-FC for a number of tank circuit configurations. The MIS-FC resonant frequency is seen to decrease with increasing capacitance as anticipated from Equation [4].

Figure 18:
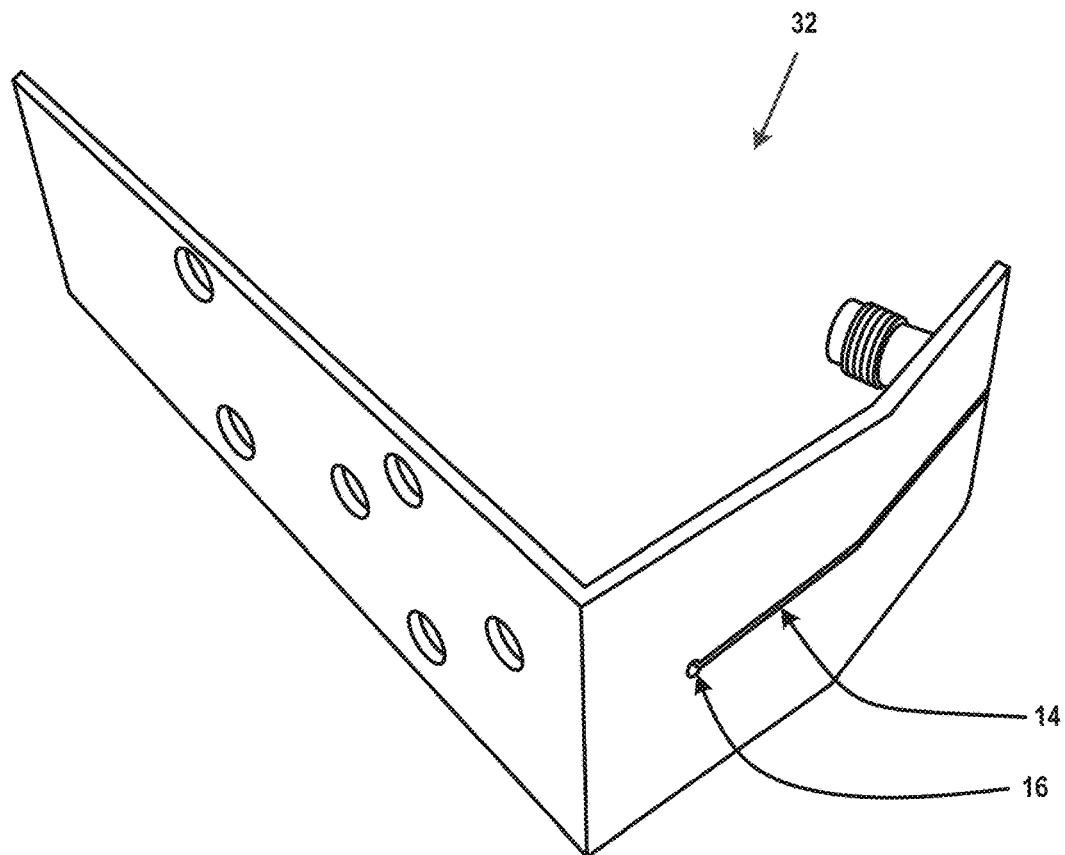
FIG. 18 is a perspective view of a print head that includes a flux concentrator according to an embodiment of the invention.

FIG. 18 shows a MIS-FC print head 32 according to an embodiment of the invention. Similar to the prototype MIS-FC 10 shown in FIG. 9, this "air-core" flux concentrator is fabricated from a 1 mm thick copper plate and consists of a thin 0.25 mm slot 14 with a 1 mm diameter hole 16 at the end. This MIS-FC design concentrates the high frequency magnetic flux within the hole 16 in the plate 12 with the appropriate matching network, and is ideal for use in close proximity to a very high temperature powder bed. The MIS-FC print head 32 is fabricated by first machining the slot and concentrator in a planar geometry, and then forming the plate into an approximate "L" geometry with a die set. The entire assembly is mounted vertically with the MIS-FC formed by the hole 16 facing down, which allows for the precise positioning of the MIS-FC above the powder bed and the easy removal and replacement of the print head, if necessary.

ScNc Powder Deposition System

Figure 19:
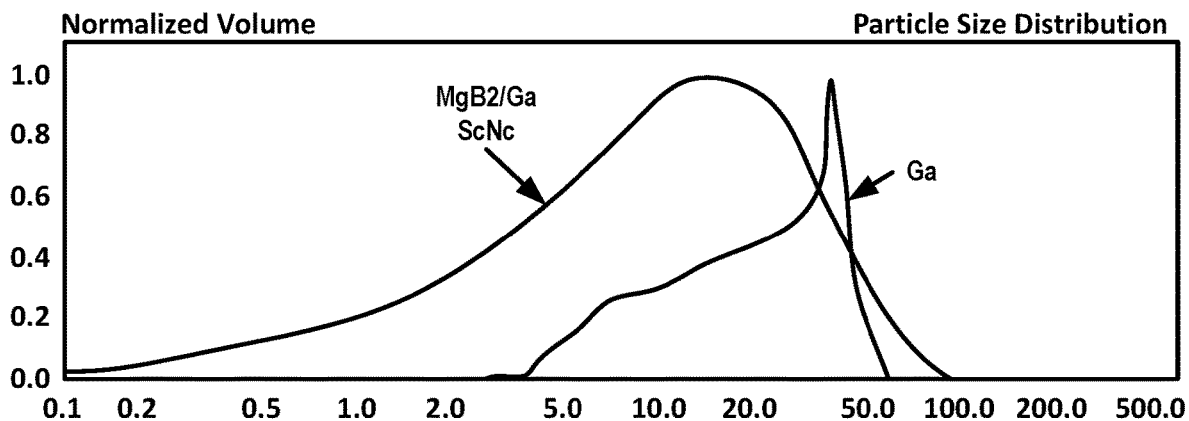
FIG. 19 is graph showing normalized particle size distribution of a Superconducting Nanocomposite (ScNc) and gallium particles.

Superconducting Nanocomposite (ScNc) powder materials consist of superconducting magnesium diboride and gallium metal prepared using a milling process that results in an intimate, homogeneous mixture of both materials. FIG. 19 shows the normalized particle size distribution of the ScNc and the gallium particles. This particular ScNc composition is 30% by volume, or approximately 50% by mass, Ga. The particle size distribution obtained through laser diffraction suggests $MgB_2$ particles as large as 100 μm, but optical analysis indicates these are agglomerates of particles will average diameters well below 50 μm.

In general, particle size, morphology, and density determine the flow characteristics of a given powder or powder mixture. These characteristics are described using a classification scheme developed by Geldart for the fluidization of powders in air driven fluidized beds, but are also useful when describing the flow properties of any powder.

Figure 20:
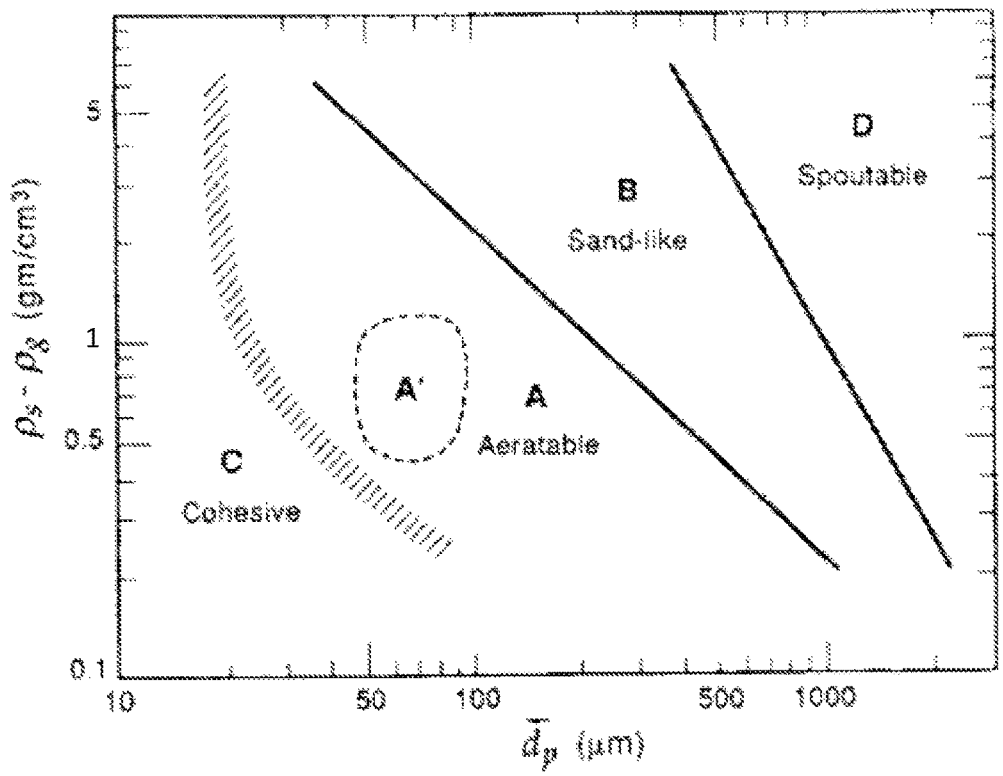
FIG. 20 is a graph showing Geldart classification for powders.

FIG. 20 shows the Geldart classification scheme for powders of a given density $\rho_S$ and particle diameter $\bar{d}_P$, where $\rho_g$ is the density of the gas used for the fluidization. Class B powders are "sand-like" and tend to fluidize and flow easily. For a given material density, however, the "flowability" of the powder decreases as the particle size decreases. In general, as the surface area of the powder increases and particle-to-particle forces dominate, the powder becomes a Geldart Class C powder, which is cohesive and possesses very poor flow properties. These flow characteristics are specific to each powder, or mixture of powders, and significantly impact the design of an effective powder delivery system for additive manufacturing.

Table 1 lists the relevant properties of ScNc powders used herein as well as some commercially available metal powders. The large particle size and moderate density of both the commercially available Al and Ti powders, for example, place these materials well within the Geldart Class B limit, as shown in FIG. 20. Because of the excellent flow characteristics of these materials, a simple mechanical screed can be used to create very uniform layers of metal powder for consolidation in an additive manufacturing system. The ScNc powder consists of very small particles with moderate to light densities, which place this composite material well within the Geldart Class (C-A) region. Unlike aluminum or titanium powders, these powders do not fluidize or flow well and thus a Geldart Class C Powder Deposition System (PDS) was designed and fabricated to manipulate The ScNc materials for use in the ScNc MIS system.

TABLE 1

| Material | Particle Size (μm) | Density (g/cm³) | Geldart Class |
|---|---|---|---|
| $MgB_2$ | 1-100 | 2.57 | C: Cohesive |
| Gallium | 5-50 | 5.91 | C-A: Cohesive-Aeratable |
| Aluminum | 100-200 | 2.70 | B: Sand-like |
| Titanium | 200-400 | 4.51 | B: Sand-like |

MIS of ScNc Powder

Figure 21:
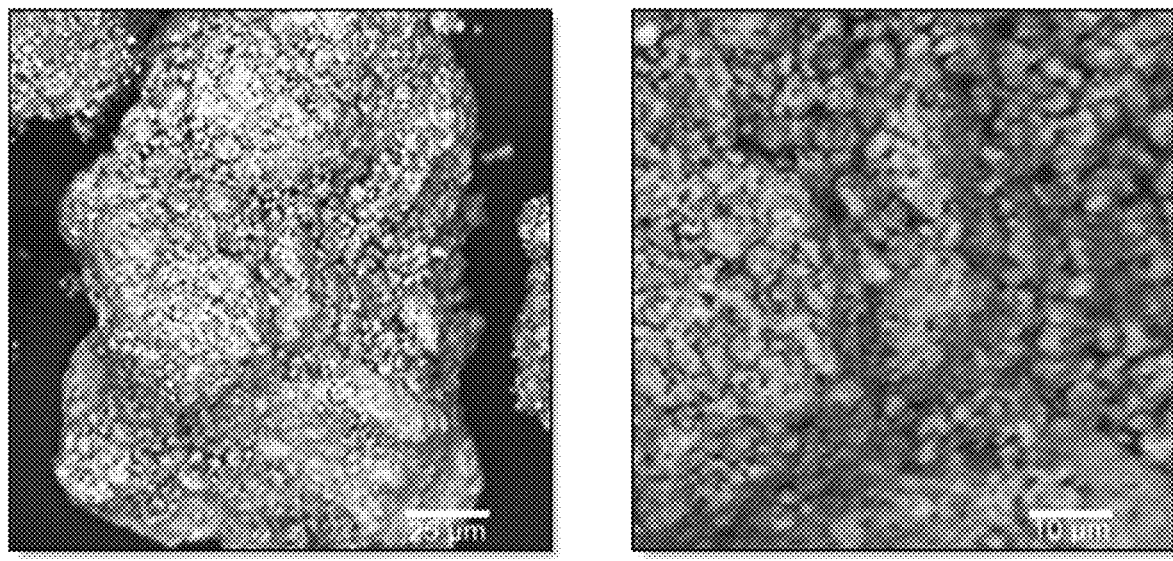
FIG. 21 shows Scanning Electron Microscope (SEM) images of a ScNc material.

FIG. 21 shows representative Scanning Electron Microscope (SEM) images of the $MgB_2$/Ga ScNc material. This particular ScNc composition is 30% by volume, or approximately 50% by mass, Ga. Though the particle size distribution obtained through laser diffraction suggests ScNc particles as large as 100 μm, SEM image analysis indicates these large particles are, in fact, agglomerates of 1 to 5 μm particles. The fact that these agglomerates consist of such small individual particles has dramatic consequences on the MIS-FC frequency. Theoretically, a 100 μm diameter spherical ScNc particle, for example, can be bulk heated using a high frequency magnetic field at approximately 180 MHz. If, however, the effective "electrical dimension" of the ScNc is much smaller than 100 μm, then the MIS-FC must be designed to operate at much higher frequencies.

Based on the observed ScNc particle/agglomerate morphology and the unknown "electrical dimension" of the ScNc powder, fabricated a series of MIS-FC assemblies and directly measured the power transfer by detecting heat from the ScNc material located over the MIS-FC. This method was very effective in determining the minimum frequency required for the ScNc MIS process. It was found experimentally that induction heating of the ScNc did not occur for frequencies less than approximately 700 MHz, which indicates that the "electrical dimension" of the ScNc is on the order of 35 µm, which is well below the physical size of the ScNc agglomerate.

Figure 22:
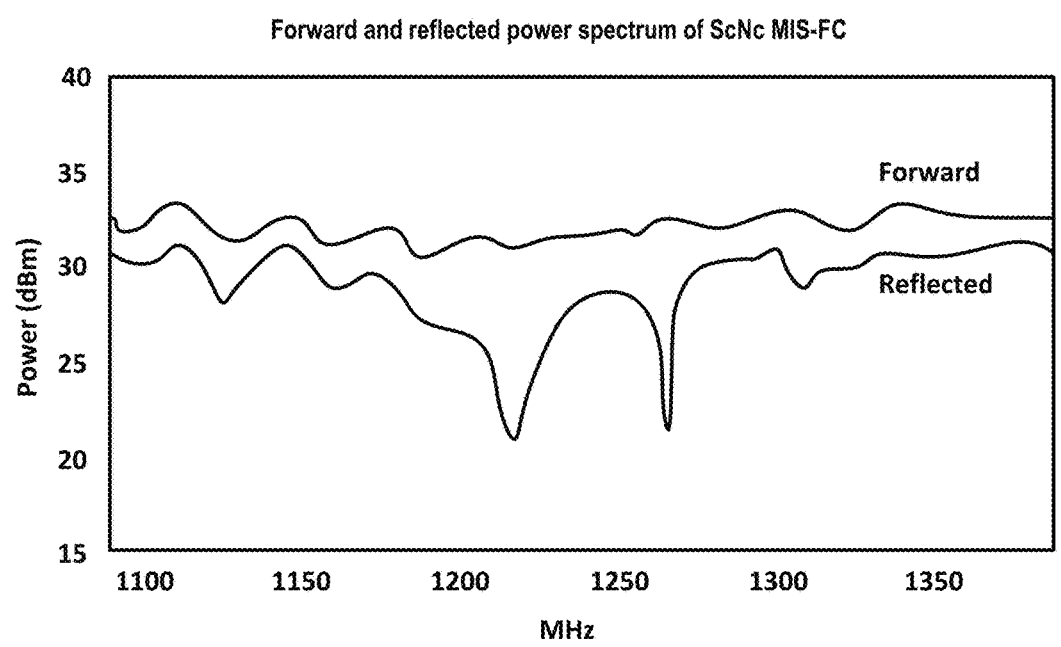
FIG. 22 is a graph showing forward and reflected power spectrum for a ScNc.

After a series of measurements with increasing resonant frequencies, we fabricated an ultra-high frequency MIS-FC suitable for ScNc materials. FIG. 22 shows the forward and reflected power spectrum of the ScNc MIS-FC with a resonant frequency of approximately 1.2 GHz. As seen in the Figure, there are many resonances in the MIS-FC circuit over this wide bandwidth. The resonance at 1229 MHz, however, corresponds to the resonance in the tank circuit associated with installed tank capacitor. The flux density only occurs at the single turn MIS-FC with an RF field probe. The measured VSWR of the MIS-FC displays a minimum of 1.87 at 1229 MHz, which corresponds to approximately 90% transfer of power to the load.

Voltage Standing Wave Ratio Spectroscopy

A particularly unique feature of the MIS process is the potential for real time diagnostics and monitoring of the sintering and consolidation of the metal particles during the additive manufacturing of a part. To illustrate this, consider the MIS tank circuit of FIG. 11 operating at a resonant frequency that couples well to a given powder. Recall that when this circuit is driven at resonance, large reactive currents flow in the tank circuit, but little real power is drawn from the amplifier if the MIS-FC is not in close proximity to the powder bed. As the MIS-FC tip is brought near the surface of the powder bed, however, real power is drawn from the RF amplifier and the metal particles are rapidly heated by induction. Essentially, the MIS-FC acts as the primary of a transformer during this process and the individual metal particles act as the secondary.

Figure 23A:
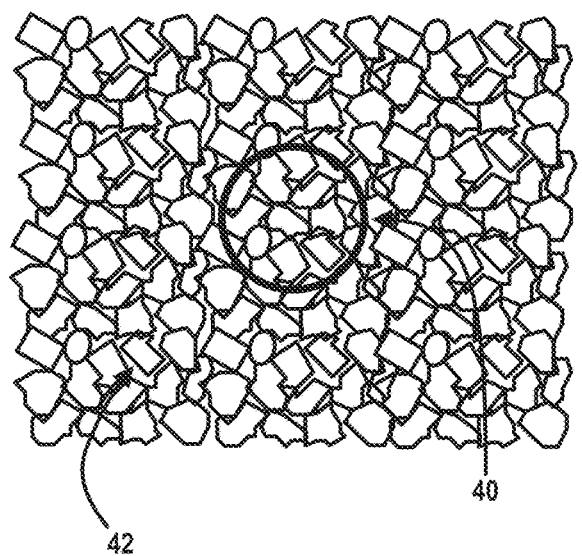
FIG. 23a-23c illustrate sintering of particles.
Figure 23B:
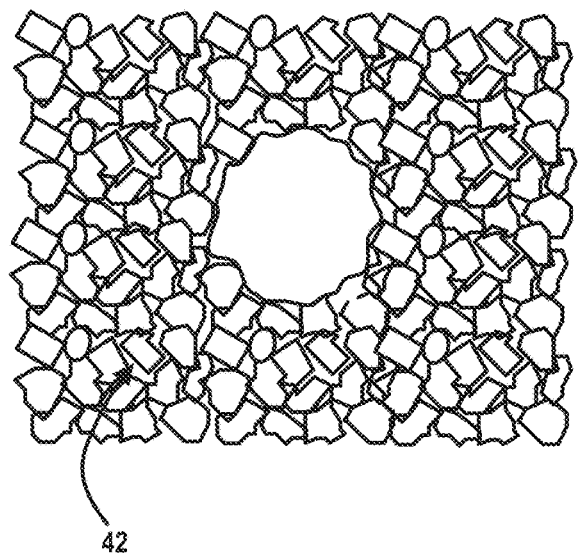
Figure 23C:
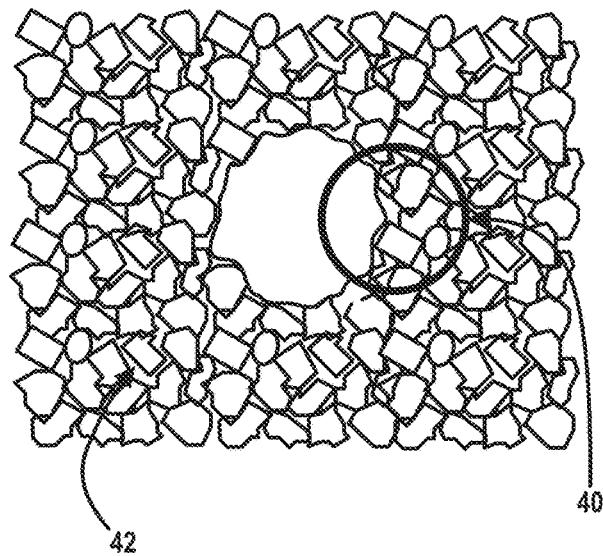

As discussed previously, bulk heating of the particles will only occur when the diameter d of the particles is on the order of 6δ. As the particles heat and sinter together, the effective diameter increases significantly, and the bulk induction heating of the individual particles transforms into the surface heating of the consolidated powder in the region of the MIS-FC tip. This is illustrated schematically in FIGS. 23a to 23c, where the circle 40 represents the spatial extent of the high frequency flux density on the surface of the powder bed 42. Note: the spatial extent of magnetic flux density on the powder bed is many times larger than the average diameter of the metal particles. When the MIS-FC is energized, the particles heat rapidly and fuse together as shown schematically in FIG. 23b. If this sintered domain is 5 to 10 times larger than the individual particles, the frequency for bulk heating of the sintered domain would be reduced by 25 to 100 times (see Equation [3]). Thus, as the metal particles fuse together during the MIS process, the power flow at high frequencies to the MIS-FC is significantly reduced due to the dramatic increase in the effective "electrical dimension" d/δ. Real power will only flow to the powder bed via the MIS-FC as it moves over new, unsintered particles, as shown in FIG. 23c. This provides a real time measurement of the quality of the consolidation of the particles during the MIS process.

Figure 24:
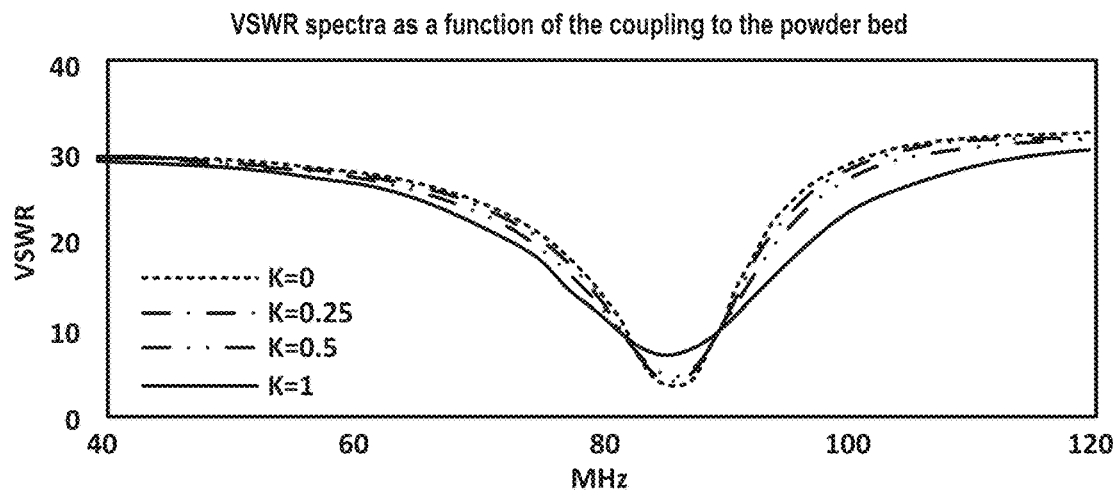
FIG. 24 is a graph showing calculated VSWR's for a particular tank circuit.
Figure 25:
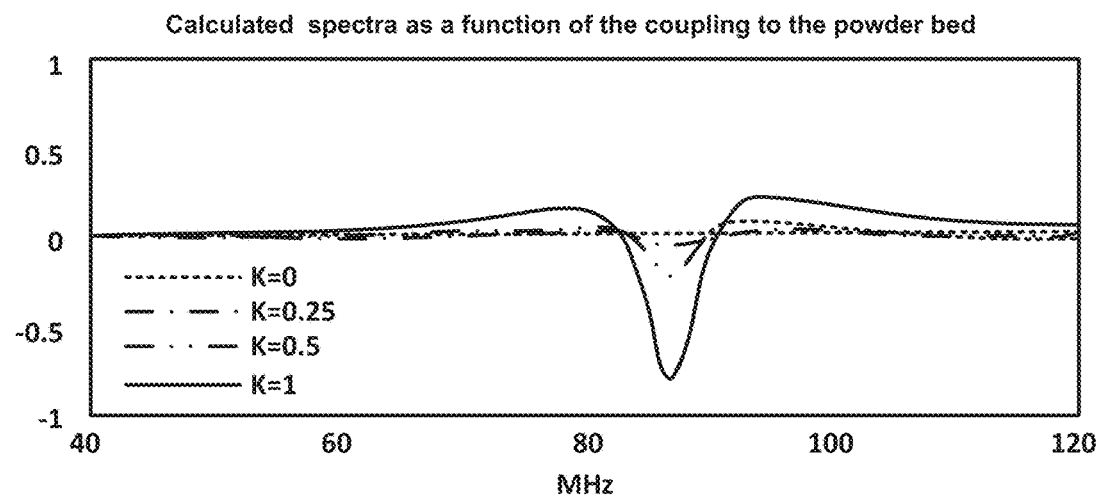
FIG. 25 shows the calculated VSWR ratio θ as a function of coupling M.

FIG. 24 shows calculated VSWRs for a MIS-FC tank circuit with a resonant frequency of approximately 86 MHz and increasing values of the coupling M The overall shape of the VSWR changes as M increases. As discussed previously, changes in M reflect changes in the degree of coupling between the powder and the MIS-FC, which will occur when the MIS-FC passes over individual particles or fused particles. In order to emphasize the changes in the VSWR with increased coupling, we define a normalized VSWR ratio θ as:

$$\theta = 1 - \left(\frac{VSWR_{K>0}}{VSWR_{K=0}}\right), \quad [7]$$

where $VSWR_{K>0}$ is the VSWR of the MIS-FC circuit when it is coupled to the powder bed, and $VSWR_{K=0}$ is the VSWR of the MIS-FC circuit when it is completely de-coupled from the powder bed. Similar to the VSWR, this normalized quantity is also independent of the level of RF power incident on the MIS-FC. Note that θ is unity if there is no coupling to the powder bed for all frequencies. FIG. 25 shows the calculated θ as a function of coupling M for the VSWRs shown in FIG. 24. As anticipated, there is considerable structure in θ with increasing coupling of the RF power to the powder bed.

Figure 26:
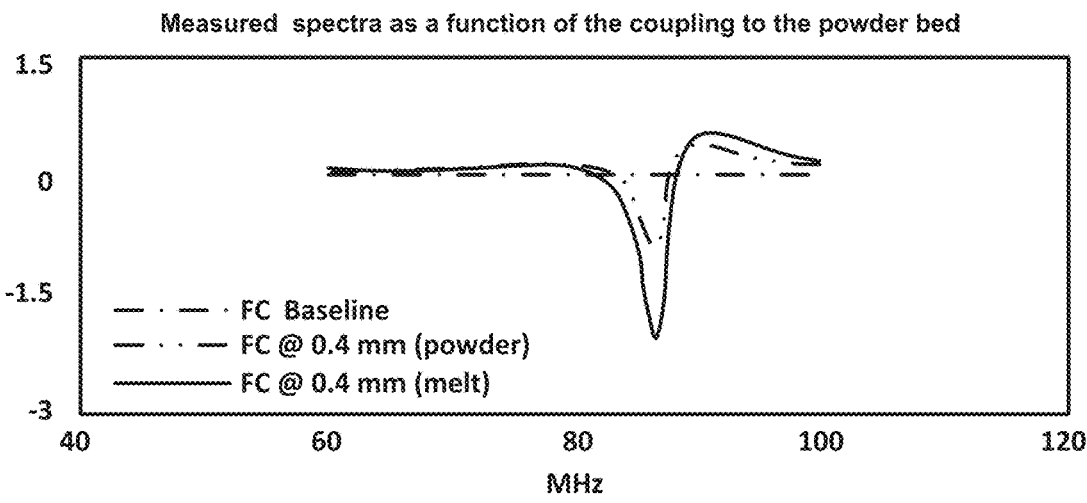
FIG. 26 is a graph showing the result of real-time monitoring of an additive manufacturing process and that indicates the normalized ratio of the VSWR's during an MIS process.

FIG. 26 shows the results of real time monitoring of the additive manufacturing process that indicate the normalized ratio of the VSWRs during the MIS process can be used to monitor the degree of sintering and consolidation of the particles. This method of non-destructive evaluation is called Voltage Standing Wave Ratio Spectroscopy.

In addition to the high frequency VSWR spectroscopy, auxiliary low frequency induction heaters located near the MIS-FC assembly could be used to probe the quality of the consolidation over larger length scales and to locally heat treat the part during fabrication to reduce the mechanical stress on the part.

Figure 27A:
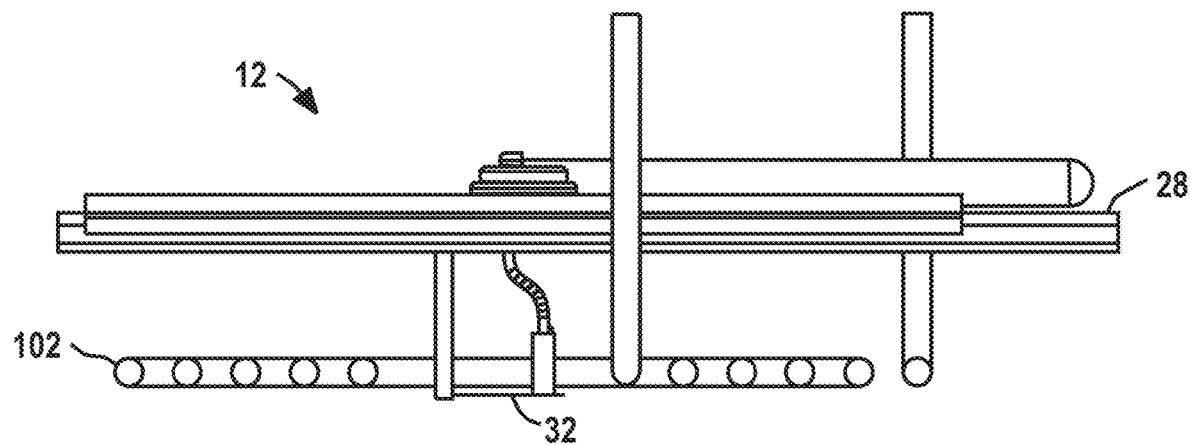
FIG. 27a-27b are partially cross-sectioned side and perspective views of a sintering apparatus according to an embodiment of the invention.
Figure 27B:
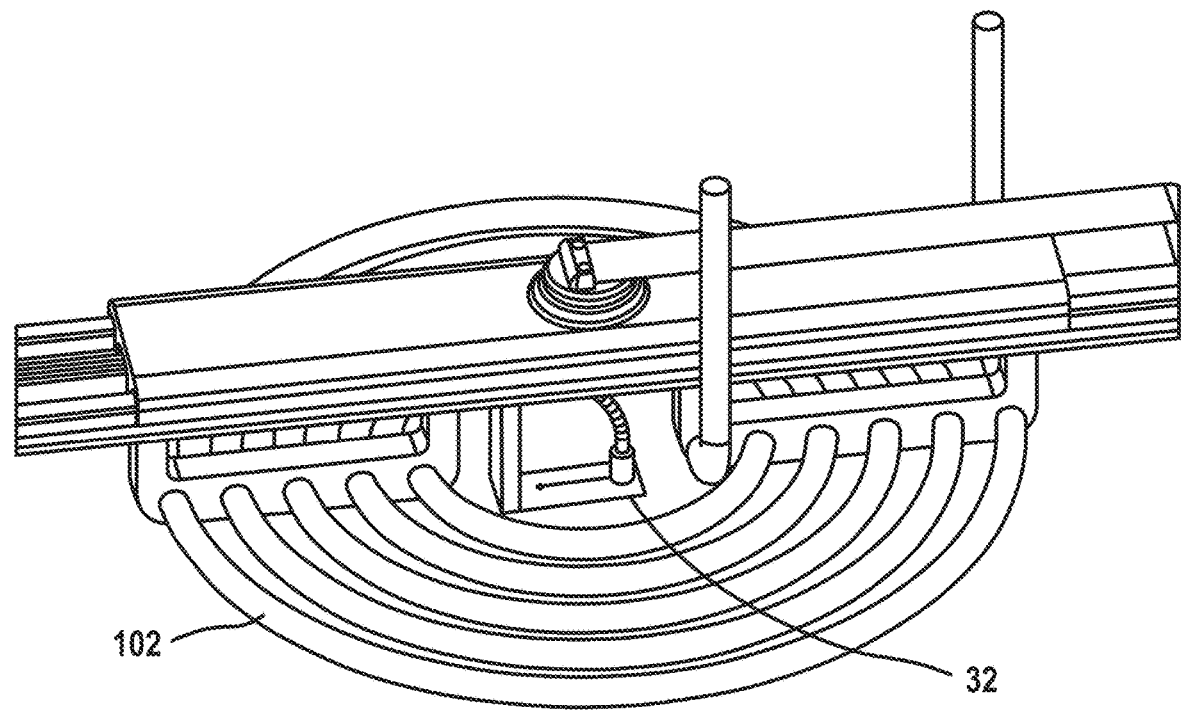

FIGS. 27a and 27b show an embodiment where a localized heater in the form of the print head 32 with high frequency flux concentrator is in the middle of bulk heater in the form of a larger, low frequency induction coil 102. The low frequency induction coil 102 is used to heat the consolidated part in preparation for the sintering of the powder by the high frequency flux concentrator that when the particles sinter into a larger unit, the increased domain size leads to inefficient surface heating. The high frequency of the flux concentrator of the print head 32 is not ideal for bulk heating. The low frequency, spatially disperse flux concentrator (i.e. the induction coil) can be used to heat the macroscopic part, reduce thermal and mechanical stress, and reduce the amount of power required for the initial powder consolidation.

The low frequency induction coil 102 is driven by its own electric current generator (not shown) and exposes the part to an alternating magnetic field generated by the alternating electric current. The high frequency of the flux concentrator of the print head 32 heats only a portion of the particles that are in contact with the part so that the particles of the portion join with the part. The alternating electric current for preheating the part is a low frequency alternating electric current that exposes the part to a low frequency alternating magnetic field. The alternating current for heating the particles is a high frequency alternating electric current that exposes a portion of the particles that are in contact with the part to a high frequency alternating magnetic field.

Figure 28:
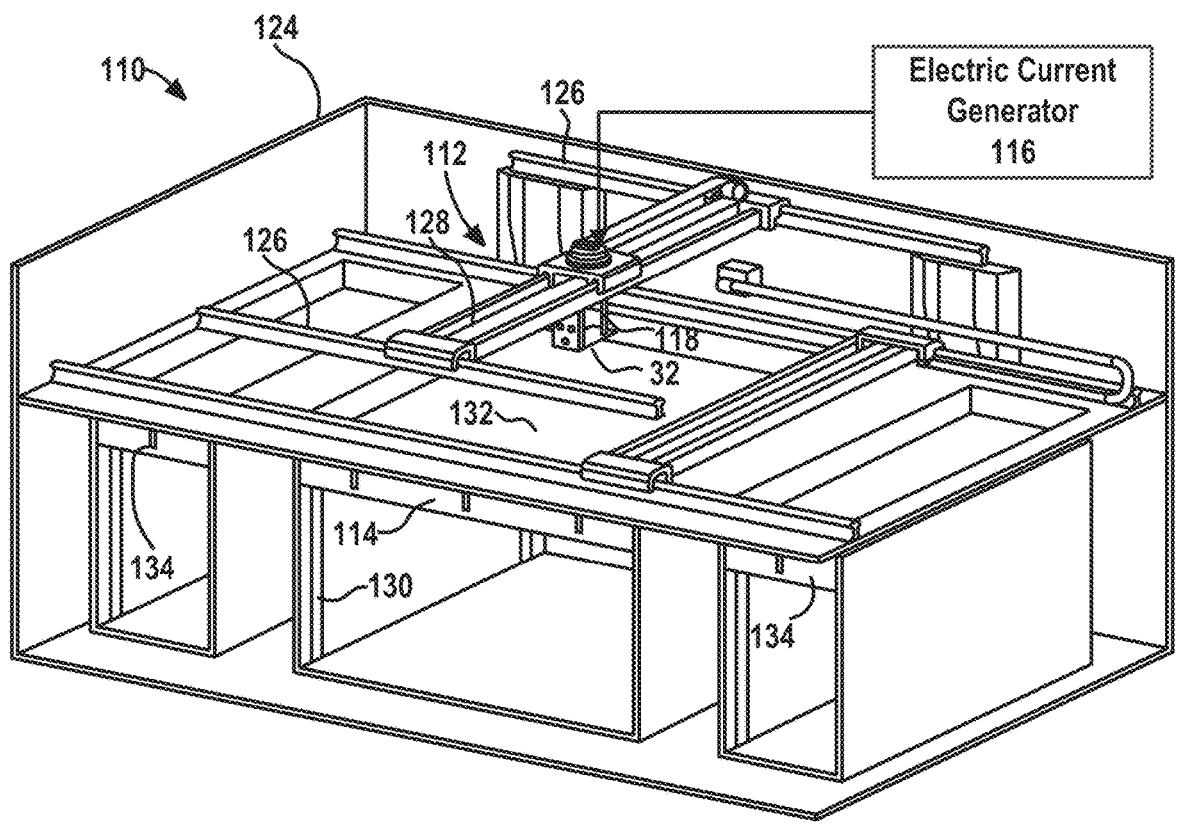
FIG. 28 is a perspective view of the sintering apparatus.

FIG. 28 illustrates an MIS apparatus 110 according to an embodiment of the invention. The apparatus 110 includes a system 112 for creating relative movement in three-dimensions, a container 114, an electric current generator 116, a high frequency electric lead 118, and the print head 32. The entire apparatus 110 resides in a controlled atmosphere environment.

The system 112 includes a frame 124, first and second tracks 126, a boom 128, and a plurality of rails 130. The tracks 126 are mounted to the frame 124 on opposing sides thereof and extend in an x direction. The boom 128 is mounted between the rails 130 and extends in a y direction. The boom 128 is movable in the x direction on the rails 130. An actuator (not shown) moves the boom 128 horizontally on the rails 130 in the x direction. The print head 32 is mounted to the boom 128 for movement in the y direction on the boom 128. An actuator (not shown) moves the print head 32 horizontally on the boom 128 in the y direction.

The container 114 is a horizontal bed with sides for containing and holding small particles 132 that contact one another. The rails 130 extend in a vertical z direction. The container 114 is mounted to the rails 130 for movement up and down in the vertical z direction. An actuator (not shown) moves the container 114 up and down the rails 130 in the vertical z direction.

The apparatus 110 further includes two powder reservoirs 134. The powder reservoirs 134 are also movable in a vertical z direction. By raising the powder reservoirs 134 and/or lowering the container 114, a height differential can be created between the particles 132 in the container 114 and particles held in the powder reservoir 134 so that particles can be scraped from the powder reservoirs 134 into and over the particles 132 already in the container 114.

It can thus be seen that the system 112 provides for movement in three-dimensions of the print head 32 relative to the particles 132. In use, a thin layer of particles 132 is scraped from the reservoirs 134 onto the container 114. The electric current generator 116 is connected through the lead 118 to the print head 32. When the electric current generator 116 is operated, it generates an alternating electric current and provides the alternating electric current through the lead 118 to an area adjacent the print head 32. The print head 32 is held close to the particles 132 and focuses an alternating magnetic field generated by the alternating magnetic current within a small first portion of the particles 132. The alternating magnetic field heats the particles so that they join. Joining of the particles occurs due to sintering and or melting of the material. The flux concentrator is then moved in x and/or y directions so that the alternating magnetic field is reduced from the first portion of the particles while exposing a second, adjacent portion of the particles to the alternating magnetic field. A reduction in the alternating magnetic field strength at the first portion of particles that has been joined allows the first portion to cool. In reality, there is a transition from the first portion to the second portion, and then to a third portion and so on so that an elongate part can be formed. The elongate part can have a two-dimensional profile in x and y directions.

After the part is formed within the particles 132, the container 114 is lowered and a new layer of particles is scraped onto the particles 132 from the reservoirs 134. The process hereinbefore described is then repeated. The particles that are heated in the second cycle are not only fused to one another, but are also fused to the part that has been manufactured in the first cycle. Should a circular plate for example be manufactured during the first cycle, the second cycle will add another layer to the circular plate and if the process is repeated, a cylinder may be manufactured. It may also be possible to manufacture more complex, three-dimensional shapes in this manner.

Figure 29:
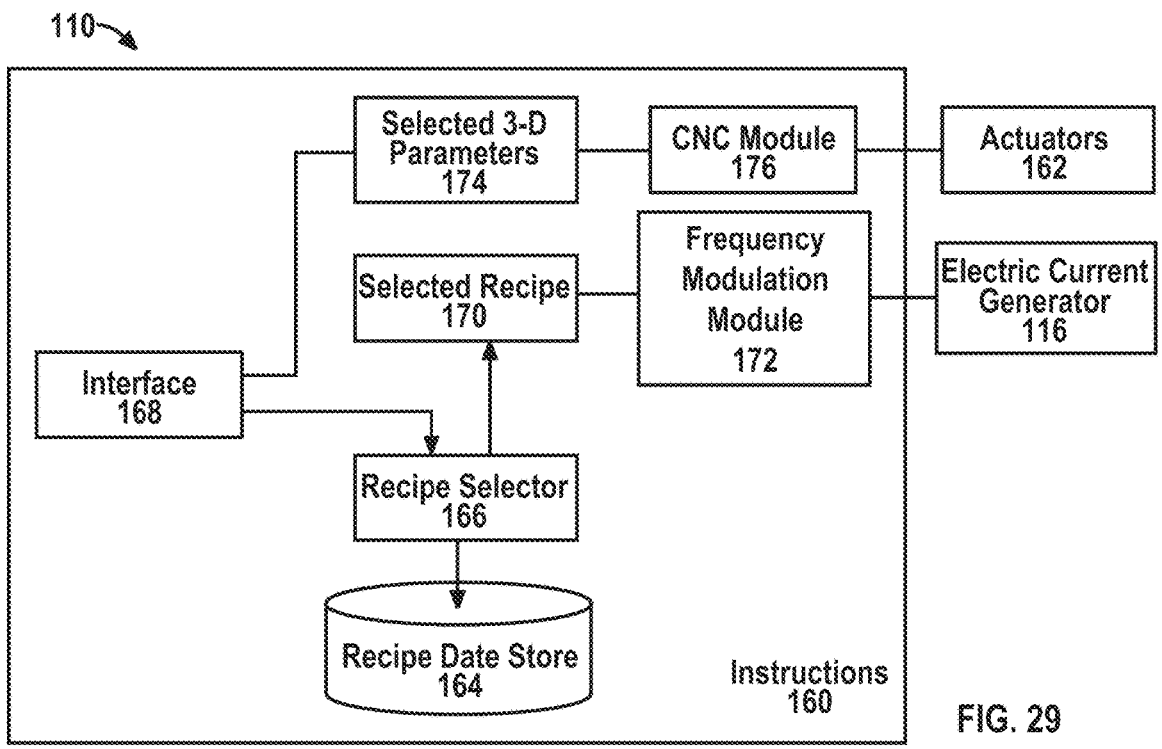
FIG. 29 is a block diagram illustrating instructions forming part of the apparatus of FIG. 28.

FIG. 29 illustrates further components of the apparatus 110 shown in FIG. 28, including instructions 160 that are executable by a processor of a computer, actuators 162 to cause movement in x, y, and z directions of the print head 32 relative to the particles 132, and an electric current generator 116.

The instructions 160 include a recipe data store 164, a recipe selector 166, an interface 168, a selected recipe 170, a frequency modulation module 172, selected 3D parameters 174, and a CNC module 176.

In use, an operator can view the interface 168 on a display device. The interface 168 gives the operator access to the recipe selector 166 and the selected 3D parameters 174. The recipe selector 166 includes inputs for materials and particle sizes. A plurality of recipes are stored in the recipe data store 164. The recipe selector 166 selects one of the recipes in the recipe data store 164 based on the input provided by the operator through the interface 168. The recipe that is selected by the recipe selector 166 is then stored as the selected recipe 170.

The operator also enters 3D parameters through the interface 168, for example the manufacture of a cylinder as hereinbefore described. The parameters that are entered by the operator are then stored as the selected 3D parameters 174. The frequency modulation module 172 then utilizes the parameters of the selected recipe 170, including frequency, to modulate a frequency generated by the electric current generator 116. The CNC module 176 simultaneously operates the actuators 162 to create a desired two-dimensional, and ultimately three-dimensional part.

Figure 30:
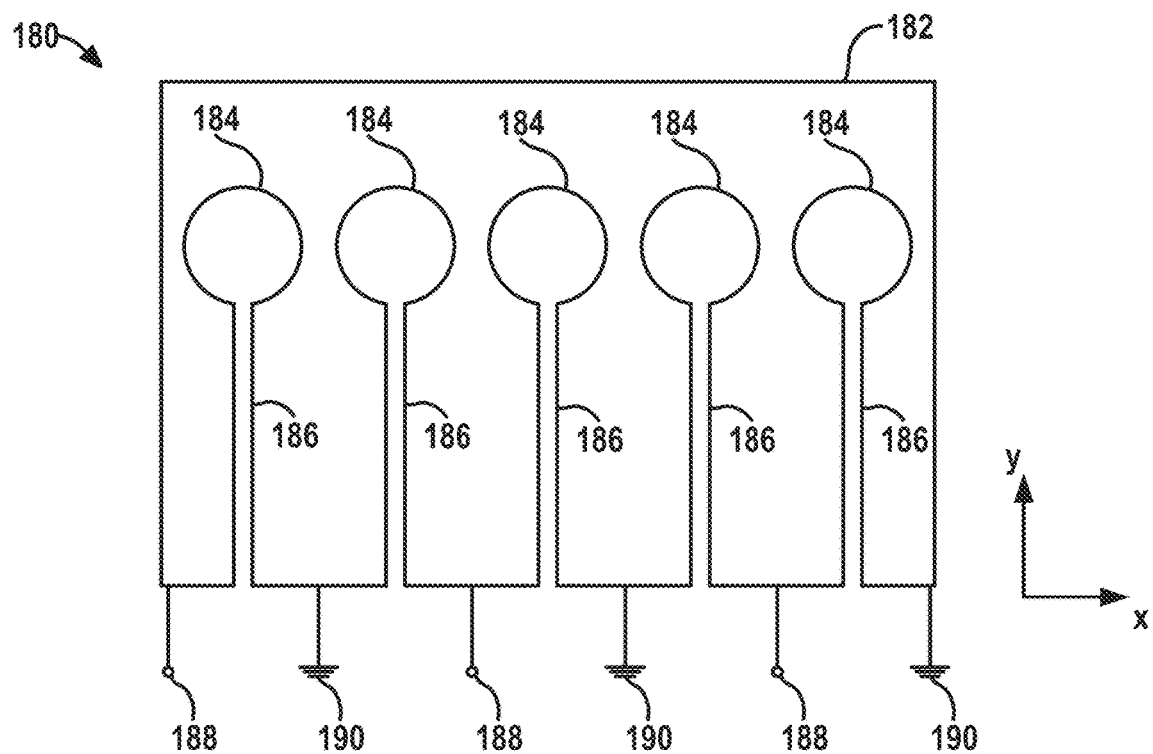
FIGS. 30 and 31 show print heads according to alternate embodiments of the invention that allow for bulk manufacture.

FIG. 30 shows a print head 180 comprising a plate 182 with a plurality of holes 184 and slots 186. Each hole 184 and slot 186 is as hereinbefore described with reference to FIG. 9. Each hole 184 thus forms a respective flux concentrator. One terminal of a flux concentrator forms an electric current terminal 188 and an opposite terminal is connected to ground 190. The holes 184 are located in a single row that extends in an x-direction.

Figure 31:
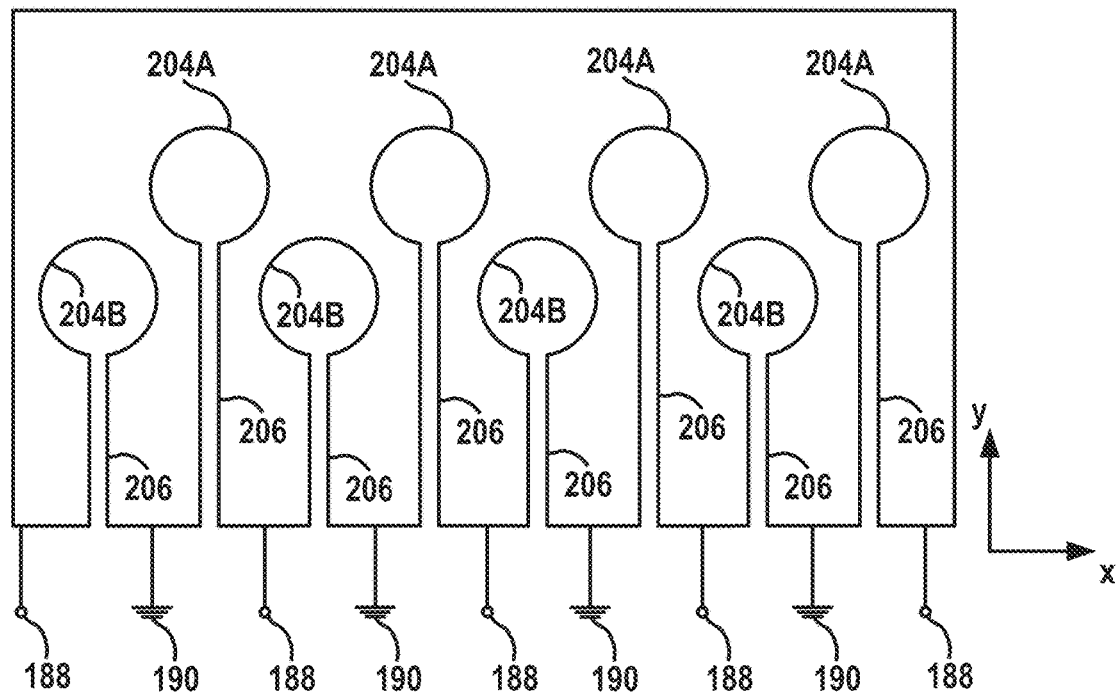
Figure 32:
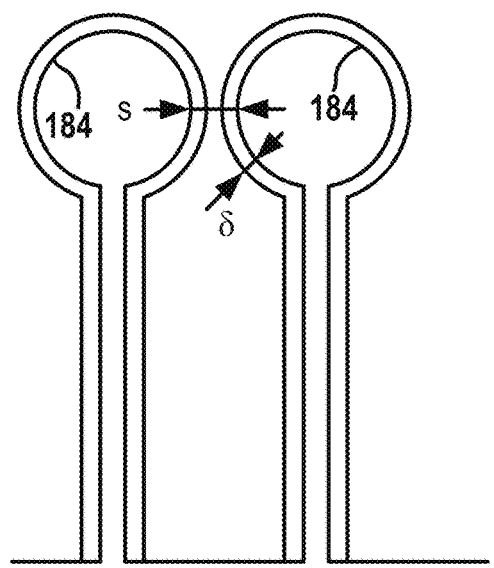
FIGS. 32 and 33 are enlarged views of FIGS. 30 and 31 showing the spacing and location of skin depth.

FIG. 31 shows a print head, according to another embodiment of the invention, having a plate 202 with holes 204A and B and slots 206. The holes 204A are located in a first row extending in an x-direction. The holes 204B are located in a second row extending in an x-direction. The second row of holes is offset from the first row of holes in a y-direction. As shown in FIG. 32, current flows within a skin depth δ. The distance within the metal at which the current is reduced by approximately 37% of the value at the surface is called the skin depth δ and can be written as:

$$\delta = \sqrt{\frac{\rho}{\pi f \mu}} \quad [8]$$

ρ is the resistivity of the material of the plate,
μ is the permeability of the material of the plate; and
f is the frequency of the magnetic field.

Figure 33:
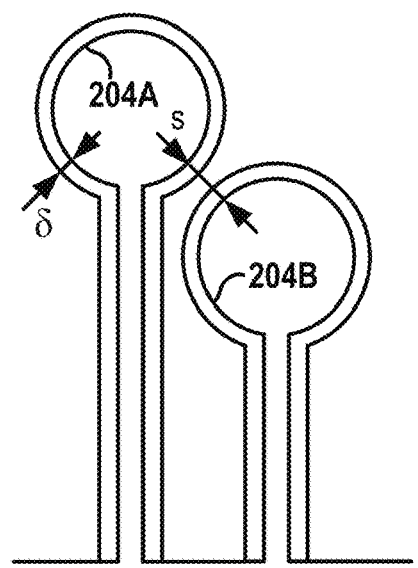

The holes 184 are spaced from one another by a distance s. In order for the currents of the holes 184 to remain separate from one another, s≥2δ. In FIG. 32, s is measured in a y-direction. In FIG. 33, s is the closest distance between adjacent ones of the holes 204A and B.

In general, each flux concentrator heats a respective region of the underlying part or parts. A respective heat affected zone is thereby created in the respective region where atom movement causes a change in a property of a material the part or parts. The material may or may not melt.

A plurality of particles may be sintered together due to migration of atoms between the particles, which is an example of a non-melting change in properties of a material. A non-melting change in properties of a material may include a change in microstructure of the material. Such a change in microstructure may for example include a phase change of the material wherein a crystal structure of the material is changed. Such a change in crystal structure may involve a change in lattice structure with or without the inclusion of additional or replacement atoms or may include the inclusion or replacement of atoms without a change in the lattice structure. A phase change may involve a change in the grain size.

Figure 34A:
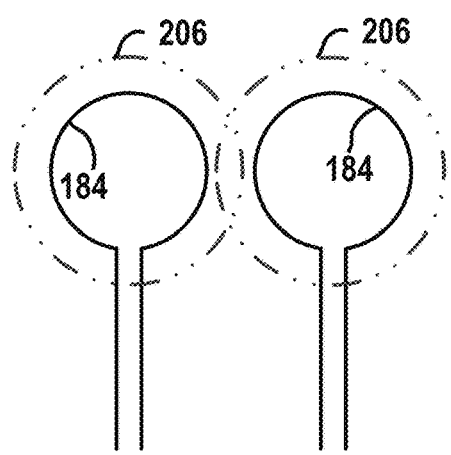
FIGS. 34a and 34b illustrate heat affected regions where phase change occurs.
Figure 34B:
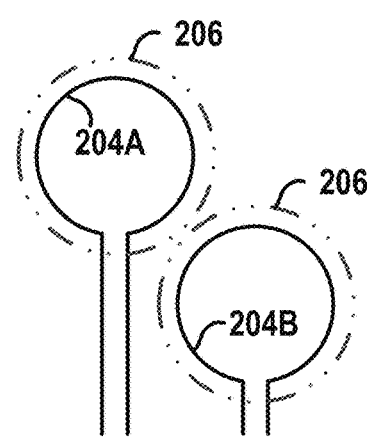

As shown in FIGS. 34a-b, the alternating magnetic fields created by the holes 184 and 204A and B create heat affected regions 206 within the underlying part or parts such as particles that are larger than the holes 184 and 204A and B.

Figure 36:
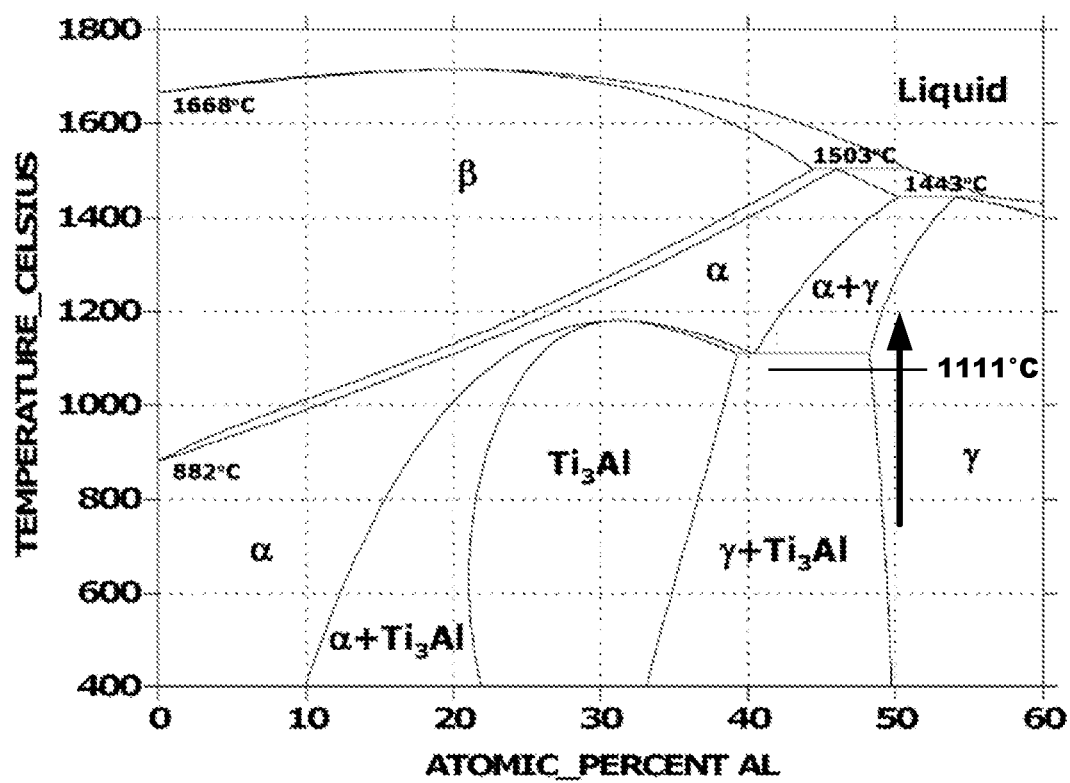
FIG. 36 is a Ti—Al phase diagram that includes a phase change at 1111° C. of Ti-48 Al-2 Cr-2 Nb.
Figure 37A:
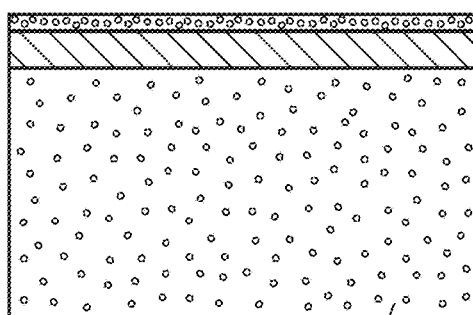
FIGS. 37a-37f are cross-sectional side views illustrating a conventional AM process.
Figure 37B:
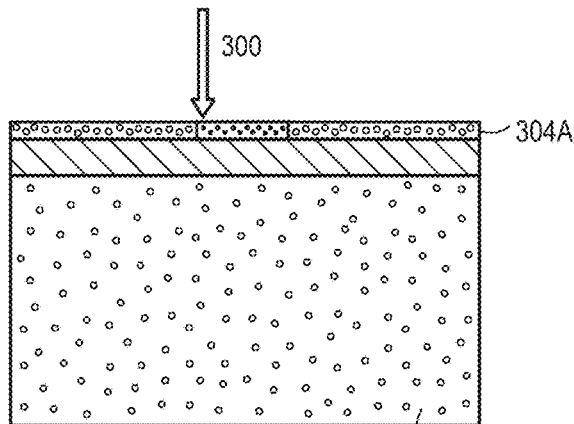
Figure 37C:
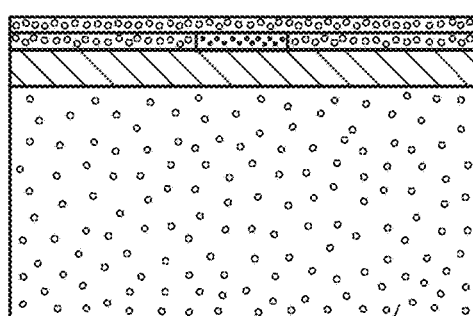
Figure 37D:
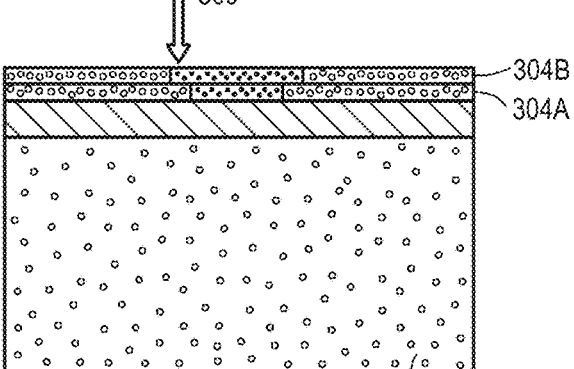
Figure 37E:
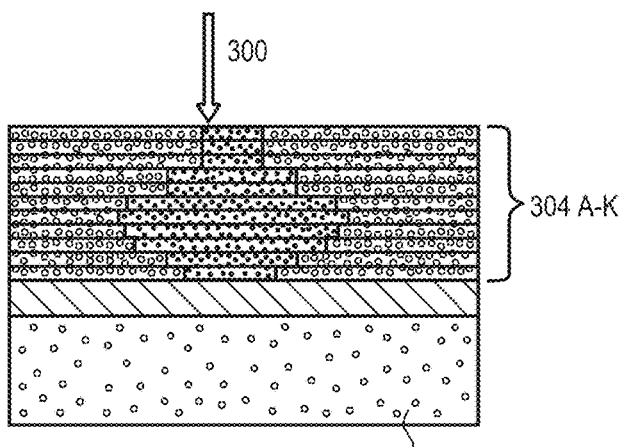
Figure 37F:
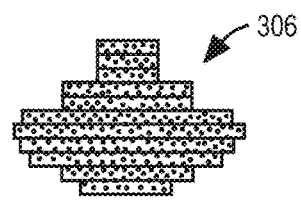

FIG. 36 shows, by way of example, a Ti—Al phase diagram to illustrate an example of a phase change in the material. A composition of Ti-48 Al-2 Cr-2 Nb (48% aluminum) has a phase change at 1111° C. Below 1111° C., the composition is a mixture of γ and Ti$_3$Al. Above 1111° C., the composition consists of solid α and solid γ without having been melted. A subsequent quenching to below 1111° C. will render a composition of α and γ only.

Figure 35A:
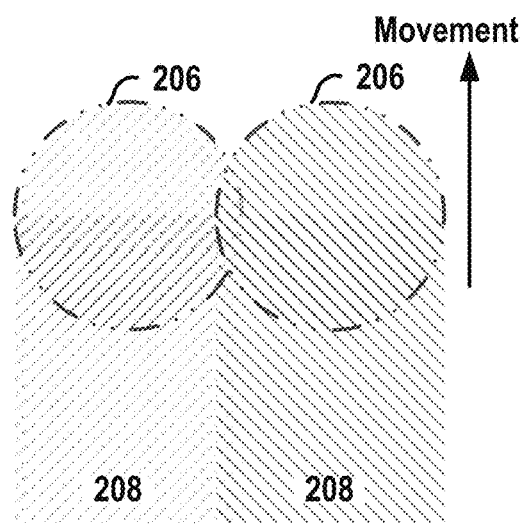
FIGS. 35a and 35b show trailing paths of the regions in FIGS. 34 and 34b, respectively, where phase change has occurred.

As shown in FIG. 35a, the regions 206 that are formed due to the holes 184 in FIG. 34a are simultaneously moved in a y-direction i.e., at right angles to the rows of holes 184 shone in FIG. 34a. Each region 206 leaves a respective trailing path 208 where the phase change has happened. The trailing path 208 of the region 206 on the left is cross-hatched from bottom left to top right and the trailing path 208 of the region 206 on the right is cross-hatched from bottom right to top left. Because the regions 206 overlap, and are in-line with one another in an x-direction, the trailing paths 208 also overlap. There is thus no break between the trailing paths 208 where the phase change did not occur.

Figure 35B:
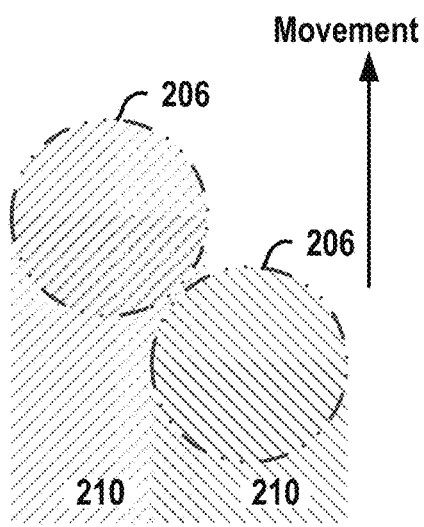

FIG. 35b shows the regions 206 where phase change occurs due to the holes 204A and B in FIG. 34b. Each region 206 forms a respective trailing path 210 where phase change has occurred. The trailing paths 210 overlap one another. Because the holes 204A and B are offset in both an x- and a y-direction, there is no need for the regions 206 to overlap at any particular moment in time.

FIGS. 37a-f illustrate a conventional AM powder manufacture method. A local energy input is represented by the arrow 300, and this energy source travels over the powder bed in a pattern that traces the profile of the two dimensional slice. The consolidated part is fabricated by slowly submerging the as-built part into a powder bed 302. After a layer 304A is consolidated for example, the as-built part is lowered and a fresh layer 304B of powder is deposited over the previously consolidated layer 304A. The process is then repeated for subsequent layers 304A-K. At the end of the process, a multi-layer, partially- to fully-consolidated part 306 is removed from the loose powder in the powder bed 302 and subjected to a number of post-processing routines such as subtractive machining or additional thermal or mechanical treatments.

In conventional AM, the final resolution of the part is determined by the spatial and temporal resolution of the input energy in the X-Y plane (i.e. the "spot" size), the penetration of the energy in the Z direction (i.e. how deep into the powder bed/substrate), and the physics of energy transport away from the fusion and heat affected zones (i.e. the heat capacity, thermal diffusivity, thermal conductivity, crystallization and solidification kinetics, heat of fusion, etc.). It is well known, for example, that the energy required to melt a small feature in a powder bed must be delivered over a very short time frame. Longer exposure times to the energy source causes "growth" of the localized melt area resulting from the sintering of neighboring particles due to thermal conduction. Thus, a very small "spot" size may result in a locally melted region with a large section of loosely sintered particles that may extend far from the "spot" and the resolution of the part is not determined simply by the X-Y dimension of the energy source.

In this invention, an alternative method of complex part fabrication is proposed in which a part is fabricated in an AM process that creates a high resolution ordered arrangement of loose or loosely consolidated materials within a powder bed, which respond in different ways to the input energy source. The energy input to the powder bed is not necessarily localized in the X-Y plane, but rather can be a dimension much larger than the resolution of the part. Thus, the resolution of the part is determined by the spatial ordering of the loose or loosely consolidated material in the powder bed and not necessarily by the spatial resolution of the input energy source.

Figure 38A:
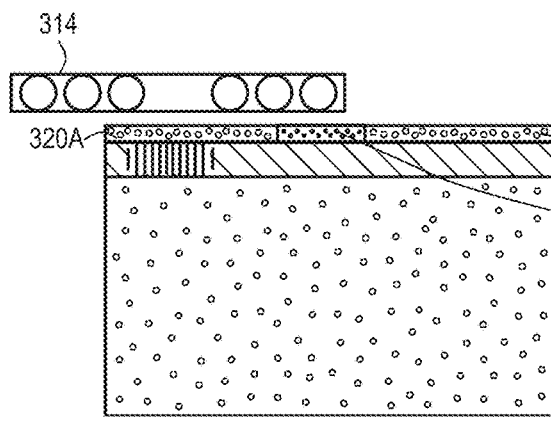
FIGS. 38a-38h are cross-sectional side views illustrating a manufacturing method according to an embodiment of the invention.
Figure 38B:
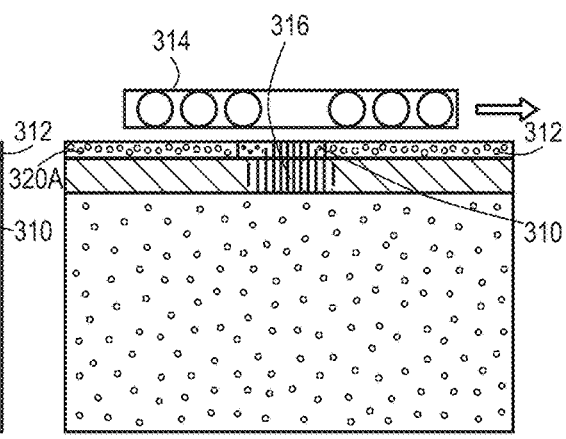
Figure 38C:
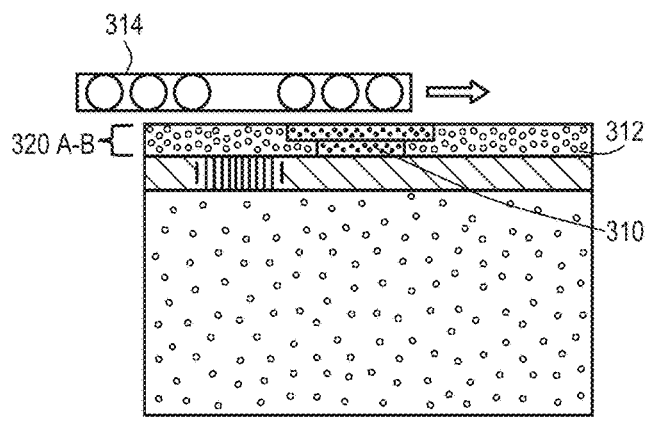
Figure 38D:
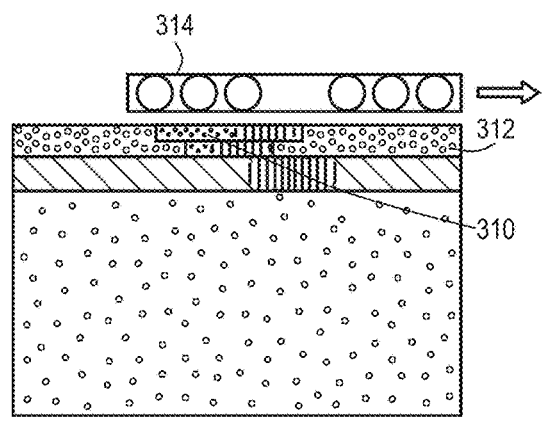
Figure 38E:
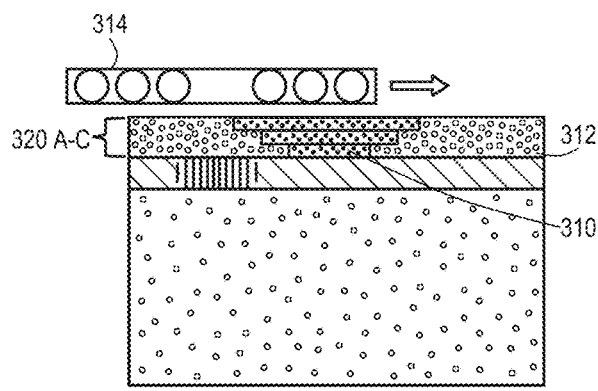
Figure 38F:
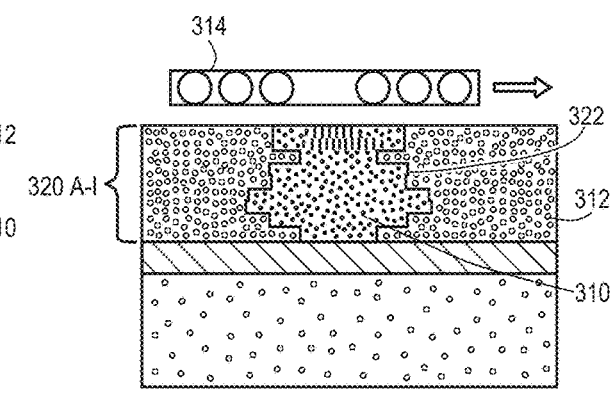

FIGS. 38a-f shows one embodiment of the invention in which an ordered powder layer is heated layer-by-layer to produce a complex part. In FIG. 38a, the material to be consolidated is represented by the pattern 310. The pattern 312 represents material that will not be consolidated by the process used to consolidate the material represented by the pattern 310. For example, the two materials may possess very different melting points, which will result in the consolidation of the lower temperature melting point material with proper thermal processing. In this example, a low frequency induction heater 314 is used to heat the substrate. The induction frequency is chosen such that there is efficient power transfer to the substrate. As the substrate heats, the loose powder represented by the pattern 310 is heated and begins to consolidate. This is shown schematically in FIG. 38b, where the pattern 310 represents a consolidated material that no longer consists of individual particles, but consists of loosely sintered particles or fully dense material.

A first layer 320A is thus heated to consolidate the particles of a first material represented by the pattern 310 of the first layer 320A before depositing a second layer 320B on the first layer 320A. The second layer 320B is heated, after depositing the second layer 320B on the first layer 320A, to consolidate the particles of the first material represented by the pattern 310 of the second layer 320B.

Figure 38G:
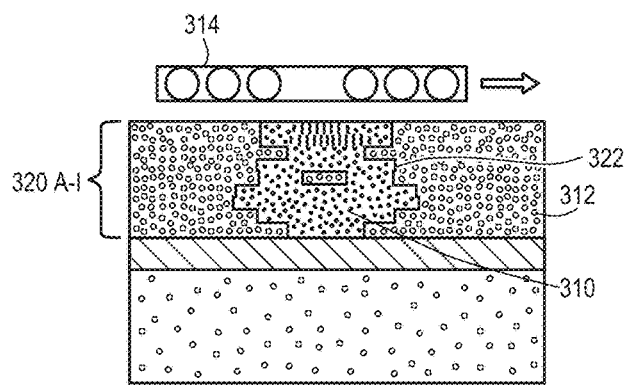

A plurality of layers 320A-I are depositing on one another. A first of the layers 320A includes a portion of the first material represented by the pattern 310 and a portion of the second material represented by the pattern 312, and a second of the layers 320B includes a portion of the first material represented by the pattern 310 and a portion of the second material represented by the pattern 312. The first material of the second layer 320B is in contact with the first material of the first layer 320A. On a multi-layer level the patterns 310 and 312 define first and second volumes and an interface 322 that is formed between the first and second volumes. Consolidation by heating connects the particles of the first material of the second layer 320B to the first material of the first layer 320A. As shown in FIGS. 38g and h, a complex part 324 is fabricated in this manner through the layer-by-layer deposition of powder of layers 320A-I in an ordered fashion over the previously sintered or consolidated material. Each layer 320A-I of ordered powder is subjected to a broad energy input that selectively consolidates the material represented by the pattern 310. An edge 326 of a part 324

Figure 38H:
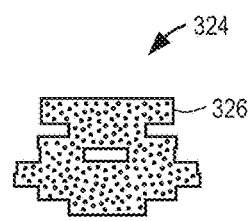

(FIG. 38h) is defined by the interface 322 (FIG. 38g) between the first and second volumes. As seen in the FIG. 38g, this method can be used to create internal features 320A-I (e.g. pockets, holes, and cavities) by using the material that will not sinter or consolidate when exposed to the energy source.

Although the particles of the powder are connected by heating consolidation, other connection schemes may be employed. Most cases involve (i) forming first volume of first powder having first particles of a first material in contact with a second volume of second powder having second particles of a second material and (ii) employing a connection scheme to connect the particles to one another, wherein the first material is a positive material and the second material is a negative material so that the positive material preferentially connects the first particles to one another to a greater extent than the negative material connecting the second particles to one another. In most cases the first material together with a substrate or earlier layer form a holder suitable to hold the first particles of a first powder in proximity to one another.

Figure 39A:
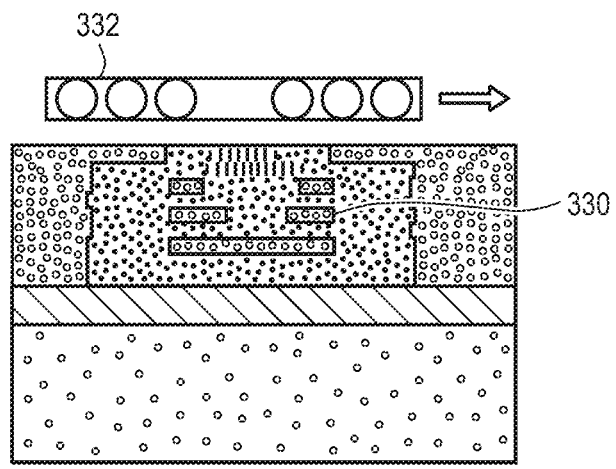
FIGS. 39a-39b are cross-sectional side views illustrating a complex part with a number of internal features that are be fabricated using the manufacturing method.
Figure 39B:
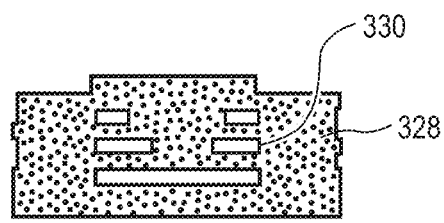

FIGS. 39a-b show a schematic of a complex part 328 with a number of internal features 330 that can be fabricated using this process. In this example, the induction heating with an induction heater 332 is used to selectively heat the previously consolidated/sintered material on a layer-by-layer basis. The induction heating technology will heat the substrate material in a reference depth determined by the skin depth of the material and the thermal conductivity and thermal diffusivity of the substrate. The internal features 330 can be closed or open. If the internal features are closed, then the loose powder remains within the cavity formed by the internal features. The negative powder within the internal features 330 also serves to hold the positive powder in place before the positive powder is consolidated.

Alternatively, the induction frequency can be tuned to specifically heat the loose powdered material, the loose powdered material and the substrate, or specifically the substrate.

While heating by induction is used in this example, any number of energy sources can be used to heat and consolidate the ordered powder layer such as laser, high intensity light, radiant heat, electron beam, etc.

Figure 40A:
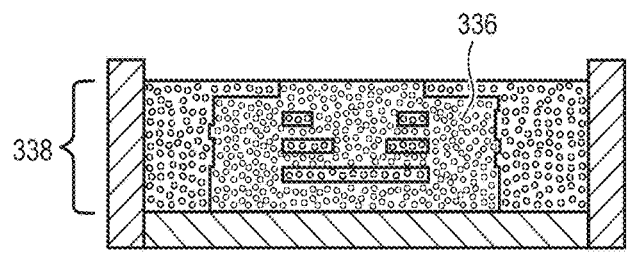
FIGS. 40a-40f illustrate fabrication of a three-dimensional part.
Figure 40B:
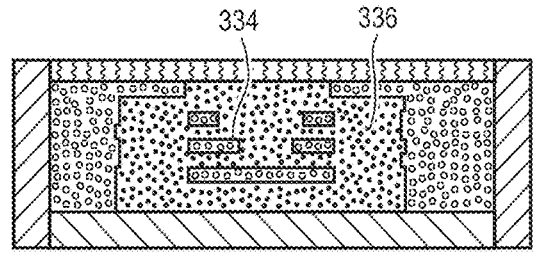
Figure 40C:
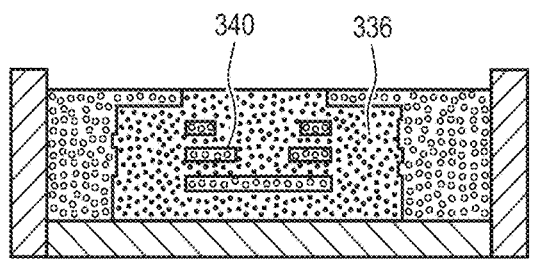
Figure 40D:
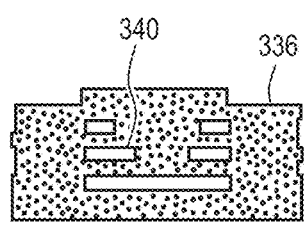
Figure 40E:
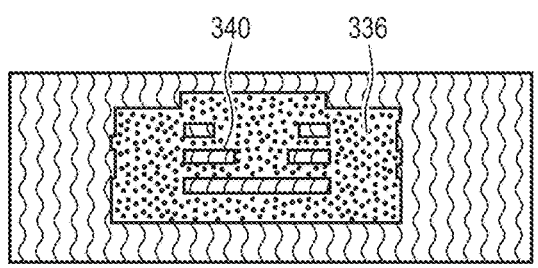
Figure 40F:
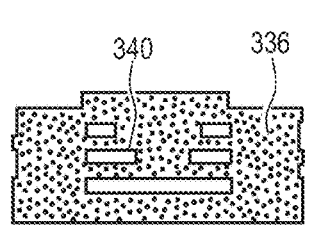

Alternatively, as shown schematically in FIGS. 40a-f, a three-dimensional part 336 can be fabricated using the layer-by-layer powder deposition technology by creating a three dimensional ordered powder part within the powder bed. In FIG. 40a, complex loose powder structure is formed completely within the powder bed using multiple layers 338 of powder, each layer having powder of positive and negative materials. After the spatially ordered powder, that comprises the part 336, is fabricated, the entire system is heated as shown in FIG. 40b to a temperature that results in the partial or complete consolidation of the part. In effect, a first layer and a second layer are simultaneously heated to consolidate the particles of the first material of the first layer and the second layer. The entire system is then allowed to cool down as shown in FIG. 40c. In FIG. 40d, the partially (or fully) consolidated part 336 is removed from the powder bed for post processing. Post processing may include the machining of the part or, as shown in FIG. 40e, further heat treatments to achieve the proper microstructure, density, and materials properties.

The part 336 can be fabricated using two different materials, wherein one material has a lower melting point than the other material. A three-dimensional ordered part can be fabricated through a layer-by-layer process and heated using the method outlined in FIGS. 40a-f and internal features can be fabricated using this method.

An additively manufactured part 336 with internal cavities 340 can be formed using this process, i.e. a part 336 wherein a second volume formed by negative material is within the first volume formed by positive material and the first volume partially or entirely encloses the second volume.

Figure 41:
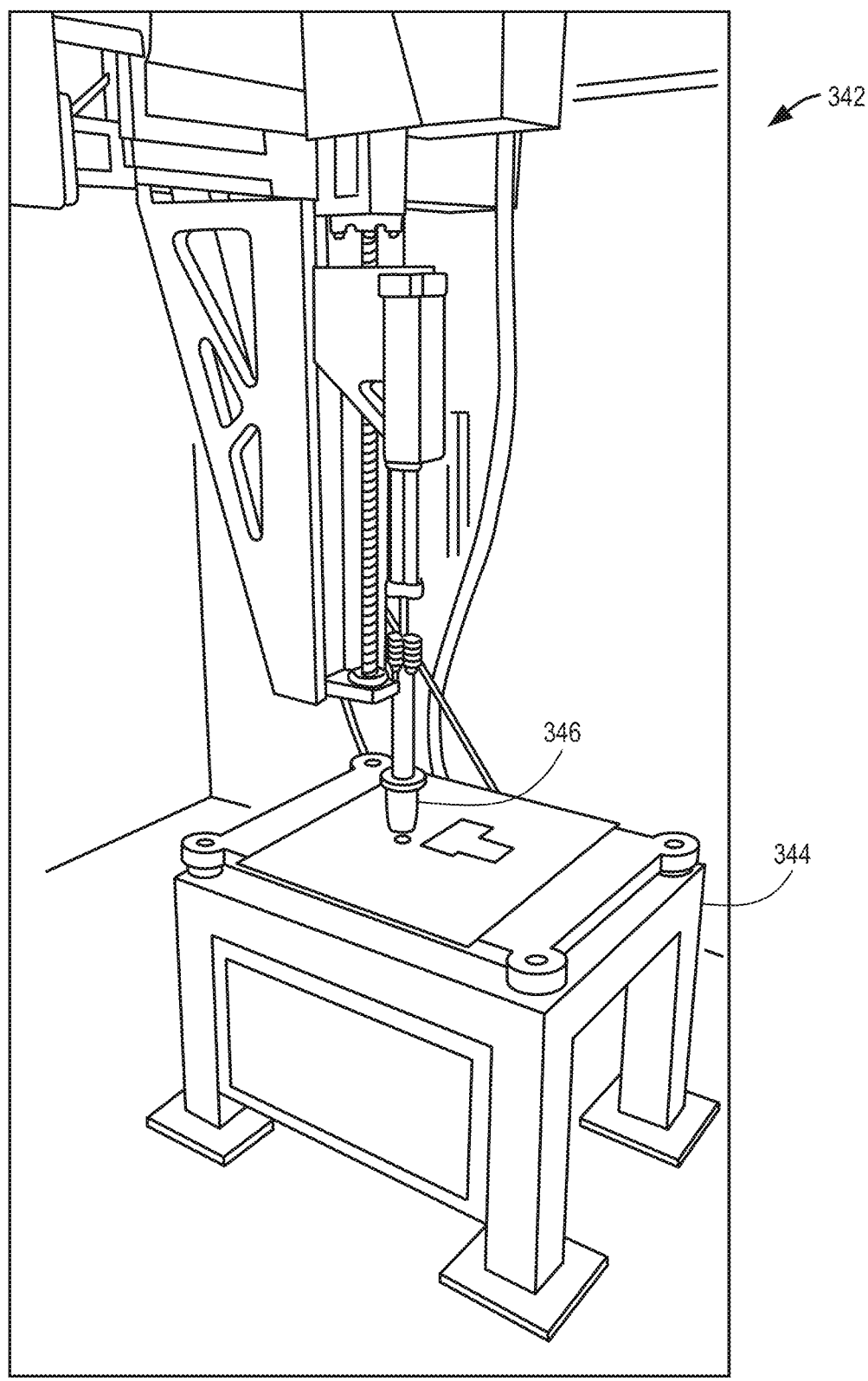
FIG. 41 is a perspective view of a manufacturing system according to an embodiment of the invention.

FIG. 41 shows an example of a manufacturing system 342 that includes a CNC stage 344 and a print head 346 used to fabricate parts by the ordered powder approach. In this specific example, the print head 346 is capable of depositing three different powders at specific flow rates. A small vibrating transducer is used within each powder deposition channel to partially or completely fluidize the powder. An integrated shutter allows for the rapid switching of the individual powders.

Each deposition channel is also equipped with a number of small transducers that monitor the flow of the powder. These transducers are small tank circuits that resonate at frequencies that couple well to the individual powders. A frequency limit is set for each flow transducer. In general, good coupling occurs when the diameter of the particles in the powder are greater than approximately 4 to 6 times the skin depth of the material. This sets the lower bound of the frequency limit for the flow transducer.

The transducer has a specific impedance when no powder is within the inductive portion of the tank circuit. This impedance changes significantly when powder is present and when powder is flowing in through the inductive portion of the circuit (i.e., the coil). Thus, by measuring the impedance of the tank circuit, it is possible to measure the flow characteristics of the powder through the powder deposition tube.

The ordered powders are fabricated by controlling and measuring the flow of powder from the print head 346 that is mounted on a CNC stage 344, which is controlled by a computer.

Figure 42A:
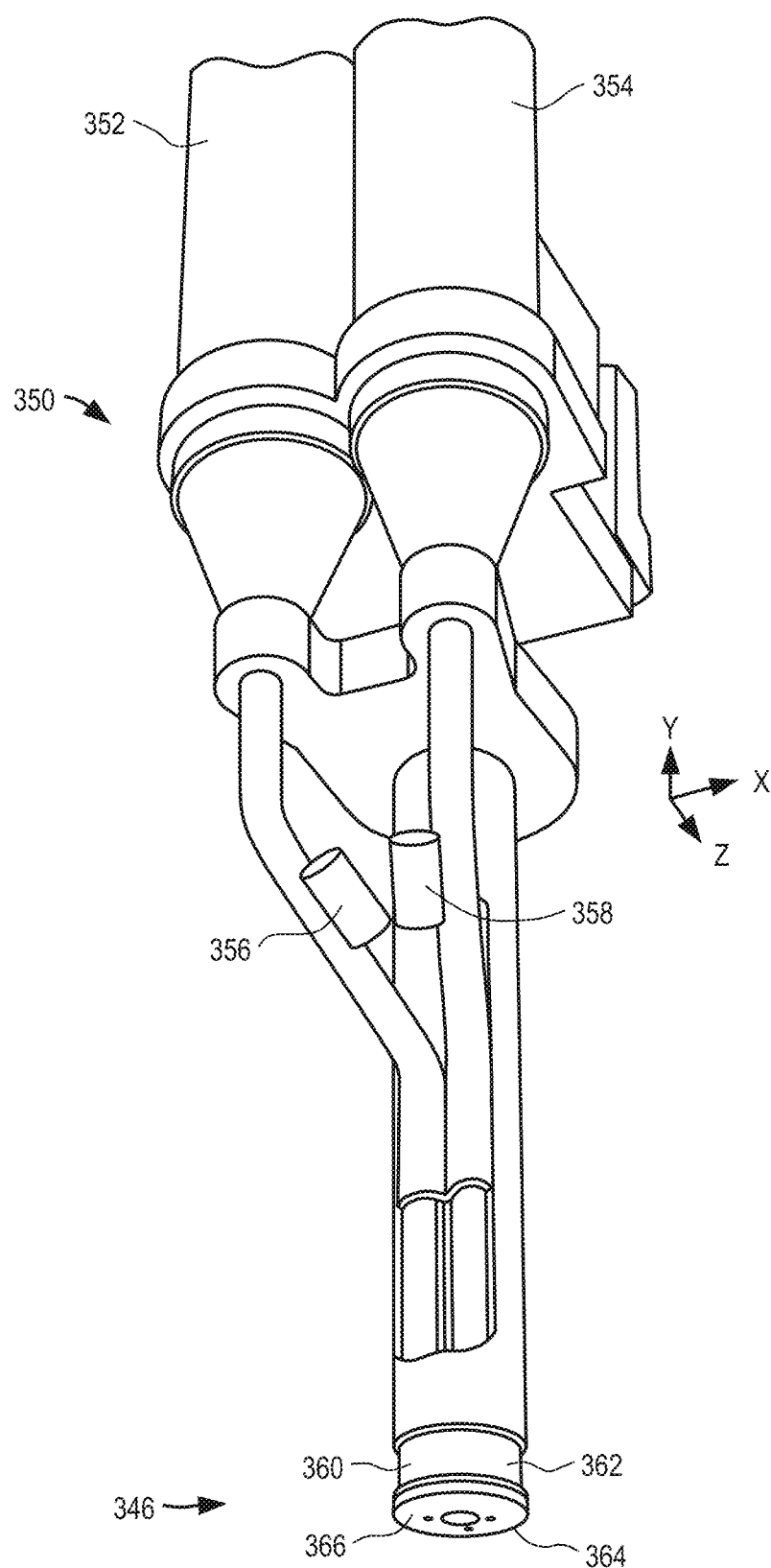
FIGS. 42a to 42b are perspective views of a print head forming part of the system in FIG. 41.
Figure 42B:
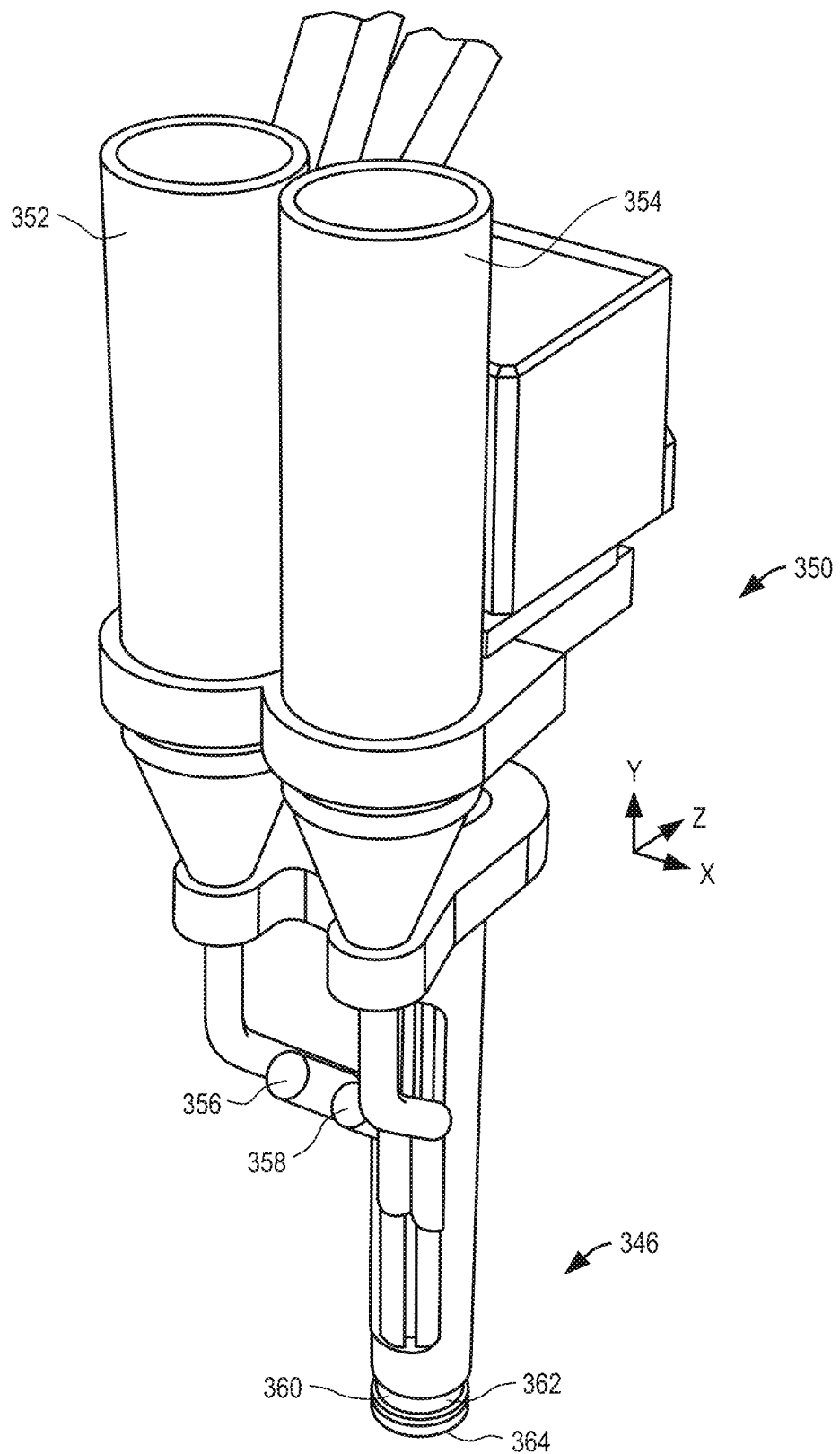

FIG. 42a-b show a two-powder advanced Ordered Powder Lithography (OPL) powder deposition system 350 forming part of a manufacturing system according to an embodiment of the invention. This system consists of first and second powder hoppers 352 and 354, first and second vibrating transducers 356 and 358, first and second powder flow sensors 360 and 362 and an integrated powder shutter 364. A bottom surface 366 of the shutter 364 also serves to screed the powder to form a flat, level surface. The shutter 364 forms part of an OPL print head 346 of the system 350.

Figures 43A, 43B:
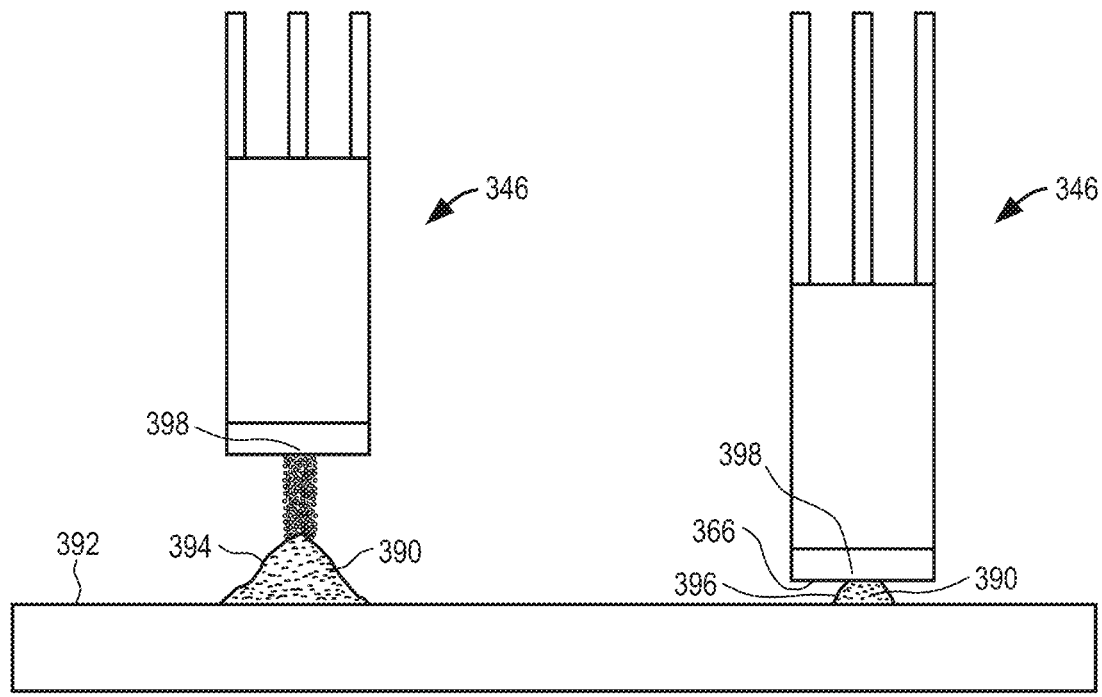
FIGS. 43a to 43b are cross-sectional side views illustrating a self screeding print head.

In additive manufacturing it is critical to have well defined dimensions of the material that is deposited. Powder flowing from a nozzle on a surface will generally form into a loose pile with an angle specific to the particular powder. This angle is known as the angle of repose of the powder. FIGS. 43a-b show a schematic of a typical cross section of powder 390 that has been deposited on a supporting surface 392. As shown in FIG. 43a, if the powder 390 is allowed to "free fall" from the OPL print head 346, the powder 390 will form a loose pile with an angle of repose 394 specific to the powder 390. This will result in a broad line that becomes wider with distance from the surface 392 (or powder bed). As shown in FIG. 43b, by moving the OPL print head 346 very close to the surface 392, however, the powder flow is limited to a much narrower region. In this case, nearly vertical walls 396 can be achieved with the OPL print head 346. In addition, the flow of powder is self-limiting with the bottom surface 366 of the print head 346 near the surface 392 of the substrate. Powder 390 will flow out of the nozzle

398 and stop when there is no more room underneath the print head 346. As soon as the print head 346 moves, however, powder will begin to flow if the specific powder shutter valve (not shown) is open.

Figure 44:
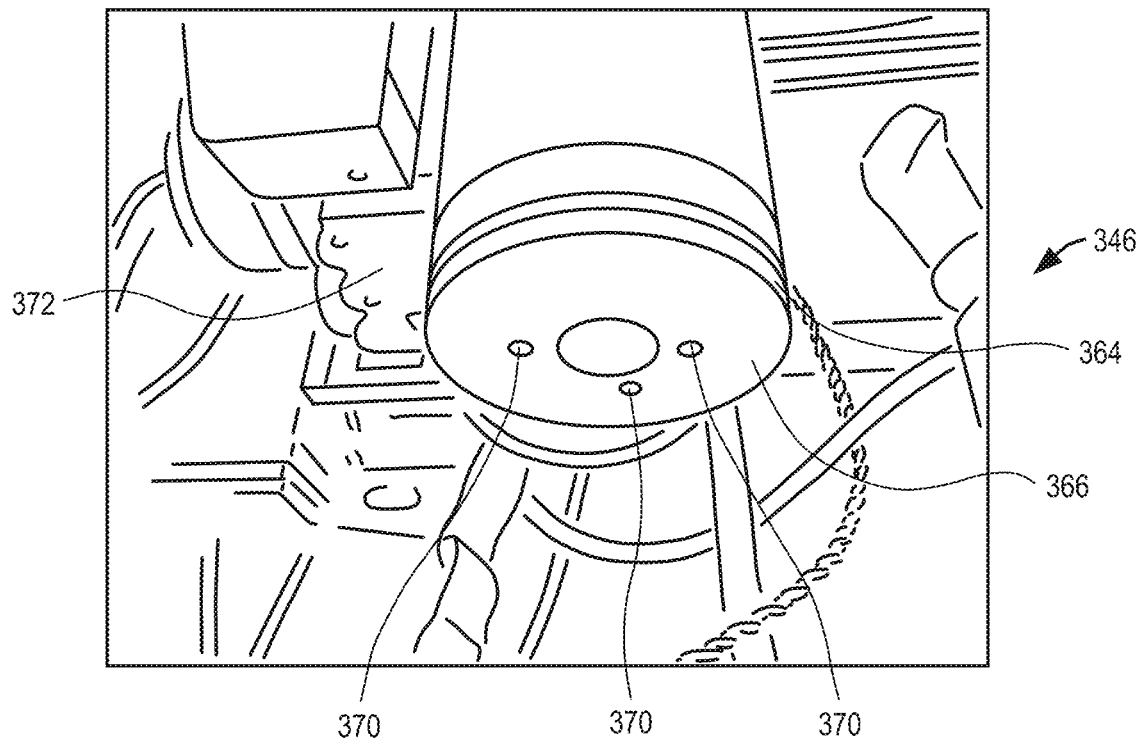
FIG. 44 is a perspective view of a shutter of the print head.

This self-limiting, self-screeding, shuttered, multi-powder deposition system allows for the controlled deposition of one or more powders, thus enabling the ordered powder lithography method. FIG. 44 shows a bottom surface 366 of the OPL print head 346. A shutter actuator 372 rotates (moves) the shutter 364 from a first position to a second position. The shutter 364 dispenses the first powder without dispensing the second powder when the shutter 364 is in the first position and the shutter 364 dispenses the second powder without dispensing the first powder when the shutter is in the second position. The shutter 364 includes multiple openings 370, each being capable of depositing a separate powder or combination of two powders.

OPL is an AM technique that permits the rapid structured deposition of metallic (or other) powders to form a three-dimensional part. The method uses powder metallurgy techniques to sinter material with the use of heat. However, unlike conventional powder metallurgy techniques in which a powder is loaded into a pre-made mold and compacted, OPL additively deposits material that forms the part and the mold through the same layer-by-layer AM process.

Figure 45A:
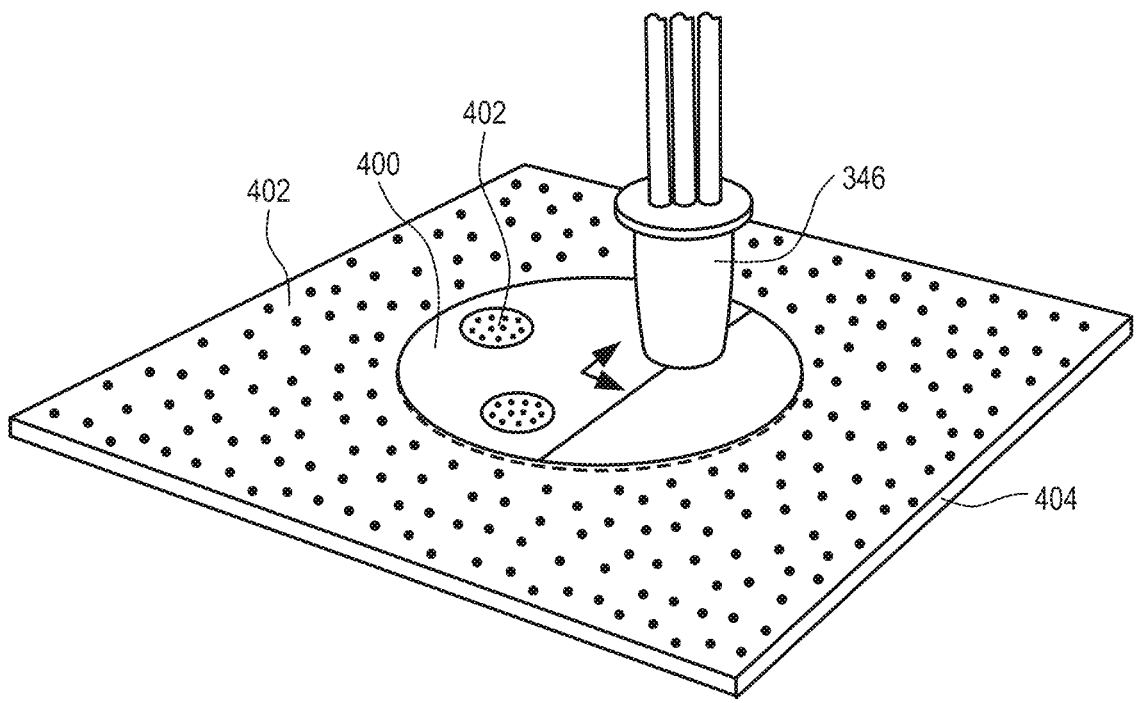
FIGS. 45a-45f are perspective views illustrating the manufacture of a part with internal features.
Figure 45B:
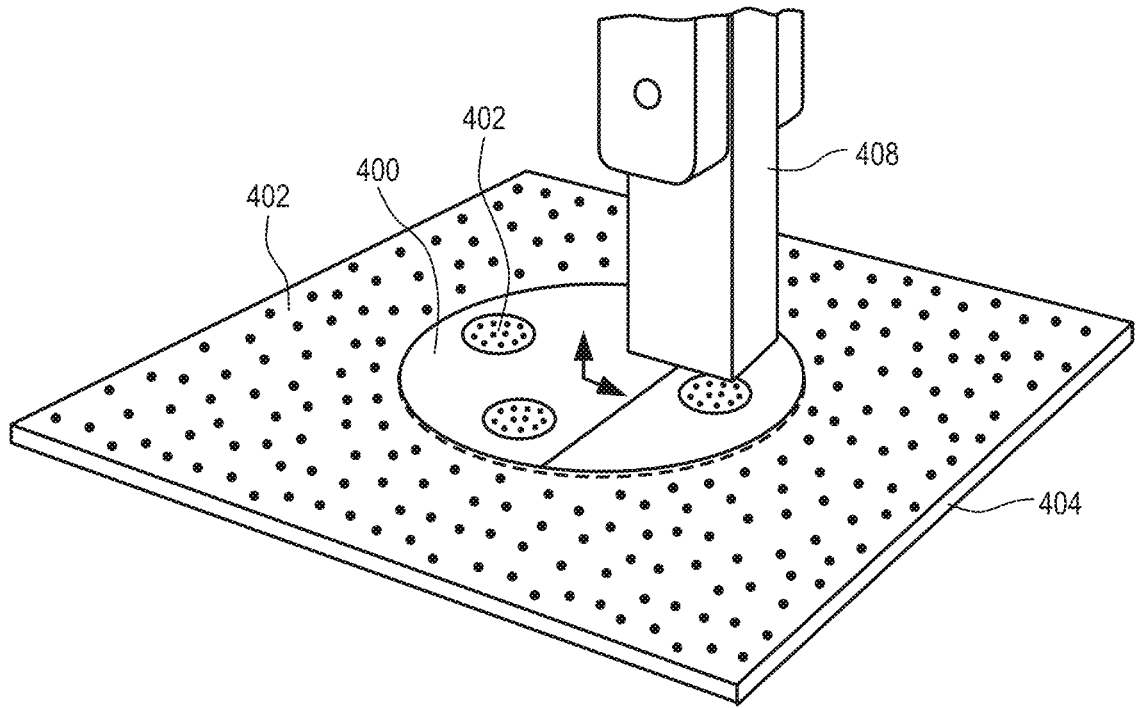
Figure 45C:
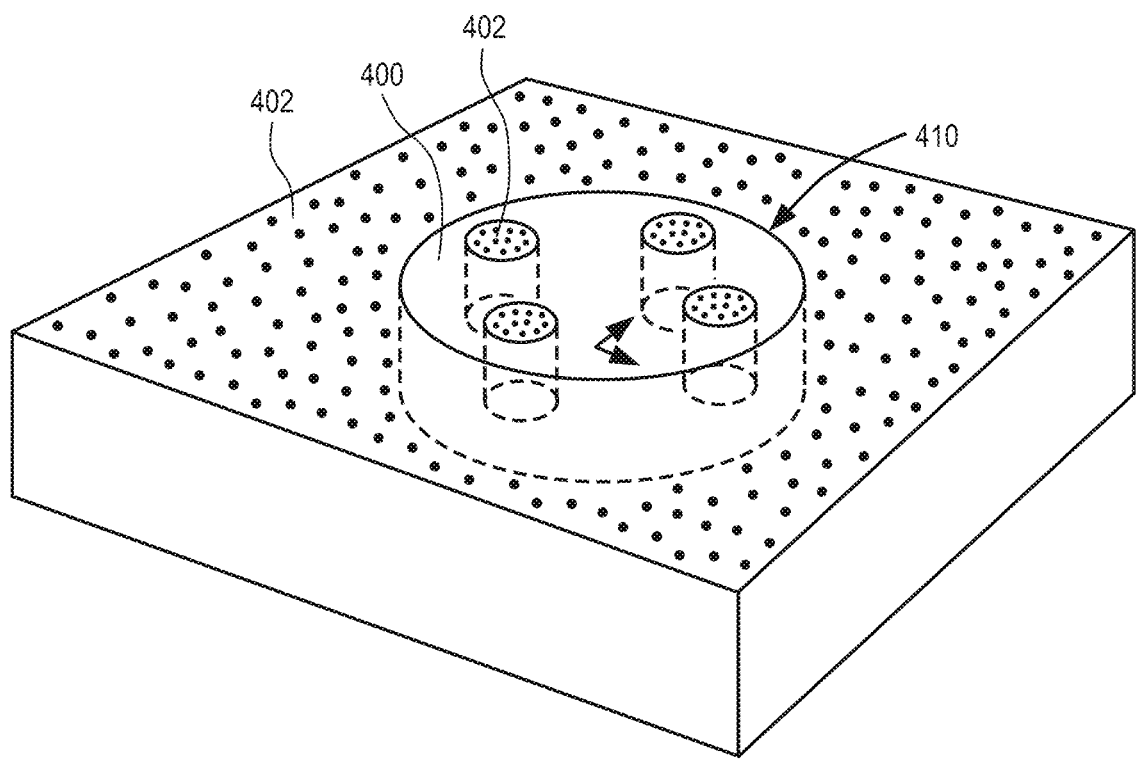
Figure 45D:
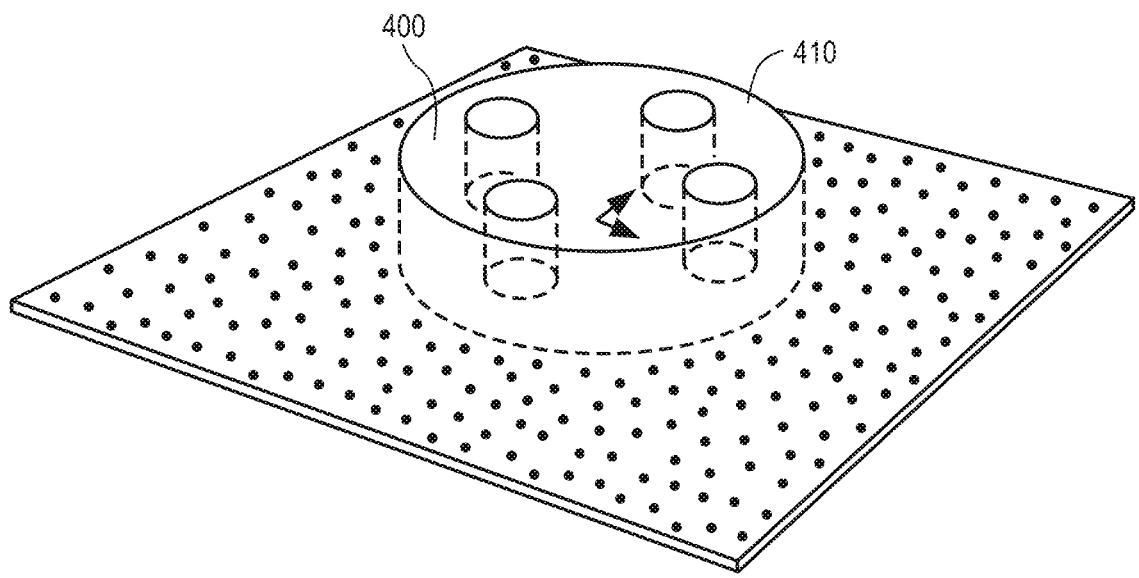
Figure 45E:
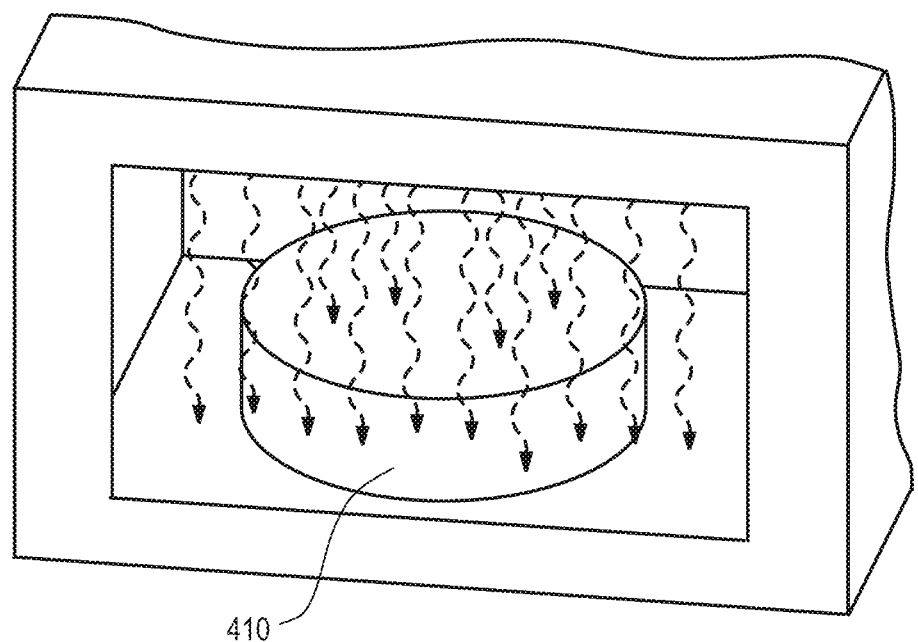
Figure 45F:
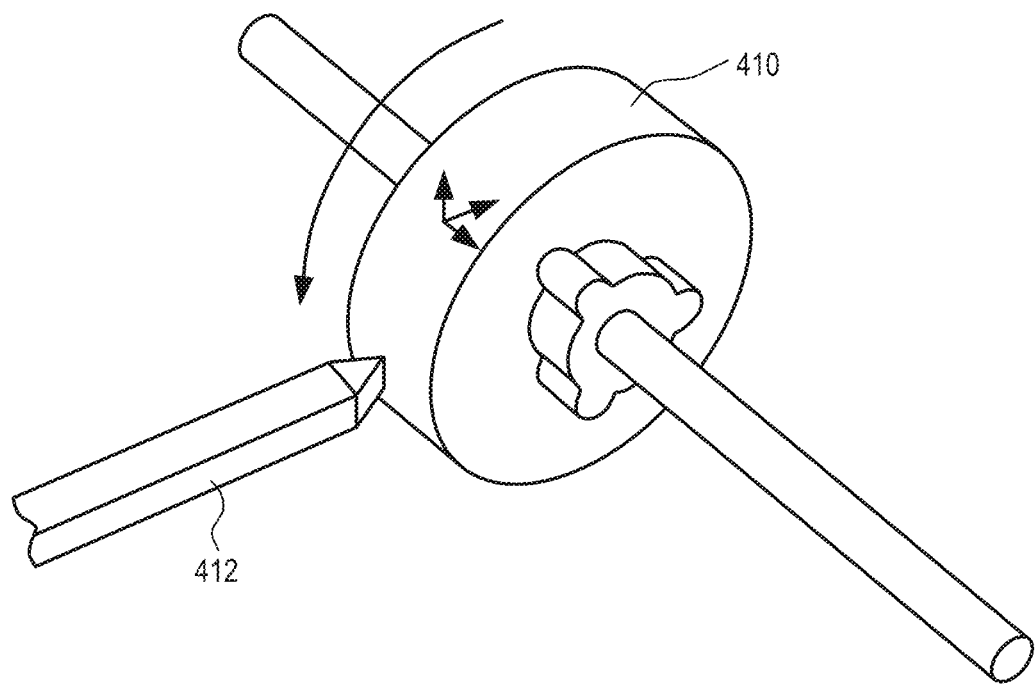

As illustrated in FIG. 45a, the print head 346 deposits positive powder 400 and negative powder 402 to a form an ordered powder layer 404 in shapes specified by a computer aided manufacturing (CAM) program. As shown in FIG. 45b, the layer 404 is loosely sintered using an MIS-based induction heater 408. As shown in FIG. 45c, the process is repeated on a layer-by-layer basis to form a "green" part 410 that has structural integrity both within and between each layer. As shown in FIG. 45d, the negative powder 402 is then removed from the part 410 The green part 410 is then fully consolidated using a variable duty cycle high power induction heating process or other equivalent energy source that results in the consolidation of the powder layer. Unlike other AM techniques, OPL does not necessarily require binders (as in binder jetting techniques) and is not based on progressive consolidation of a small point of material in a powder bed (as in laser or e-beam methods). As shown in FIG. 45e, the part 410 may be subjected to further heat treatment using a post-processing heater. As shown in FIG. 45f, a machining apparatus 412 may be used to machine the part 410 to its final specifications and tolerances.

As can be seen above, OPL technology is an AM Lithographic Technique that uses positive and negative materials in powders. Negative powders form volumes that are not sintered by heating at a specific temperature and are used to define the exterior boundaries of the part (additively forming a mold) as well as the interior volumes. Positive powders are those that are sintered by heating at a specific temperature to form the three-dimensional green part. Multiple types of powders can be used to fabricate a part, permitting graded material fabrication that cannot be achieved by other additive methods.

Figure 46A:
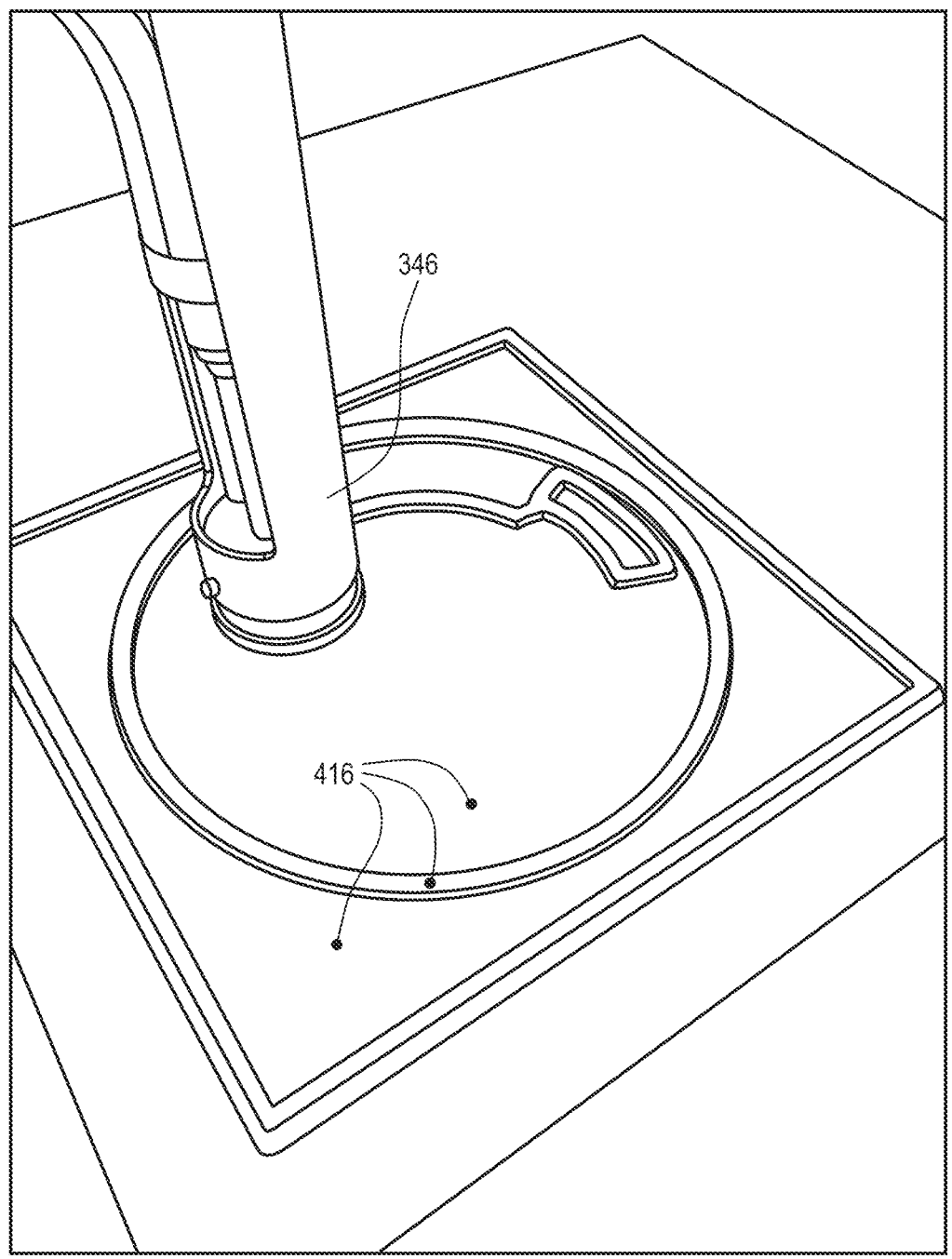
FIGS. 46a and 46b are perspective views illustrating deposition of positive and negative powders.

FIGS. 46a and b show the use of the print head 346 that is used as an OPL 3D printer. Powder is deposited on a layer-by-layer basis through a series of fine nozzles with mass flow meters in the print head 346. Different negative materials 416 and positive materials 418 can be deposited through each nozzle as the print head is swept over the build surface. Parts with graded material structures are those in which the material varies from one portion of the part to the other. The printer has a separate print head (not shown in FIGS. 46a and b) with MIS transducers that are swept across the powder layer after each layer is deposited to sinter positive powders through high frequency induction heating. Alternatively, the printer may integrate the powder deposition and MIS print heads.

The green part is brought to full density in a separate furnace using variable duty cycle induction heating or any other heating process that results in achieving the desired materials properties of the final part. The induction heating process is operated at tuned frequencies and pulsed duty cycles that permit material consolidation without damaging the multi-layer material structure. The particles are thus selectively heated using induction heating and by tuning an induction frequency to heat the first particles preferentially over the second particles, and by using pulsed duty cycles to heat the first particles preferentially over the second particles.

Many materials can be used in the OPL printer. These include metals, plastics, polymers, non-metals, ceramics, reactive materials, and un-reactive materials. If the powder flows well using the OPL print head and at least one material is partially or fully consolidated using a layer-by-layer or bulk energy source, then complex parts can be fabricated using the technology.

Other Features of the OPL System

System is "self-leveling"—Any reservoir or "build cartridge" can be inserted in the system without necessarily leveling the build surface relative to the print head 346. A build cartridge is usually an open top box that the powders are deposited into. We have made them from metal, refractory fire brick, and graphite. Any material can be used if it is stable under the heat treatment conditions. Because the powder flow is self-limiting and self-screeding, a true and level surface is created in the first powder layer that is deposited. This first powder layer serves as a foundation for the rest of the build.

Non-spherical particles are good negative materials—non-spherical free-flowing particles tend to not move in the individual powder layer and thus hold the shape of the positive material. Tungsten powder is particularly good for this application because of the powder morphology, very high melting temperature, and high density. Casting sands (such as Zircon, alumina, and magnesium oxide) are also good candidate materials. These materials do not sinter at temperatures typically used to sinter/consolidate most metals. In addition, most metals do not wet these materials.

Automatic powder hopper fill—The system can be equipped with an automated powder hopper that will fill the powder reservoirs on the print head when needed. This can be a timed system (e.g. fill after a fixed number of layers) or a system equipped with a sensor such as an optical sensor to detect the level of powder the powder reservoirs on the print head, or a gravity-flow system with flexible powder feed tubes.

Powder is deposited in a controlled fashion using the self-screeding, self-limiting nozzle described previously. The tool path is generated by taking a 3D model of the part, slicing the part into well defined "2D" sections, and generating a path for each powder that creates a 2D representation of the slice with a given thickness. By stacking these slices, a 3D part can be fabricated. The tool path consists of:

Negative powder perimeter moves
Negative powder in-fill moves
Positive powder perimeter moves
Positive powder in-fill moves
Travel moves
Powder clearing moves In this tool path, the perimeters are typically deposited first, followed by the in-fill regions. There may be certain geometries, however, where the in-fill is deposited first. Any number of positive or negative materials may be deposited in the toolpath. The number of materials depends on the specific OPL print head used to fabricate the part.

Travel moves are moves during which all powder shutters are off and the print head 346 is moving to the next print position. These moves may be a direct line from the previous position, or may be programmed to avoid any region that does not contain the previous powder. For example, after depositing a positive in-fill, the shutter will close and the travel path may be a long route that avoids all positive powder regions and passes only over negative regions. This will reduce or eliminate any cross contamination of the different powders.

Powder clearing moves are coordinated complex moves that serve to move a small amount of powder from the internal of the powder shutter and deposit this material in a "safe" region. When the powder shutter closes, there is a rotating or linear movement that stops the flow of powder from the accumulator. As this moves, there is an associated movement of the print head that compensates for the shutter movement and effectively keeps the powder in the shutter at the same position on the powder bed build surface. The control program then evaluates all possible positions adjacent to this position that satisfy one of the following criteria:

- The powder clearing position has the same powder that is in the shutter.
- The powder clearing position is a minimum distance from the any position that contains another powder.
- Ideally the powder clearing position is not yet filled with powder from the toolpath. This would occur if the perimeter was deposited first and the powder clearing position was located within the in-fill region of the same powder.
- The powder clearing position can only be reached by a straight or continuous path that only contains the same powder as the powder in the shutter.
- The powder clearing position is typically slightly higher in the z-direction, which allows the remaining powder in the shutter to slowly flow out of the space and fully empty the shutter. With the proper selection of the powder clearing position, the small amount of extra powder becomes fully incorporated into the existing or subsequent powder layer and is not detectable in the final build.

Figure 47A:
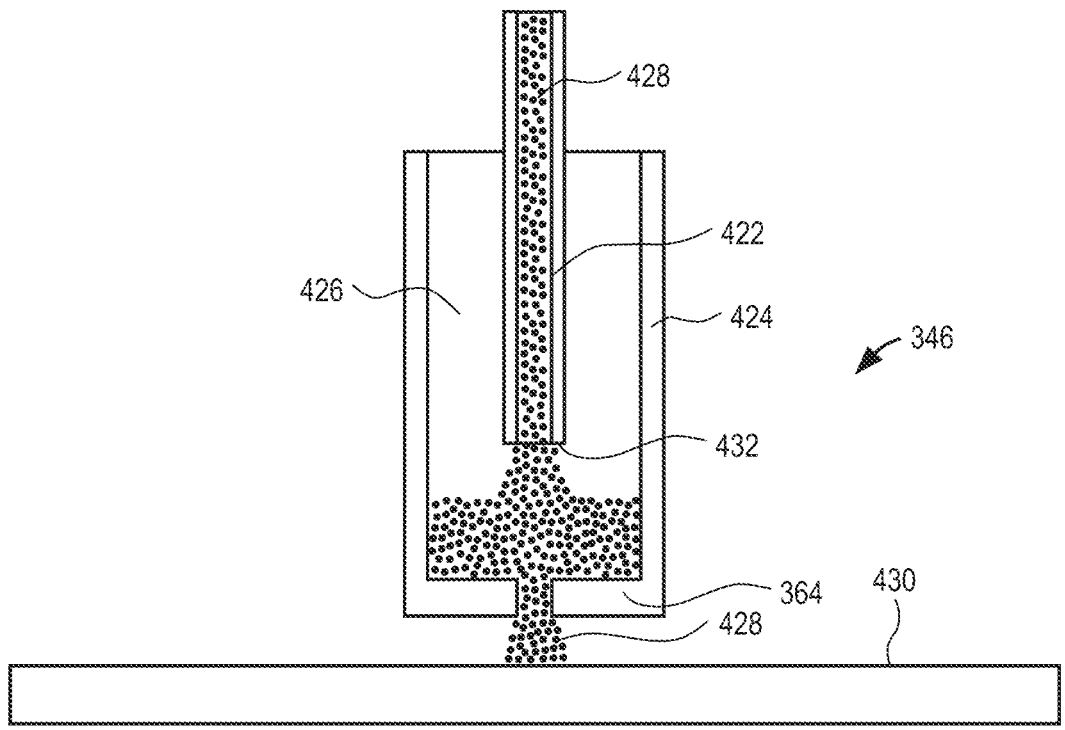
FIGS. 47a-47b are cross-sectional side views illustrating a self-limiting regulator for powder flow.

As discussed previously and further illustrated in FIGS. 47*a* and *b*, the OPL print head 346 is a self-limiting, self-screeding system that creates powder traces with well-defined dimensions. This is achieved by incorporating a powder hopper system, which may include a mechanical fluidization system, with a powder accumulator that regulates the flow of powder to the build. The print head 346 includes a feed tube 422 and a powder hopper 424. The powder hopper 424 forms a powder accumulator 426. As shown in FIG. 47 *a*, powder 428 is directed through the feed tube 422 into the powder hopper 424 and accumulates within the powder accumulator 426. The feed tube 422 is vibrated and fluidizes the powder 428 in the powder accumulator 426, which results an even flow of powder out of the shutter. The cross-sectional shape of this powder 428 on the surface 430 is determined by the distance between the screed formed by the print head 346 and the surface 430 on which the powder 428 is deposited.

Figure 47B:
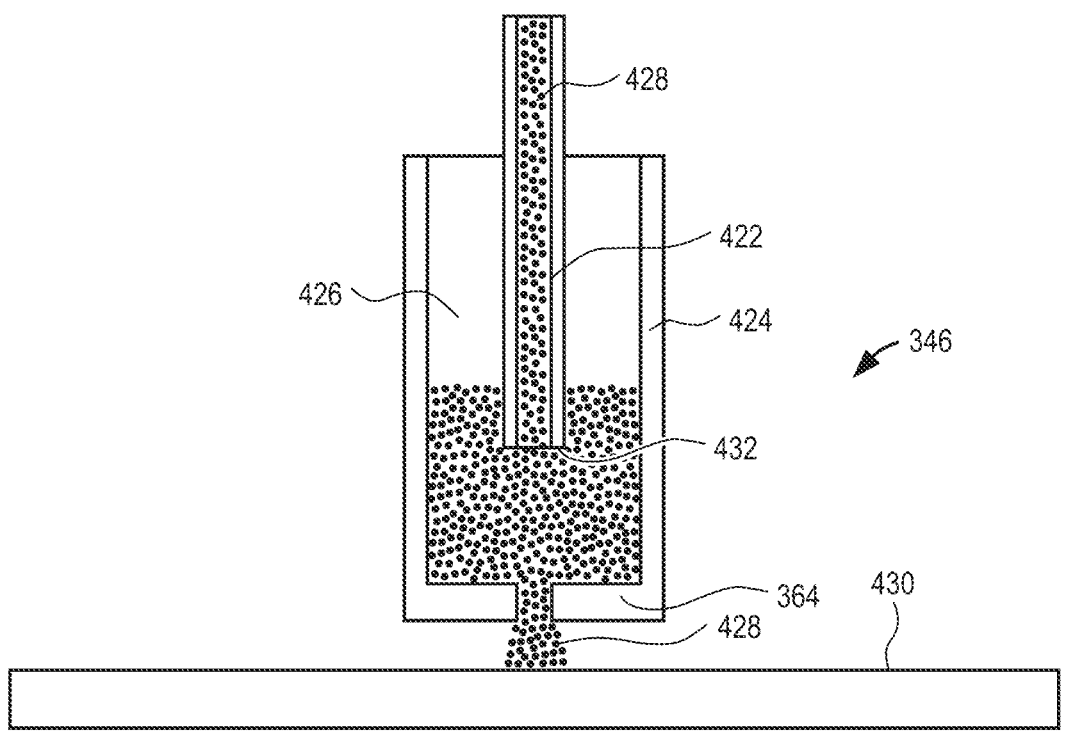

As shown in FIG. 47*b*, the powder accumulates within the powder accumulator 426 until the powder rises over a mouth 432 of the feed tube 422. The powder 428 then forms a natural powder cork over the mouth 432 of the feed tube 422. The cork prevents the flow of more powder 428 into the powder accumulator 426 until a level of the powder 428 in the powder accumulator 426 has dropped. This occurs even if there is a large quantity of powder in the hopper that feeds the vibrating powder feed tube 422. After a level of the powder 428 in the powder accumulator 426 has dropped, the powder 428 does not form a cork any more and more of the powder 428 then flows through the feed tube 422 into the powder accumulator 426.

Figure 46B:
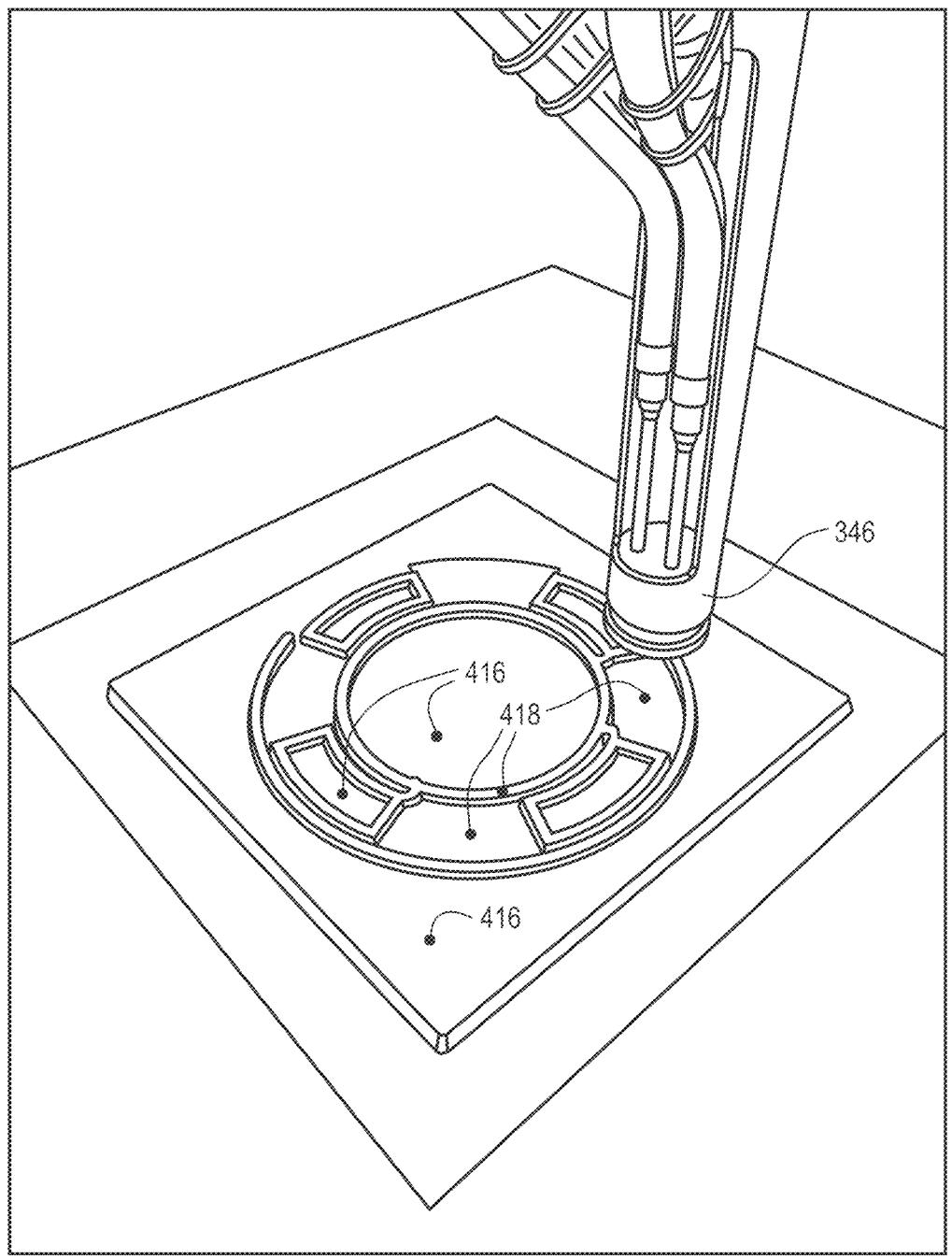

The print head shown in FIGS. 46*a-b* deposits a positive and negative powders onto a powder bed. This print head configuration can be expanded to accommodate any number of powders. These powders, for example may consist of an iron or iron alloy material, a copper powder, and a negative powder. The negative powder, as usual, should be inert with respect to the iron or copper powders, so as to serve as the relatively unsintered mold/holder in the process.

FIGS. 48*a* to *d* illustrate that, by using multiple powders, it is possible to first sinter and then infiltrate a given part with another material. As shown in FIG. 48*a*, a holder 440 is formed out of a negative material to define the first and second volumes 442 and 444. First particles are of a first material 446 are held within the first volume 442. A second material 448 is held within the second volume 444. The negative material forming the holder 440, the first material 446 and the second material 448 are formed using the layer-by-layer approach as herein described.

As shown in FIG. 48*b*, the first particles are of a first material 446 and are sintered to connect the particles to one another. In another embodiment, another connection scheme can be used to connect the particles, for example a scheme that includes a press and/or a binder. If the particles are sintered, a heater, preferably an MIS induction heater, is positioned to heat the first particles to a first temperature to connect the first particles to one another. The first particles have voids between them and connecting the first particles leaves the voids within the first material. Alternatively, the entire assembly can be heated in a furnace. The particles 446 will sinter below the melting temperature of the second material 448.

As shown in FIGS. 48*c* and *d*, a heater is positioned to heat the second material 448 so that the second material 448 melts and flows into the first material 446. The negative material forming the holder 440 also forms a passage 450 with a smaller cross-section than the second volume 444 connecting the second volume 444 to the first volume 442 for directing the second material 448 under the force of gravity from the second volume 444 through the passage into the first volume. The passage 450 thus forms an infiltration system directing the second material into the voids so that the second material infiltrates the first material. After the first material 446 is infiltrated with the second material 448, the negative material forming the holder 440 can be removed, thus releasing the part from the negative material. This example shows the infiltration using gravity, but it is also possible to infiltrate the first material 446 using capillary action. In this case, the second material 448 could be located at the same level as the first material, or even below the level of the first material. When the infiltrant material becomes a fluid, it will naturally wick into the voids of the first material 446 by capillary action.

By way of example, an Iron (Fe)-based OPL part is fabricated in a standard build volume. After the layer by layer fabrication of the part is complete, an additional negative volume is deposited on top of the part. At a certain distance from the part, a volume of copper (Cu) powder is deposited. This powder will act as the infiltrant in the fabrication process.

The entire assembly is then heated to sufficient temperature to bring about sintering, while not reaching temperatures required for liquid phase sintering or melting. This could result in the loss of features in the part.

At around 950° C., for example, both the Cu and the Fe alloy will partially sinter. The Fe alloy part will acquire some degree of structural integrity at this point, as will the copper volume. As the temperature is increased above the melting temperature of copper, the copper will melt and move towards the Fe-alloy part, which has a melting temperature well above that of copper. The molten copper will move through the voids in the Fe-alloy part and slowly infiltrate the material. Ideally, all voids in the Fe-alloy part will be infiltrated with copper and the resulting part will consist of a Fe-alloy substructure with a Cu matrix.

FIGS. 40a to f illustrate an example of reactive material deposition using an OPL technique. The OPL technique allows for the deposition of a number of powdered materials in an ordered fashion. In principle, certain positive materials can be reactive in nature. An article formed using this method may consist of a positive "containment" material 336 that encloses one or more volumes of "reactive" powder 334 that may behave in a specific manner upon mechanical, thermal, or otherwise environmental conditions. The manufacture should consist of the negative mold material, a positive material 336, and an additional material 334 that is contained within the positive material 336. The positive material 336 is sintered/consolidated under a post process treatment and contains the additional material 334. The additional "reactive" material 334 may be sintered or may remain loose, but is contained within the positive material 336. The "reactive" material 334 retains all reactive properties during the sintering/consolidation of the positive material 336.

Figure 49A:
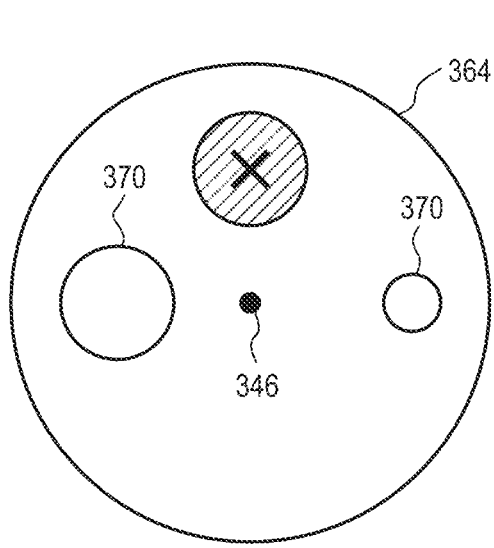
FIGS. 49a-49c are bottom views illustrating movement of a shutter and a print head.
Figure 49B:
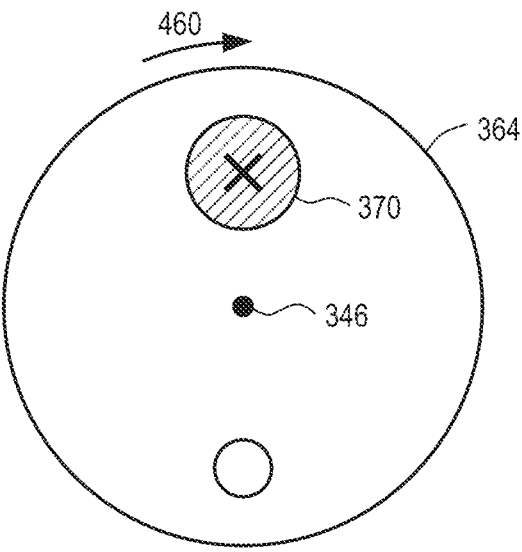
Figure 49C:
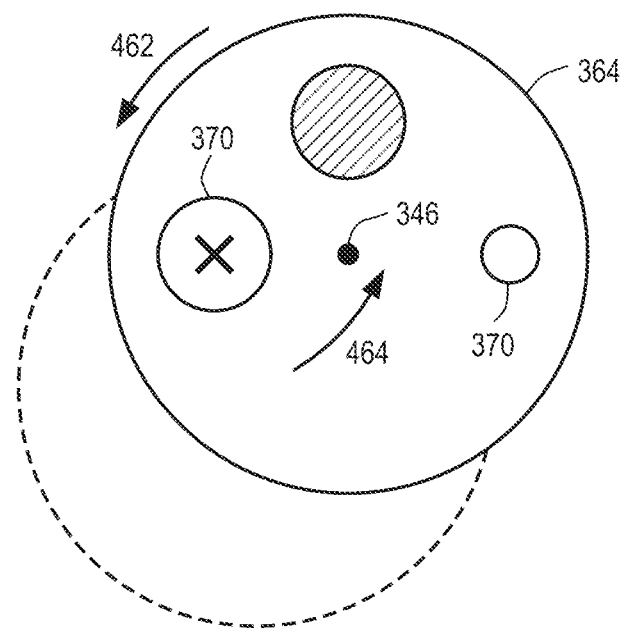
Figure 50A:
FIGS. 50a-50l are cross-sectional side views a manufacturing method where layers are uniformly thick.
Figure 50B:
Figure 50C:
Figure 50D:
Figure 50E:
Figure 50F:
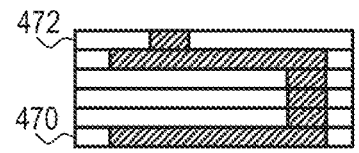
Figure 50G:
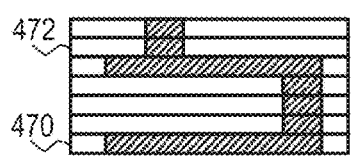
Figure 50H:
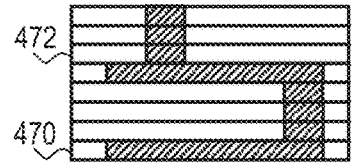
Figure 50I:
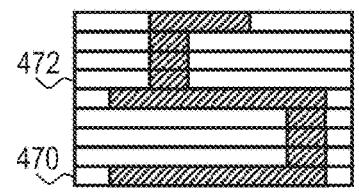
Figure 50J:
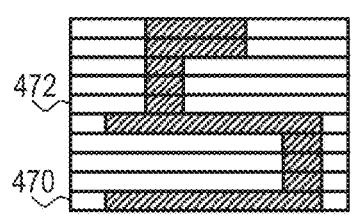
Figure 50K:
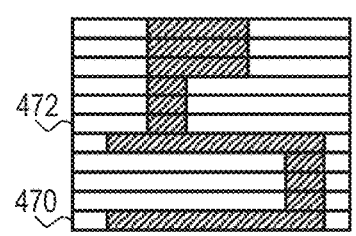
Figure 50L:
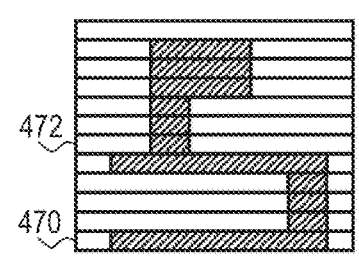
Figure 51A:
FIGS. 51a-51i are cross-sectional side views a manufacturing method where layers have different thicknesses.
Figure 51B:
Figure 51C:
Figure 51D:
Figure 51E:
Figure 51F:
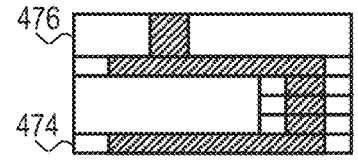
Figure 51G:
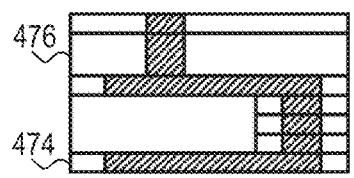
Figure 51H:
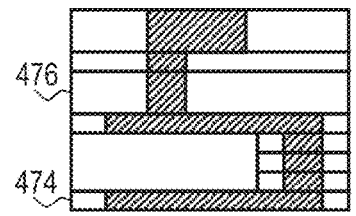
Figure 51I:
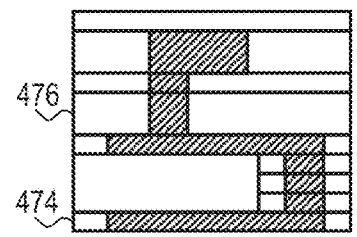

FIGS. 49a to c illustrate aspects relating to coordinated movement of the print head 346 and the powder shutter.

The OPL print head consists of a shutter/screed system that regulates the flow of a number of powders into a powder bed. The shutter 364 itself may consist of a surface with a number of openings 370 of differing sizes that control the flow of powder from the powder accumulator to the surface of the powder bed.

The "X" in FIGS. 49a to c marks the reference point for the build. In the FIG. 49a, there is no flow of powder from the print head 346 through the shutter 364. In the FIG. 49b, the shutter 364 is rotated in a clockwise direction 460 to the larger of the two openings 370 in the shutter 364, and powder flows from the accumulator to the powder bed. When the shutter 364 closes as shown in FIG. 49c, it rotates in a counter-clockwise direction 462 back to the closed position. The shutter 364 thus rotates (moves) from a first position shown in FIG. 49b to a second position shown in FIG. 49c relative to the print head 346 to close the opening 370 forming a dispensing hole defined by the shutter 364. When the shutter moves from the first position to the second position, a finite mass of powder is retained in the opening 370 of the shutter 364. To maintain print integrity, the print head 346 undergoes a simultaneous coordinated motion 464 while the shutter 364 rotates in the counter-clockwise direction 462 in order to keep the remaining finite mass of powder in the same position "X" on the powder bed. The remaining powder is then moved to the "powder clearing position" as described previously.

FIGS. 50 and 51 show aspects of the invention that relate to variable thickness layers that are used in a build. As shown in FIG. 50, in conventional additive manufacturing, a layer 470 of powder is deposited and some of that layer 470 is fused together using an external energy source (e.g. laser, electron beam). Because the energy that is absorbed penetrates only a short distance, it is necessary to fabricate the part (indicated by the cross-hatching) using relatively thin, uniform layers (e.g. the layers 470 and 472) of powder. Layer-by-layer consolidation of a material with a given uniform thickness results in a slow buildup of a complex part.

In the OPL process, shown in FIG. 51, it is not necessary to constrain the build to uniform thicknesses of the build. Instead, the fabrication of the part can be optimized by using build layers of varying thicknesses (e.g., the layers 474 and 476) based on the geometry of the part. If a portion of the part requires high resolution, for example, the thickness can be reduced to accommodate the finer detail of the part. For large structures, or large regions of negative powder, it is faster to use larger OPL print head nozzles and thicker layers to build up the part. This is illustrated in FIG. 51, which shows the fabrication of the same part shown in FIG. 50. Varying thicknesses of layers may be accomplished by positioning the print head further from a deposition surface for thicker layers than for thinner layers, while depositing all necessary materials in a given layer with two or more internal or external nozzles of the print head.

An advantage of OPL is that it provides complete part support using negative powders. It is well known that powder bed additive manufacturing methods require the addition of supporting structures in the fabrication of parts with large overhangs. Supporting structures of this kind are required because the powder bed has a relatively low density and cannot support the mass of a consolidated overhang in the build structure. OPL, which is a powder based AM method, does not require extensive supporting structures during the fabrication process. It may be that is necessary in some circumstances to fabricate supports to manufacture an extremely complex part, but it is not a requirement of the technique.

Figure 52:
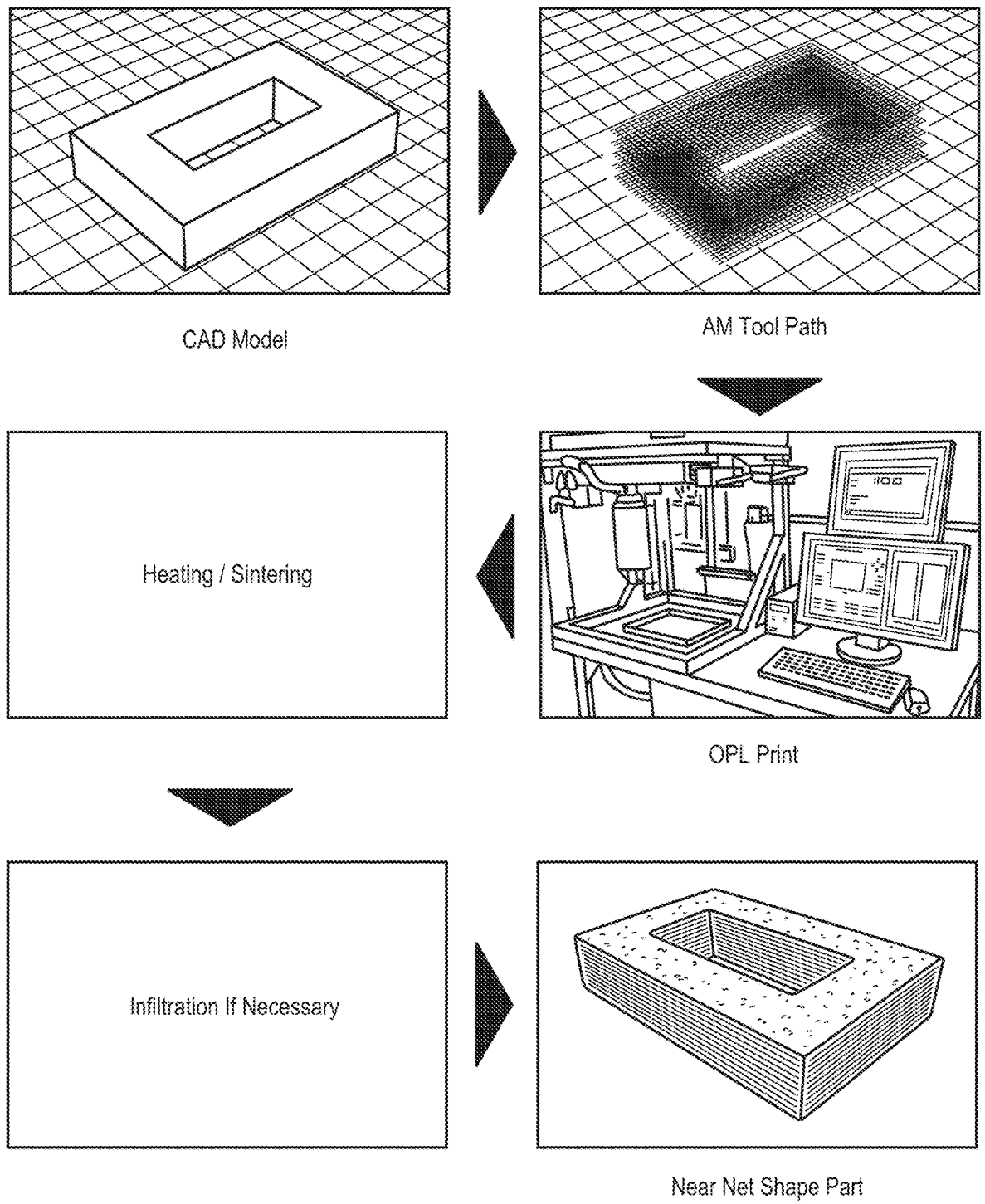
FIG. 52 includes schematics illustrating an integrated method for part fabrication.

FIG. 52 shows the overall process of part fabrication using the OPL build process. First, the part is designed in a computer-aided design (CAD) program. This 3D design is then "sliced" into 2D layers and a tool path is generated. The tool path is uploaded to the OPL printer, which creates a 3D image of the part and mold using two or more powders. This cartridge is then subjected to post-processing methods (e.g. heating, infiltration, etc.) to create the final near net shape part.

Negative powder materials, in general, may be a material that does not sinter at the processing temperatures required to form the green part. Partial sintering is acceptable as long as the positive material is more mechanically robust. Tungsten, Zircon, Silicon Carbide, Alumina, WC, and Chromite are examples of negative materials.

Positive powder materials are usually materials that sinter or react at the processing temperatures to form the green part. Iron and iron alloys, copper and copper alloys, aluminum and aluminum alloys, titanium and titanium alloys, and ceramic powders are examples of positive powders.

Figure 53A:
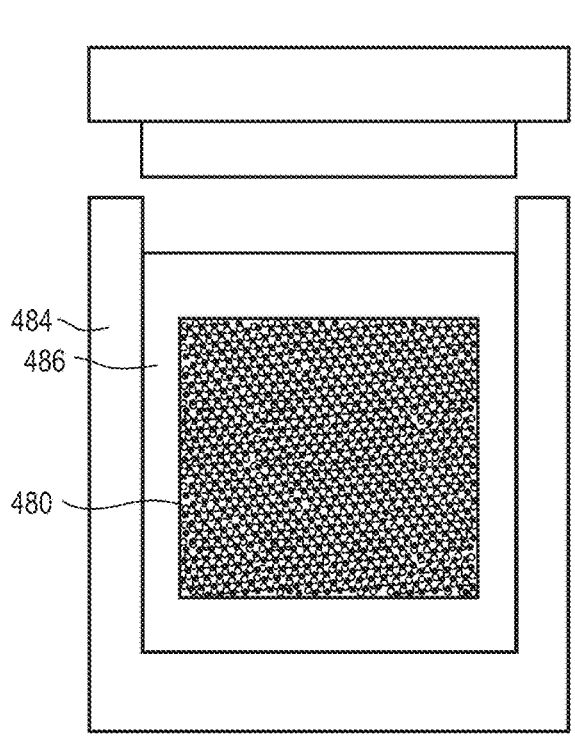
FIGS. 53a-53d are cross-sectional side views a manufacturing method that includes the use of a press.
Figure 53B:
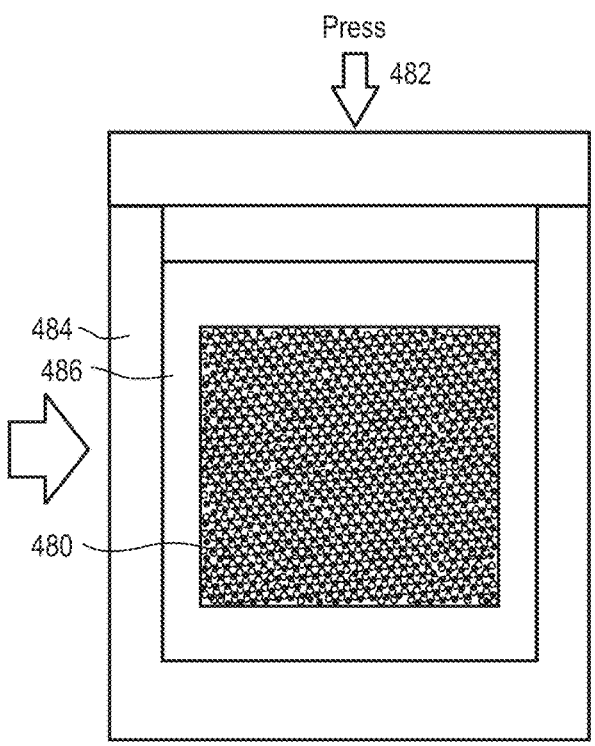
Figure 53C:
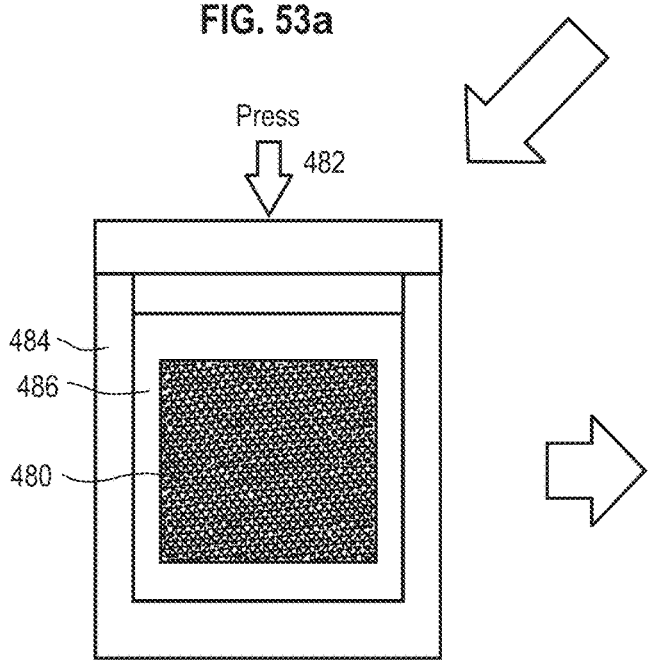

FIGS. 53a to 53d illustrate that it is possible to fabricate the part 480 using OPL technique and a cold isostatic press (CIP) 482. In FIG. 53a the powders are formed directly into a flexible mold 484 using the OPL technique described above. The positive material forms the part 480 within a negative material 486. In FIG. 53b the mold is degassed, sealed, and inserted into a cold isostatic press 482. In FIG. 53c the powders are compressed under hydrostatic pressure, which increases the density of the packed powders. In this case, the positive powder may require a small amount of binder so that the green part stays together. The use of binders in powder metallurgy is well known in the field.

Figure 53D:
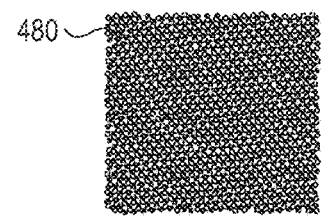

Unlike the previous part fabrication process, the "green" part in this case was formed from and ordered powder method and pressed to shape using the cold isostatic press (CIP). In FIG. 53d, the green part is removed from the mold 484 and subjected to the usual heat treatments designed to increase the density and improve the mechanical properties of the material of the heat-treated part.

FIGS. 53a to d thus provide an example of a connection scheme that includes a mold 482 suitable for locating the first and second powders and a pressurizing device (the press 482) suitable for creating a pressure to increase the density of the first powder under pressure. The connection scheme includes a binder included in the first powder.

Similar to the OPL/CIP process, high-density metal or ceramic parts can be fabricated using a Hot Isostatic Press (HIP) and a metal mold. In this case, the ordered powders are formed within a metal container. The metal container is degassed, sealed, and loaded into a HIP at elevated temperatures and pressures. The elevated temperatures of the hip transfers heat to the mold and the powders, thereby increasing a temperature of the mold and the powder. The resulting part has positive powder that reaches near-full to full density after the HIP process. In this example the connection scheme includes a press heater to increase a temperature of the mold.

Complex structures using internal chemistry can be manufactured following the OPL technique. High performance intermetallic materials, in general, are difficult to form into complex shapes using conventional machining methods. A materials such as gamma Titanium Aluminide (TiAl), for example, display high strength at high temperatures but is known to be difficult to machine. An alternative approach to fabricating complex parts from these materials is to form the part using precursor material (e.g. Ti and Al) and then heat the part to form the gamma TiAl part. In this case the Ti and Al powders are mixed in the proper proportions and printed as the positive powder in an OPL printer. Any number of negative powder materials may be used as long as there is no detrimental reaction with the precursor components. Upon heating, the gamma TiAl is formed in the shape of the precursors.

An alternative method involves the printing of a Ti part with partial sintering. This green Ti part may then be infiltrated with Al metal and held at a temperature at which the gamma TiAl phase forms. Though this method is described using TiAl as an example, any number of intermetallic or multiple element phases of materials can be fabricated into complex shapes using this process. Other examples include; WC/Co, W/Ni, MgB$_2$/Ga, Ti/MgZn and more.

Note: this process may be used to form intermetallic materials into complex shapes, but it can also be used to form alloys into complex shapes. For example, copper powder can be printed into a shape and then infiltrated with tin to form a bronze part.

Figure 54A:
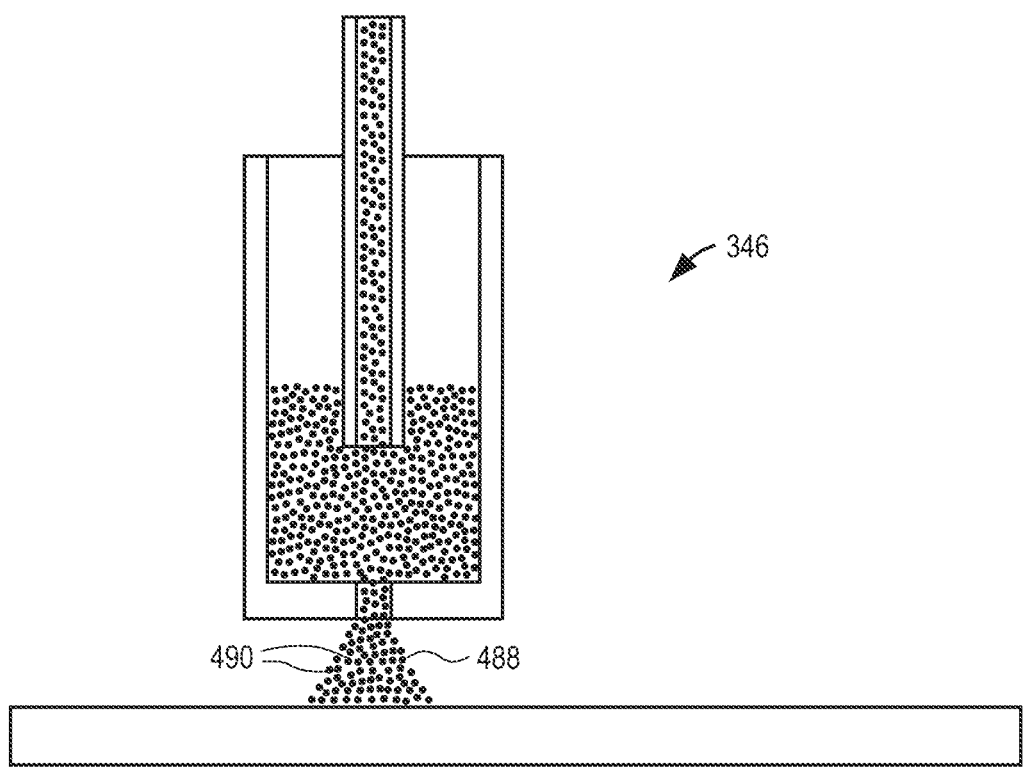
FIGS. 54a and 54b are cross-sectional side views illustrating deposition of positive and negative powders at different times.
Figure 54B:
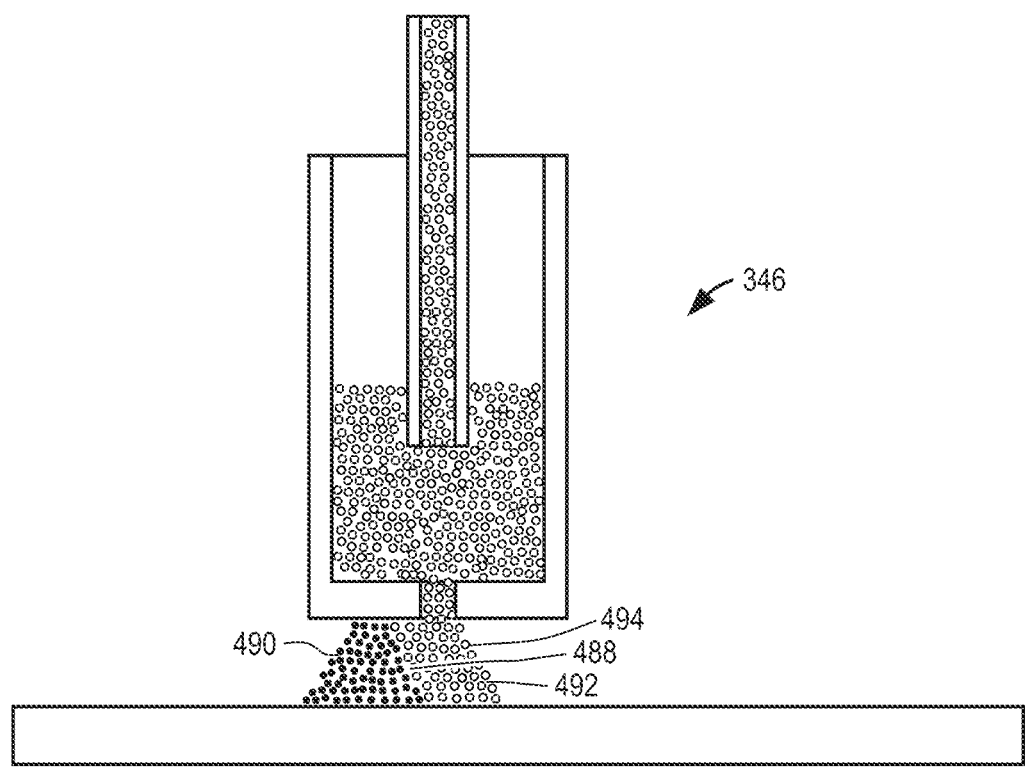

As illustrated in FIGS. 54a to 54d, high deposition rates can be achieved by increasing the OPL print head speed and by increasing the layer or slice thickness of the build. As illustrated in FIG. 54a, for large slices, the angle of repose 488 of the specific powder may lead to a loss of resolution of the ordered powder structure 490 due to the powder being deposited on the build surface at a height that results in a significant angle. As shown in FIG. 54b, as the next powder is deposited, it forms a structure 492 that fills over the top of the other powder in the region defined by the angle of repose and displays another angle 494 on the side of the deposited powder structure 492 opposing the previously deposited powder structure 490.

Figure 54C:
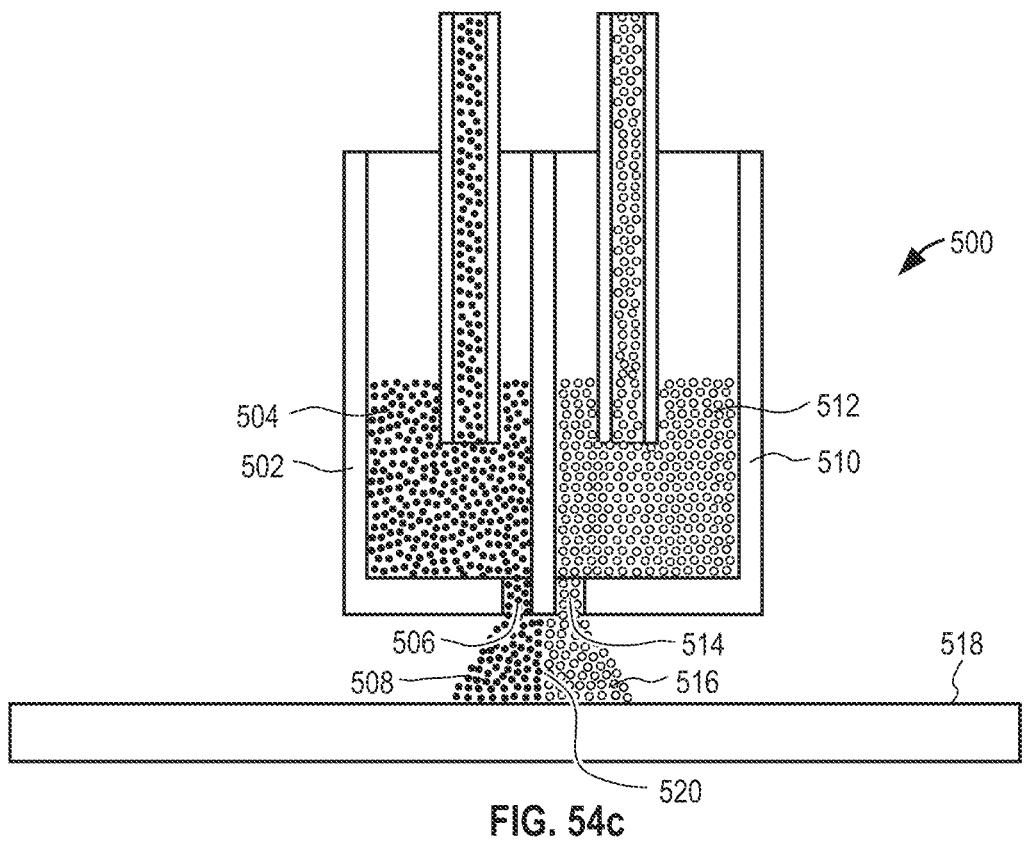
FIGS. 54c and 54d are cross-sectional side views illustrating the use of a print head that causes simultaneous deposition of positive and negative powders.

FIG. 54c illustrates a print head 500 that deposits positive and negative powders at the same time. The print head 500 includes a first hopper 502 for a positive powder 504 and a first nozzle 506 through which the positive powder 504 flows out of the first hopper 502 to form a first volume 508. The print head 500 further includes a second hopper 510 for a negative powder 512 and a second nozzle 514 through which the negative powder 512 flows out of the second hopper 510 to form a second volume 516. The positive and negative powders 504 and 512 are simultaneously deposited onto the substrate 518. The first volume 508 is in contact with the second volume 516 with an interface 520 between the first and second volumes 508 and 516.

Figure 54D:
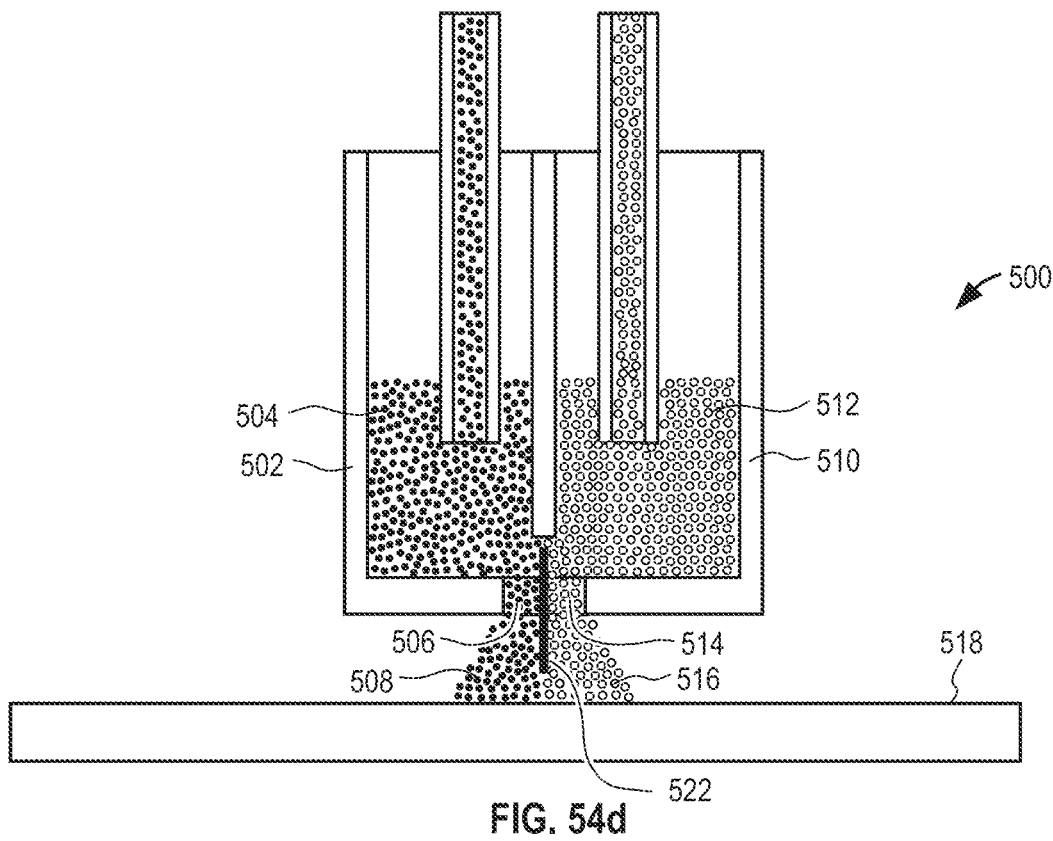

By simultaneously depositing two powders 504 and 512, the resolution of the OPL part can be maintained. The volumes 508 and 516 formed by the two powders meet in the middle and fill up to the screed level. The interface 520 between the volumes 508 and 516 is nearly vertical with essentially no angle of repose. This method is ideal for the generation of thick perimeters in the two-dimensional (2D) build slice as the resolution of the boundary (and thus the part) is maintained. An alternative design is shown in FIG. 54d in which a thin mechanical barrier 522 is located between the two flowing powders. This barrier 522 moves with the print head and results in a highly defined interface between the two materials.

As described previously, the OPL print head can be equipped with a number of nozzle diameters. The build speed, or deposition rate, of the print head is determined by the print head speed, the diameter of the OPL nozzle, and the thickness of the build slice. In any given part, there are many deposition rates used in order to minimize the total deposition time of the part.

FIG. 55a-55i show a schematic of the OPL process used to fabricate near net shape (NNS) parts. An original CAD model with details of the part is created and stored in computer memory (FIG. 55a). This representation of the part is a high resolution, complex 3D model of the part to be fabricated with all of the details. Most additive manufacturing methods use this as the fabrication target. In the NNS OPL process, the original CAD model is "blurred" and fine details are lost. The original CAD model is modified by eliminating fine details of the part in the original CAD model to render a fabrication target model (FIG. 55b). The fine details will be regained during a subtractive machining process, but for now the fabrication target model is a lower resolution representation of the original CAD model. An OPL tool path is then created (FIG. 55c). The OPL tool path is based on this lower resolution fabrication target model and not the original CAD model. The resulting tool path is much simpler and can be executed much more quickly than the high definition tool path that would be generated by from the original CAD drawing. The NNS tool path is uploaded to the OPL printer and the part is fabricated (FIGS. 55d and 55e). A print head is moved relative to a substrate based on the tool path (FIG. 55d). The first powder is formed and held in a shape according to the fabrication target model before connecting the first particles of the first powder to one another (FIG. 55e) to form a green part. At this stage, the green part is optionally machined to the details of the original CAD model (FIG. 55f). Depending on the part, it may be easier to infiltrate and/or consolidate the part to the final density before it is machined. The NNS tool path and part are simply used to reduce the printing time and provide a NNS form from which to create the near final machined green part.

This machined green part can then be further processed through infiltration (FIG. 55g) or heat treatments (FIG. 55h) under ambient pressure or elevated pressures to form the final part (FIG. 55i). For highly detailed parts, additional finish machining/grinding/polishing methods may be used. It can be seen that the objective is not to fabricate a detailed part from the outset, but rather to fabricate a lower resolution representation of the part quickly, and then to use conventional machining operations to add the detail to the final component. The print head forms the shape according to the fabrication target. The green part is then machined to the details of the original CAD model to form the part.

FIG. 56 shows control components of the manufacturing system 342, including the powder flow sensor 360, shutter actuator 372, vibrating transducer 356, a computer 600, heaters 602 and print head actuators 604. The computer 600 receives input from the powder flow sensor 360. A sensor scheme that measures the total mass of the build cartridge during the build may also be implemented. Input from a total mass measurement system allows the computer 600 to qualify the build for each layer and is an extra monitor on the flow of the powders. The computer 600 controls the shutter actuator 372, vibrating transducer 356, a computer 600, heaters 602 and print head actuators 604. The heaters 602 may be one or more heaters that may include layer-by-layer a consolidation heater, a bulk consolidation heater to consolidate multiple layers at the same time, an infusion heater, and a post-manufacture heat treatment heater. One heater may perform one or more function. The computer 600 is programmable to perform the functions hereinbefore described. The components in the figure work together in the manner of a programmed robot that receives human input and feedback from its components such as the powder flow sensor 360 to fabricate a part.

Multiple Diameter Self-Leveling Screed

Figure 57A:
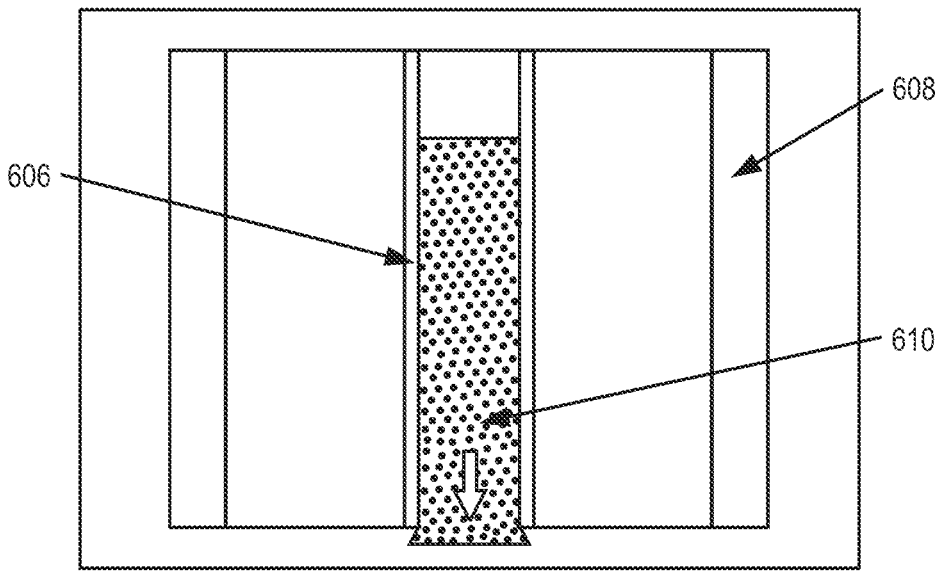
FIGS. 57a-57c are cross-sectional side views of powder nozzle/screed design of a print head according to an alternate embodiment.
Figure 57B:
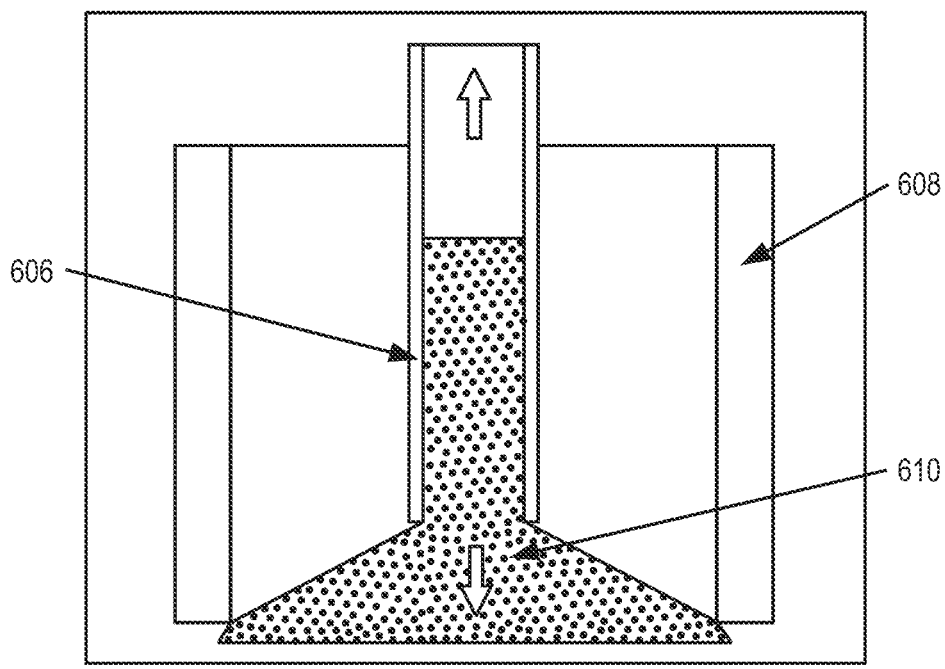
Figure 57C:
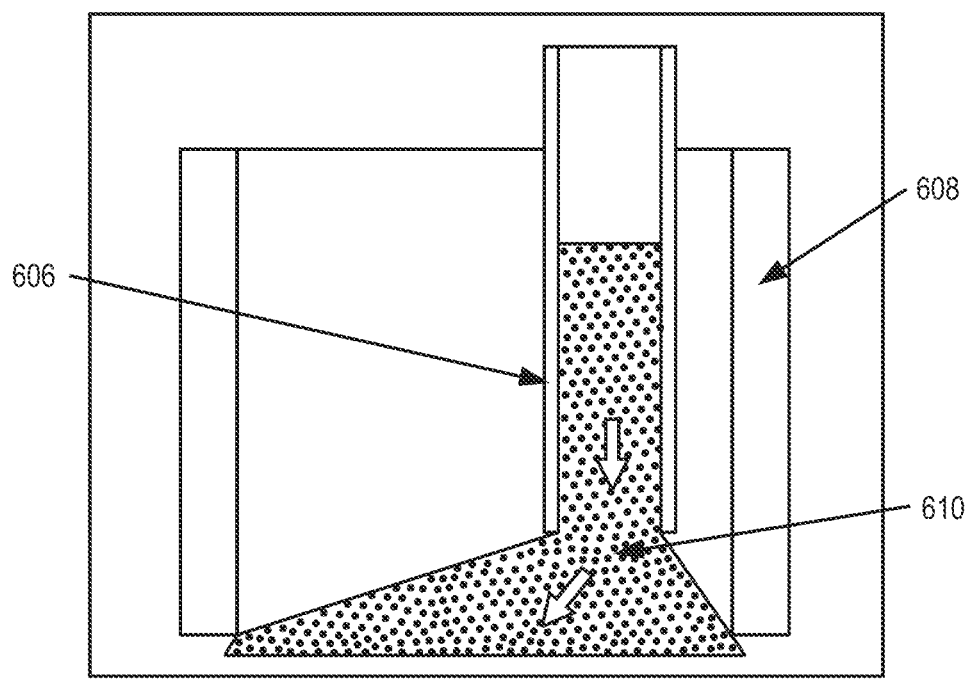

FIGS. 57a to 57c show an alternative powder nozzle/ screed design. Fluidization of the powder occurs in an accumulator that is located above the powder/screed nozzle. The assembly consists of two concentric powder nozzles/ screeds, each of which operates independently of the other. In FIG. 57a, the smaller nozzle is lowered such that powder flows from the accumulator to the powder bed. In this case, the powder is deposited with a width in the X-Y plane that is approximately the diameter of the nozzle. The thickness of the powder layer in the Z-direction is determined by the height of the overall assembly above the powder bed surface.

In FIG. 57b, the powder is deposited over a wide area in the X-Y plane by raising the internal nozzle to a fixed height above the powder bed. In this case, the powder flows from the small nozzle, but is contained in the X-Y plane by the dimensions of the outer screed. Again, the thickness of the powder layer in the Z-direction is determined by the height of the overall assembly above the powder bed.

This embodiment shows the concentric nozzle/screed assembly with two different diameters, but it is clear that the assembly can be extended to any number of nozzles. Further, because the powder flow "line" on the X-Y plane is fixed by the shape of the screed, it is not a requirement that the inner and outer nozzles be concentric to each other.

It should be understood from the foregoing description and for purposes of describing further embodiments that such further embodiments although not specifically illustrated, may include a manufacturing system having a holder suitable to hold first particles of a first powder in proximity to one another, and a connection scheme which, when employed, connects the particles to one another to form a part. The manufacturing system my further include a support structure, and at least one powder hopper for holding the powder, a print head having a first nozzle for directing the powder from the at least one powder hopper onto a substrate, the first nozzle having a lower surface that is sufficiently near the substrate for the powder to flow out of the first nozzle and stop flowing out of the first nozzle when there is no more room below the first nozzle, and a print head actuator, and a computer that is programmable to cause movement of the print head actuator for the print head actuator to move the print head relative to the support structure, causing the powder to resume flow out of the first nozzle. The manufacturing system may further include a first regulating apparatus for regulating flow of the powder through the first nozzle. The first regulating apparatus includes a first powder container to hold the first powder, and a first nozzle actuator that has a portion connected to the first nozzle and operable to move the first nozzle between a first position wherein an upper end of the first nozzle is above an upper surface of a volume of the first powder in the first powder container so that the first powder cannot drop into the upper end of the first nozzle, and a second position wherein the upper end of the first nozzle is dropped relative to the first position so that the powder in the first powder container flows into the first nozzle.

Referring specifically to FIGS. 57a and 57b, the print head has a first inner nozzle 606 and a first outer nozzle 608 with the first outer nozzle 608 positioned around the first inner nozzle 606. The print head has a first nozzle actuator (not shown) and the computer is programmable to cause movement of the first nozzle actuator, causing movement of the first inner nozzle 606 relative to the first outer nozzle 608 between a first position (FIG. 57a) wherein powder 610 flowing through the first inner nozzle 606 does not reach the first outer nozzle 608 and a second position (FIG. 57b) wherein the powder flowing through the first inner nozzle flows laterally and does reach the first outer nozzle and powder stops flowing out of the first outer nozzle when there is no more room below the first outer nozzle and wherein said movement of the print head relative to the support structure caused the powder to resume flow out of the first outer nozzle. Center lines of the first inner nozzle 606 and the first outer nozzle 608 are concentric in FIGS. 57a and 57b. In FIG. 57c, a center line of the first inner nozzle 606 is offset relative to a center line of the first outer nozzle 608.

Figure 58A:
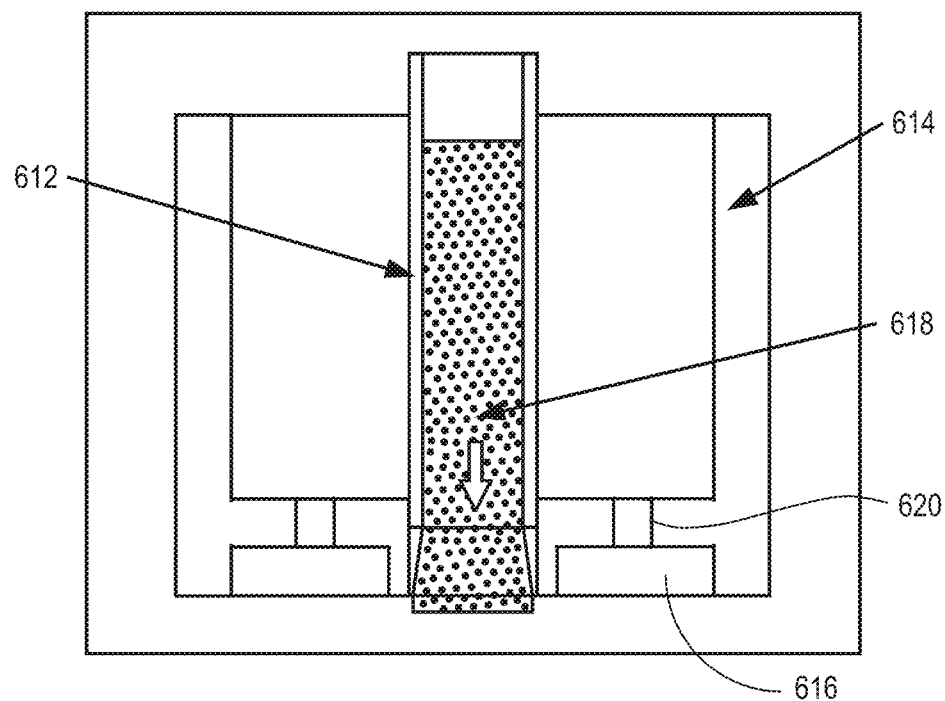
FIGS. 58a and 58b are cross-sectional side views of powder nozzle/screed design of a print head according to a further embodiment.
Figure 58B:
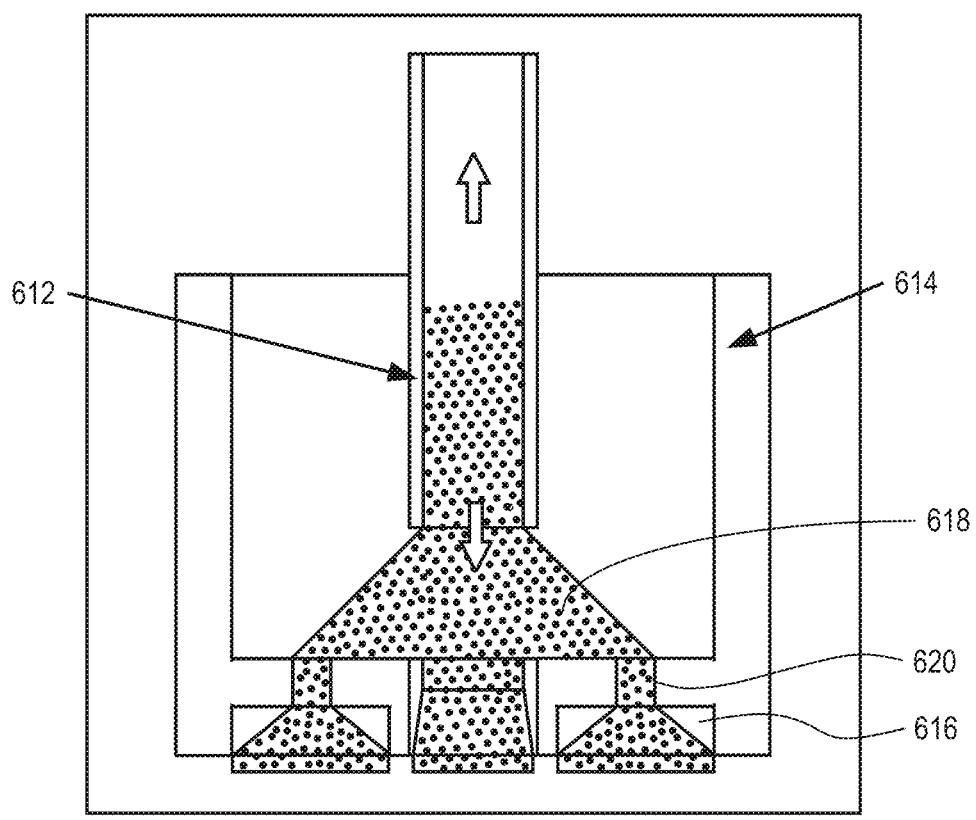

FIGS. 58a and 58b show an alternative embodiment of the powder nozzle/screed. Powder flow into the outer nozzle/ screed assembly is limited by holes in an outer ring of the nozzle. This is advantageous if the powder flows too quickly out of the nozzle shown in FIGS. 57a and 57b. In addition, the screed assembly in FIGS. 58a and 58b is always fixed at the powder bed surface, which may allow for a smoother surface in the X-Y plane.

As such, a print head has a first inner nozzle 612 and defines a first outer chamber 614 around the first inner nozzle 612, and a first outer nozzle 616 out of the first outer chamber 614. The print head has a first nozzle actuator (not shown), and the computer is programmable to cause movement of the first nozzle actuator, causing movement of the first inner nozzle 612 relative to the first outer chamber 614 between a first position (FIG. 58a) wherein powder 618 flowing through the first inner nozzle 612 does not reach the first outer chamber 614 and a second position (FIG. 58b) wherein the powder 618 flowing through the first inner nozzle 612 flows laterally and does reach the first outer chamber 614 and flows out of the first outer chamber 614 through the first outer nozzle 616 simultaneously with the powder 618 flowing out of the first inner nozzle 612. The powder 618 stops flowing out of the first outer chamber 614 through the first outer nozzle 616 when there is no more room below the first outer nozzle 616. The movement of the print head relative to the support structure causes the powder 618 to resume flow out of the first outer nozzle 616.

The print head defines a plurality of first restricted flow passages 620 connecting the first outer chamber 614 to the first outer nozzle 616. The first outer nozzle 616 is an annular nozzle around the first inner nozzle 612 and the plurality of first restricted flow passages 620 connect the first outer chamber 614 with the first outer nozzle 616. Each respective first restricted flow passage 620 has a smaller cross-section than the first outer nozzle 616 to restrict flow of the powder 618.

In the embodiments of FIGS. 57a to 57c and 58a and 58b, it may also be possible for the print head to have second inner nozzle (not shown) and a second outer nozzle (not shown) with the second outer nozzle positioned around the second inner nozzle. A second actuator may move the second inner nozzle relative to the second outer nozzle in a similar manner as shown in FIGS. 57a to 57c and 58a and 58b.

Figure 59:
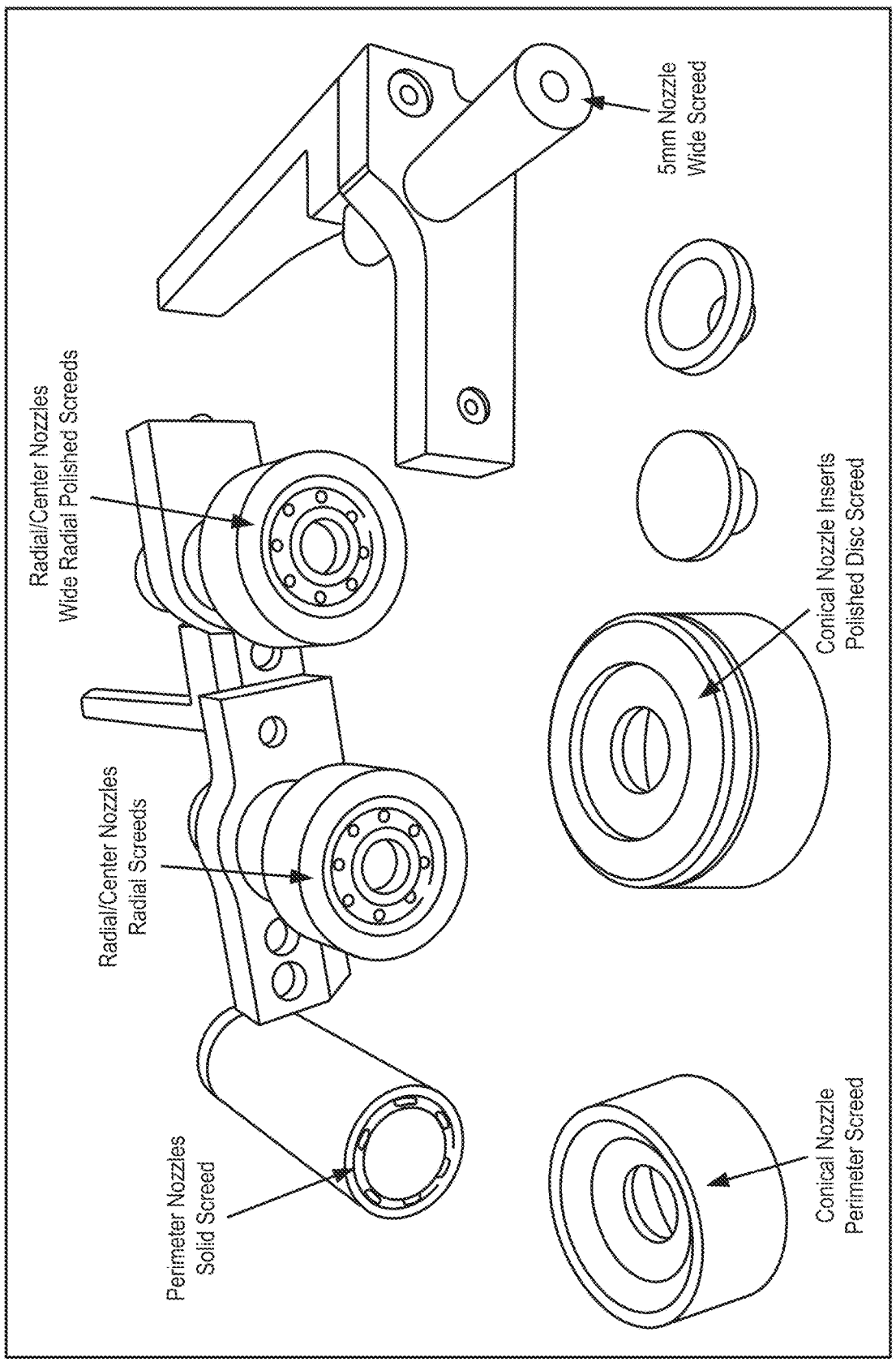
FIG. 59 is a perspective view of powder nozzle/screed design of a print head according to further embodiments.

FIG. 59 shows several nozzle/screed geometries according to various further embodiments that incorporate the ideas described above. In particular, the large nozzle/screed region can be limited to a very short height in the Z-direction. This allows for the powder to fill the volume of the screed assembly quickly. Note: powder will only flow into the volume of the screed assembly if there is available space. In addition, the level of the powder flow in FIGS. 57b, 57c and 58b does not go above the level of the inner powder flow nozzle. This flow behavior of fluidized powder is in contrast to the behavior of a liquid.

Figure 60A:
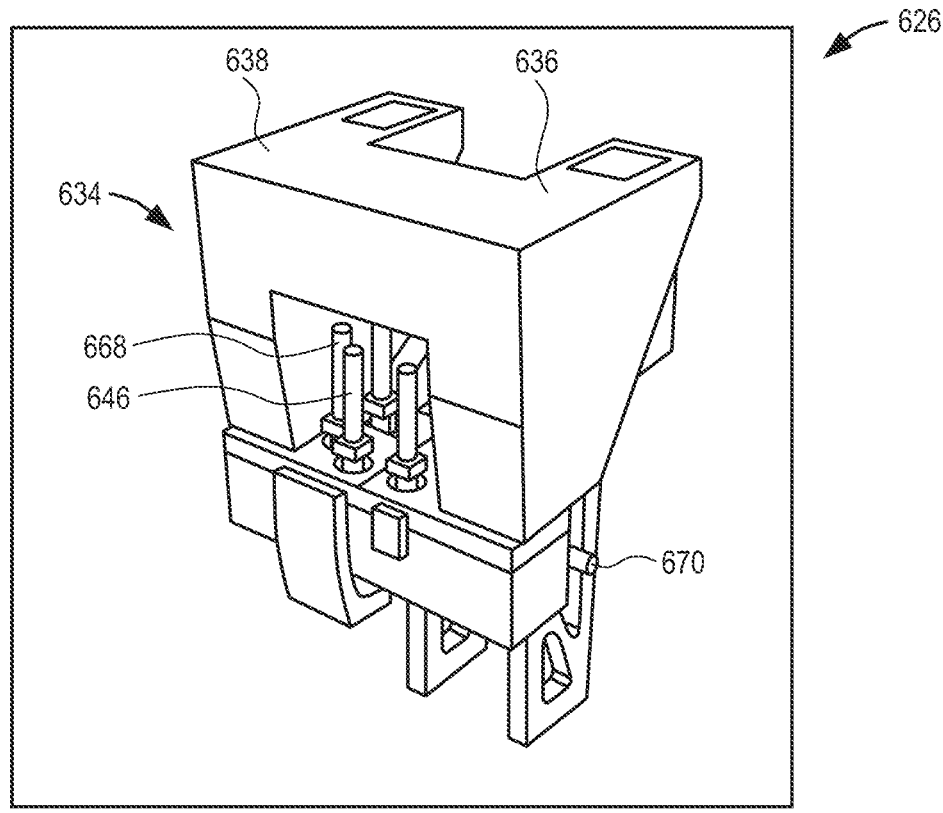
FIGS. 60a and 60b are perspective views of a print head according to further embodiment.
Figure 60B:
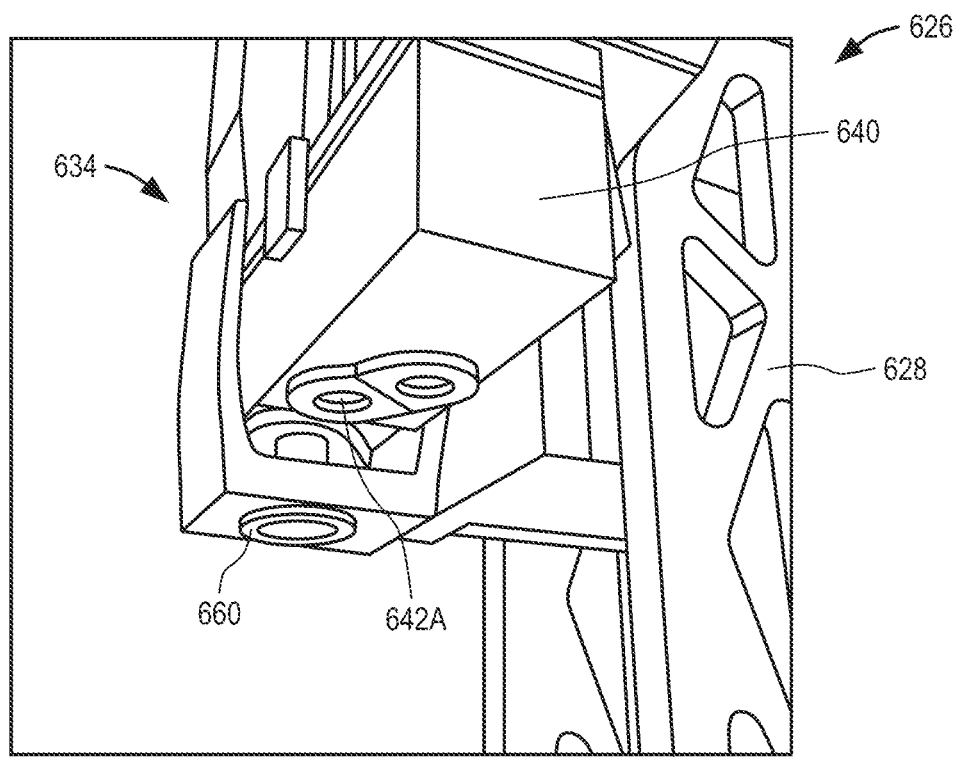

FIGS. 60a and 60b show different views of a multi-diameter printhead according to another embodiment of the invention. A screed assembly can move independently of the powder flow valve. The powder accumulator is located above the nozzle/screed, similar to the arrangement shown in FIGS. 47a and 47b.

FIGS. 60a and 60b specifically show a manufacturing system 626 that includes a support structure 628, and a print head 634. The print head 634 includes first and second powder hoppers 636 and 638 for holding first and second powders, respectively, and a powder accumulator and valve assembly 640.

Figure 61A:
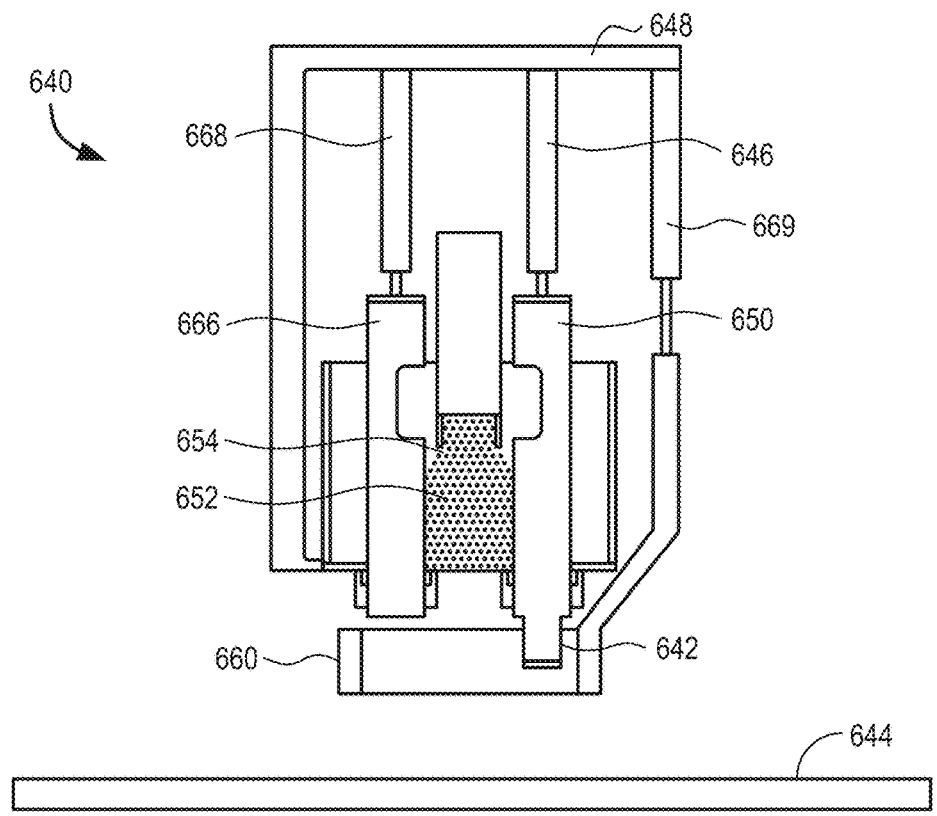
FIGS. 61a-61h are cross-sectional side views of the print head in FIGS. 60a and 60b to illustrate its functioning.

As more clearly shown in FIG. 61a, the powder accumulator and valve assembly 640 has a first inner nozzle 642 for directing the first powder from the first powder hopper 636 onto a substrate 644. The powder accumulator and valve assembly 640 has a first inner nozzle actuator 646 that has opposing portions connected to a frame 648 and to a first inner nozzle powder valve 650. The first inner nozzle actuator 646 is operable to move the first inner nozzle powder valve 650 between an upper position wherein an upper end of the first inner nozzle powder valve 650 is above an upper surface of a volume 652 of the first powder in a first powder container 654 so that the first powder cannot drop into the upper end of the first inner nozzle powder valve 650 (FIG. 61a) and a lower position wherein the upper end of the first inner nozzle powder valve 650 is dropped relative to the upper position so that the first powder in the first powder container 654 flows into the first inner nozzle 642.

Figure 61B:
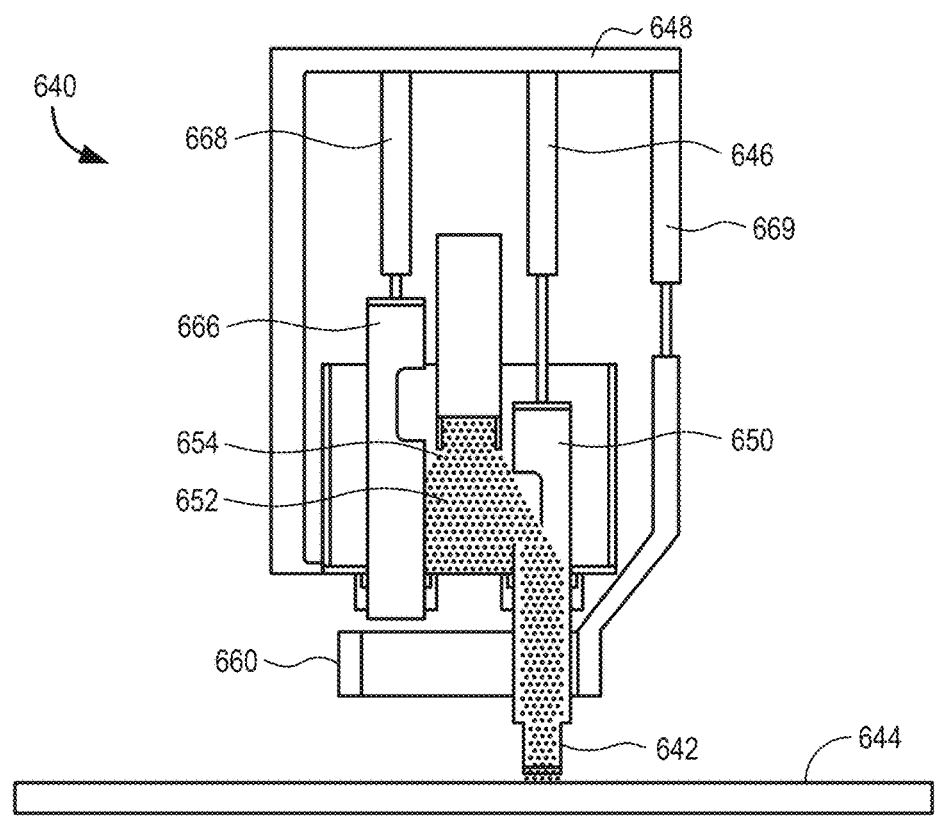

In FIG. 61b, the first inner nozzle 642 has a lower surface that is sufficiently near the substrate 644 for the first powder to flow out of the first inner nozzle 642 and stop flowing out of the first inner nozzle 642 when there is no more room below the first inner nozzle 642. The manufacturing system 626 has a print head actuator (not shown), and a computer that is programmable to cause movement of the print head actuator for the print head actuator to move the print head 634 relative to the support structure 628, causing the powder to resume flow out of the first inner nozzle 642. If the first inner nozzle 642 is lowered to the substrate 644, a width of the line of powder will be approximately the same as a relatively narrow diameter of the first inner nozzle 642 (e.g., 5 mm).

Figure 61C:
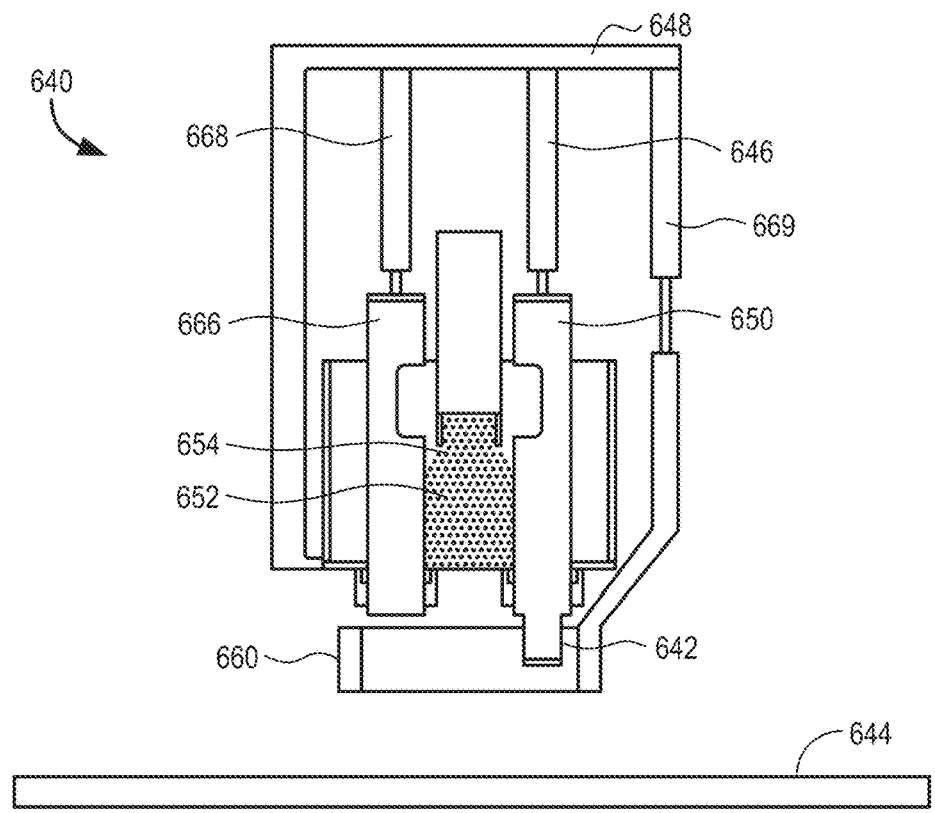

In FIG. 61c, the first inner nozzle 642 is moved from the lower position to the upper position to stop flow of the first powder through the first inner nozzle 642. The first inner nozzle powder valve 650 and first inner nozzle actuator 646 thus form a first regulating apparatus for regulating flow of the first powder through the first inner nozzle.

Figure 61D:
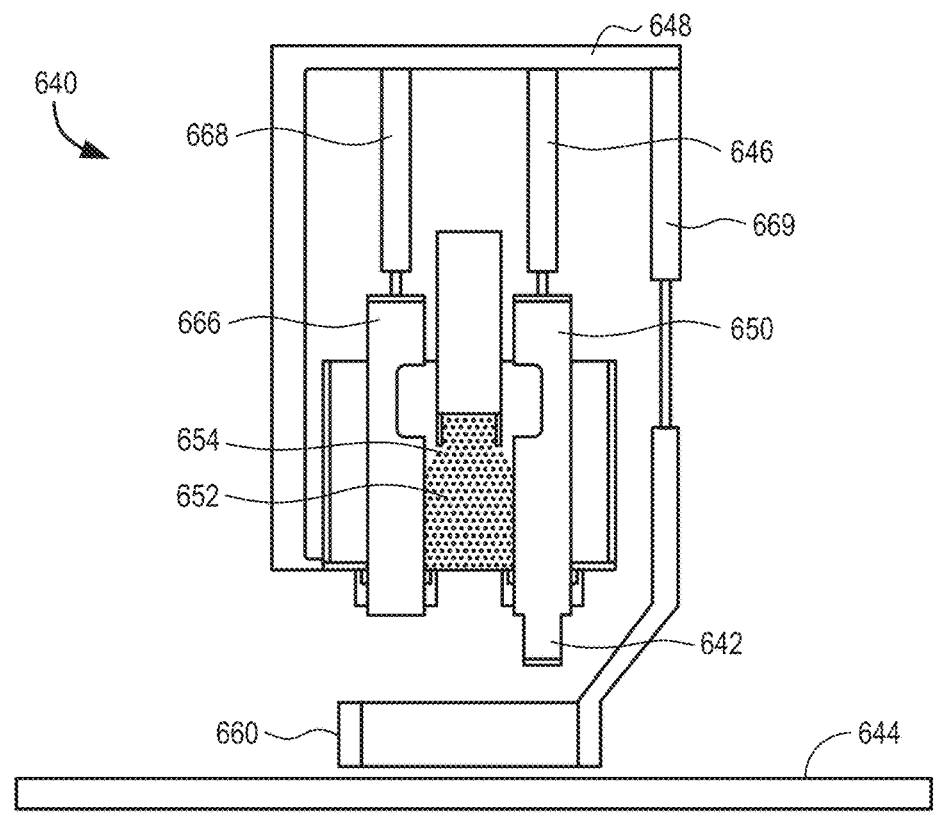
Figure 61E:
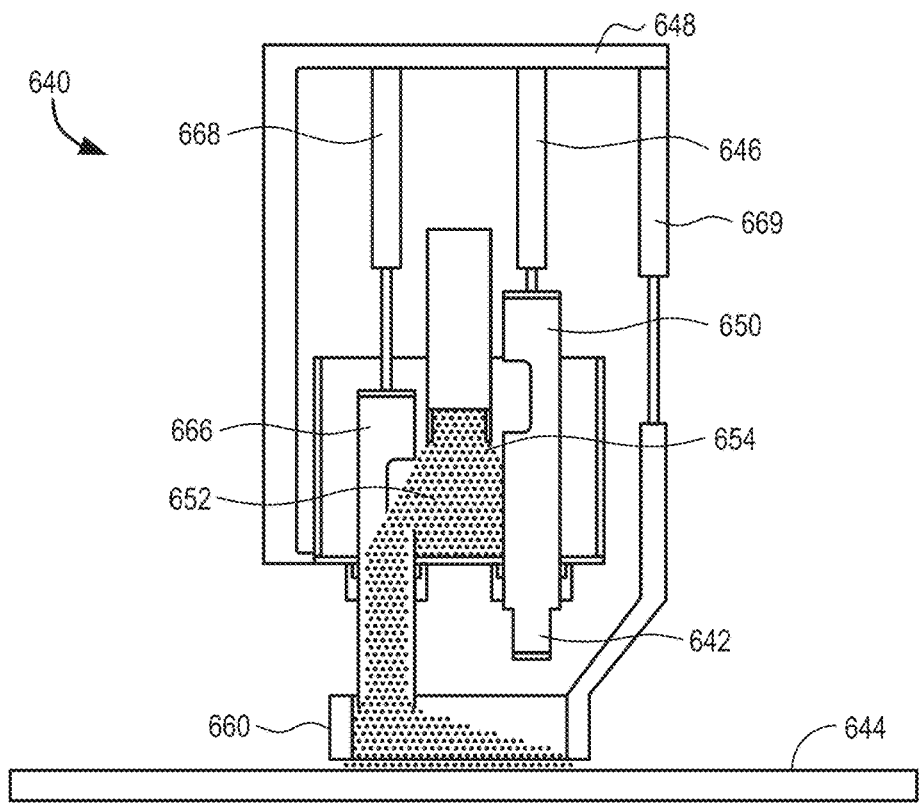

Referring to FIGS. 61c, 61d and 61e, the print head 634 has an outer nozzle 660 for directing the second powder from the second powder hopper 638 onto the substrate 644.

The powder accumulator and valve assembly 640 has a first outer nozzle powder valve 666 and a first outer nozzle actuator 668 and a second nozzle docking actuator 669. The second nozzle docking actuator 669 has opposing portions connected to the frame 648 and the outer nozzle 660 respectively and is operable to move the outer nozzle 660 between a docked or travel position as shown in FIG. 61c and a print position as shown in FIG. 61D. The first outer nozzle actuator 668 has opposing portions connected to the frame 648 and the first outer nozzle powder valve 666, respectively and operable to move the first outer nozzle powder valve 666 between an upper position wherein an upper end of the first outer nozzle powder valve 666 is above an upper surface of the volume 652 of the first powder in the first powder container 654 so that the first powder cannot drop into the upper end of the first outer nozzle powder valve 666 (FIG. 61d) and a lower position wherein the upper end of the first outer nozzle powder valve 666 is dropped relative to the upper position so that the powder in the first powder container 654 flows into the outer nozzle 660 (FIG. 61e).

The outer nozzle 660 has a lower surface that is sufficiently near the substrate 644 for the second powder to flow out of the outer nozzle 660 and stop flowing out of the outer nozzle 660 when there is no more room below the outer nozzle 660. Movement of the print head 634 relative to the support structure 628 causes the second powder to resume flow out of the outer nozzle 660. A width of a line of powder is approximately the same as the diameter of the larger outer nozzle 660 (e.g., 25 mm).

Figure 61F:
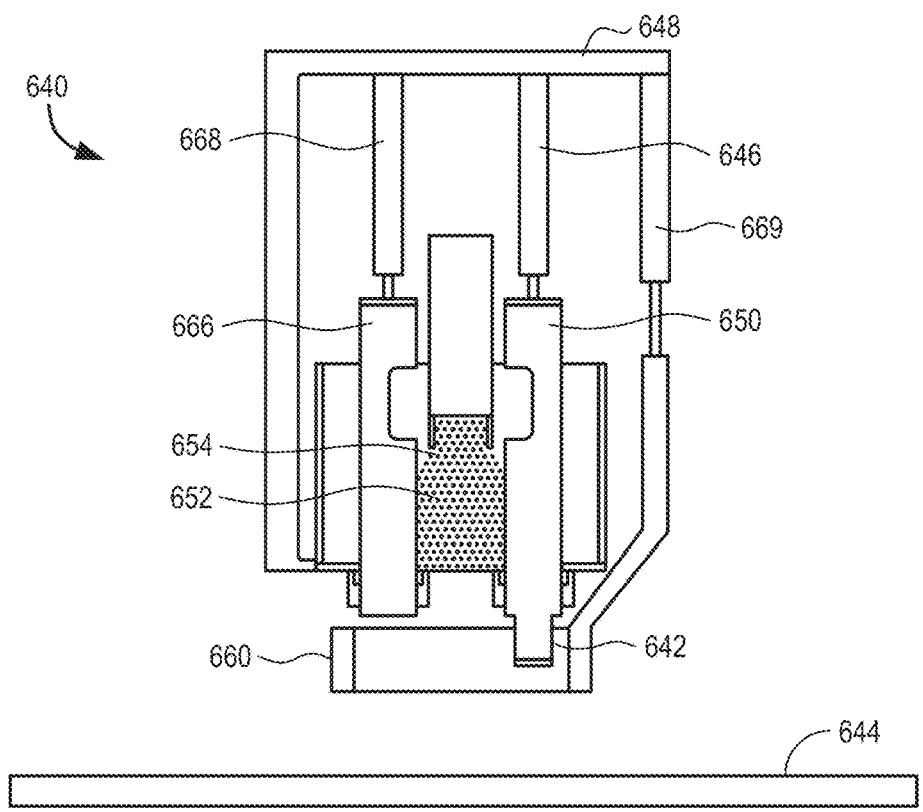

In FIG. 61f, the first outer nozzle powder valve 666 is moved from the lower position to the upper position to stop flow of the second powder through the outer nozzle 660. The first outer nozzle powder valve 666 and first outer nozzle actuator 668 thus form a second regulating apparatus for regulating flow of the second powder through the outer nozzle 660.

Figure 61G:
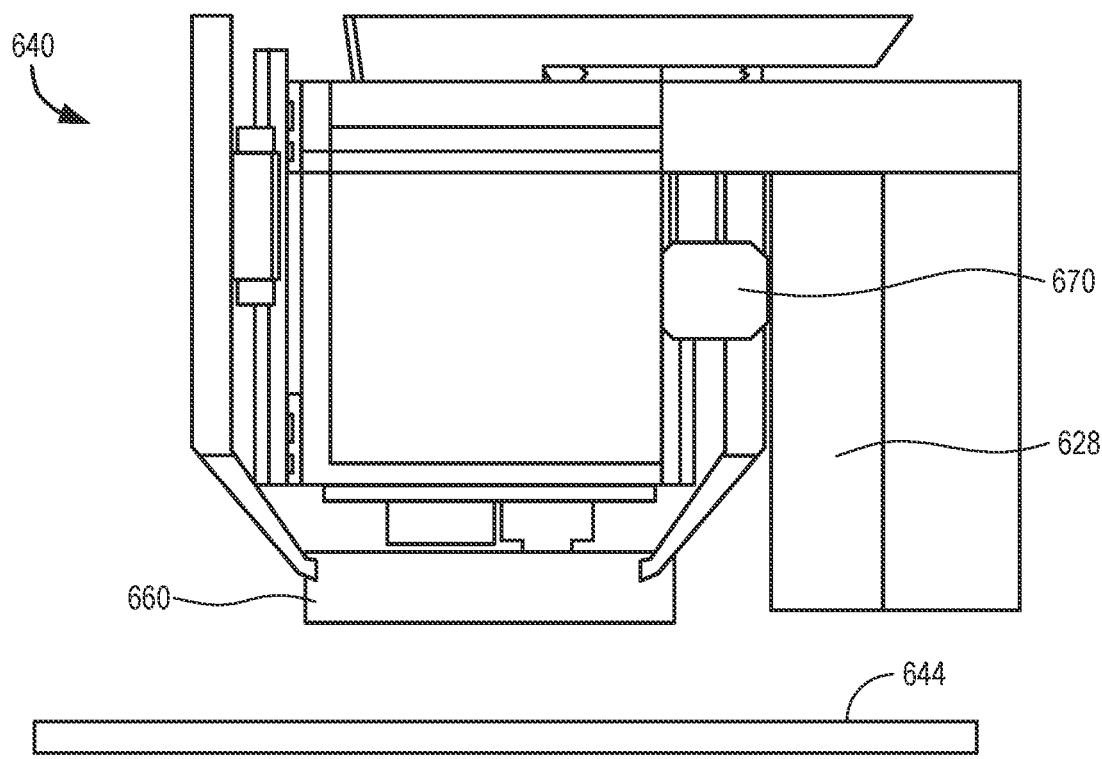
Figure 61H:
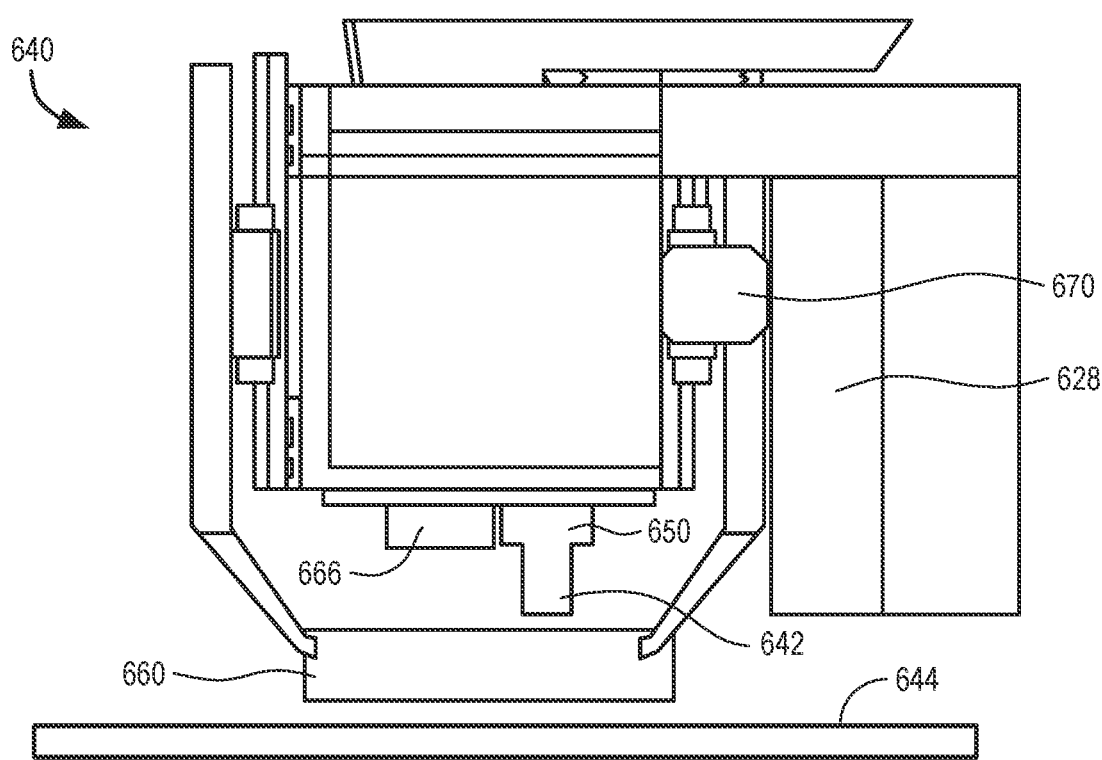

FIGS. 61g and 61h correspond to FIGS. 61a and 61d and show the outer nozzle 660 in docked or travel and printing positions, respectively.

The print head 634 further includes a second inner nozzle 642A (FIG. 60b) and a powder selector actuator 670. The powder selector actuator 670 is typically a screw drive actuator although another actuator such as a pneumatic actuator may be used. The powder selector actuator 670 has portions connected to the powder accumulator and valve assembly 640 (which includes the outer nozzle 660) and the support structure 628, respectively and is operable to move the outer nozzle 660 relatively between a first powder position wherein the outer nozzle 660 is around the first inner nozzle 642 and a second powder position wherein the outer nozzle 660 is around the second inner nozzle 642A. The second inner nozzle 642A forms part of the powder accumulator and valve assembly 640 that includes a second powder container to hold the second powder, a second inner nozzle powder valve, a second inner nozzle actuator that has a portion connected to the second inner nozzle powder valve and operable to move the second inner nozzle powder valve between an upper position wherein an upper end of the second inner nozzle powder valve is above an upper surface of a volume of the second powder in the second powder container so that the second powder cannot drop into the upper end of the second inner nozzle and a lower position wherein the upper end of the second inner nozzle powder valve is dropped relative to the upper position so that the powder in the second powder container flows into the second inner nozzle, and a second outer nozzle powder valve, a second outer nozzle actuator that has a portion connected to the second outer nozzle powder valve and operable to move the second outer nozzle powder valve between an upper position wherein an upper end of the second outer nozzle powder valve is above an upper surface of a volume of the second powder in the second powder container so that the second powder cannot drop into the upper end of the second outer nozzle and a lower position wherein the upper end of the second outer nozzle powder valve is dropped relative to the upper position so that the powder in the second powder container flows into the outer nozzle.

Multiple Level, Multi-Powder Deposition

Independent control of the screed height in multi-material powder beds allows for two or more powders in the powder bed to be to be positioned at different heights. This is illustrated in FIGS. 62a-62f where the blocks with more dense dotted shading and blocks with less dense dotted shading represent two different powders that are printed at different screed heights. In the first layer 680 of the build, shown in FIG. 62a, the second powder 682 is deposited at a specific height, then the first powder 684 is deposited at a height above the second powder 682. By doing this, it is possible to then independently screed the entire top (i.e., first powder 684) surface of the powder bed with a simple moving screed, or doctor blade assembly as is commonly used in additive manufacturing. More precise control over the level of the top layer of first powder 684 is provided, which is particularly important for laser-based sintering additive manufacturing systems. FIG. 62b illustrates the concept in that the powder bed screed 686 is passed over the top surface of the powder bed, in contact with the first powder 684, which keeps the entire surface at a uniform height.

In general, a small amount of the first powder 684 may spill into the second powder 682 with the screeding of the entire powder bed, but the part (in this example) is fabricated from the first powder 684 and the second powder 682 is simply a supporting material. Multi-height, multi-material powder beds can only be fabricated using the multi-level, multi-material powder bed technology described here.

Note: "multi-material" can refer to two different material compositions (e.g. zircon and steel) and/or materials with the same material composition but different particle morphologies and/or particle size distributions (e.g. +100 mesh Titanium and −325 mesh Titanium powder).

Figure 62A:
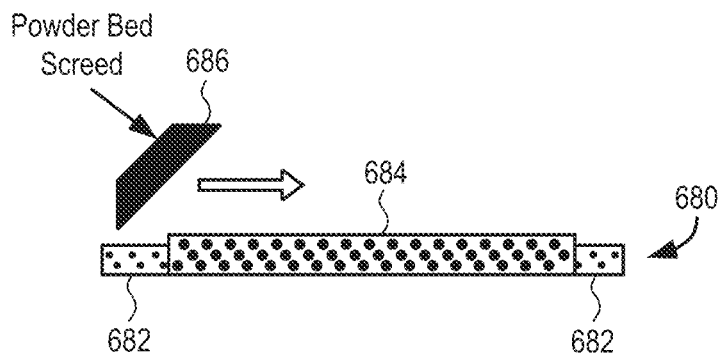
FIGS. 62a-62f are cross-sectional side views of a method of forming a part that includes independent control of screed height.
Figure 62B:
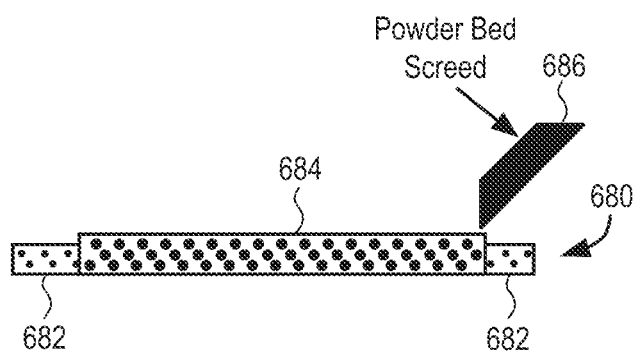

More specifically, in FIG. 62a, a method of forming a part includes holding first particles of a first powder 684 in proximity to one another, holding second particles of a second powder 682 in proximity to one another, wherein the first and second powders 684 and 682 form a first layer 680 with a surface of the first layer being in a first plane at the first powder 684 of the first layer 680 and in a second plane at the second powder 682 of the first layer 680, the first plane being spaced from the second plane of the first layer 680. The second powder 682 of the first layer 680 is deposited before the first powder 684 of the first layer 680. The first powder 684 of the first layer 680 and the second powder 682 of the first layer 680 may be different types of powder.

The first powder 684 of the first layer 680 and the second powder 682 of the first layer 680 may have the same particle sizes or particle size distributions.

The first powder 684 of the first layer 680 and the second powder 682 of the first layer 680 may differ from one another in material or material compositions.

The first powder 684 of the first layer 680 and the second powder 682 of the first layer 680 may be made of the same material or material composition.

The method further includes connecting the first particles to one another to form a portion of a part and the second powder 682 remaining loose and supporting the first powder 684 of the first layer 680. The connection scheme may include exposing the first powder 684 of the first layer 680 to laser light.

As shown in FIG. 62b, the method further includes moving the powder bed screed bar 686 over the first layer 680 to level the first powder 684 of the first layer 680.

Figure 62C:
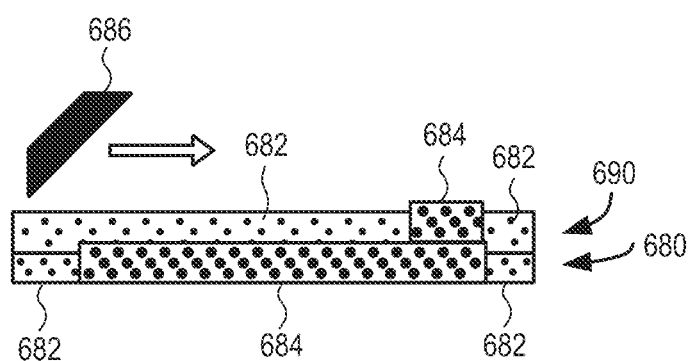

As further shown in FIG. 62c, the method includes holding first particles of the first powder 684 in proximity to one another, holding second particles of the second powder 682 in proximity to one another, wherein the first and second powders 684 and 682 form a second layer 690 with a surface of the first layer being in a third plane at the first powder 684 of the second layer 690 and in a fourth plane at the second powder 682 of the second layer 690, the third plane being spaced from the fourth plane of the second layer 690. The second powder 682 of the second layer 690 is deposited before the first powder 684 of the second layer 690. The first powder 684 of the second layer 690 and the second powder 682 of the second layer 690 may be different types of powder.

The method further includes connecting the first particles to one another to form a portion of a part and the second powder 682 remaining loose and supporting the first powder 684 of the first layer 680. The connection scheme may include exposing the first powder 684 of the second layer 690 to laser light.

Figure 62D:
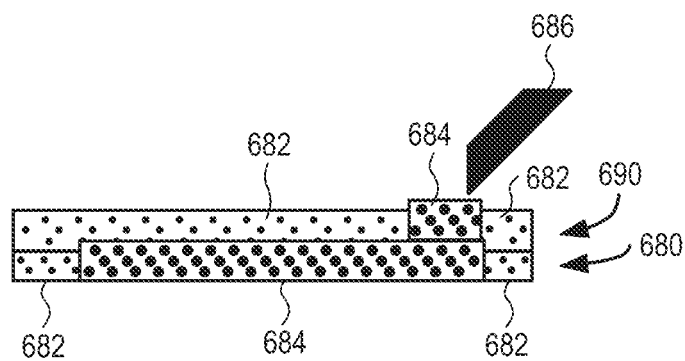

As shown in FIG. 62d, the method further includes moving the powder bed screed bar 686 over the second layer 690 to level the first powder 684 of the second layer 690.

Figure 62E:
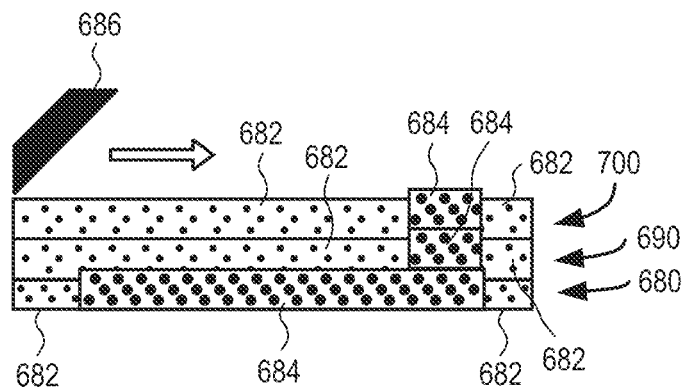
Figure 62F:
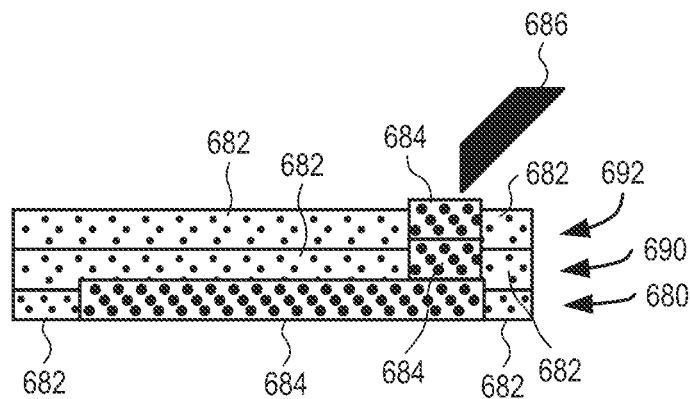

As shown in FIGS. 62e and 62f, the process for the first layer 680 and the second layer 690 is repeated for a third layer 699 and for further layers as necessary to complete the part.

The method further includes removing the second powder 682 of the first layer 680, second layer 690 and third layer 699 from the first powder 684 of the first layer 680, second layer 690 and third layer 699 to leave the part formed by the first powder 684 of the first layer 680, second layer 690 and third layer 699 after the first particles of the first powder 684 of the first layer 680, second layer 690 and third layer 692 are connected to one another to form the part.

Multi-Material Powder Separation Methods

In FIG. 63a a first layer 800 is printed by forming a first volume 802 of a first powder having first particles of a first material in contact with a second volume 804 of second powder having second particles of a second material with an interface between the first and second volumes. As shown in FIG. 63b, a connection scheme is then employed to connect particles of a first portion 806 of the first volume 802 to one another to form a part without connecting particles of a second portion 808 of the first volume 802 to one another. As shown in FIGS. 63c and 63d, the process is repeated for further layers 810 to 814. The first portion 806 of the first material of the second layer 810 is in contact with the first portion 806 of the first material of the first layer 800, and so on to complete the formation of a part 816.

FIG. 63e shows that the method includes removing the second powder (represented by the second volume 804) of the layers 800, 810, 812 and 814 and the second portion 808 of the first powder of the layers 800, 810, 812 and 814 from the part. The powders that are removed are schematically shown in their respective blocks as represented in FIG. 63d, although it should be understood that the powders mix with one another during the removal process.

FIG. 63f shows that the method includes separating the second powder ("support" powder) and the second portion of the first powder ("part" powder) from one another.

As additive manufacturing systems grow to larger and larger sizes, it is critically important to use the powder not sintered in the powder bed again and again as a means to reduce cost. In general, powder recycling in metal added manufacturing (AM) systems consists of removing the sintered part from the single-material powder bed, and sieving the remaining un-sintered powder to obtain a powder with the same characteristics as the original powder. In practice, however, the properties of an "un-recycled" powder are never identical to a powder that has been "recycled". Further, the properties of the powder tend to decline with the number of times it has been recycled. This can lead to unpredictable materials properties and makes it difficult to qualify the performance of additively manufactured metal parts.

Multi-material deposition of powders in an AM powder bed allows for the significant reduction of waste in the metal powders used to fabricate parts, and may eliminate the need to recycle the powders at all. In general, the powder used to fabricate the part is deposited only where it is needed in the powder bed. This can significantly reduce the overall powder requirements to produce the part because AM parts fabricated in most powder bed systems only occupy approximately 25% of the total powder bed volume.

An alternative to recycling the powder in AM powder beds is to completely separate the powders after the part is fabricated. Multi-material deposition technology allows for the separation of powders based on a number of characteristics of the powders. In this description, two powders are described; the metal powder that makes up the "part" and the powder that provides the "support" to the "part" powder.

Magnetic Separation of Two Powders

Two powders can be physically separated from each other if one of the powders is magnetic and the other is not. Physical separation can be achieved using permanent magnets and/or electromagnets. The magnet will attract all of the magnetic particles to regions of high magnetic flux, and the particles can be removed from the bulk of the powder with a variety of mechanical mechanisms. An example of a two-powder system that can be separated in this manner is an iron "support" powder and a titanium-alloy "part" powder. The iron "support" powder has a high magnetic permeability and is easily separated from the non-magnetic titanium-alloy powder using moderate strength magnetic fields.

Induction-Based Separation of Two Powders

Two powders can be physically separated from each other by subjecting the powders to a high frequency magnetic field. Referring to Equation [1] and FIGS. 1a to 1c, the skin depth of a material is a strong function of the materials resistivity and the frequency of an applied magnetic field. As discussed previously, if the diameter of the individual particles of a metallic powder are greater than the skin depth at a particular frequency, then significant eddy currents are generated within the particles. These currents generate magnetic fields that oppose the applied high frequency magnetic field. This results in a force between the applied and induced magnetic field that can be used to physically separate the particles when the particles are within a volume of high frequency magnetic field. In general, good coupling to particles in a high frequency magnetic field (and thus a large opposing force) occurs for particles with a diameter greater than about 4 times the skin depth. If the particle diameter is approximately the skin depth, there is very little coupling to the particle and very little to no force between the applied and induced magnetic field.

For example, a mixture of aluminum and titanium-alloy powders, each with about 50 micron particle size, may be physically separated by passing a stream of particles through a volume of magnetic field oscillating at 75 MHz. Aluminum and titanium-alloy materials have a resistivity of 2.6 microOhm cm and 124 microOhm cm, respectively. At this frequency, the skin depth of Aluminum is ~9.4 microns, which results in a d/δ ~5.3. Thus, at this frequency, the applied magnetic field couples strongly to the powder and there will be a large relative force on the Aluminum particles in the powder mixture as they pass through the high frequency magnetic field.

The titanium-alloy particles, however, couple very poorly to the applied magnetic field because of the high resistivity of the material. At 75 MHz, the skin depth of the titanium-alloy is ~65 microns, which results in a d/δ ~0.8. Thus, at this frequency, the applied magnetic field does not couple to the Titanium-alloy particles in the powder mixture as they pass through the high frequency magnetic field.

In general, the frequency-dependent force induced by an applied oscillating magnetic field on particles of a different resistivity and/or size can be used to separate metallic powders from each other.

Separation of Powders Based on Solubility in a Solvent

Two powders can be physically separated from each other by using a solvent that selectively dissolves only one of the materials, leaving the other behind. For example, if the "support" powder is soluble in Solvent A, and the "part" powder is not, then the unsintered powders can be separated (after removal of the part) by simply dissolving away the "support" powder in Solvent A. Ideally, Solvent A does not react with the remaining "part" powder and can then be re-used after residual Solvent A is removed from the powder.

For example, if the "support" powder is sodium chloride (or sodium chloride treated with an anti-clogging agent) and the "part" powder is a titanium-alloy, the two residual powders can be separated (after removing the titanium-alloy part) by simply placing the powder mixture in an aqueous solvent (i.e., water). Sodium chloride is highly soluble in water, and titanium-alloys are known to be resistant to corrosion in a variety of environments. Thus, the remaining titanium-alloy powder not sintered in the AM process can be easily separated from the aqueous solvent. After rinsing and drying the un-used powder, the recycled "part" powder can be used again in the AM process.

In this example, water was used as the solvent with a selective solubility relative to the two powders, but any number of solvents can be used if the solubility of one powder is greater than the other to achieve a separation of the powders. Similarly, an active chemical solvent, such as an acidic or basic etching solution, can be used to separate the particles if the chemical solvent selectively etches only one of the materials. In this case, the separation is not due to a difference in solubility, but rather due to the difference in the chemical activity of one material versus the other.

Separation of Powders Based on Melting Temperature

Double powders can be physically separated from each other by heating the powders above the melting temperature of one powder, leaving the other behind. For example, if the "support" powder has a melting temperature of ~800 degrees Celsius, and the "part" powder melts above 1300 degrees Celsius, then the unsintered powders can be separated (after removal of the part) by simply melting the "support" powder and separating the "part" powder from the melt. Ideally, the melted "support" powder liquid does not react with the remaining "part" powder.

For example, if the "support" powder is sodium chloride (or sodium chloride treated with an anti-clogging agent) and the "part" powder is a titanium-alloy, the two residual powders can be separated (after removing the titanium-alloy part) by simply heating the two powders to a temperature greater than the melting temperature of sodium chloride (~800 degrees Celsius). Titanium-alloys are known to be resistant to corrosion in a variety of environments. Thus, the remaining titanium-alloy powder not sintered in the AM process can be easily separated from the molten salt solution. After rinsing and drying the un-used powder, the recycled "part" powder can be used again in the AM process.

Separation of Compositionally Identical Powders based on the Particle Size Distribution Two powders can be physically separated from each other by physical means if the two powders have significantly different particle size distributions. For example, consider the following two powders: a "support" powder that is a titanium-alloy with a particle size between approximately 100 microns and 300 microns, and a "part" powder that is a titanium-alloy with a particle size less than 80 microns. In this case, both powders have the same composition, but have a significantly different particle size. The multi-material powder bed consists of the second powder with a large particle size and the first powder with the small particle size. After the part is removed from the powder bed, these two powders can be separated mechanically using standard sieve meshes. A #170 sieve, for example, has a mesh size opening of 88 microns. This sieve will pass essentially all of the blue "part" powder, but retain the gray "support" powder.

This method of separation can be of particular importance in both selective laser melting (SLM) and electron beam melting (EBM) additive manufacturing methods, because the transfer of energy to the powder bed is very sensitive to the local particle size distribution of the powder. Specifically, the optimum particle size is approximately 15 to 45 microns and for SLM and approximately 45 to 106 microns for EBM.

In the preparation of metal powders (by gas atomization or other standard means), the as-prepared wide particle size distribution of the powder is not ideal for use in either SLM or EBM without further processing. In general, the as-prepared powders are sieved (or mechanically separated by other means) to achieve the ideal particle size distribution for the AM method. Particles that are too small or too large are a by-product of the process and may be re-melted or discarded. This adds considerable cost to the powders that are suitable for use in SLM or EBM, because a significant percentage of the as-prepared powder cannot be used.

A multi-material powder bed with powders of the same composition, but different particle sizes, takes advantage of the "un-usable" large particle size powder to act as a "support" powder. After the part is removed from the powder bed, the two powders can be separated using mechanical sieves and re-used as both "support" powder and "part" powder. In this case, the powders have the same composition so there is no chance of material cross contamination between the powders.

FIGS. 63a to 63f may illustrate the complete AM process that uses two materials with different particle sizes. The layer-by-layer AM process (FIGS. 63a to 63d) consists of two powders with different particle size distributions. The "support" powder is shown with the coarse fill pattern and the "part" powder with the fine fill pattern. After the powders are deposited in the multi-material powder bed using OPL technology, a localized energy source is used to melt the "part" powder within the layer. This is illustrated in FIGS. 63b to 63d as the volume with the solid black fill pattern. The "part" is then slowly fabricated by fusing each successive layer in a pattern determined by a sliced version of the 3D part. After the AM process is complete, the part is removed from the loose "support" and "part" powders, as shown schematically in FIG. 63e. The remaining loose powders can then be separated using standard sieves. This allows for the convenient recycling of both the "support" and "part" powders. Note: In general, there is much more "support" powder than "part" powder recycled in this process because most of the "part" powder was melted locally to produce the part.

Powder Valve Assembly

Figure 64A:
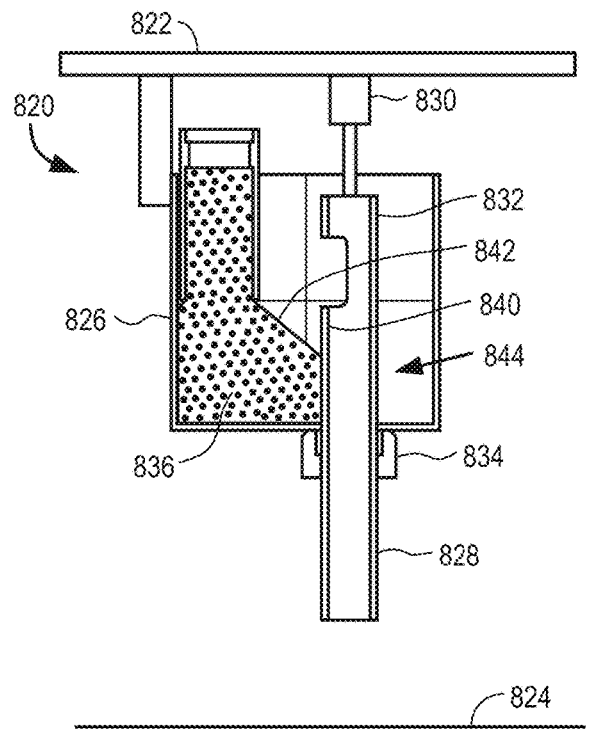
FIGS. 64a and 64b are cross-sectional side views of powder nozzle/screed design of a print head according to further embodiment.
Figure 64B:
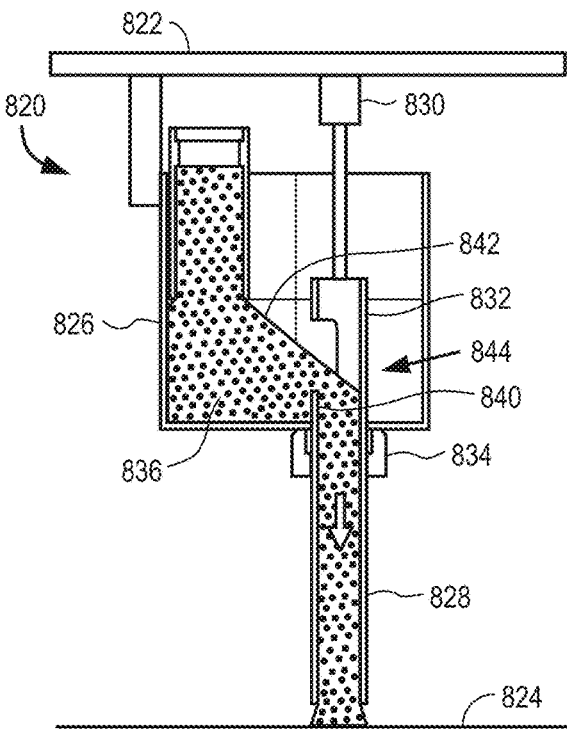

FIGS. 64a-64d show two different embodiments of a powder valve assembly. In FIGS. 64a and 64b, the powder flow is controlled by the height of the valve in the accumulation chamber. Powder is contained in this configuration by a slip seal ring around the outer diameter of the valve.

More specifically, FIGS. 64a and 64b show a manufacturing system 820 that includes a print head frame 822, a substrate 824, a first powder container 826, a first nozzle 828, a first nozzle actuator 830, a first connecting piece 832, and a first seal piece 834.

The first powder container 826 receives a first powder 836 from a first powder hopper and holds the first powder 836. The first nozzle actuator 830 has a portion connected to the first nozzle 828 via the first connecting piece 832 and an opposing portion connected the print head frame 822. The first nozzle 828 is mounted to the first powder container 826 for vertical movement between a first position (FIG. 64a) and a second position (FIG. 64b). The first nozzle actuator 830 is operable to move the first nozzle 828 between the first position and the second position. In the first position, an upper end 840 of the first nozzle 828 is above an upper surface 842 of a volume of the first powder 836 in the first powder container 826 so that the first powder 836 cannot drop into the upper end 840 of the first nozzle 828. In the second position, the upper end 840 of the first nozzle 828 is dropped relative to the first position so that the first powder 836 in the first powder container 826 flows into the first nozzle 828.

The first connecting piece 832 having a lower portion secured to the first nozzle 828 and an upper portion located higher than the upper end 840 of the first nozzle 828. The first nozzle actuator 830 is attached to the upper portion of the first connecting piece 832. The first connecting piece 832 and the first nozzle 828 are made out of a common piece of material to form a valve piece 844.

The first seal piece 834 is connected between the first powder container 826 and the first nozzle 828 to keep the first powder 836 in the first powder container 826.

Figure 64C:
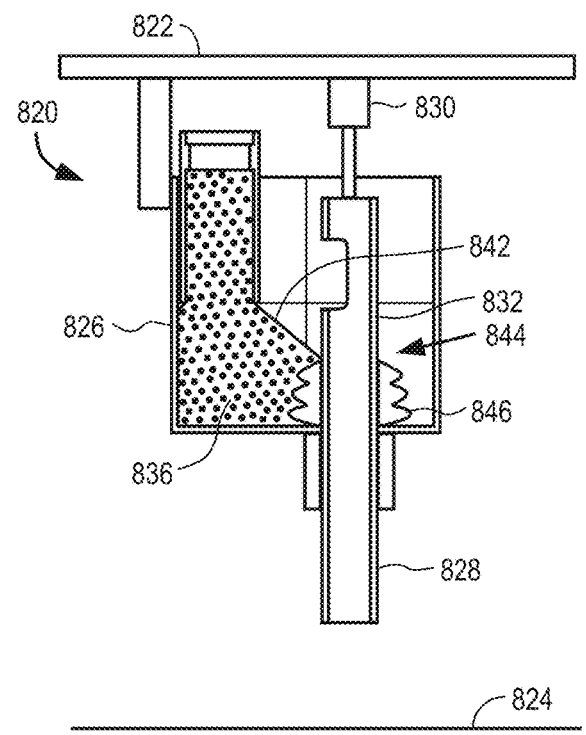
FIGS. 64c and 64d are cross-sectional side views of powder nozzle/screed design of a print head according to further embodiment.
Figure 64D:
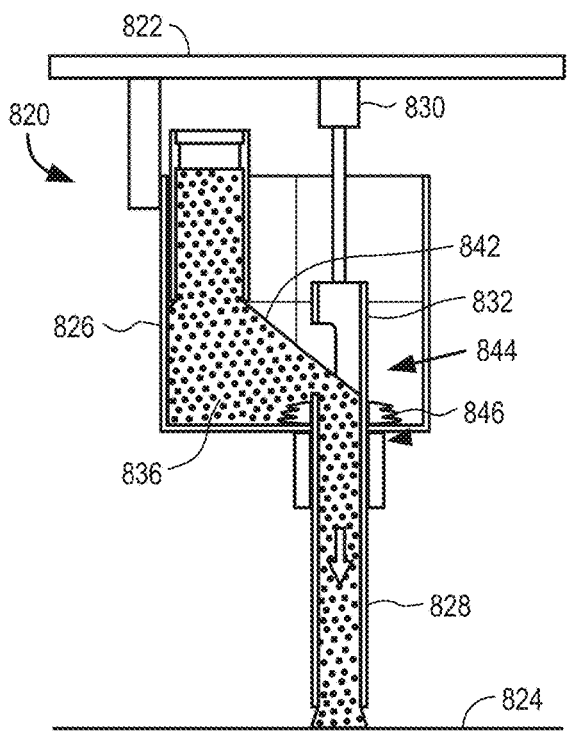

Similarly, in FIGS. 64c and 64d, the powder flow is controlled by the height of the valve in the accumulation chamber. Powder is contained in this configuration by a flexible bellows attached to the outer diameter of the valve. This bellows can be fabricated from metal or polymeric material, if the construction allows for the movement of the valve assembly.

Instead of first seal piece 834 shown in FIGS. 64a and 64b, a bellows 846 is connected between the first powder container 826 and the first nozzle 828 to keep the first powder 836 in the first powder container 826.

In the embodiments shown in FIGS. 64a to 64d, the first nozzle actuator 830 has a portion connected to the print head frame 822 to move the first nozzle 828 relative to the print head frame 822. The first nozzle 828 moves vertically relative to the substrate 824.

Figure 64E:
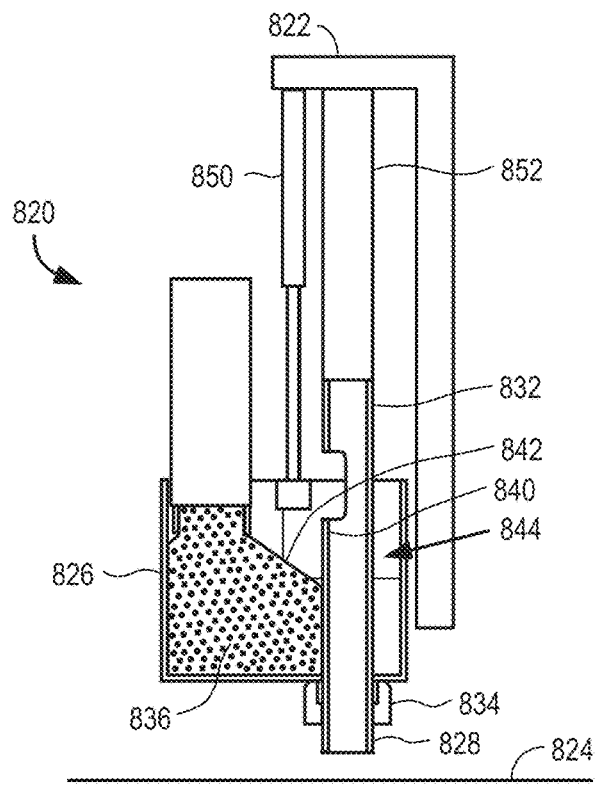
FIGS. 64e and 64f are cross-sectional side views of powder nozzle/screed design of a print head according to further embodiment.
Figure 64F:
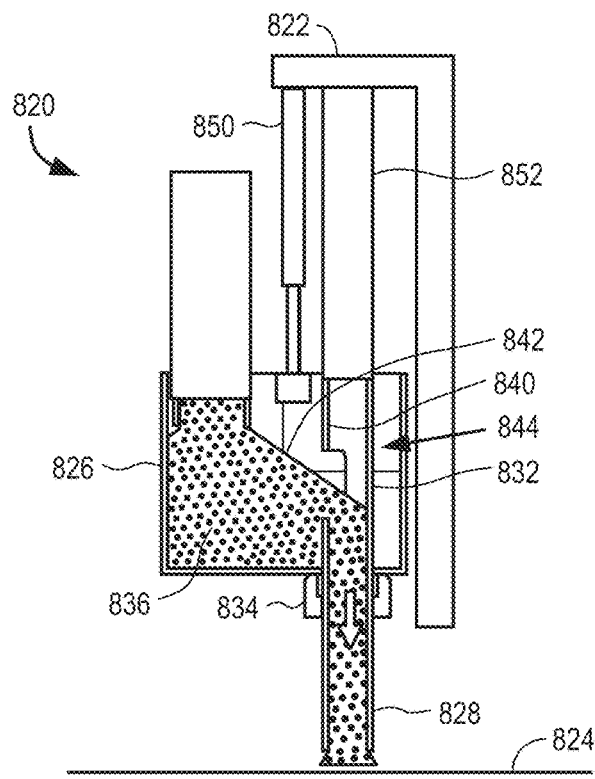
Figure 64G:
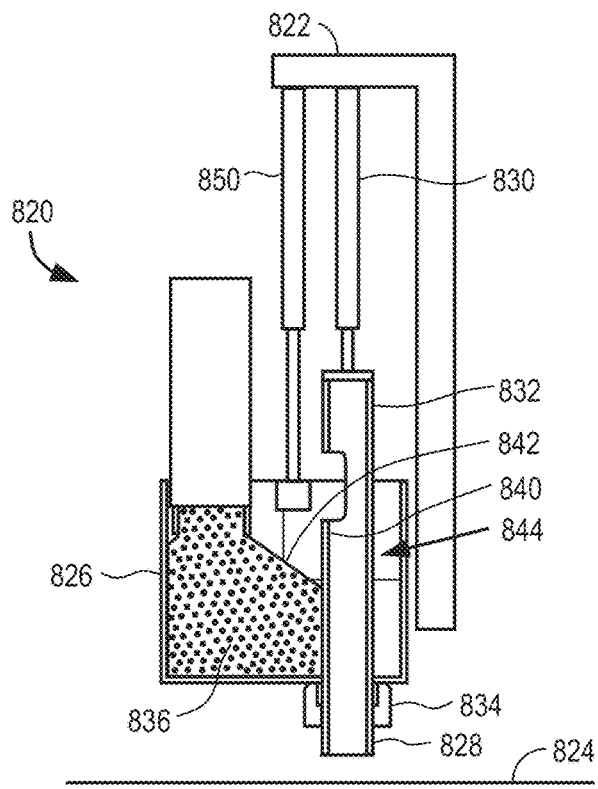
FIGS. 64g and 64h are cross-sectional side views of powder nozzle/screed design of a print head according to further embodiment.
Figure 64H:
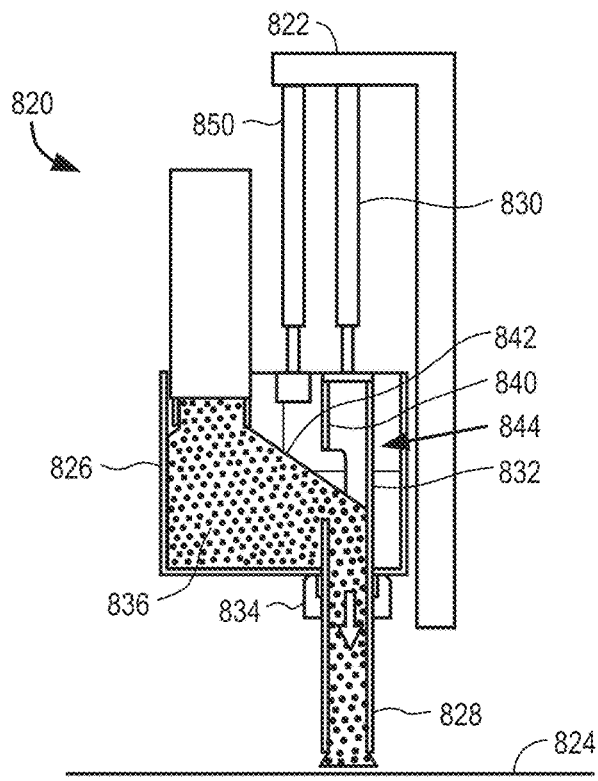

FIGS. 64e and 64f show a different embodiment wherein a first nozzle actuator 850 is connected through the print head frame 822 and a solid bar 852 to the first nozzle 828, and has a portion connected to the first powder container 826 to move the first powder container 826 relative to the first nozzle 828. The first nozzle 828 remains stationary relative to the substrate 824. FIGS. 64g and 64h show a further embodiment that includes both a nozzle actuator 830 as shown in FIG. 64a and a nozzle actuator 850 as shown in FIG. 64e. The nozzle actuators 830 and 850 work in concert with each other to move the first nozzle and the first powder container 826 relative to the print head frame 822 and the substrate 824.

The manufacturing system 820, in addition to the print head frame 822 and the substrate 824 may include a second powder container (not shown), a second nozzle (not shown), a second nozzle actuator (not shown), a second connecting piece (not shown), and a second seal piece (not shown) that are assembled in a similar manner to deposit a second powder that is different from the first powder.

Plasma Assisted Additive Manufacturing

As discussed previously, FIGS. 38a to 38h show one embodiment of the invention in which an ordered powder layer is heated layer-by-layer to produce a complex part. Two materials may possess very different melting points, which will result in the consolidation of the lower temperature melting point material with proper thermal processing.

In addition to heating the "part" material by induction, laser, high intensity light, radiant heat, or electron beam, it is also possible to rapidly heat and locally melt the "part" powder using a thermal plasma and a gas specific to the process.

Figure 65:
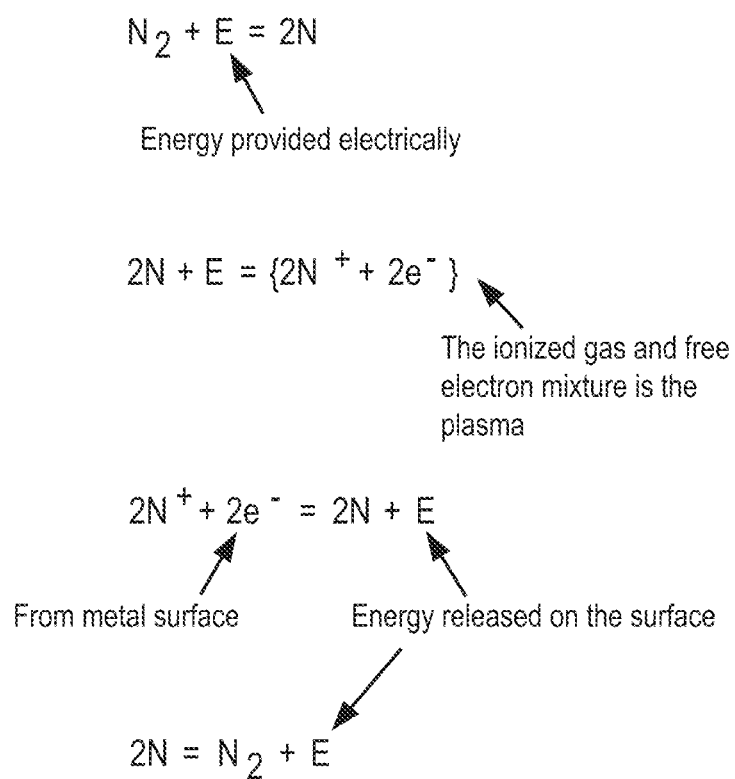
FIG. 65 illustrates how energy can be transferred to a substrate using the ionization/recombination of gas in a plasma.

FIG. 65 illustrates how energy (in the form of heat) can be transferred to a substrate using the ionization/recombination of gas (e.g., nitrogen) in a plasma. Nitrogen gas is first ionized by applying an AC or DC voltage across electrodes in an appropriate apparatus. This creates a plasma that consists of nitrogen ions and electrons that can be directed at a surface. If the surface is porous, like a powder bed surface in additive manufacturing, the plasma can penetrate below the top surface of the powder bed.

The recombination of the electrons with the nitrogen ions, and the subsequent formation of nitrogen gas from the monoatomic nitrogen, releases a significant amount of energy in the form of heat and photon. This energy, properly applied to the surface, can locally melt powder into a solid mass.

While this example has been illustrated with nitrogen gas, the process can be carried out with any gas or gas mixture that can be ionized and formed into a plasma. This includes nitrogen, argon, forming gas, air, helium, etc.

Overall, this process is similar to the AM process described previously with the exception that the induction heating source shown in FIGS. 38a to 38h is replaced with a plasma generator. In addition to being able to rapidly heat the powder bed surface, the plasma generator allows specific chemistry to occur on, and below, the topmost surface of the powder bed, which may help with the overall consolidation/melting of the "part" powder. For example, it is well known that nitrogen gas acts as a sintering aid in the sintering/consolidation of aluminum powder in powder metallurgy. This occurs due to the reaction of aluminum oxide on the surface with nitrogen, and the subsequent decomposition of the aluminum nitrides at elevated temperatures. In effect, the presence of nitrogen results in the decomposition of the robust aluminum oxide surface (present on all aluminum particles), which prevents the particles from consolidating even at temperatures well above the melting temperature of aluminum. In this case, the plasma chemically cleans the "surface" of the aluminum alloy and heats the material due to the recombination of the ions to gaseous nitrogen.

A manufacturing system will typically include a deposition system having a holder suitable to hold first particles of a first powder in proximity to one another, a first hopper for a first powder having first particles of a first material, a first nozzle through which the first powder flows out of the first hopper to form a first volume, a second hopper for a second powder having second particles of a second material, a second nozzle through which the second powder flows out of the second hopper to form a second volume in contact with the first volume with an interface between the first and second volumes, the second particles forming at least part of a holder suitable to hold first particles in proximity to one another; and a plasma source which, when employed, exposes at least the first particles to a plasma that heats the first particles to connect the first particles to one another, wherein the first material is a positive material and the second material is a negative material so that the positive material preferentially connects the first particles to one another to a greater extent than the negative material connecting the second particles to one another, the positive material forming the part with an edge of the part defined by the interface.

While this example illustrates the use of nitrogen to clean and melt aluminum alloy powder during the additive manufacturing process, equivalent gases or gas mixtures can be used with other powders or powder mixtures depending on the specific chemistry of the material to be melted and the gas used in the plasma.

Referring again to FIGS. 38a to 38h, with the substitution of the induction heater with a thermal plasma, this technology allows for the layer-by-layer melt casting of the aluminum (or other metal) during the OPL printing process. The "support" powder serves as a temporary mold during this process, which could be set using a binder or could simply remain a loose powder during the entire process. The first particles and the second particles are exposed to the plasma.

Ordered Powder Lithography using a Chemical Mold-Set Process

In order to overcome the current technology limitations of additive manufacturing and enable the low cost manufacture of specialized metal parts, a new approach is needed. Ideally, this AM approach will possess the following characteristics:

Open-Environment Operation. Most AM systems require the use of a controlled atmosphere build chamber for the layer-by-layer fusion of the metal powder or printing of a binder to produce the metal part. This requirement severely limits the flexibility of the process, especially if parts need to be fabricated in factory environments, depots, or FOBs.

Scalable Build Envelope. The need for a controlled atmosphere build chamber limits the overall size of the parts that can be fabricated and prevents the system from being easily scaled to very large parts.

Low Operations Burden. Many AM systems are complex machines with a myriad of operating parameters that ultimately effect the quality of the additively manufactured part. In addition, these systems require constant monitoring, frequent maintenance, and skilled technicians to run efficiently, which add considerable cost to the final part produced.

Part Qualification. Unlike metal parts that are fabricated using casting and/or conventional subtractive machining, AM parts are fabricated through as-yet unqualified processes for many applications, which may delay the adoption of these parts.

Prototype casting molds can be fabricated using a three-powder OPL AM system and a configurable build containment envelope. Complex 3D powder structures, which define the target part and mold, are fabricated on a layer-by-layer basis in open-air within this build containment envelope. The 3D powder structure consists of "negative" supporting powder, "positive" casting pattern powder, and "auxiliary" mold powder. After the OPL powder printing procedure, mold/pattern setting process are performed in-place using modular heating elements affixed to the perimeter of the build containment envelope, which are capable of heating the 3D powdered structure to the temperatures required to set the mold. During this process, the auxiliary casting mold powder is consolidated at a specified temperature to form a rigid, yet porous, mold. After the mold is set, the positive pattern powder is removed from the mold by raising the temperature of the build containment envelope above the melting point of the positive powder. This liquid then drains from the mold cavity through capillary action and gravity. In this manner, complex casting molds can be fabricated in open-air during a single thermal processing sequence with minimal operations burden. Using these additively manufactured low cost molds, high quality parts can be fabricated using well-understood casting and tempering processes.

Ordered Powder Lithography (OPL) is an AM technique that permits the rapid structured deposition of powders to form a 3-dimensional part. The method begins with the deposition of multiple types of powder to form a layer in shapes specified by an OPL CAM program. The process is repeated on a layer-by-layer basis to form a three dimensional ordered powder part that is surrounded with a three dimensional ordered powder support structure.

Spatial resolution is achieved in the powder deposition process using a high resolution OPL print head. This novel powder deposition system is capable of depositing multiple powders with precise geometries in three dimensions. In addition, the self-limiting, self-screeding print head allows for the rapid, uniform deposition of powder in the build cartridge. Unlike other multi-material powder deposition methods, OPL does not require a fixed powder flow rate during the fabrication of the 3D part and mold. Powder flow in the system is not a function of hopper vibration frequency or amplitude, but only flows into available volumes in the specific layer of the build. This feature, in combination with the OPL tool path, results in an extremely uniform powder density in the build cartridge and high quality near net shape (NNS) parts. In addition, the self-limiting OPL print head allows for in-process monitoring and error correction during the build, which is critically important in the fabrication of large-scale NNS parts.

Figure 66A:
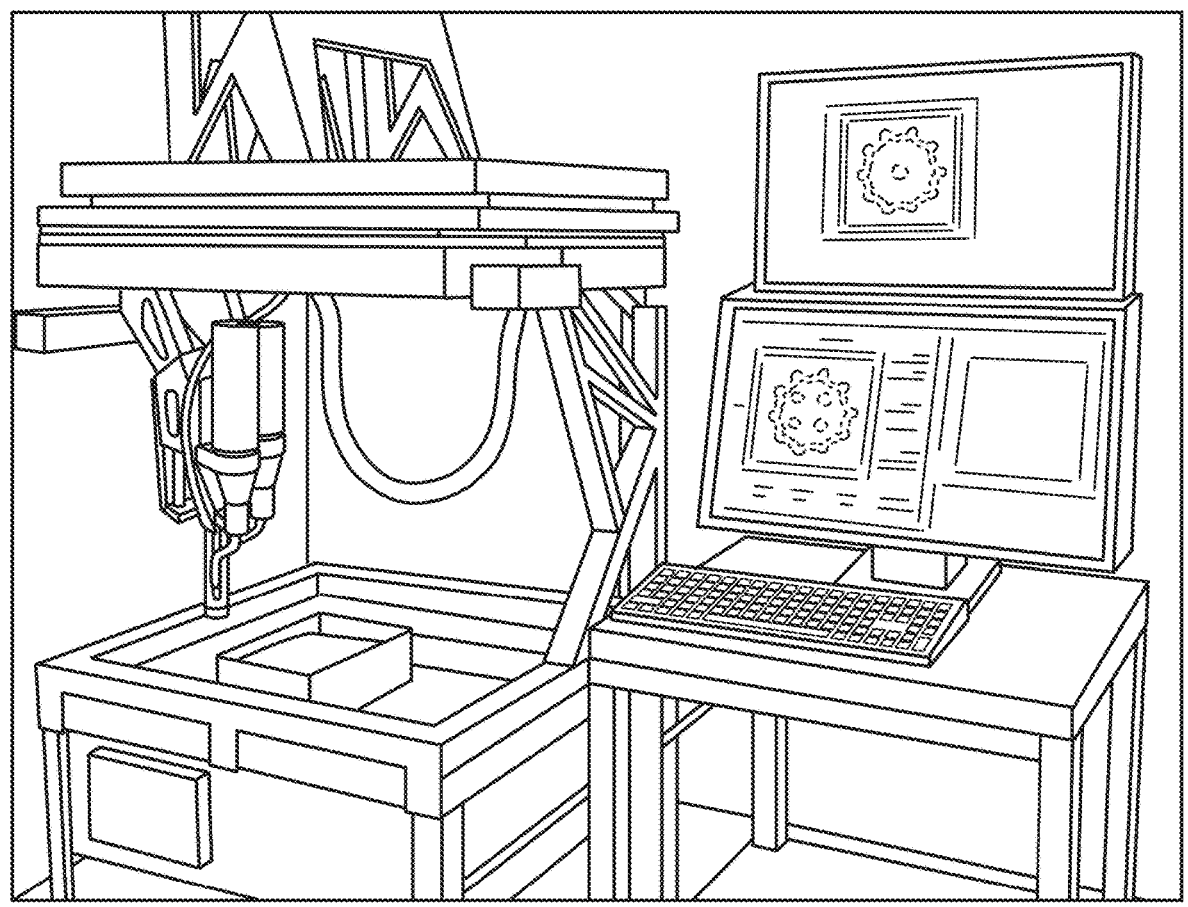
FIG. 66a is a perspective view of a multi-material Ordered Powder Lithography (OPL) printer.
Figure 66B:
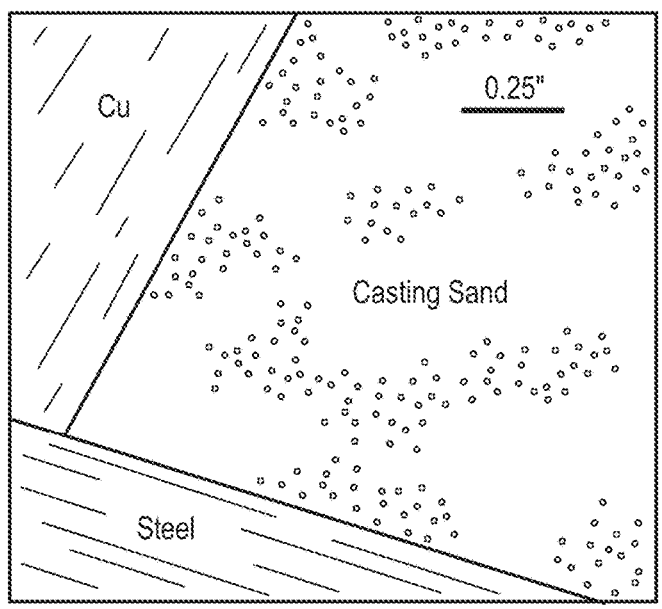
FIG. 66b is a close-up perspective view of a multi-material OPL print.

Unlike other AM systems, OPL can print many types of powders during the deposition process, including most low-cost powder metallurgy feedstock, casting sand, ceramics, and any other powder that flows well in the OPL print head. The multi-material OPL printer is shown in FIG. 66*a*. This system is capable of printing three distinct powders in an ordered fashion. System specific OPL print instructions are generated automatically from input CAD data with little to no operator input. The powder deposition process can take place in standard build cartridges or upon any sufficiently stable surface. Reusable build cartridges are essentially simple metal boxes that can be made any size or shape as determined by the dimensions of the part. FIG. 66*b* is a close up image of a multi-material OPL print that illustrates the high quality of the multi-material powder deposition that can be achieved using this technology.

A fundamental aspect of the OPL technology is the use of "Positive", "Negative", and "Auxiliary" powders. By convention, positive powders form the partially to fully consolidated part after heat treatment, while "Negative" powders confine the positive powder shape in each layer. Negative powders therefore serve as an additively formed 3-dimensional supporting structure in the build cartridge, which is easily removed after heat treatment. In addition to the positive and negative powders, auxiliary powders can be deposited. Auxiliary powder can be used as, 1) a structural "Shell" material to further support the positive powder, 2) a second positive material that consolidates during heat treatment, 3) a sintering aid to promote consolidation of the positive powder, and 4) a source of liquid metal to infiltrate the positive powder during heat treatment.

It should be understood that a plasma-based system as described above may include other features that have been described above. A plasma-based system may have a deposition system that includes a support structure, a print head through which the first powder and the second powder are deposited, a print head actuator; and a computer that is programmable to cause movement of the print head actuator for the print head actuator to move the first and second nozzles relative to the support structure to deposit a plurality of layers on one another, wherein at least a first of the layers includes a portion of the first material and a portion of the second material and at least a second of the layers includes a portion of the first material and a portion of the second material, wherein the first material of the second layer is in contact with the first material of the first layer, wherein the plasma source, when employed, connects the particles of the first material of the second layer to the first material of the first layer.

The print head actuator may be programmable to move the first and second nozzles relative to the support structure to deposit the second volume is within the first volume.

The print head actuator may be programmable to move the first and second nozzles relative to the support structure so that the first volume entirely encloses the second volume.

The print head actuator may be programmable to move the first and second nozzles relative to the support structure so that the first and second layers have different thicknesses.

A plasma-based system may include a heater positioned to heat the first layer to consolidate the particles of the first material of the first layer before depositing the second layer on the first layer, and heat the second layer, after depositing the second layer on the first layer, to consolidate the particles of the first material of the second layer.

A plasma-based system may include a machining apparatus to machine the part. The part may be a green part with structural integrity, and the plasma-based system may include a heater for heat treatment of the green part to form heat treated part.

The deposition system may include a print head through which the first powder and the second powder are deposited, a print head actuator, and a computer that is programmable to cause movement of the print head actuator for the print head actuator to move the print head relative to the support structure to deposit the first material through the first nozzle. The second powder may also be deposited through the print head. The first and second powders may be simultaneously deposited onto the substrate through the print head.

The negative material may include Tungsten, Zircon, Silicon Carbide, Alumina, WC, or Chromite.

The positive material may include Iron, copper, aluminum, titanium, or a ceramic.

The first and second powders may be deposited at the same time with an interface between the powders where the powders meet.

Mold Printing

FIGS. 67a to 67k illustrate a method and a system for making a part according to an embodiment of the invention.

Figure 67A:
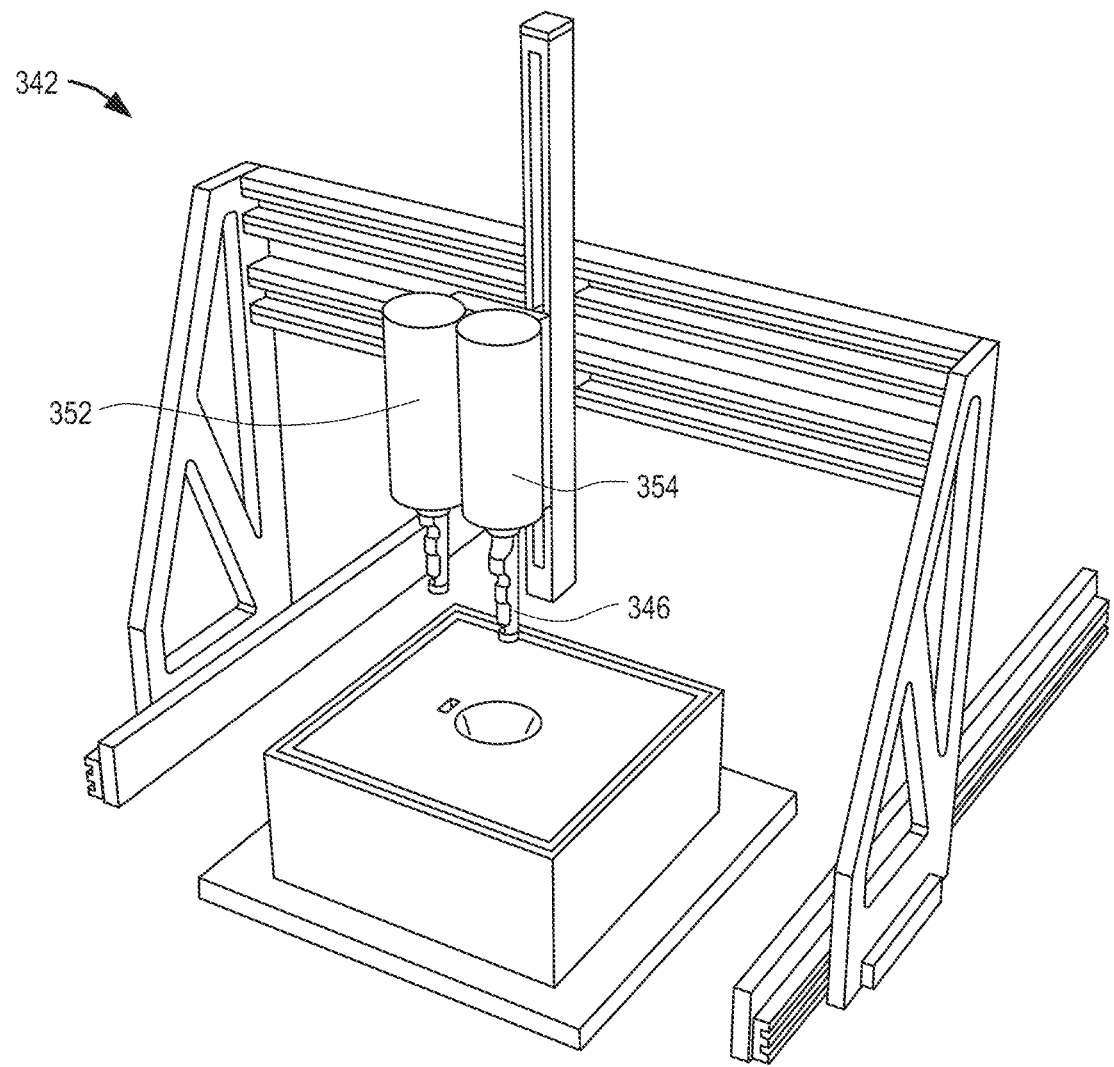
FIGS. 67a-67k are perspective views that illustrate a method and system of making a part according to embodiment of the invention.

FIG. 67a shows a manufacturing system 342 as described with reference to FIG. 41. A mold-forming material is held in the first hopper 352 and a sacrificial material is held in a second hopper 354. A third hopper may also be used for various purposes. For example, a third hopper may hold an envelope material such as sand that forms an envelope from which the eventual mold can easily be removed. The mold-forming material and the sacrificial material are subsequently printed as hereinbefore described with reference to FIGS. 54c and 54d.

By way of a practical example, the mold-forming material includes a granular material in the form of Zircon sand and a binder in the form of sodium silicate. A 40 percent solution of sodium silicate and water is created, and the solution is mixed with the Zircon sand so that the sodium silicate forms approximately 2 percent of the mixture by mass. The Zircon sand is mixed well with the sodium silicate-water solution and the wet mixture is placed in a tumble drying system to remove the water. The resulting powder consists of Zircon particles with sodium-silicate hydrate material roughly coating surfaces of the Zircon particles. The binder activates at elevated temperature above 500° C. such as between 650° C. and 750° C. The sacrificial material includes table salt with a melting temperature of 800° C., which is above the temperature at which the binder activates. Typically, commercial "salt flour" is used instead of commercial table salt. Salt flour is a fine grained version of table salt and has a material added to the NaCl to keep the powder flowing. Commercial table salt may be used for certain applications, although the particle sizes are usually larger than what may be desired for purposes of fast and accurate manufacturing of many parts.

Figure 67B:
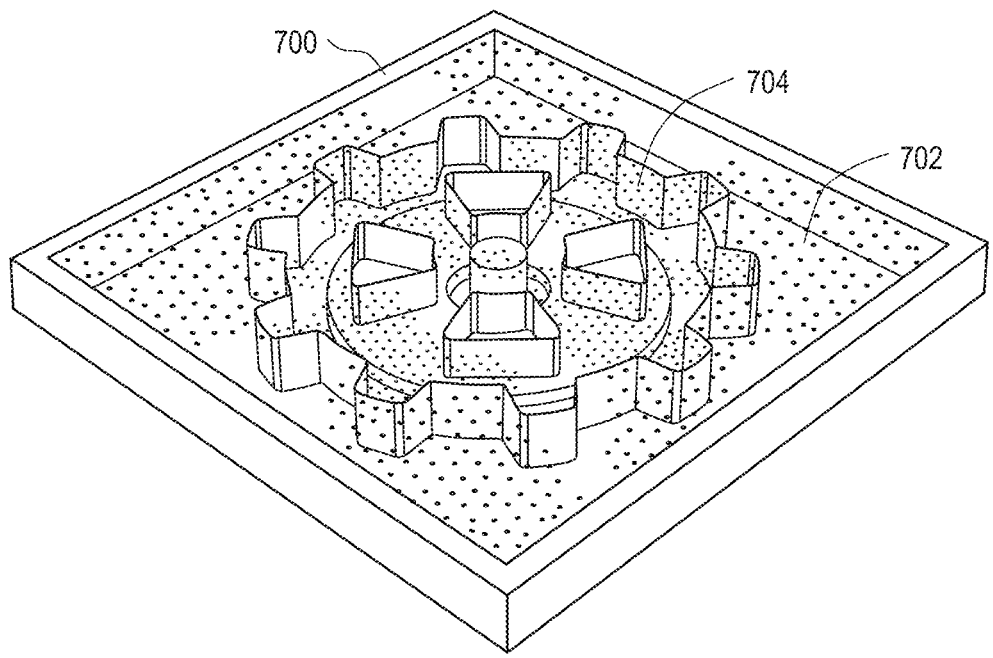

As shown in FIG. 67b, a first layer 700 is printed up to a first height. The first layer 700 includes a first quantity 702 of the mold-forming material from the first hopper 352 and a first quantity 704 of the sacrificial material from the second hopper 354.

Figure 67C:
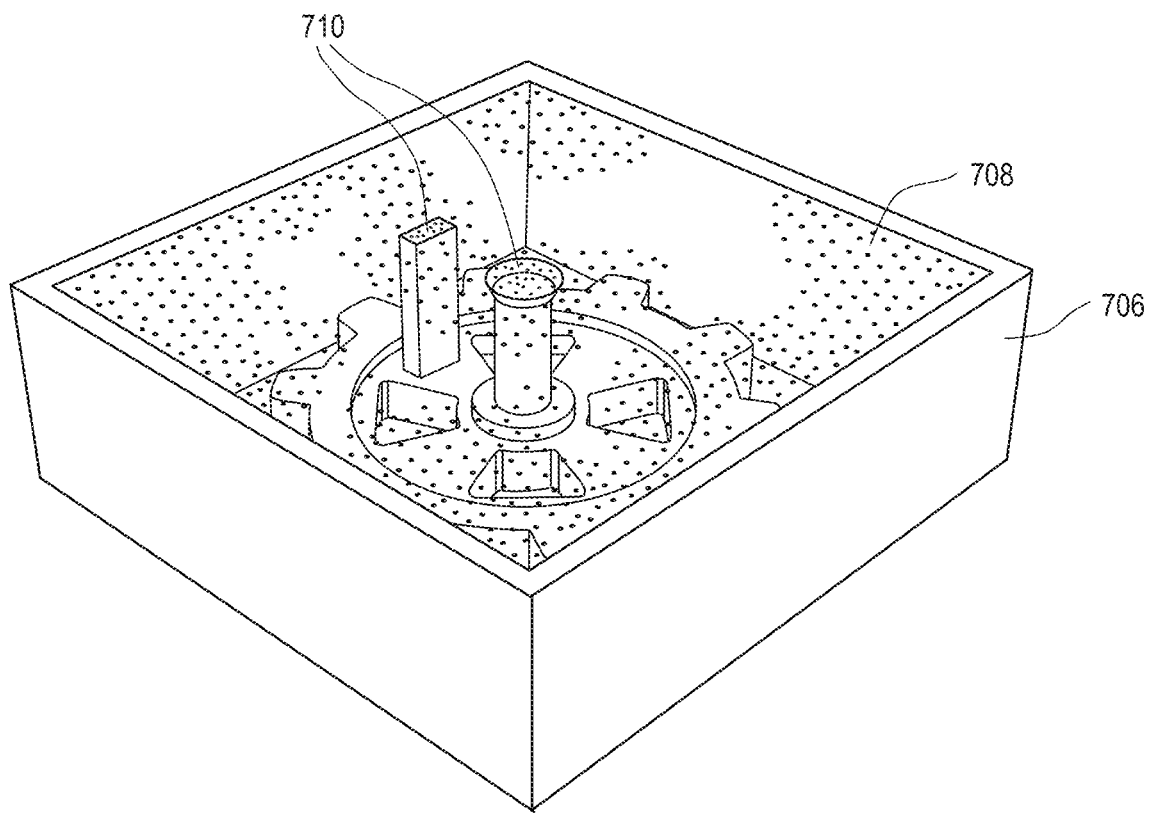

As shown in FIG. 67c, a second layer 706 is formed on the first layer 700. The second layer 706 includes a second quantity 708 of the mold-forming material from the first hopper 352 and a second quantity 710 of the sacrificial material from the second hopper 354.

Figure 67D:
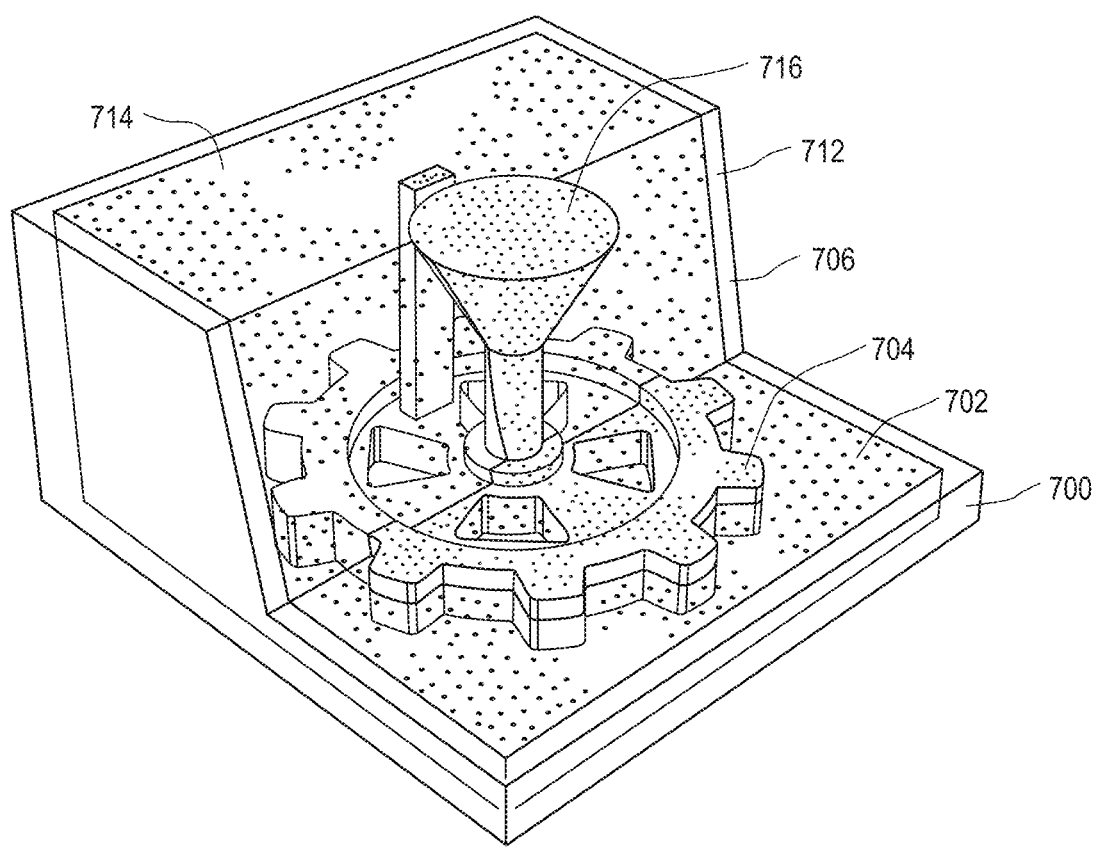

FIG. 67d illustrates a third layer 712 that is formed on the second layer 706. The third layer includes a third quantity 714 of the mold-forming material from the first hopper 352 and a third quantity 716 of the sacrificial material from the second hopper 354.

Figure 67E:
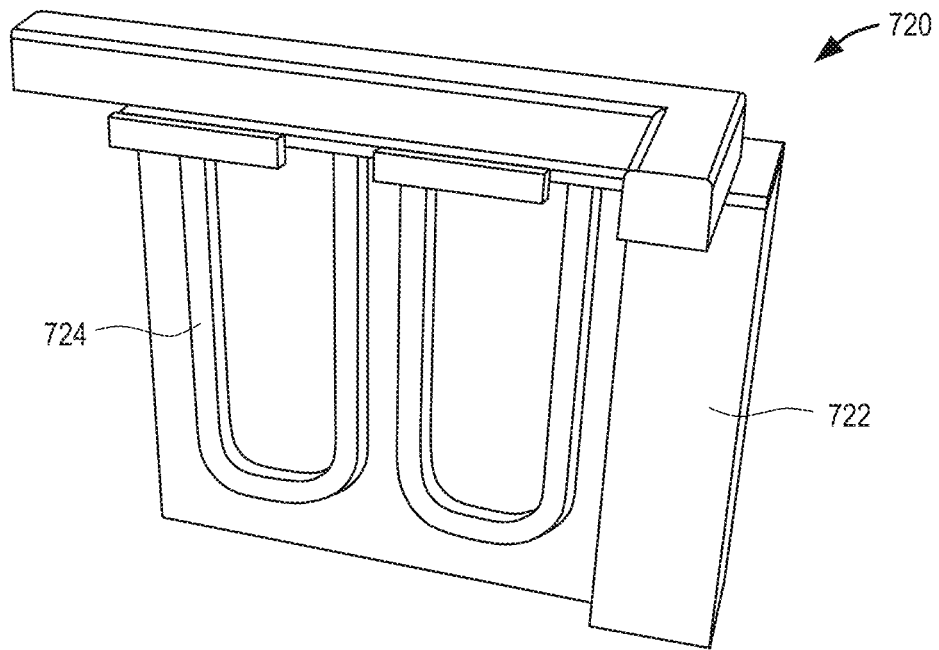

FIG. 67e illustrates a heating structure 720 that includes a body 722 and a heating element 724. The heating element 724 is electrically conductive and has a high resistance so that it creates heat when a voltage is connected over it.

Figure 67F:
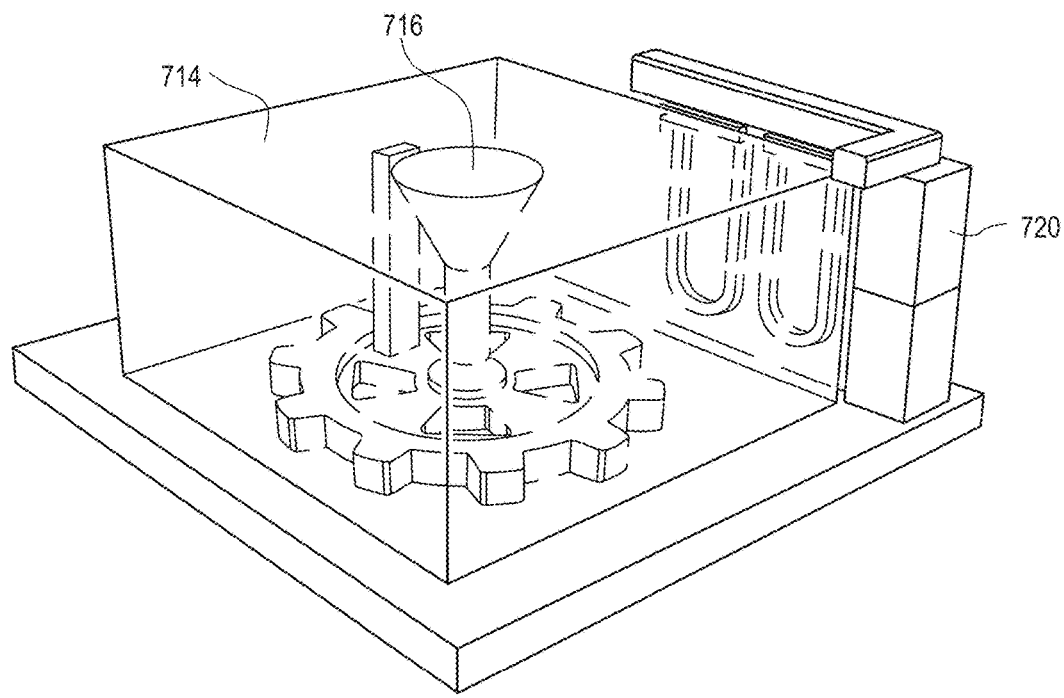

FIG. 67f shows the heating structure 720 that is placed so that it forms a vertical wall adjacent a build collar of the materials that are deposited in FIG. 67d. The materials are deposited in a shape that has a square profile when viewed from above and the body 722 has a shape that fits around one corner of the square shape.

Figure 67G:
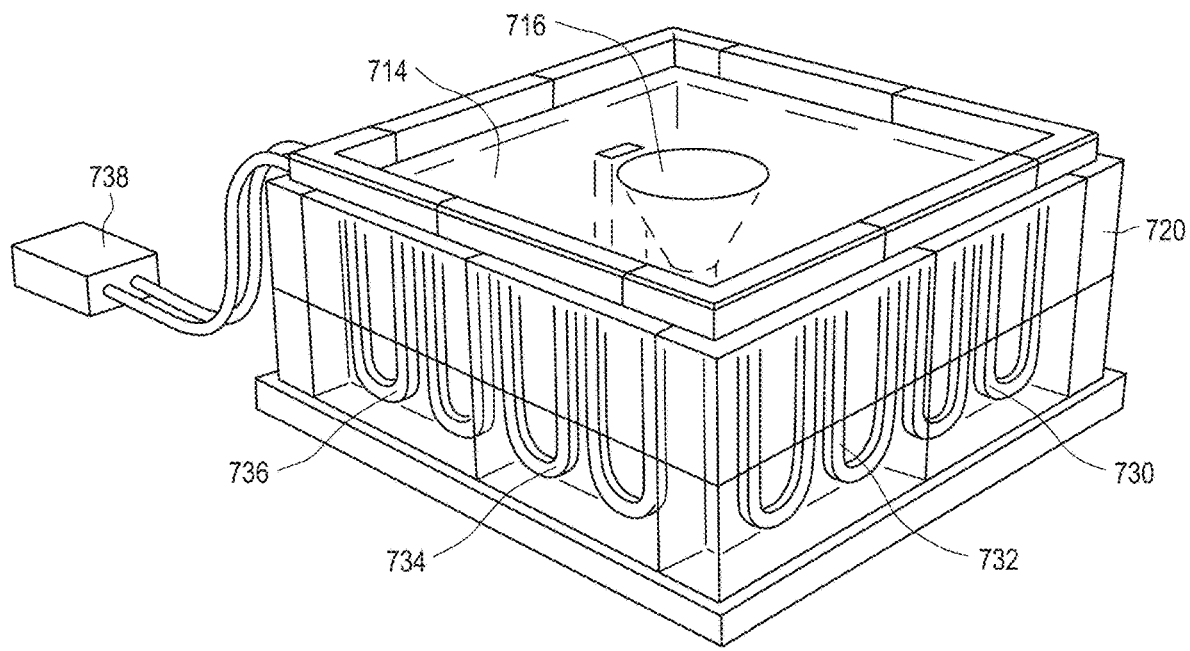

FIG. 67g shows further heating structures 730, 732, 734 and 736 that are positioned around the build collar until the entire build collar is surrounded by the heating structures 720, 730, 732, 734 and 736. Connecting wires (not shown) are then used to electrically connect the heating elements of the heating structures 720, 730, 732, 734 and 736 in series to one another. Electric leads 738 are connected to opposing ends of the circuit formed by the electric elements.

Figure 67H:
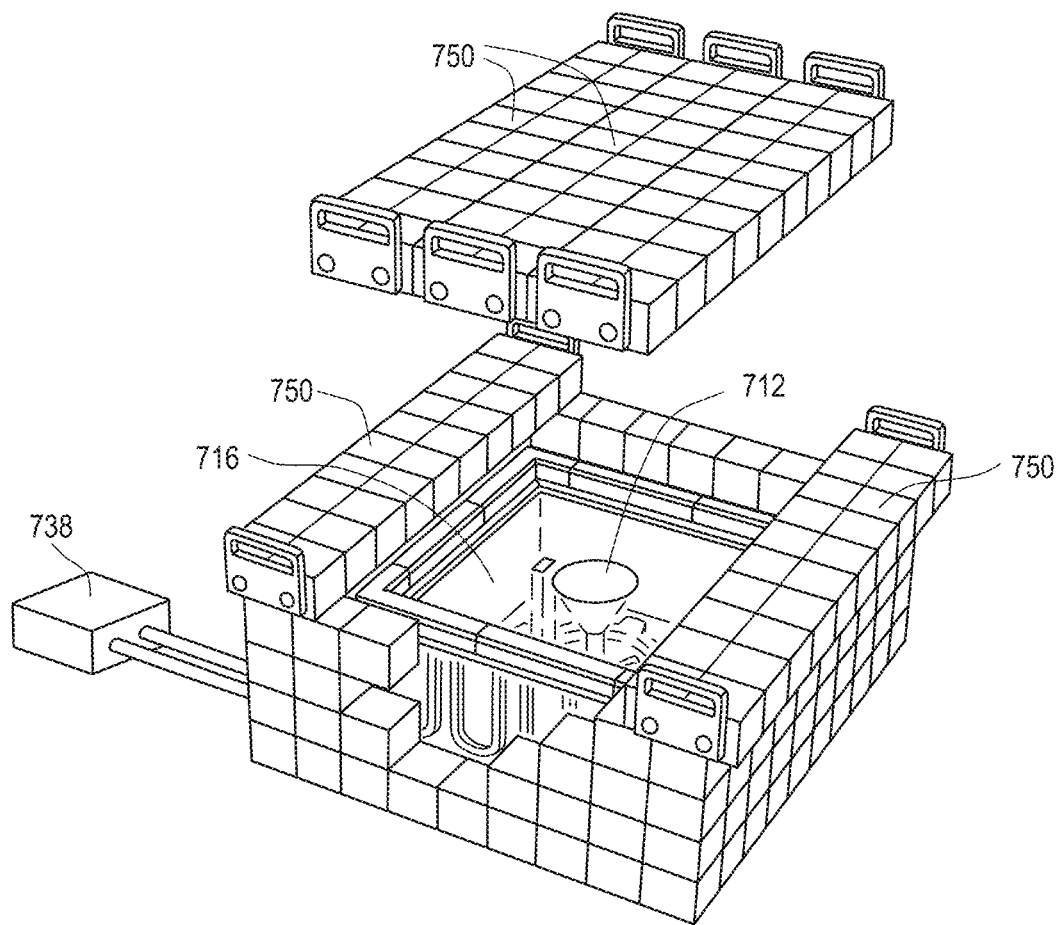
Figure 67I:
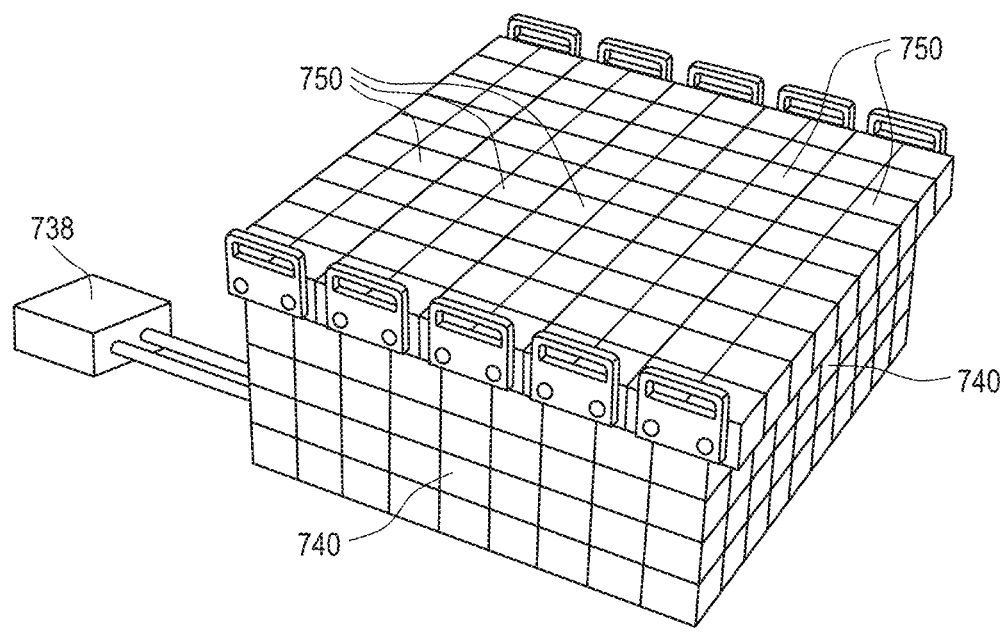

FIGS. 67h and 67i further illustrate a plurality of side refractory bricks 740 and a plurality of top refractory bricks 750 that complete the heating system. The side refractory bricks 740 are located around the heating structures 720, 730, 732, 734 and 736 and collectively form a vertical wall that completely surrounds the assembly shown in FIG. 67g. The top refractory bricks 750 are positioned above the structure that is assembled in FIG. 57d. The structure in FIG. 67d is entirely surrounded and covered by the side refractory bricks 740 and the top refractory bricks 750.

The heating structures 720, 730, 732, 734 and 736 provide a modular solution that is configurable to different shapes and sizes depending on the shape and size of the layers that are deposited in FIG. 67d. In addition, the side refractory bricks 740 are assembled in a modular fashion and come in different sizes to allow for refractory enclosures of different shapes and sizes to be constructed.

A voltage source is connected to the leads 738. The voltage source creates a voltage over each one of the heating elements, such as the heating element 724 shown in FIG. 67e. Heat is thereby created by each one of the heating elements. The heat convects and conducts from the heating elements into the mold-forming material and the sacrificial material. The side refractory bricks 740 and top refractory bricks 750 form an enclosure with a high thermal resistance to keep the heat within the mold-forming material and the sacrificial material.

The mold-forming material and the sacrificial material are heated to a temperature of approximately 700° C. The sacrificial material does not melt. At 700° C., the binder of the mold-forming material is activated and consolidates to form a rigid structure. The voltage source is removed so that the heating elements stop generating heat. The side refractory bricks 740 and top refractory bricks 750 are removed. The mold-forming material and the sacrificial material are then allowed to cool to room temperature. The binder cures so that the binder will hold the granular material of the mold-forming material together when the sacrificial material is finally removed.

Figure 67J:
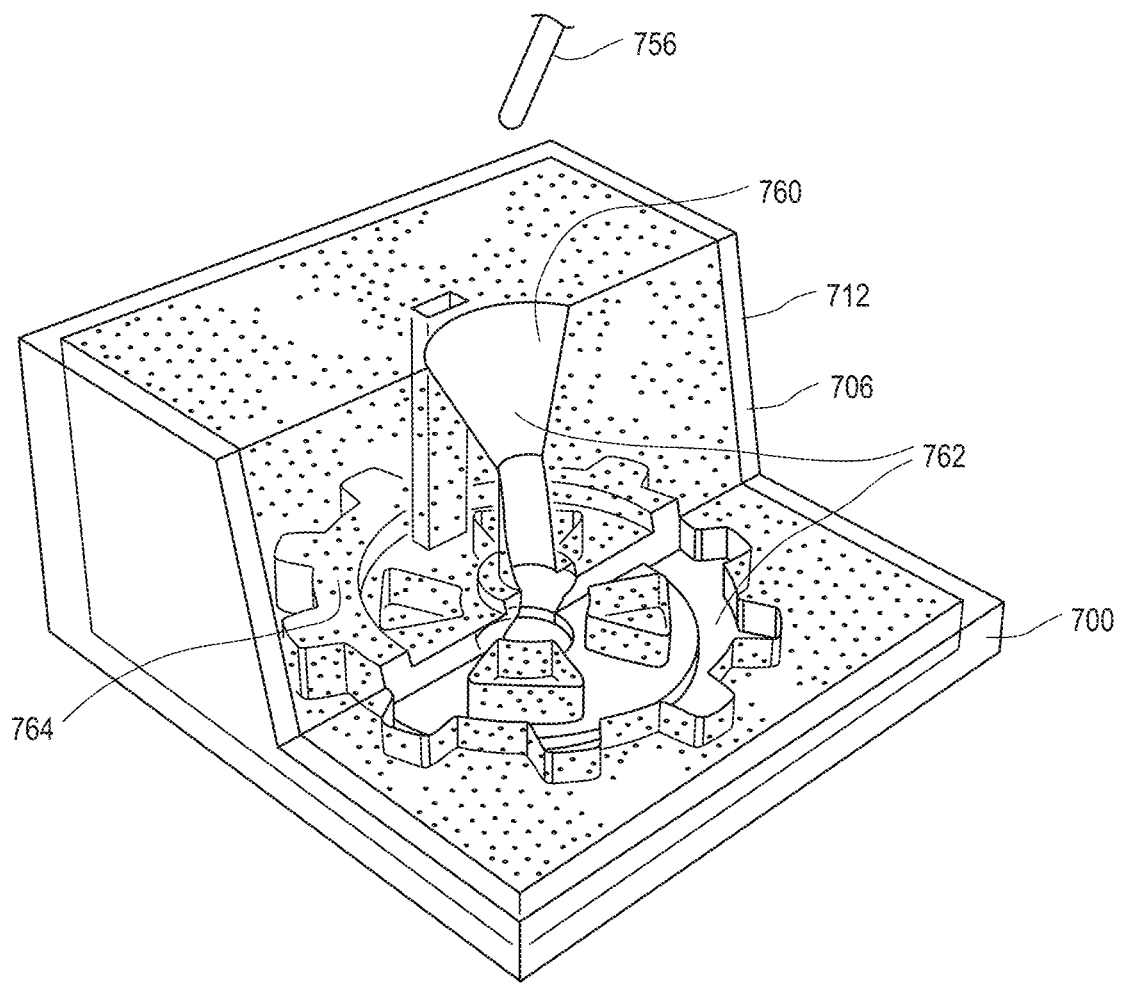

FIG. 67*j* illustrates the structure shown in FIG. 67*d* after the binder has set and the sacrificial material is removed. In the present example, the sacrificial material is table salt, and a removal system may include a water source that has a nozzle 756 that delivers water to the sacrificial material so that the sacrificial material is washed away. When the sacrificial material is removed from the first, second and third layers 700, 706 and 712, a void 762 is left behind. The void 762 has a shape defined by a mold structure 764 that is formed by the mold-forming material of the first, second and third layers 700, 706 and 712.

Figure 67K:
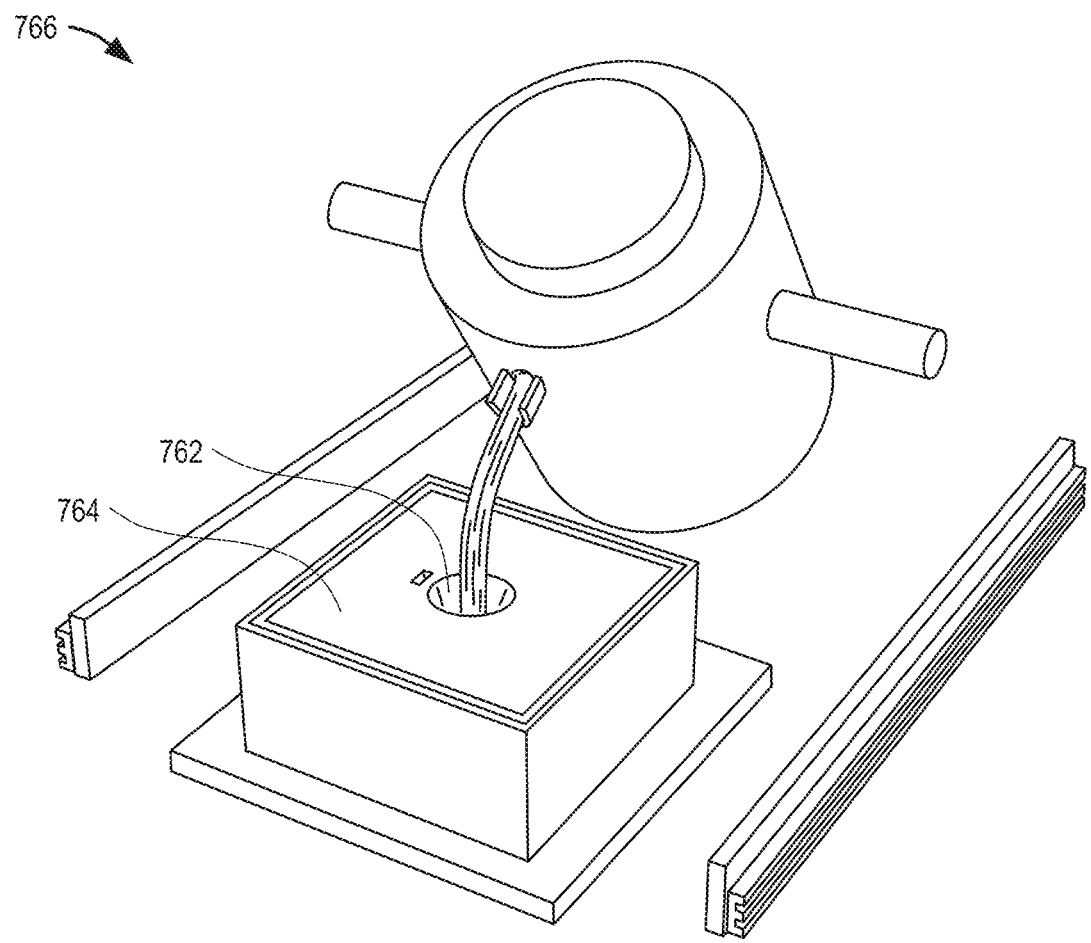

FIG. 67*k* further illustrates a filling system 766 that is operable to fill the void 762 with a part-forming material to form the part defined by the shape of the mold structure 764. The part-forming material is typically a liquid metal. The mold structure 764 has the appropriate flask, screw, gates, and risers that are printed in the process described in FIGS. 67*a* to 67*d* to ensure that the part-forming material fills the void 762 entirely. The part-forming material is then allowed to cool so that it solidifies to form a part. The mold structure 764 is then broken and removed from the part to free the part from the mold structure 764. The final part then has the shape that is defined by the void 762.

Any casting sand such as Zircon, Chromite, Alumina, or material that does not sinter or consolidate at low temperatures such as Tungsten or SiC may be used. In general, a powder is preferred that does not sinter or consolidate to a large extent under the processing conditions that are used to set the mold structure.

Other binders may be used such as polymer binders or meta silicate coatings that can be transformed to carbonates or be melted together to consolidate under various processing conditions. In general, any material that activates (i.e., sinters or consolidates) under the processing conditions to make the mold structure will be suitable as a binder.

In another embodiment, the sacrificial material may serve the purpose of a binder. The sacrificial material may decompose or undergo a phase change to a liquid or a gas that impregnates the mold-forming material. The sacrificial material thus simultaneously leaves the void and enters the mold-forming material. Under controlled conditions, the sacrificial material holds the mold-forming material together at elevated temperatures and may then further strengthen the mold structure when the entire assembly is allowed to cool to room temperature and the sacrificial material returns to a solid state. For example, table salt melts at 800° C. and will vacate the void by flowing into the mold-forming material.

According to a further method, the part-forming material serves the purpose of supporting the mold-forming material and then forming the part. In this case, the part-forming material can be printed together with a mold-forming material as described above and are then heated to a temperature of approximately 700° C. The part-forming material does not melt. At 700° C., the binder of the mold-forming material is activated and solidifies. After the mold-forming material is set, the temperature can be raised above the temperature of that the part-forming material melts. The part-forming material is made of a powder that has particles with voids between the particles. If the part-forming material is a metal powder with a high surface tension, then this material will melt and flow due to gravity. Air within the voids leave the part-forming when the part-forming material melts and the size of the printed part-forming material becomes smaller. As shown in FIG. 67*j*, the void 762 has a lower volume that is needed for the eventual part and an upper volume that provides an excess reservoir of printed part-forming material for purposes of filling the lower volume when the air outgasses from the powder and the total volume of the powder reduces. Upon cooling, the molten sacrificial material solidifies and forms the part. Sacrificial materials that can serve such a purpose are powders made of common casting metals such as Bronze, Copper, Steel, Aluminum or Magnesium or casting alloys that include Copper, Magnesium, Aluminum, Magnesium, Iron or Nickel.

Anticipated Types of Materials

In addition to standard casting alloys, the proposed AM process can be used to fabricate molds for a wide variety of molten metal compositions. This includes, for example, scrap aluminum- or iron-based alloys with non-standard or unknown compositions. While it may be difficult to qualify parts using these scrap alloys, there may be certain applications where the AM fabricated scrap alloy parts are useful.

TABLE 2

Select materials properties of common casting alloys.

| Property | Aluminum Alloy A356 | Aluminum Alloy A380 | Magnesium Alloy AZ91 | Aluminum Bronze C95400 | Tin Bronze C90300 | Steel CF8M (Wrought 316) | Specialty Alloy Invar36 |
|---|---|---|---|---|---|---|---|
| Tensile strength (MPa) | 207 | 324 | 230 | 586 | 303 | 483 | 331 |
| Yield strength (MPa) | 138 | 160 | 160 | 220 | 152 | 207 | 214 |
| Elongation (%) | 3 | 3.5 | 3 | 12 | 18 | 30 | 42 |

Overall, this scalable, open-environment AM system concept has the potential to overcome many of the limitations associated with the additive manufacture of low-volume, highly customized parts. If successful, the proposed AM technology will allow for:

The fabrication of complex monolithic molds from digital instructions using an open-environment thermal processing system that requires no atmosphere control or shielding gas.

The fabrication of molds and parts with a size limited only by the size of the OPL print head CNC positioning system.

The fabrication of casting molds with a very low operations burden due to the autonomous OPL printing process and the single cycle mold consolidation method.

The qualification of parts using well-established qualification parameters used in conventional casting processes.

Figure 68A:
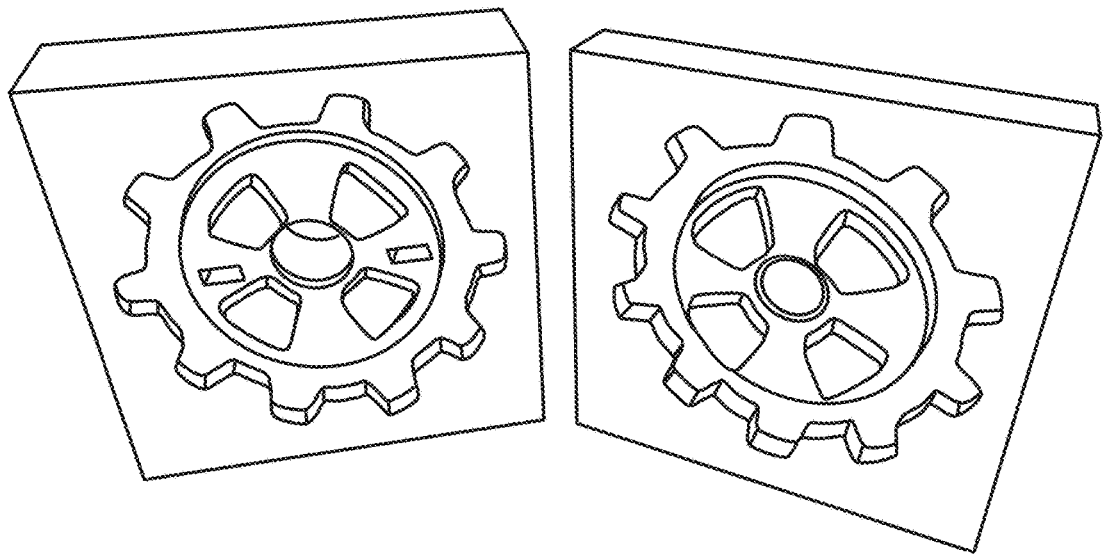
FIG. 68a is a perspective view of the cope and drag of a mold OPL-printed in a build cartridge.
Figure 68B:
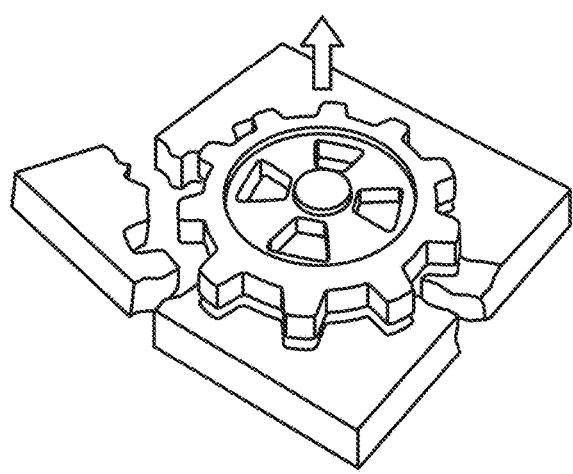
FIG. 68b is a perspective view that shows simple removal of the mold material by hand after the casting process.
Figure 68C:
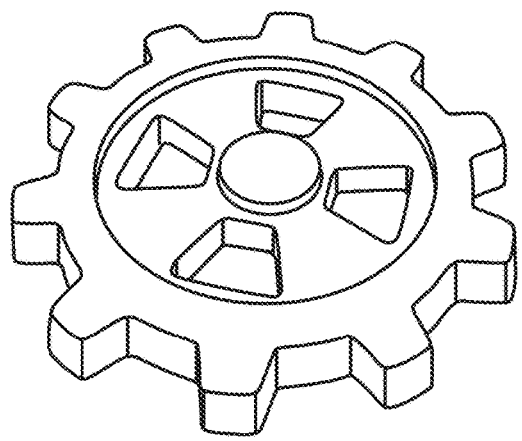
FIG. 68c is a perspective view that shows the as-cast part, after removal of the sprue and risers.

FIG. 68a shows the cope and drag of a mold OPL-printed in a build cartridge that was processed in an open-environment furnace. The cast part is fabricated by clamping the two parts of the mold together and pouring the molten A356 alloy into the central funnel. FIG. 68b shows simple removal of the mold material by hand after the casting process. The as-cast part, after removal of the sprue and risers, is shown in FIG. 68c. With the exception of the 3D printing of the mold, this process is analogous to conventional sand casting using a pattern for the desired part shape.

Negative Materials

Any casting sand, Zircon, Chromite, Alumina, Tungsten, SiC

In general, and powder that does not sinter or consolidate to a large extent under the processing conditions to set the mold or fabricate the part.

Positive Materials

Metal powders, copper, steel, aluminum, magnesium, alloys of Al, Mg, Fe, Ni, and other metals Coated materials, tungsten coated with Ni or Cu, casting sands coated with a binder (which can be organic or ceramic), water-soluble materials such as NaCl.

In general, any material that sinters or does not sinter, but retains its shape to form a part.

Special Positive Material

In general, this material sinters or does not sinter under conditions that set the mold (auxiliary) material. At a specified condition however (high temperature, different pressure, exposure to another material, exposure to an energy source) this material undergoes a phase change such that the material vacates the body of the mold set by the other materials. This could be a solid-to-liquid or solid-to-gas transition.

Embodiment: Zircon (Negative Material)

Zircon coated with some percentage of sodium silicate (auxiliary material)

Sodium chloride (positive material) melts at ~800 degrees Celsius

A number of other molten salt materials can be used as long as the melted material has limited solubility and/or reactivity with the negative and/or auxiliary powder, which could lead to the degradation of the mold.

Auxiliary Materials

Binders include polymer coatings or sodium silicate (meta silicate) coatings that can be transformed into carbonates or simply melted together to consolidate under the processing conditions (chemical or thermal).

Example 1: Zircon sand mixed with 2% sodium silicate (40%) solution. Mix well and place wet mixture in tumble drying system. The resulting powder is zircon with sodium silicate hydrate material roughly coating the outside. This material sets the mold at elevated temperatures in air or under carbon dioxide.

Example 2: Zircon sand mixed with 2% sodium silicate (40%) solution. Mix well and place wet mixture in tumble drying system. The resulting powder is zircon with sodium silicate hydrate material roughly coating the outside. This material sets the mold at room temperature upon exposure to organic esters (e.g. ethylene glycol diacetate).

Inductive and/or Resistive Sensor for In-Situ Metal Infiltration

FIGS. 69a-69d show the multi-material in-situ infiltration process described previously with reference to FIGS. 48a to 48d. In this example, the two powders are iron and copper. The iron powder, with the higher melting point, is the sintered skeleton, and the copper is the infiltrant material. See FIGS. 48a to 48d, for a more complete description. Note: there is contact between the loose "skeleton" powder and the "infiltrant" powder during the OPL print. This contact serves as the conduit for the "infiltrant" powder to flow into the "skeleton" powder at temperatures above the melting temperature of the "infiltrant" powder.

FIGS. 69a-69d show the location of electrical sensors 860 and 862, which can be placed in the build cartridge before the printing process, or after the print is complete. In each case, a resistive or inductive sensor can be positioned to monitor the electrical resistance of the "skeleton" or "infiltrant" metal. The electrical properties of the powders will change significantly with sintering and melting, and these can be detected by monitoring the response from the resistive or inductive transducer.

The transducers are shown as electrically connected in FIGS. 69a to 69d, but properly designed inductive transducers can be used to monitor the changing electrical impedance of the powders without being in direct contact to the material.

A sensor positioned to measure an electrical impedance over the first particles with or without an additional infiltration system. The sensor preferably measures the electrical impedance as the electrical impedance changes. The electrical impedance may change over time as the first particles are connected to one another.

Specifically in an infiltration system such as shown in FIGS. 69a to 69d, the first particles are of a first material and connecting the first particles leaves voids within the first material and the system further includes a first holding structure for holding the first particles within a first volume, wherein the first particles are of a first material and connecting the first particles leaves voids within the first material, a second holding structure holding an infiltration material within a second volume, and an infiltration system directing the infiltration material into the voids so that the second material infiltrates the first material, wherein the electrical impedance changes over time as the infiltration material infiltrates the first particles.

Powder Toolpaths Optimized for Speed or Efficient Use of Powder

In general, most AM systems use a single material in the powder bed. As the build progresses, a new layer of powder is spread across the surface of the bed. This powder is typically consolidated using laser, electron beam, or a number of other high energy density methods. Part precision is achieved by using a high localized energy source to fuse the individual particles together.

Figure 70:
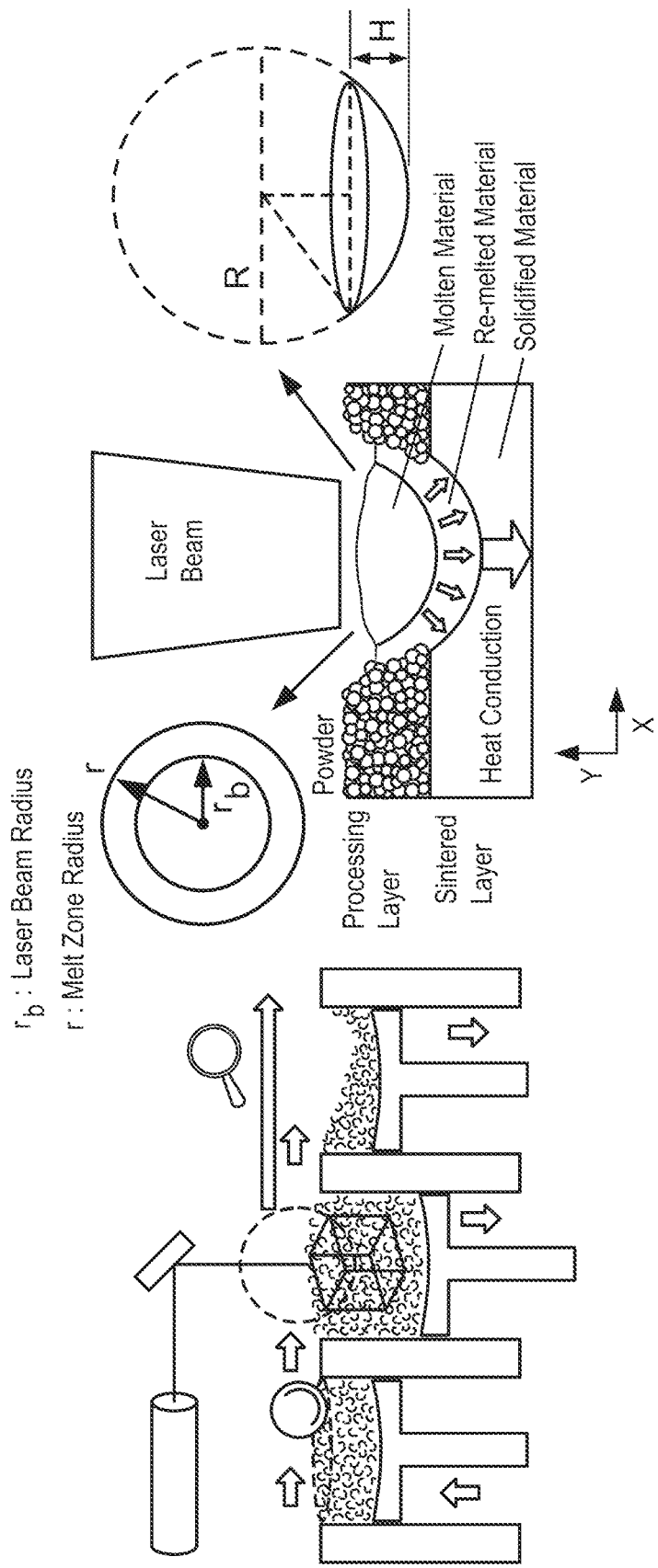
FIG. 70 is a cross-sectional side view of a prior art additive manufacturing system that uses a laser to sinter/melt the powder in the powder bed.

FIG. 70 shows a generic additive manufacturing system that uses a laser to sinter/melt the powder in the powder bed. As mentioned previously, the focused energy source is used to fuse the powder with high precision. In most AM systems, the powder bed consists of a single material. As powder beds increase in volume, more and more powder is required to fill the powder bed. The aspect ratio of the part being fabricated determines the overall efficiency of the powder use in the powder bed. A 1 m long thin rod, for example, uses almost no volume of a 1 m^3 powder bed, but the entire bed must be filled in order to fabricate the part. This is in contrast to a 0.75 m cube, which uses most of the powder bed during the build.

Metal powders suitable for use in AM systems must have a specific particle size distribution in order to absorb energy and fuse properly during the fabrication process. These powders are expensive to produce, since many methods used to synthesize the powders have a very broad particle size distribution. Thus, after synthesis, the as-made powders must be sieved to remove all material that cannot be used in the powder bed. This adds considerable cost to the powders. In addition, it is well known that "recycled" powders (powder in the powder bed that is not fused during AM) can only be re-introduced into the powder bed a finite number of times before the results become unpredictable.

Multi-material deposition in the powder bed allows for the efficient use of powder in AM systems by only depositing the high cost powder in regions where the powder will be fused. This can eliminate, in principle, all use of recycled powders in the additive manufacturing process.

Figure 71:
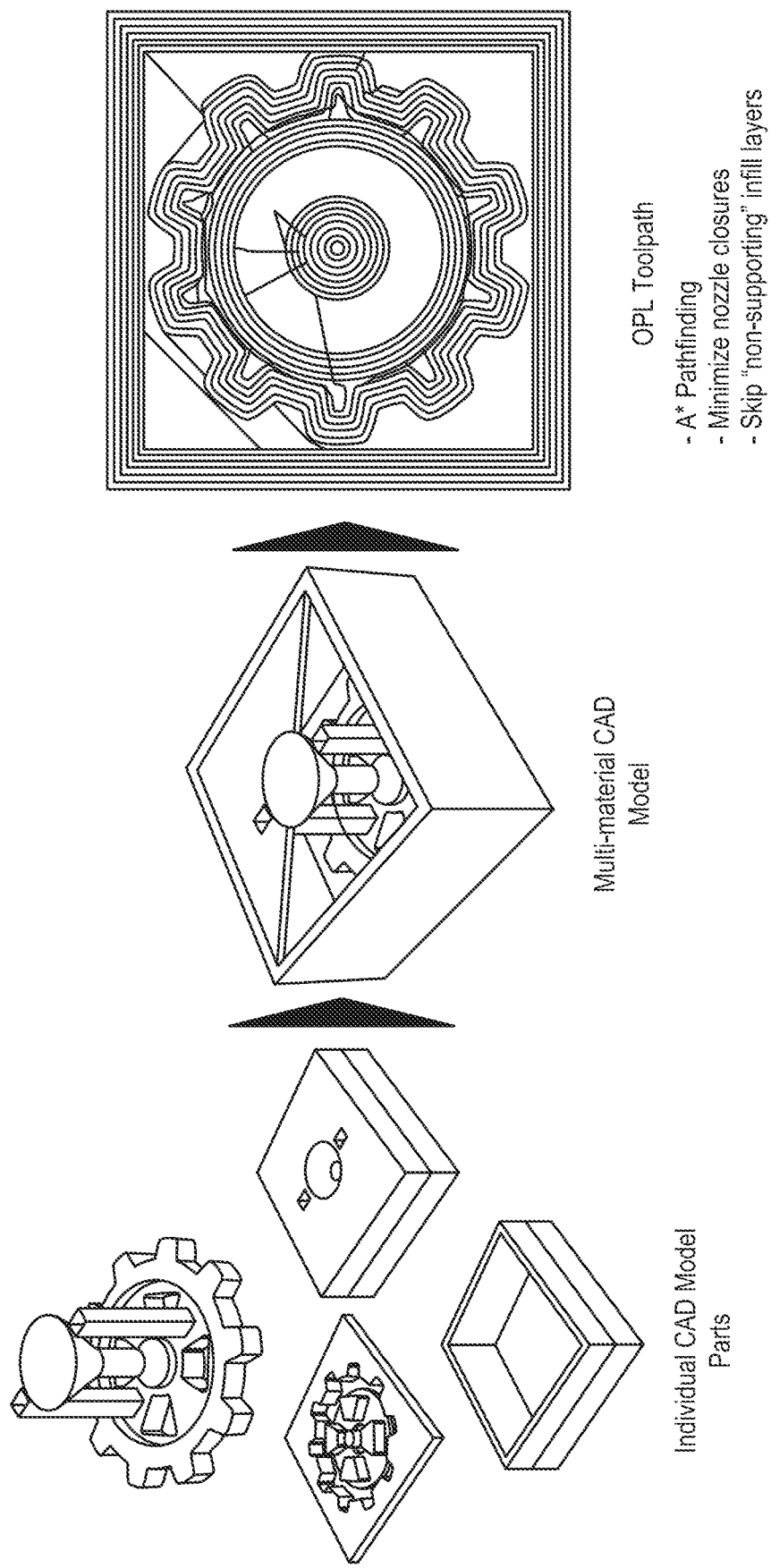
FIG. 71 is a partial perspective view and toolpath that shows an additive manufacturing system that uses a laser to sinter/melt the powder in the powder bed.

FIG. 71 shows the general process used to generate toolpaths for multi-material additive manufacturing. Multiple components are assembled together into a 100% filled structure, which is sliced along the vertical axis. This stack of slices describes the entire AM build, as is well known in the field.

Figure 72A:
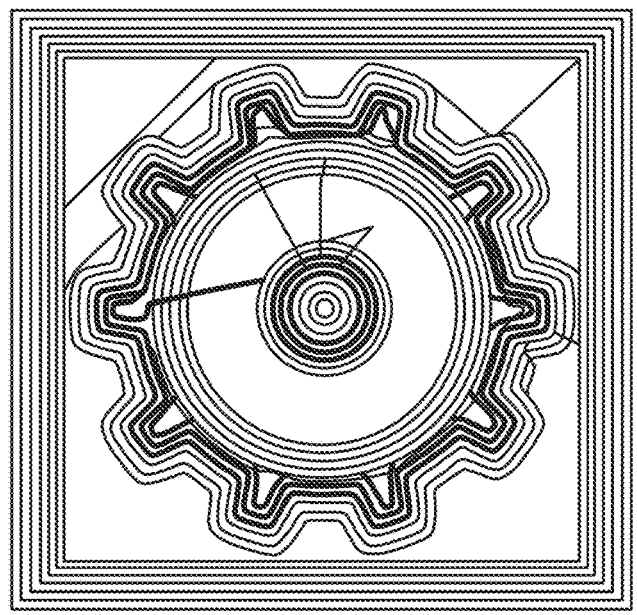
FIGS. 72a and 72b and 73-77 are tool paths according to alternate embodiments.

If the diameter of the OPL nozzle is small enough to describe the features in each slice, then the nozzle can trace out the part and replicate the overall geometry. This is shown in FIG. 72a, in which the small 3 mm nozzle diameter can be used to trace out the exact features of the part.

Figure 72B:
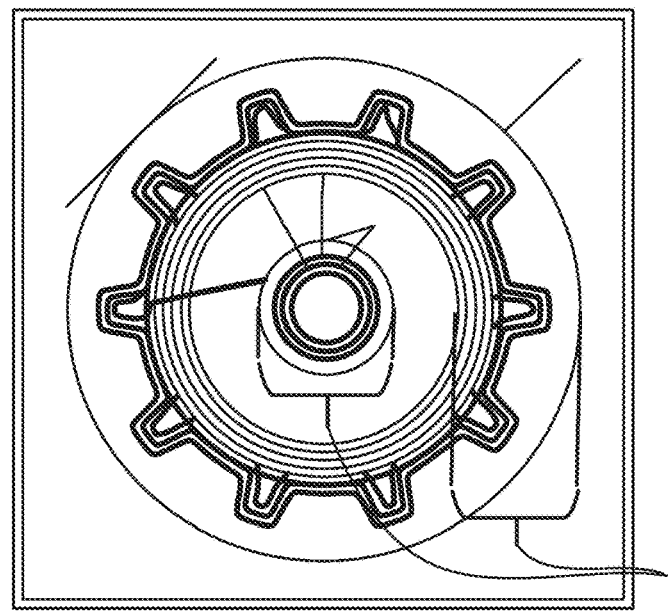

A large nozzle diameter, however, is not capable of tracing out the details of the part, but is capable of depositing powder in areas that the part is. This is shown in FIG. 72b. In this case, a 25 mm nozzle is used to deposit powders in this slice. Instead of tracing the details of the gear shape, it is much faster to simply print a "donut" shape over all of the necessary areas so that the gear is "covered". The gear shape can then be fused using the focused energy source that traces out the details of the gear. Clearly, this is less efficient with respect to the powder usage, but it is also much faster to deposit this shape with a large printhead as compared to tracing out the exact geometry of the part with a smaller printhead nozzle. There will always be a balance between powder efficiency and print speed, which must be balanced in any additive manufacturing build.

Figure 73:
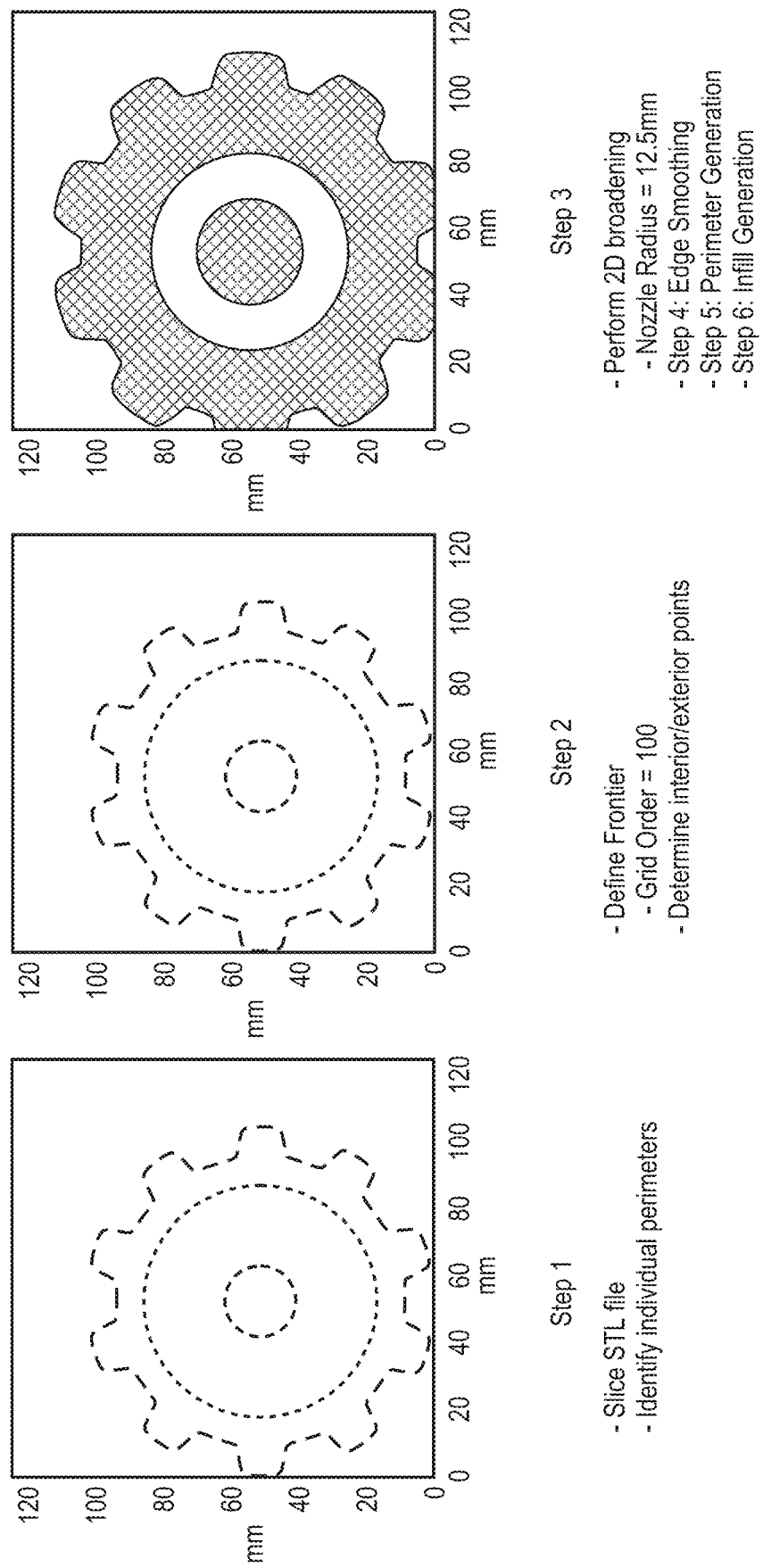

FIG. 73 shows a method to generate a simplified toolpath using the sliced data from a multi-material build. In step 1, the part is sliced along a specific direction and all perimeters of the build are determined. In step 2, a two dimensional grid is generated that covers all of the area encompassed by the perimeters. The dots are too small and too close to the features shown in Step 1 to be illustrated in Step 2. Some dots fall inside of the features illustrated in Step 1 and some dots fall outside the features illustrated in Step 1, to form a shadow-like fill inside and outside of the features. This grid can be uniform in [X, Y] positions, or it can be non-uniform with a higher density of points near regions of the slice with a lot of features.

A ray tracing routine can be used to determine which points in the grid are "inside" or "outside' of the perimeters. This is accomplished by counting the number of times a perimeter is crossed from a point well outside the build to the grid point in question. After the internal grid points are determined, a 2D convolution can be performed that effectively "broadens" the features of the slice. This is shown in Step 3 of FIG. 73, where it is seen that many of the features of the gear have been "blurred" by the convolution.

Figure 74:
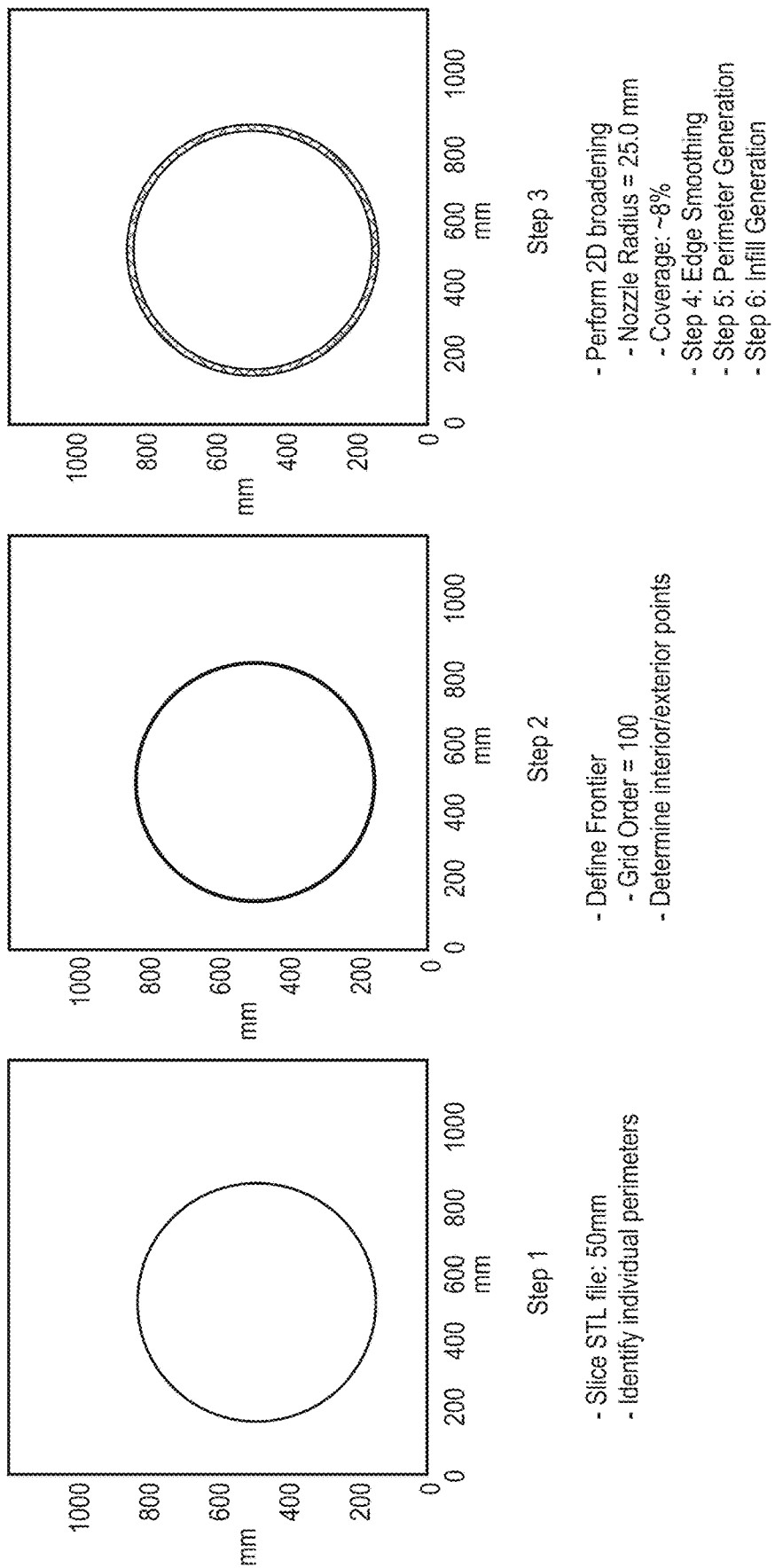

The next few figures show the degree of efficiency of powder usage as a function of 2D broadening and feature size. In FIG. 74, a simple circle is shown in the sliced file. With a broadening of 25 mm, this area only represents about 8% of the total surface of the powder bed. In addition, as shown in Step 3, this region can be printed quickly with a single circular pass over the circular area. This efficiency can only be achieved using a multi-material powder deposition system like OPL; a conventional powder bed would use approximately 12 times the powder in that layer to achieve the result.

Figure 75:
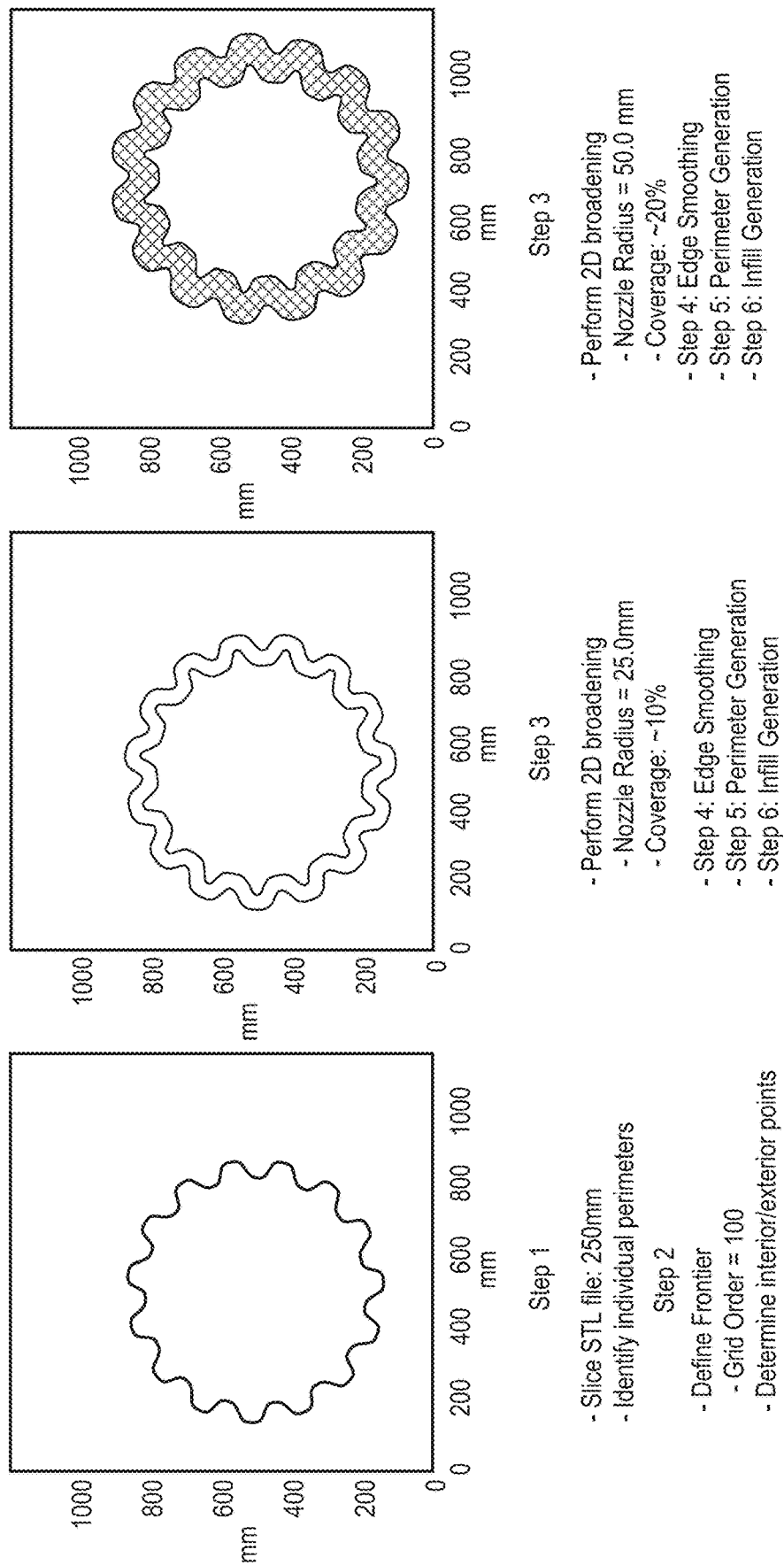

FIG. 75 shows a similar result, except that the features are more pronounced in this slice of the part. The middle Step 3 (Step 2 is omitted in the Figure and Step 3 is shown as two of Step 3) of the figure shows the 2D broadening of the image with a 25 mm nozzle. This results in a 10% coverage of the total area, but a number of turns in the toolpath. All rapid changes in velocity of a toolpath require significant deceleration/acceleration sequences, which significantly reduce the average speed of the printhead. Preliminary results suggest that rapid velocity (i.e., directional) changes in a toolpath can reduce the average print speed by a factor of 5 or greater. Thus, it is important to minimize the overall changes in velocity in order to maintain a high average print speed. By further broadening the toolpath as shown in the far right Step 3, the efficiency of powder usage decreases, but the average speed of the print will increase. The speed can be further increased by removing the "wavy" perimeter values from the toolpath and further reducing the complexity of the image to something similar to the "donut" shown in FIG. 72b. This will further decrease the powder efficiency, but with significant improvements to the print speed.

Figure 76:
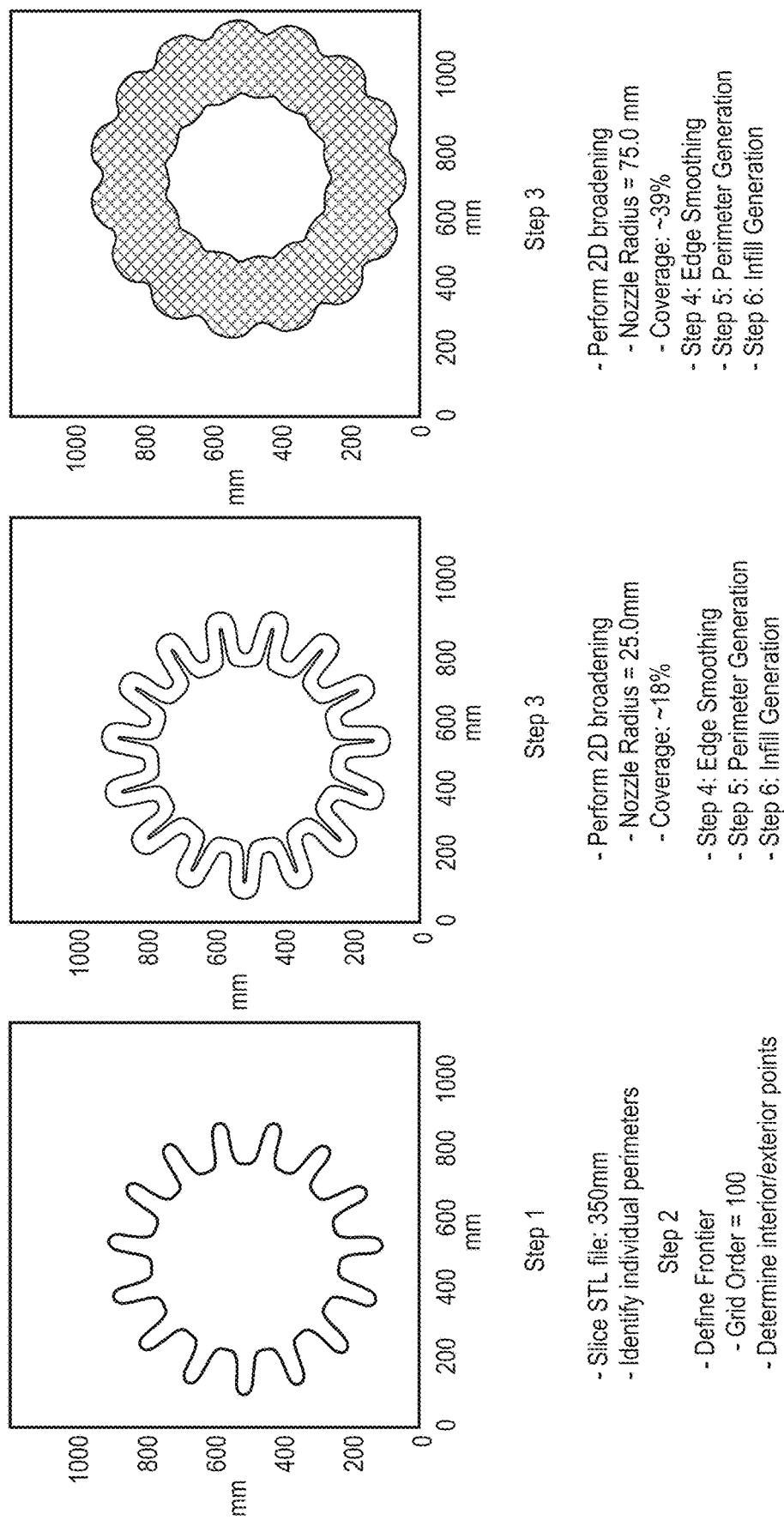

In general, the reduction of image complexity in the sliced build instructions used in additive manufacturing will result in a much improved print speed with only a minor loss in powder use efficiency. FIG. 76 shows an extreme example of the benefits of 2D broadening. In this case, there are many severe turns in the toolpath. Most, if not all, of the turns can be removed by first broadening the image and smoothing the remaining perimeters to, once again, form a "donut" image around the complex toolpath.

Figure 77:
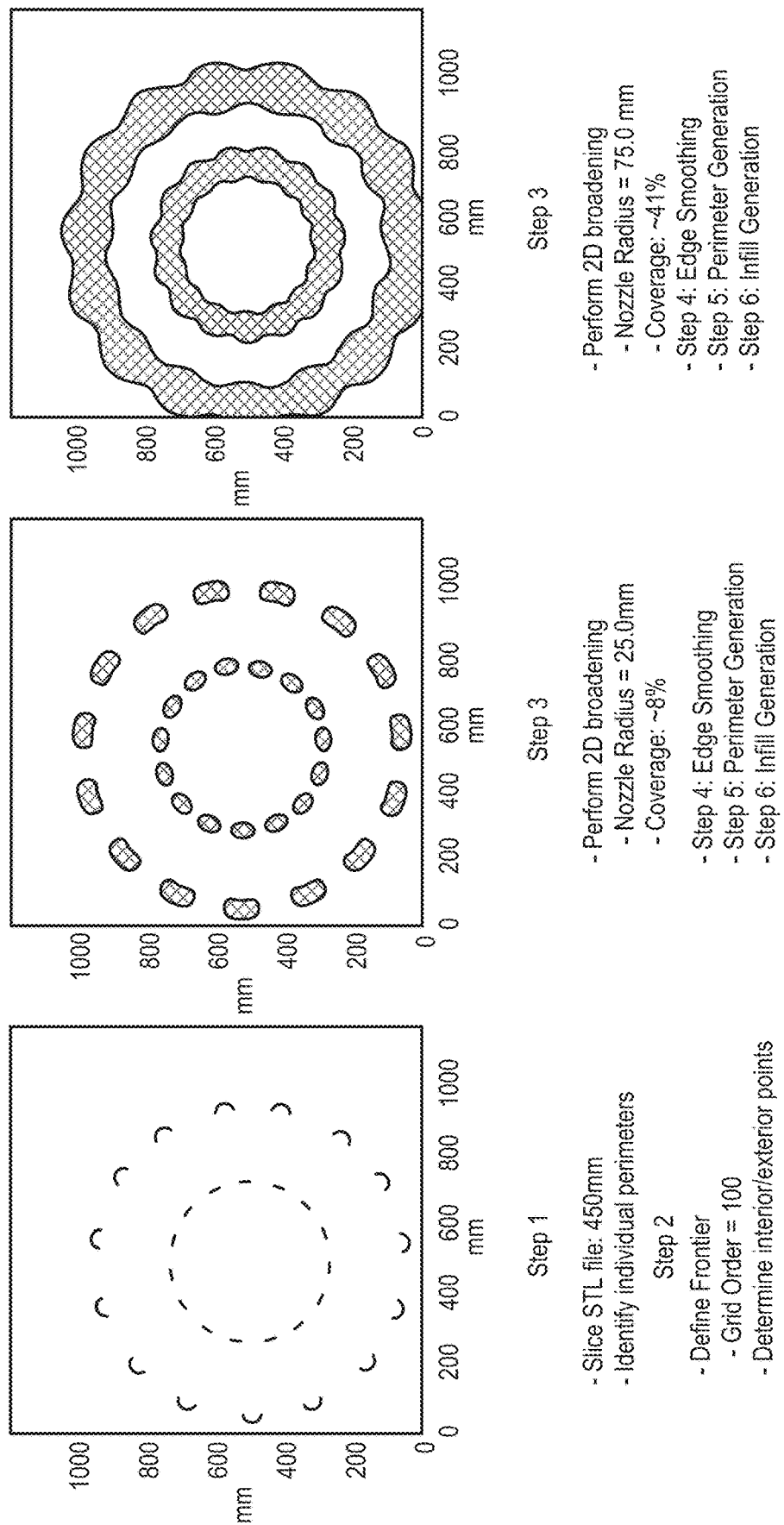

FIG. 77 shows another extreme case in which there are many distinct sections in the slice; all of which have some level of detail. In this case, the fastest method to cover the area is to both broaden the image and then connect all of the possible sections to make the minimum continuous section of material. Nozzle closures are time consuming and inefficient, similar to rapid changes in the printhead velocity. The far right image on FIG. 77 shows the connected 2D broadened area, which is inefficient in powder usage, but much easier to print. Again, this toolpath would be optimized further by removing the remaining undulations in the perimeters. In the end, this pattern would represent two roughly concentric "donuts" similar to the image shown in FIG. 72.

An additive manufacturing system that incorporates multi-material deposition and a focused energy source (e.g., laser, electron beam, etc.) is optimized by minimizing the use of expensive powder in the powder bed and minimizing the total pathlength in the toolpath through the use of larger powder nozzles and a toolpath based on a "broadened" sliced image.

Build precision is achieved by the toolpath of the focused energy source and not the toolpath of the selective powder deposition system.

Image broadening in this context was described as a 2D convolution, but this broadening can be achieved in a variety of ways. For example, filtering the high frequency components of a 2D Fourier transform of the image will remove many of the detailed features in the inverse transform.

Figure 78:
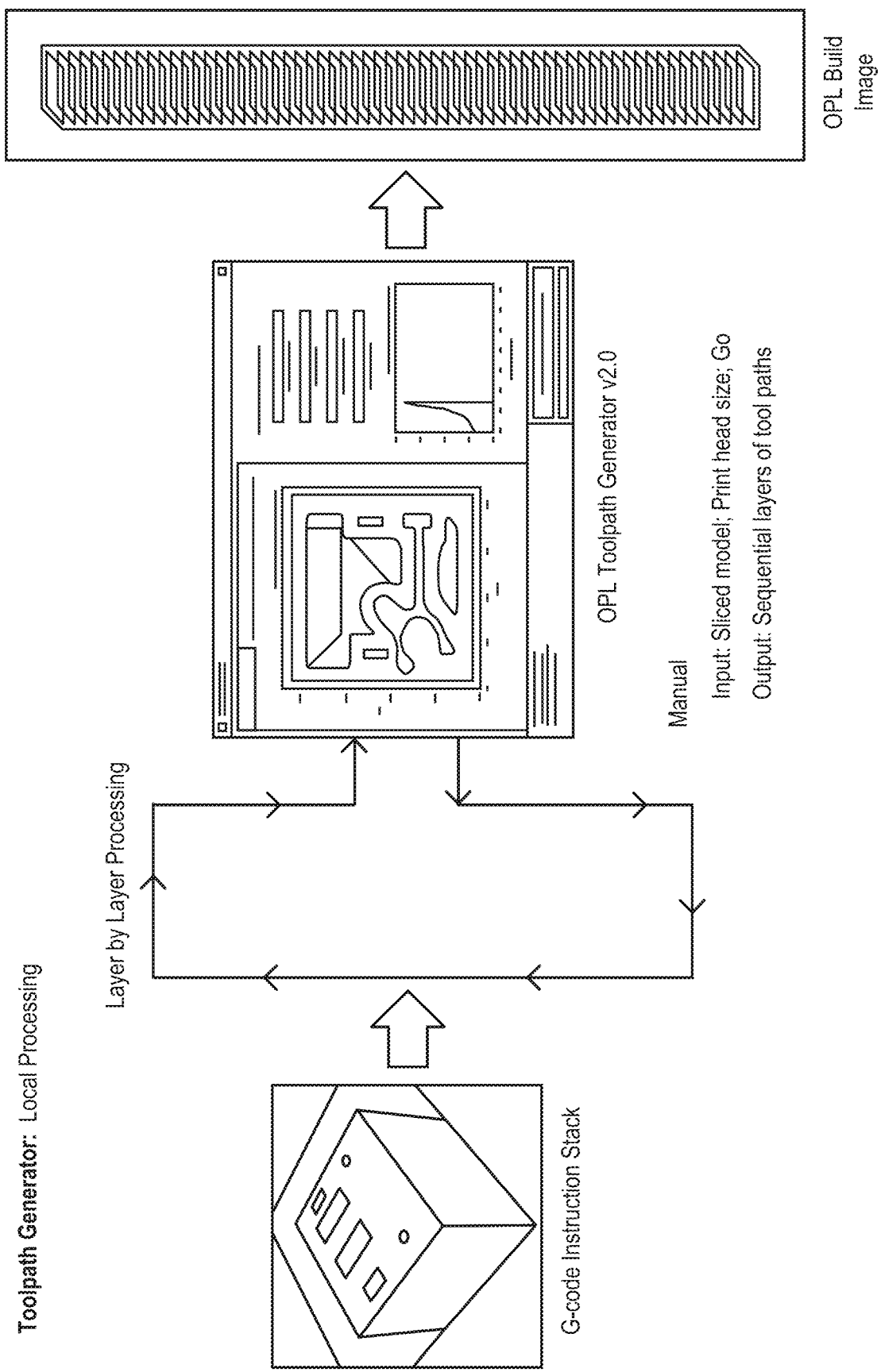
FIGS. 78-80 are schematic diagrams of a tool path module that is executable by the processor or processors to generate tool paths for an OPL build.

FIG. 78 shows the general method of solving for the OPL toolpath in an additive manufacturing process. A sliced g-code instruction stack is sent to the OPL toolpath generator program, which optimizes the overall path using A* pathfinding routines. Each layer is independent of the other layers and the algorithm simply solves for the toolpath in each successive layer.

This is a serial process and the time it takes to solve the toolpath increases significantly with build size and complexity.

Figure 79:
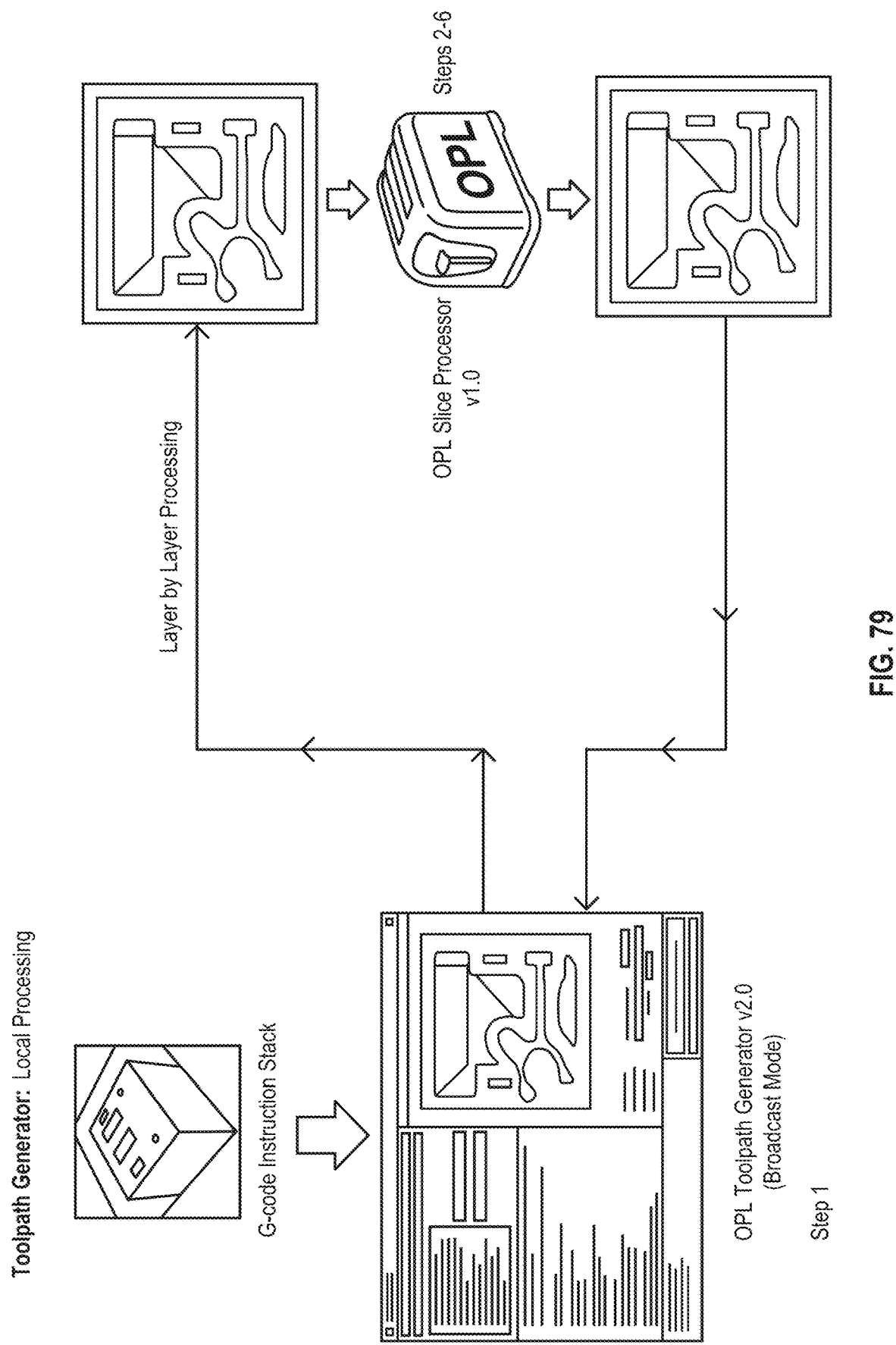

FIG. 79 shows the process of solving for the OPL toolpath remotely. In this process, each layer is sent to a detached program called a "slice processor". The slice processor processes each slice of the build and sends that build back to the Toolpath Generator program, which simply manages the overall arrangement of the slices. An advantage of this method is that essentially all of the calculations occur within the remote processing on the slice processor, and not on the computer with the Toolpath Generator program.

Figure 80:
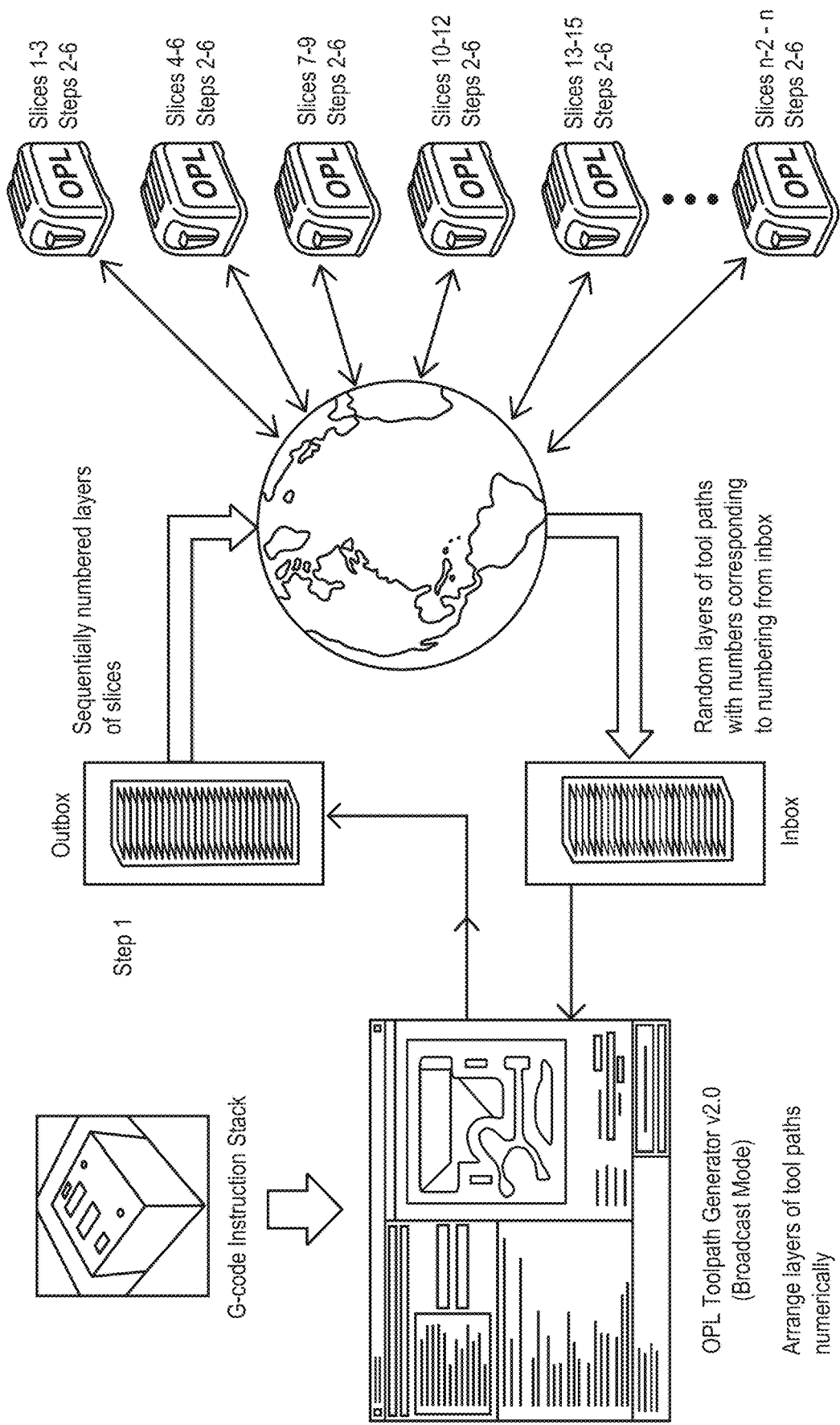

FIG. 80 shows the process of solving for the OPL toolpath on a distributed network. In this process, layers are broadcast to many slice processors that could be located anywhere on the network. These slice processors all work independently on the slices and send the final back to the main program when each slice is finished. In this example, the slices are sorted in an Inbox before delivering them to the control program.

In principle, with enough slice processors, this process should take only as long as the longest time to solve for any individual slice. This will decrease the time it takes to generate a toolpath by many orders of magnitude, which will be more and more important as the powder bed build size of AM systems continues to increase.

Non-local processing can occur on the internet, or even within a local network.

This is also a highly secure method of toolpath generation because no individual layer contains much information about the total build. It is only when fully assembled that the entire build is known.

Added security occurs if the original sliced image is first broadened before sending out to the slice processors. As discussed previously, fine details in the image should be removed in order to increase the average print speed.

A manufacturing system will typically include a computer including a processor or processors, a computer readable medium connected to the processor or processors and a set of instructions on the computer readable medium. The set of instructions will include a CAD model storing module for storing a 3D CAD model with details of the part, and a tool path module for developing a tool path based on the 3D CAD model, wherein the tool path module is executable by the processor or processors to carry out a method including generating a plurality of 2D slices from the 3D CAD model, each 2D slice having at least one slice perimeter (FIG. 73: Step 1), performing, for each 2D slice, a 2D broadening of the perimeter based on a nozzle diameter to determine a broadened slice (FIG. 73: Step 3), and generating, for each 2D slice, an infill of the broadened slice to form a print path of the tool path (FIG. 73: Step 6), and a build module that assembles the 2D slices after generating the infill for each 2D slice (FIG. 78).

The method includes receiving the nozzle diameter, the nozzle diameter being manually selectable (FIG. 78: "Print head size").

The method includes defining, for each 2D slice, a frontier based on the perimeter and a grid order, the frontier having interior and exterior points, wherein the broadening is based on the frontier (FIG. 73: Step 2).

The method includes edge smoothing, for each 2D slice, the broadened slice (FIG. 73: Step 4).

The method includes generating, for each 2D slice, a broadened perimeter based on the broadened slice after edge smoothing the slice (FIG. 73: Step 5).

As seen in FIG. 78, the toolpath module, in addition to a sliced model, receives a manual input and a print head size and "Go". The toolpath module then automatically executes steps 1 to 6 for each slice and provides a layer of a toolpath. The toolpath module automatically numbers the slices sequentially and reassembles the resulting layers in the same sequence to provide an output of the OPL build.

The tool path module may be distributed for execution between a first processor and a plurality of second processors, wherein the first processor generates the plurality or 2D slices and each second processor performs a broadening of at least one of the 2D slices (OPL Toolpath Generator in FIG. 80).

The 2D slices are assembled by the first processor (OPL Toolpath Generator in FIG. 80).

Each second processor (OPL Slice Processors on the right in FIG. 80) executes a method including generating, for the respective 2D slice, an infill of the broadened slice, and defining, for the respective 2D slice, a frontier based on the perimeter and a grid order, the frontier having interior and exterior points, wherein the broadening is based on the frontier.

The method executed by the respective second processor may include edge smoothing, for the respective 2D slice, the broadened slice.

The method executed by the respective second processor may include generating, for the respective 2D slice, a broadened perimeter based on the broadened slice after edge smoothing the slice.

The manufacturing system may further include a print head, and the target fabrication module moving the print head relative to a substrate based on the tool path, the print head forming the shape according to the print path of the tool path. The method may include generating, for each 2D slice, a sintering path within the broadened slice (FIG. 72*b*).

The manufacturing system may further include a laser source, and the target fabrication module moving laser source relative to the broadened slice based on the sintering path of the tool path, the laser source forming the shape according to the sintering path of the tool path (FIG. 72*b*).

Independent Nozzle/Valve Print/Clear Procedures

The following sequence in FIGS. 81*a* to 81*h* illustrates the function of the powder valve/printhead similar to that in FIGS. 60*a* and 60*b*, which have independent controls for the valve and screed positions. The figures illustrate the closing and clearing of the valve assembly by printing over previously "un-printed" areas and by closing the valve during the end of the toolpath and clearing the powder valve during travel.

The set of instructions on the computer readable medium carries out a method that starts by moving the first inner nozzle actuator 646 to move the first inner nozzle powder valve 650 between a first position (FIG. 61a) wherein the first powder cannot enter into a first end of the first inner nozzle 642 and a second position wherein the powder in the first powder container flows into the first inner nozzle 642. The first inner nozzle 642 is then moved relatively from a starting point (FIG. 81a) of a first shape over the substrate to an end point of the first shape over the substrate (FIG. 81b), the first inner nozzle 642 having a lower surface that is sufficiently near the substrate for powder to flow out of the first inner nozzle 642 and stop flowing out of the first inner nozzle 642 when there is no more room below the first inner nozzle 642.

Figure 81A:
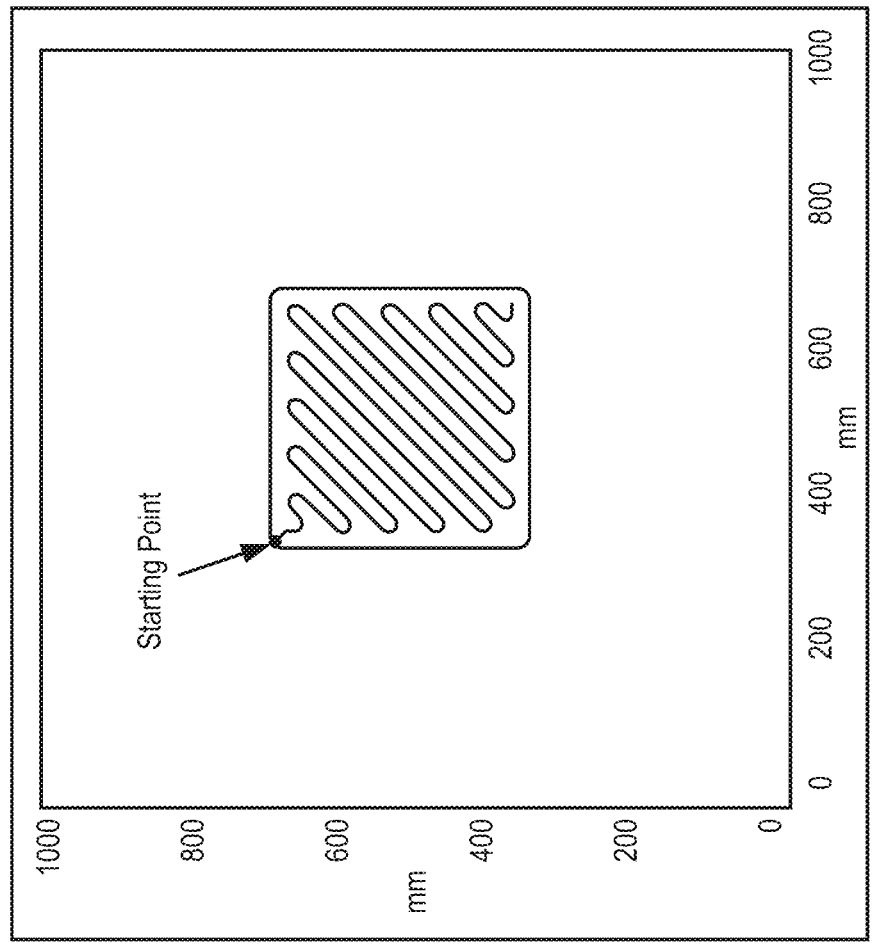
FIGS. 81a-81h are schematic diagrams illustrating the function of the powder valve/printhead in FIGS. 60a and 60b, which have independent controls for the valve and screed positions.
Figure 81B:
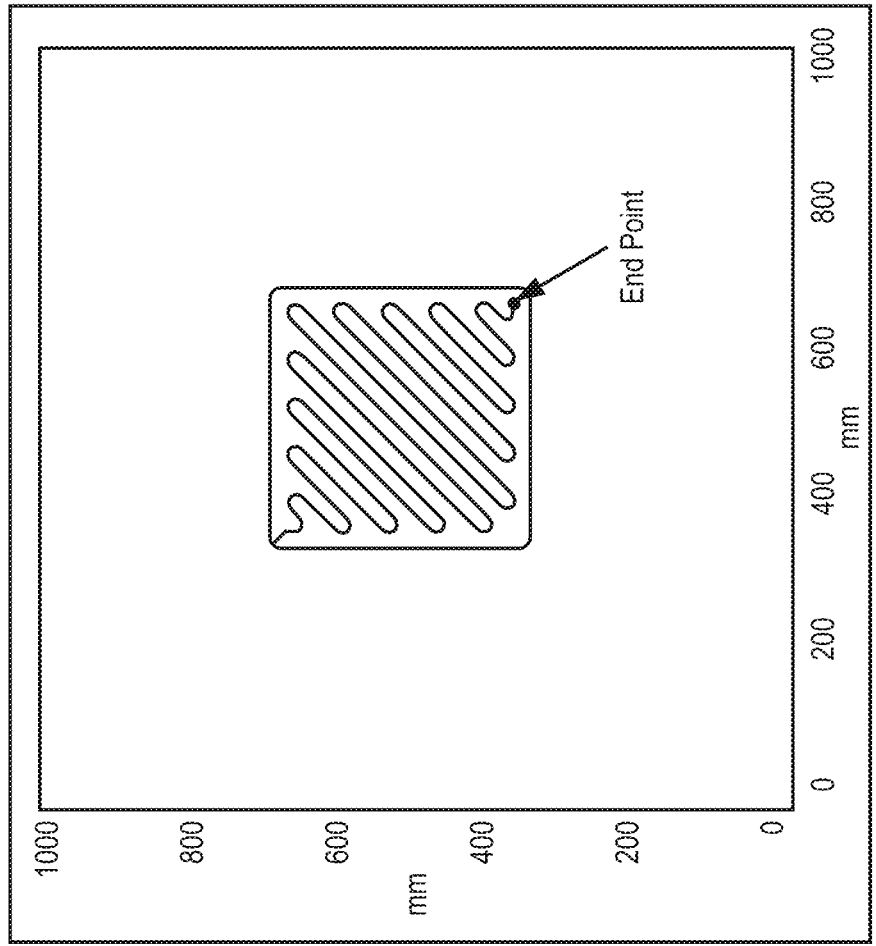
Figure 81C:
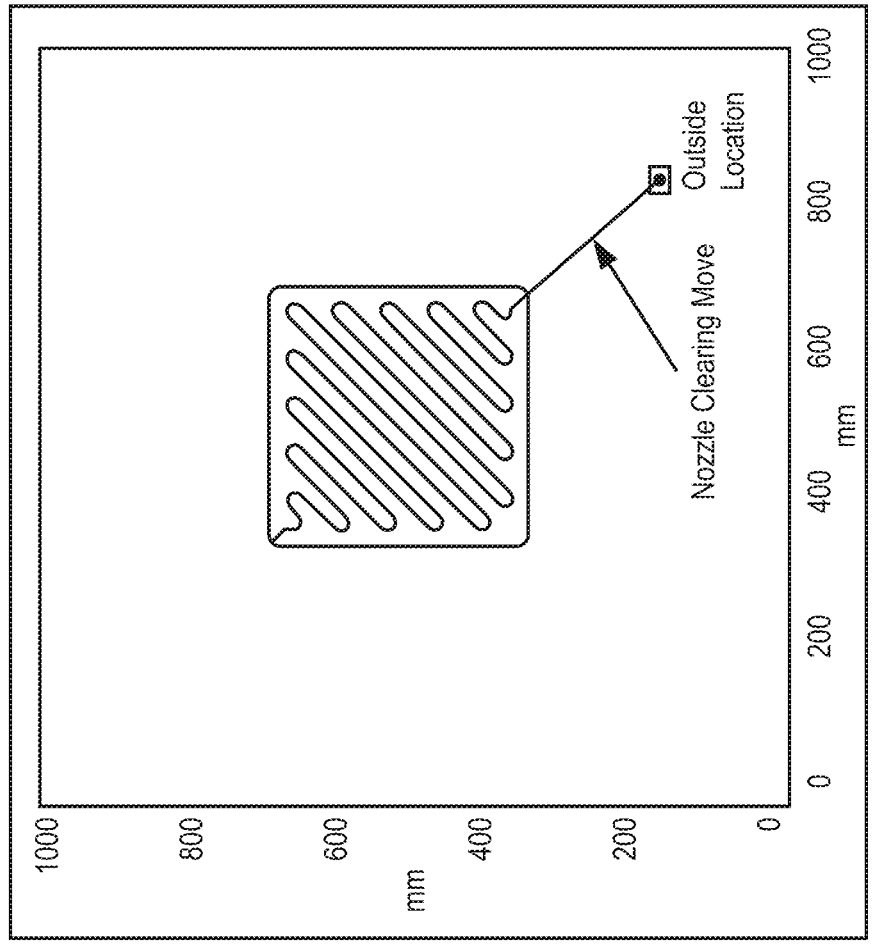
Figure 81D:
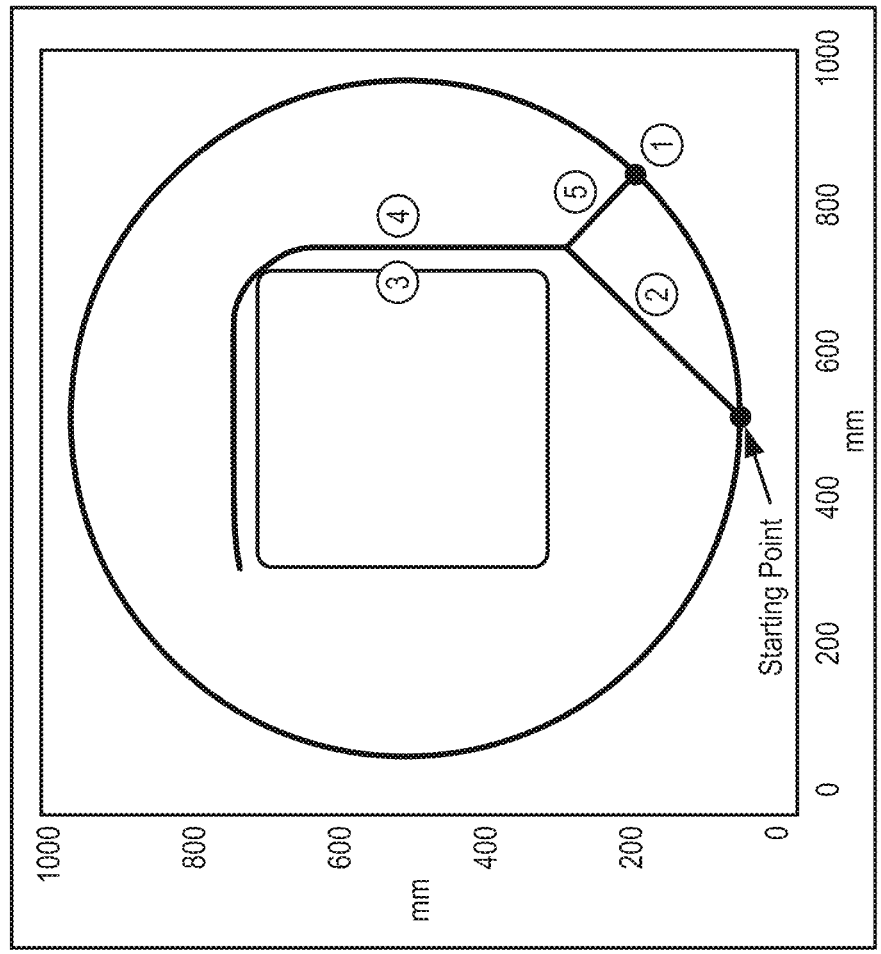

After the first inner nozzle 642 has reached the end point of the first shape, the first inner nozzle actuator 646 is activated to move the first inner nozzle powder valve 650 from the second position to the first position. The first inner nozzle 642 moves relatively from the end point of the first shape over the substrate to an outside location to perform a nozzle clearing move over the substrate to empty the first inner nozzle powder valve 650 while the first inner nozzle powder valve 650 is in the second position (FIG. 81c).

Figure 81E:
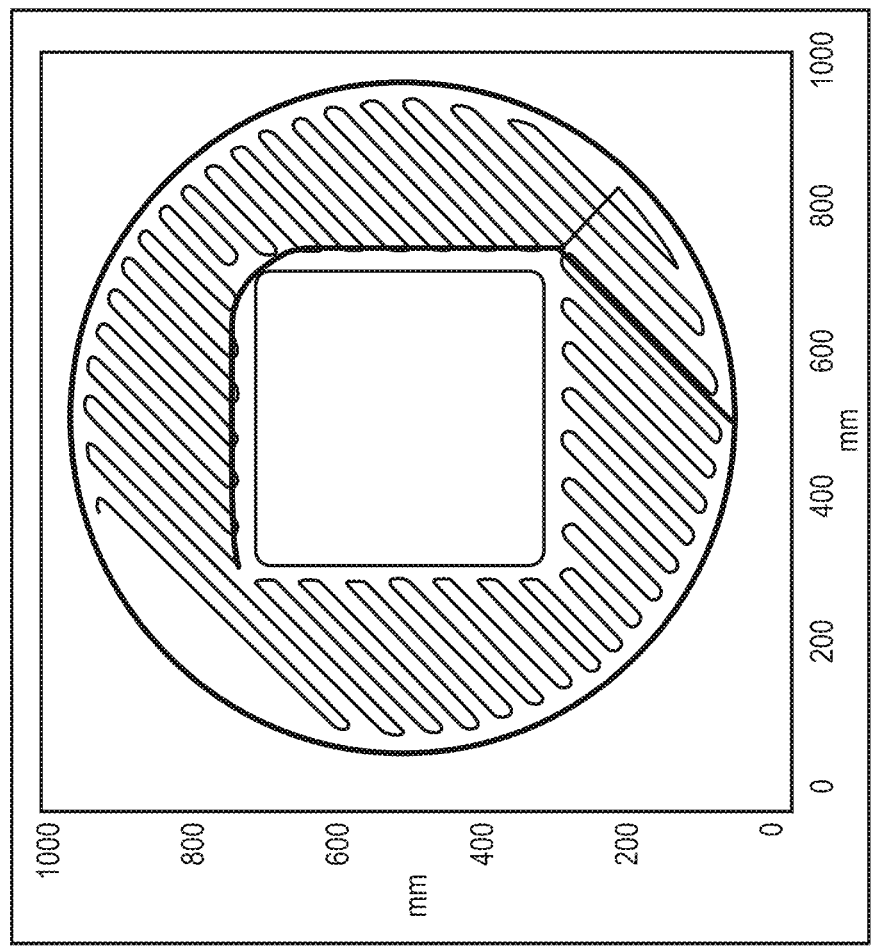
Figure 81F:
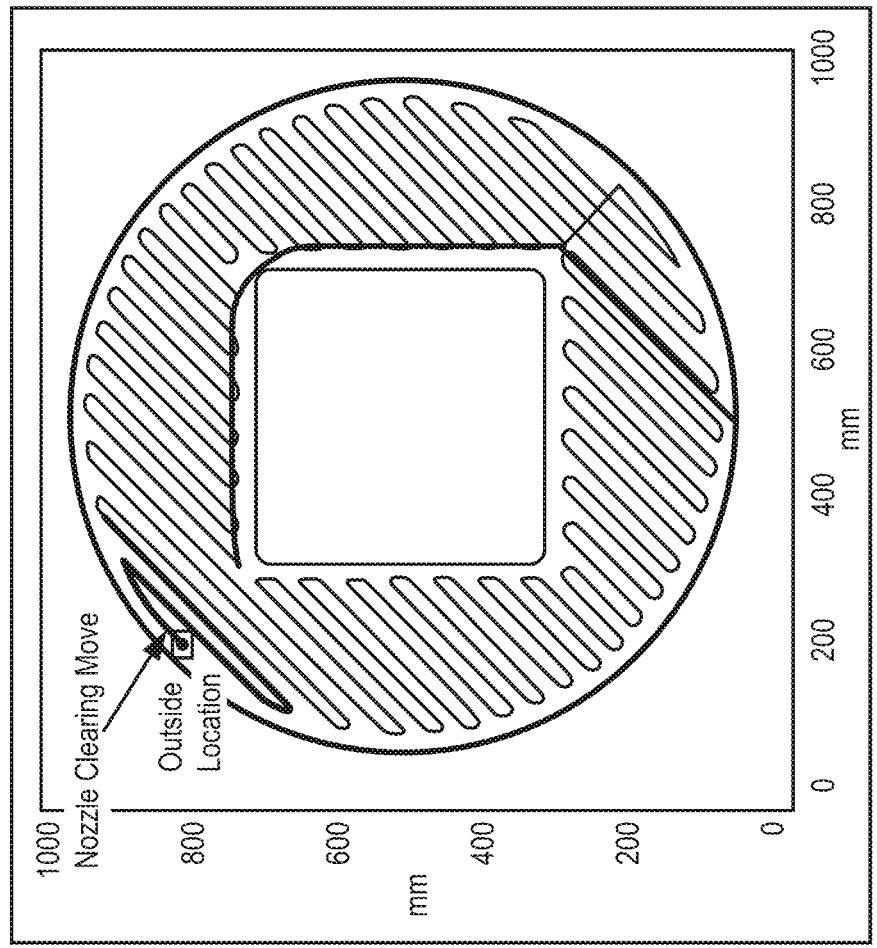

The method includes moving the first inner nozzle actuator 646 to move the second powder valve between a respective first position wherein the second powder cannot enter into a respective first end of the second inner nozzle 642A and a respective second position wherein the powder in the second powder container flows into the second inner nozzle 642A. The second inner nozzle 642A is then moved relatively from a starting point (FIG. 81d) of a second shape over the substrate to an end point of the second shape over the substrate (FIG. 81e). The second inner nozzle 642A has a lower surface that is sufficiently near the substrate for powder to flow out of the second inner nozzle 642A and stop flowing out of the second inner nozzle 642A when there is no more room below the second inner nozzle 642A. After the second inner nozzle 642A has reached the end point of the second shape, the second inner nozzle actuator is moved to move the second powder valve from the respective second position to the respective first position. The second inner nozzle 642A is then moved relatively from the end point of the second shape over the substrate to an outside location to perform a nozzle clearing move over the substrate to empty the second powder valve while the second powder valve is in the second position (FIG. 81f). The nozzle clearing move of the second inner nozzle 642A completes the second shape.

Figure 81G:
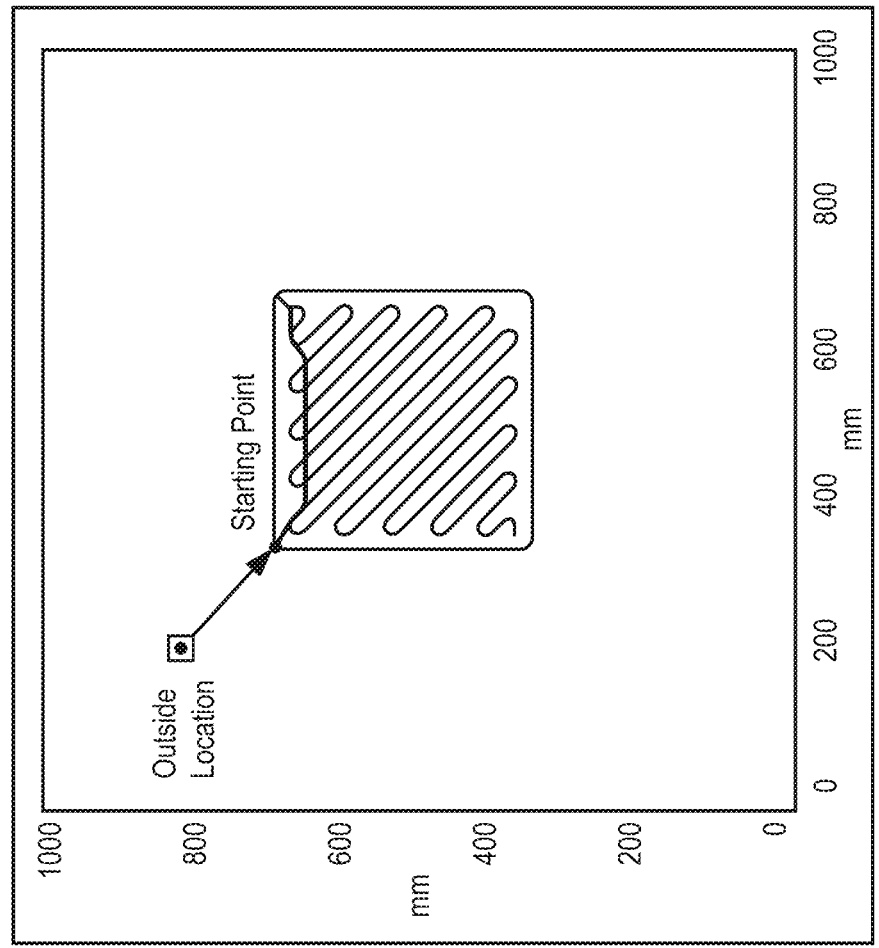
Figure 81H:
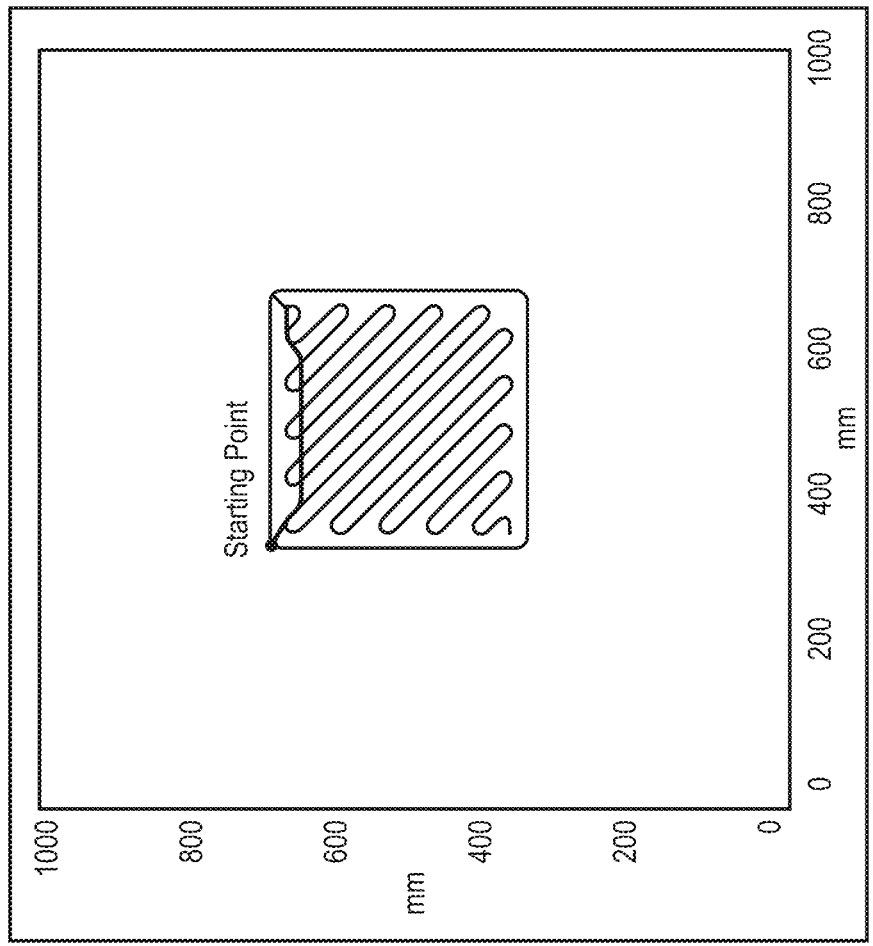

The method further includes moving the first inner nozzle 642 to a starting point of a third shape over the first shape (FIG. 81g). The method further includes moving the first inner nozzle actuator 646 to move the first inner nozzle powder valve 650 between the first position wherein the first powder cannot enter into a first end of the first inner nozzle 642 and the second position wherein the powder in the first powder container flows into the first inner nozzle 642. The first inner nozzle 642 is then moved relatively from a starting point (FIG. 81h) of a third shape over the third shape to an end point of the third shape over the third shape. The first inner nozzle 642 has a lower surface that is sufficiently near the third shape for powder to flow out of the first inner nozzle 642 and stop flowing out of the first inner nozzle 642 when there is no more room below the first inner nozzle 642. After the first inner nozzle 642 has reached the end point of the third shape, the first inner nozzle actuator 646 is moved to move the first inner nozzle powder valve 650 from the second position to the first position. The first inner nozzle 642 is then moved relatively from the end point of the third shape over the substrate to an outside location to perform a nozzle clearing move over the substrate to empty the first inner nozzle powder valve 650 while the first inner nozzle powder valve 650 is in the second position.

Reaction Bonded SiC Heat Exchanger Fabrication

Figure 69A:
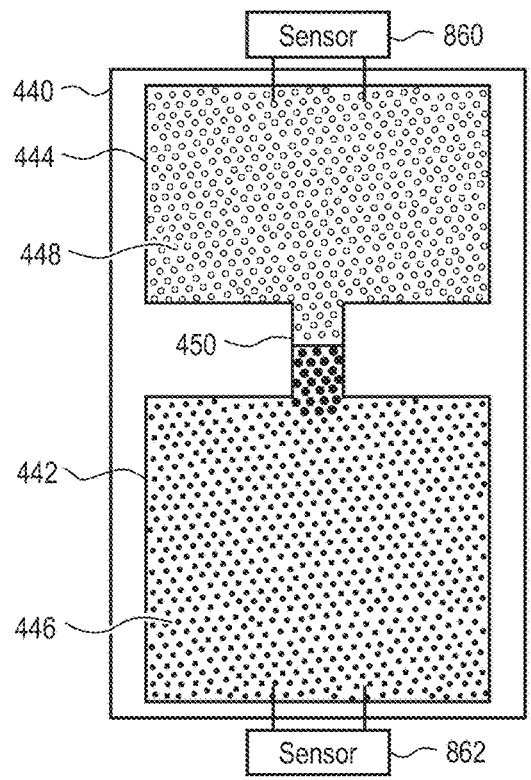
FIGS. 69a-69d are cross-sectional side views of a manufacturing method according to the invention that includes an infusion of a material with sensor integration.
Figure 69B:
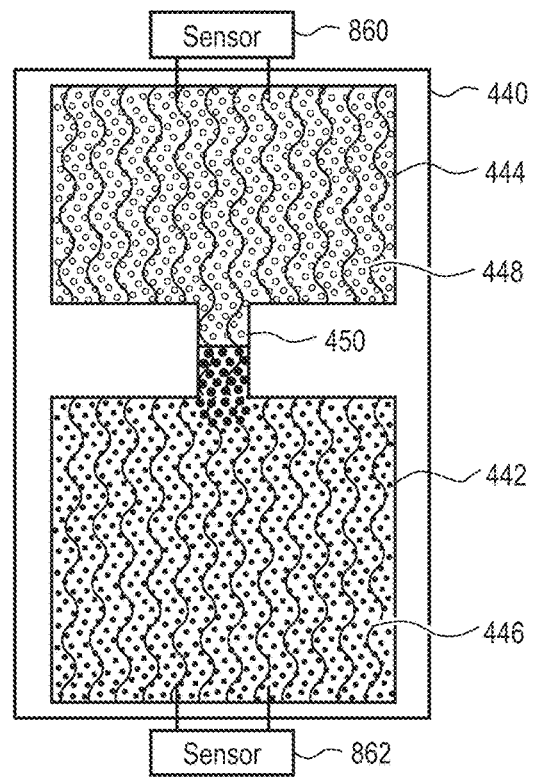
Figure 82A:
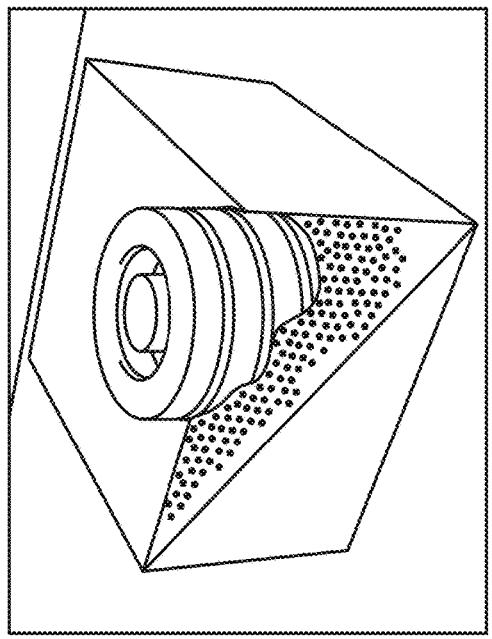
FIGS. 82a-82d are perspective views of reaction bonded SiC heat exchanger fabrication.

In a first embodiment that is described, the first particles of the first material 446 includes a mixture of silicon and silicon carbide particles. The first material 446 typically includes a silicon to silicon carbide ratio of approximately 40% to 60% by volume. A first holding structure is used for holding the first particles within a first volume 442 (FIGS. 69a and 82a), wherein the first particles are of a first material 446 and connecting the first particles leaves voids within the first material 446 (FIGS. 69b and 82a).

Figure 69C:
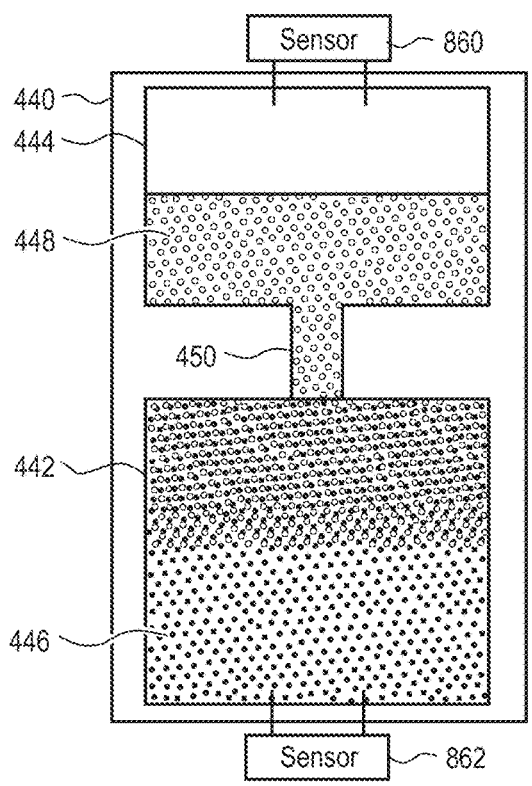
Figure 69D:
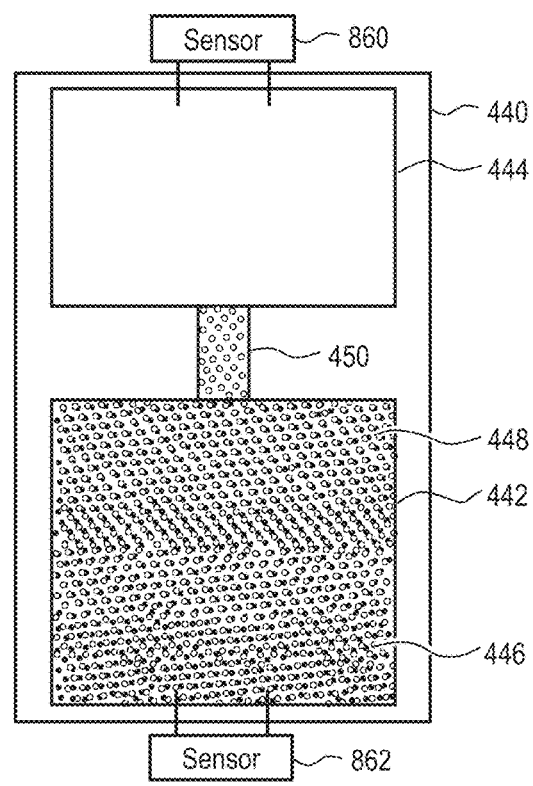
Figure 82B:
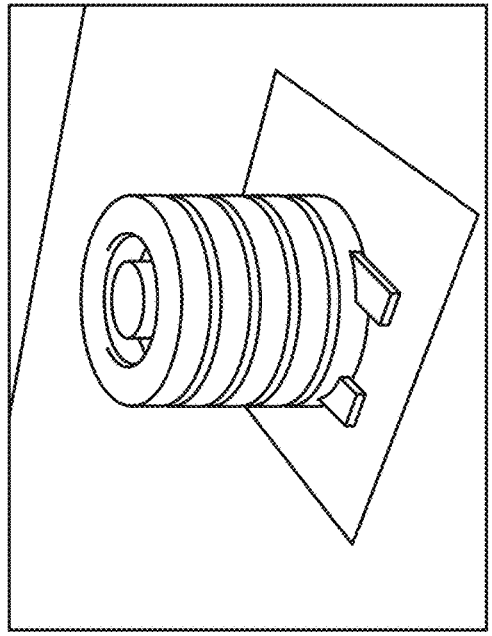

In the first embodiment, the second material 448 a Phenolic resin such as Phenol-formaldehyde. The second material 448 is an infiltration material second holding structure holds and second material within a second volume 444. The infiltration system directs the second material 448 into the voids so that the second material 448 infiltrates the first material 446 to form a pre-reaction mixture that includes silicon and carbon (FIGS. 69c, 69d and 82b).

Figure 82C:
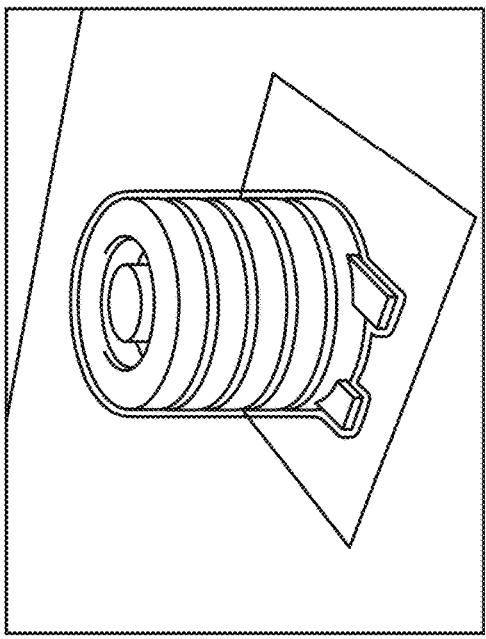
Figure 82D:
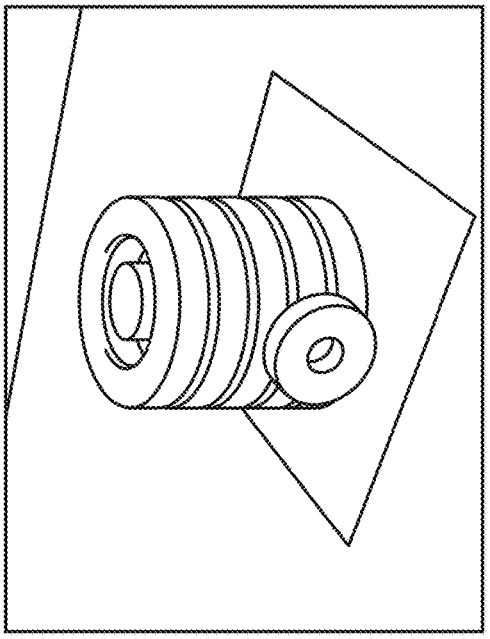

A heater (FIG. 67g) is positioned to heat the silicon, the silicon carbide, and the carbon. The silicon and the carbon are heated to below the melting temperature of 1450 degrees Celsius of silicon to decompose the infiltration material into at least the carbon, which initiates a reaction to form the reaction bonded silicon carbide (FIG. 82c). More specifically, the Phenolic resin is cured at approximately 150 degrees Celsius, followed by slow heating to increase a temperature of the resist by approximately 2 degrees Celsius per minute to 700 degrees Celsius followed by a dwell of approximately 2 hours in a nitrogen ambient. The reaction between the first and second materials forms reaction bonded silicon carbide (FIG. 82d).

In a second embodiment that is described, the first particles are of a first material 446 that includes carbon, and the infiltration material includes silicon. The first material 446 includes a mixture silicon carbide and carbon. The carbon reacts with the silicon in the second material to form reaction bonded silicon carbide.

OPL γ-TiAl Parts Fabricated Using Self-Propagating High-Temperature Synthesis

Figure 83:
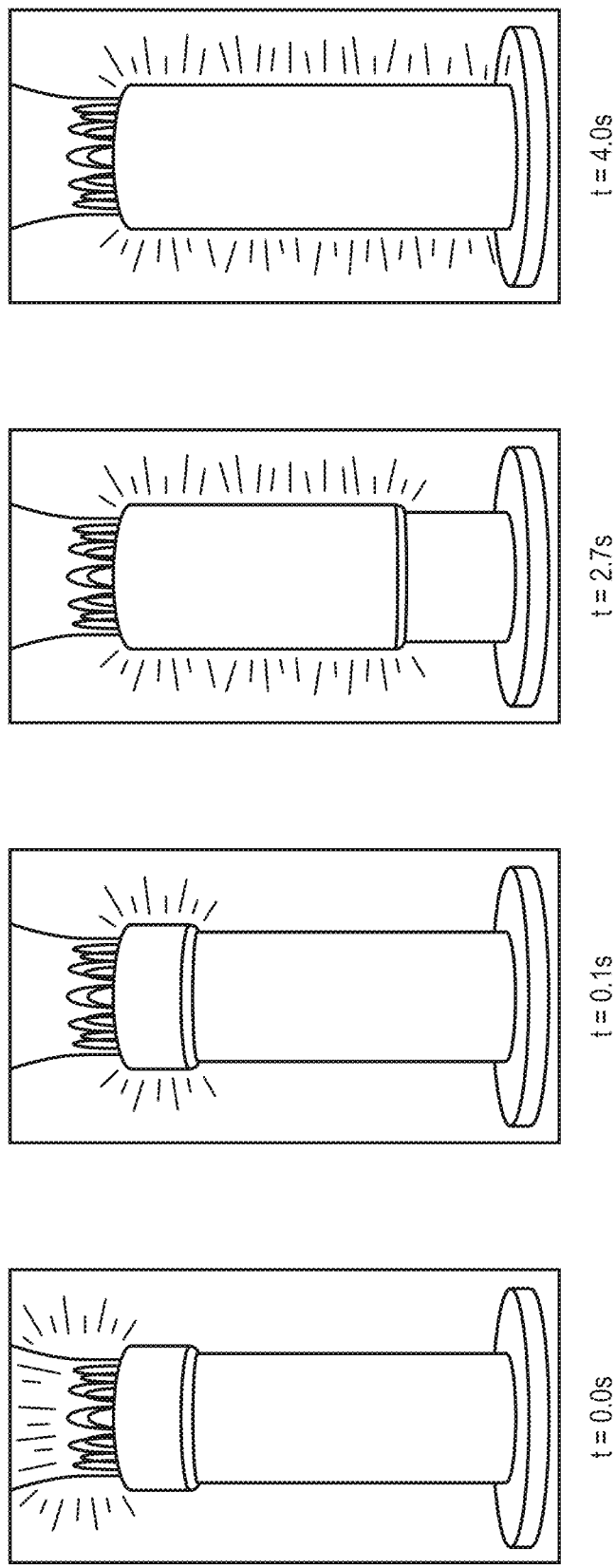
FIG. 83 is a series of side views Self-propagating High-Temperature Synthesis (SHS) of tantalum carbide according to the prior art.

FIG. 83 illustrates a conventional technique Self-propagating High-Temperature Synthesis (SHS) of tantalum carbide (A. G. Merzhanov, Adv. Science and Technology 45, 36-44 (2006). The approach is included in the OPL fabrication of γ-TiAl parts as illustrated in FIGS. 84a to 84d.

Figure 84A:
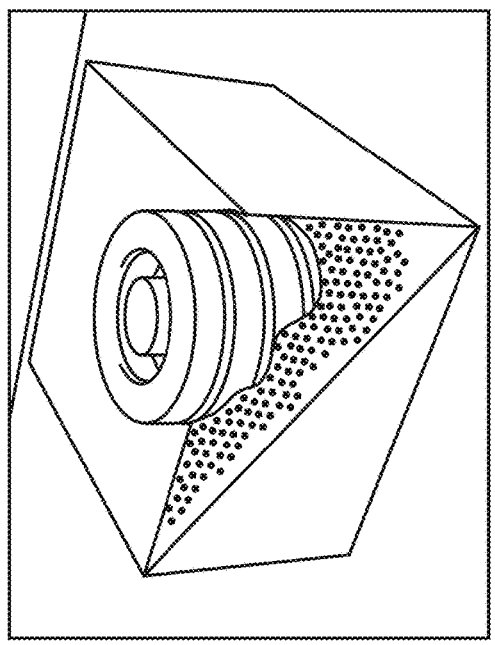
FIGS. 84a-84d are perspective views of OPL fabrication of a γ-TiAl part.

The first material 446 includes the titanium and the second material 448 includes the aluminum. A first holding structure holds the first particles within the first volume 442 (FIGS. 69a and 84a). Connecting the first particles leaves voids within the first material (FIGS. 69b and 84a).

Figure 84B:
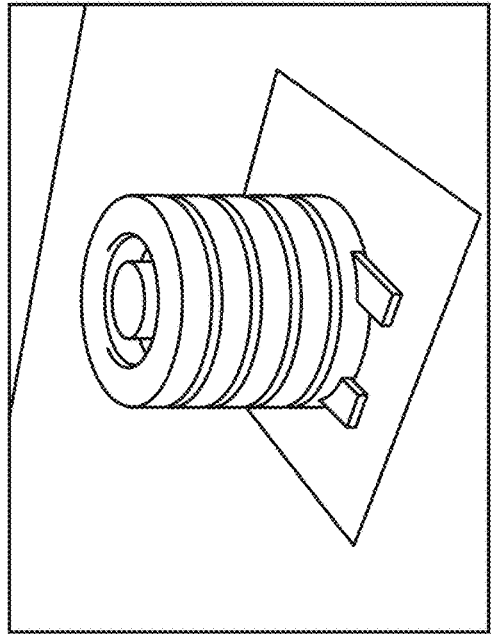
Figure 84C:
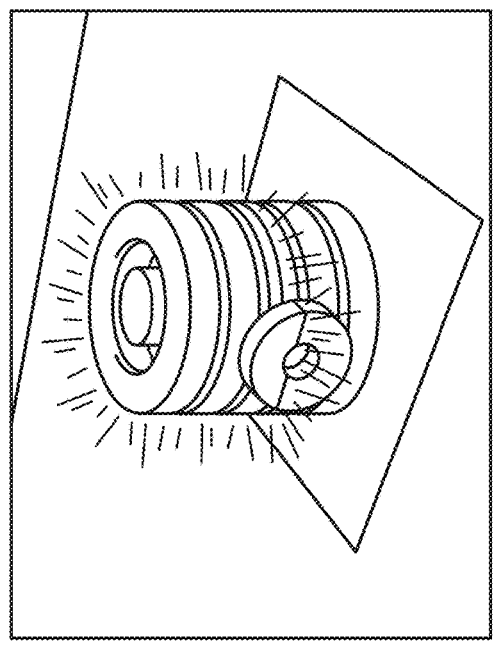

A second holding structure holds the second material within the second volume 444. The infiltration system directs the second material 448 into the voids so that the second material 448 infiltrates the first material 446 to form a pre-reaction mixture that includes aluminum and titanium (FIGS. 69c, 69d and 84b). The Titanium skeleton is infiltrated with aluminum, which ultimately form the intermetallic γ-TiAl.

Figure 84D:
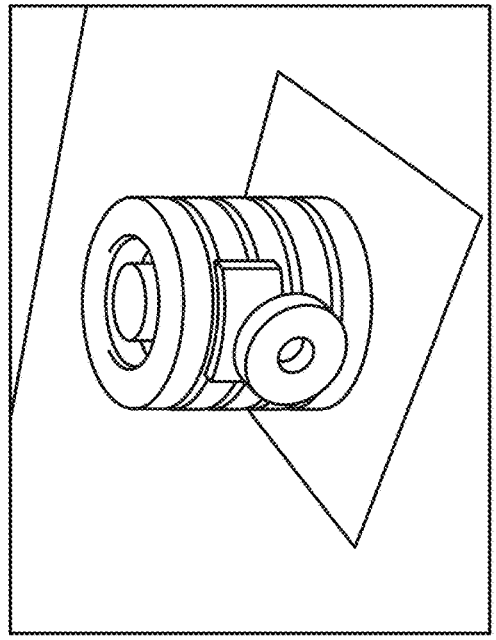

A heater (FIG. 67g) is positioned to heat the aluminum and the titanium. The heater initiates self-propagating high temperature synthesis (SHS) causing combustion (FIG. 84c) to form the γ-TiAl part (FIG. 84d).

Part Fabrication Method Using Precursor Powders

Figure 85:
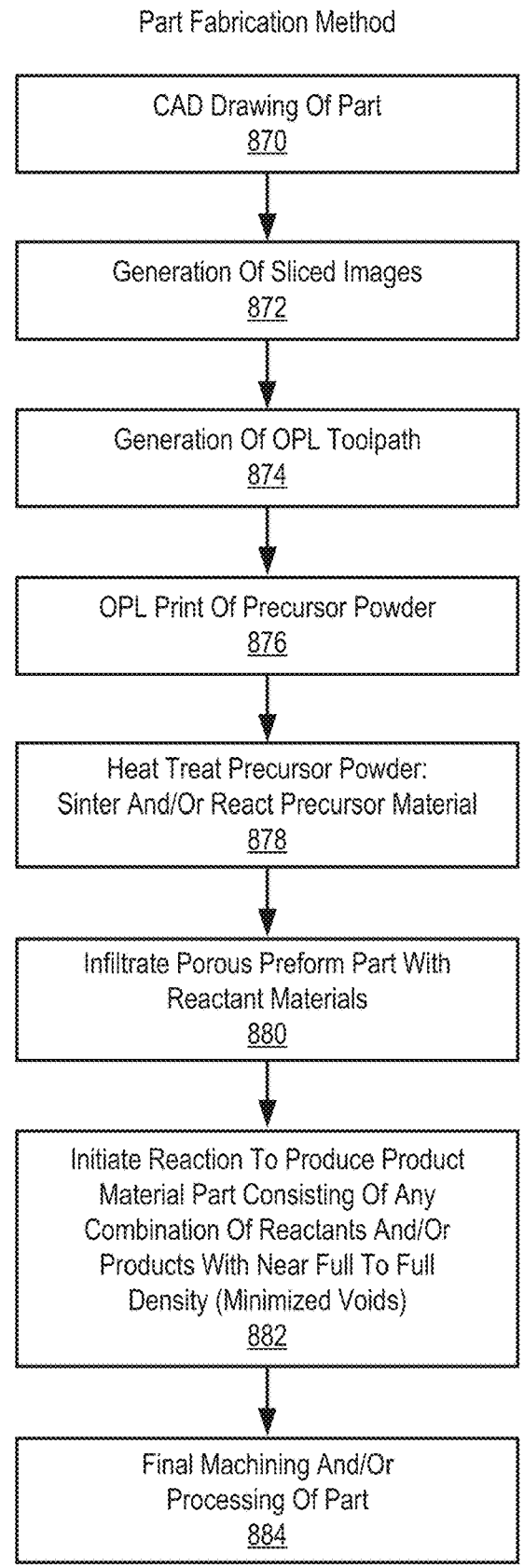
FIG. 85 is a flowchart that generically shows how a silicon carbide or γ-TiAl part is manufactured.

FIG. 85 shows generically how a silicon carbide or γ-TiAl part is manufactured. At 870, a CAD drawing of the part is made. At 872, a plurality of slices are generated to form the CAD drawing. At 874, an OPL toolpath is generated. A tool path module is used for developing a tool path based on the fabrication target model. At 876, OPL printing of precursor powders (the first material) is carried out. At 878, heat treatment of the precursor powder is carried out to sinter and/or react precursor material of the precursor powder. At 880, the porous preform part is infiltrated with reactant materials. Block 882 represents the initiate of a reaction to produce a product material part consisting of any combination of reactants and/or products with near full to full density (minimized voids). At 884, final machining and/or processing of the part is carried out.

Large-Scale Molds: Issues with Scaling to Large Casting Molds

Figure 86:
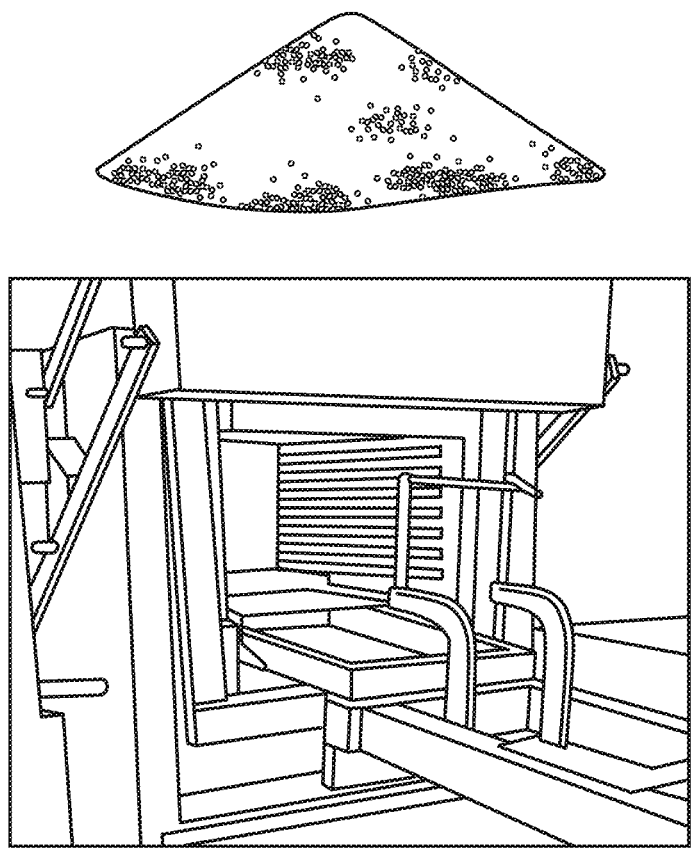
FIG. 86 is a partial perspective view and calculation that shows the definition of thermal diffusivity as the ratio of the thermal conductivity of a material over the product of the density and specific heat.

Certain problems arise in the thermal setting of casting molds when any linear dimension of the mold gets large. These problems are a result of the slow propagation of temperature through a powder (with a bulk density lower than the true density) build cartridge when placed in a high temperature furnace. Thermal diffusivity describes the rate at which a temperature pulse moves through a material. FIG. 86 shows the definition of thermal diffusivity as the ratio of the thermal conductivity of a material over the product of the density and specific heat. Materials with high thermal conductivity (which describes the flow of heat, not temperature) and high specific heats will have high thermal diffusivities. Ultimately, it can take a long time to heat bulk materials with low thermal diffusivities. By way of example, loose dry sand has a very low thermal diffusivity as compared to copper or steel.

Figure 87:
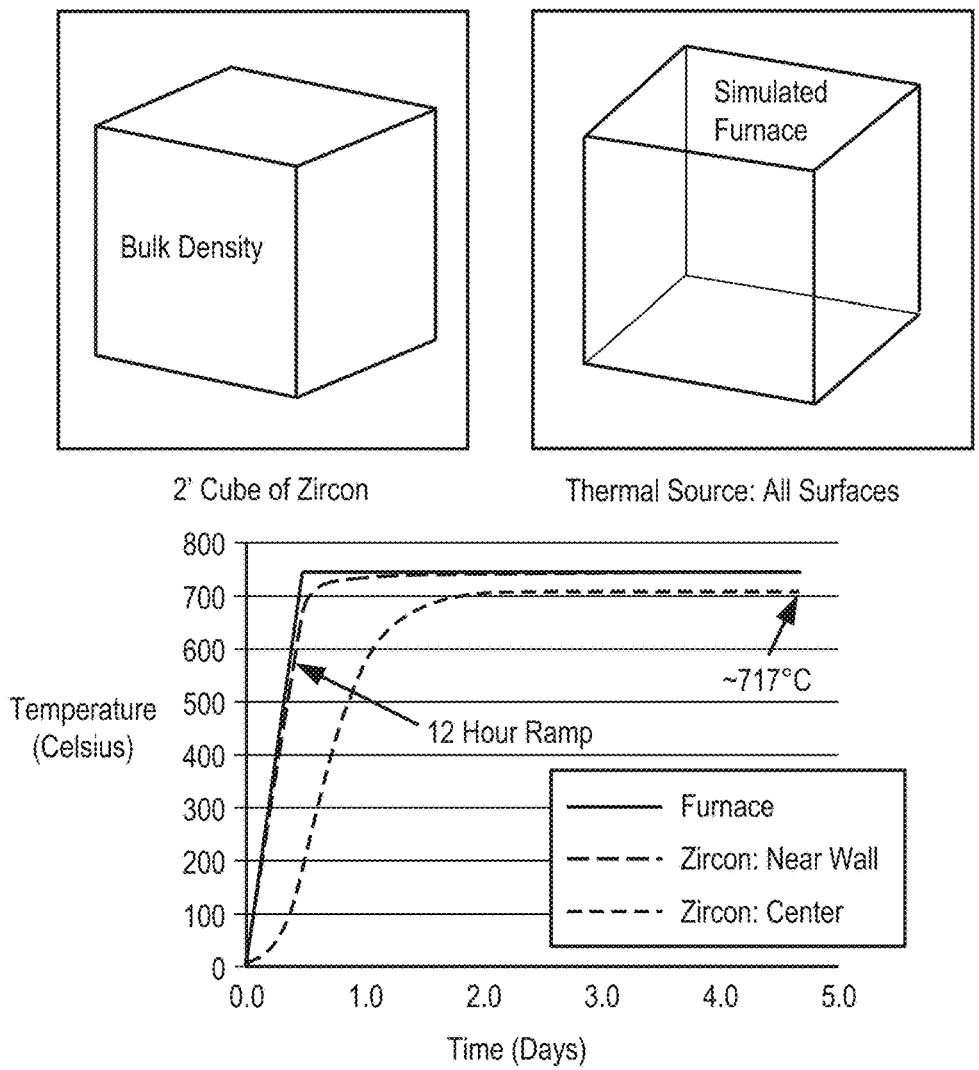
FIG. 87 is a partial perspective view, graph and calculation that shows the results of transient 3D thermal model calculations.

FIG. 87 shows the results of transient 3D thermal model calculations for an 8 cubic foot volume of zircon sand with a bulk density of approximately 2700 kg per cubic meter. In this calculation, the volume of sand was placed in a simulated furnace and the temperature was ramped from zero to 750 degrees Celsius in 12 hours. The simulation has temperature probes located at the heat source, 10 mm within the sand volume, and at the center of the sand volume. While the temperature near the outside of the sand volume closely follows that of the furnace, the temperature at the center of the cube lags far behind the furnace temperature and does not reach the external temperature of the furnace after more than 4 days.

This is a fundamental problem when using temperature to set a large-scale mold with materials that have very low thermal diffusivities. The larger the linear dimension of the 3D printed powder build cartridge, the longer time it will take to set the mold using standard furnace-based thermal set methods.

An alternative method to setting a mold for casting involves the use of wet or dry steam to cause a chemical reaction in the mold powder, which results in the formation of a mechanically sound mold structure. Wet steam is defined as having a certain percentage of suspended water vapor (e.g., droplets) in addition to the gaseous water. Dry steam is water that is fully in the gaseous state with no suspended water droplets. Using sodium silicate as the binding agent in the mold powder, exposure to wet or dry steam brings about a chemical reaction in the mold material that quickly sets the mold. Note: this process is not limited by the thermal diffusivity of the loose powder structure. Rather, the setting of the mold material is limited only by the kinetics of the reaction with the wet/dry steam with the binder/sand powder. This allows for molds to be set quickly, and most importantly, allows for very large casting molds to be set when it would otherwise take an extremely long time to bring the entire mold structure to the required temperature to set the mold.

Figure 88:
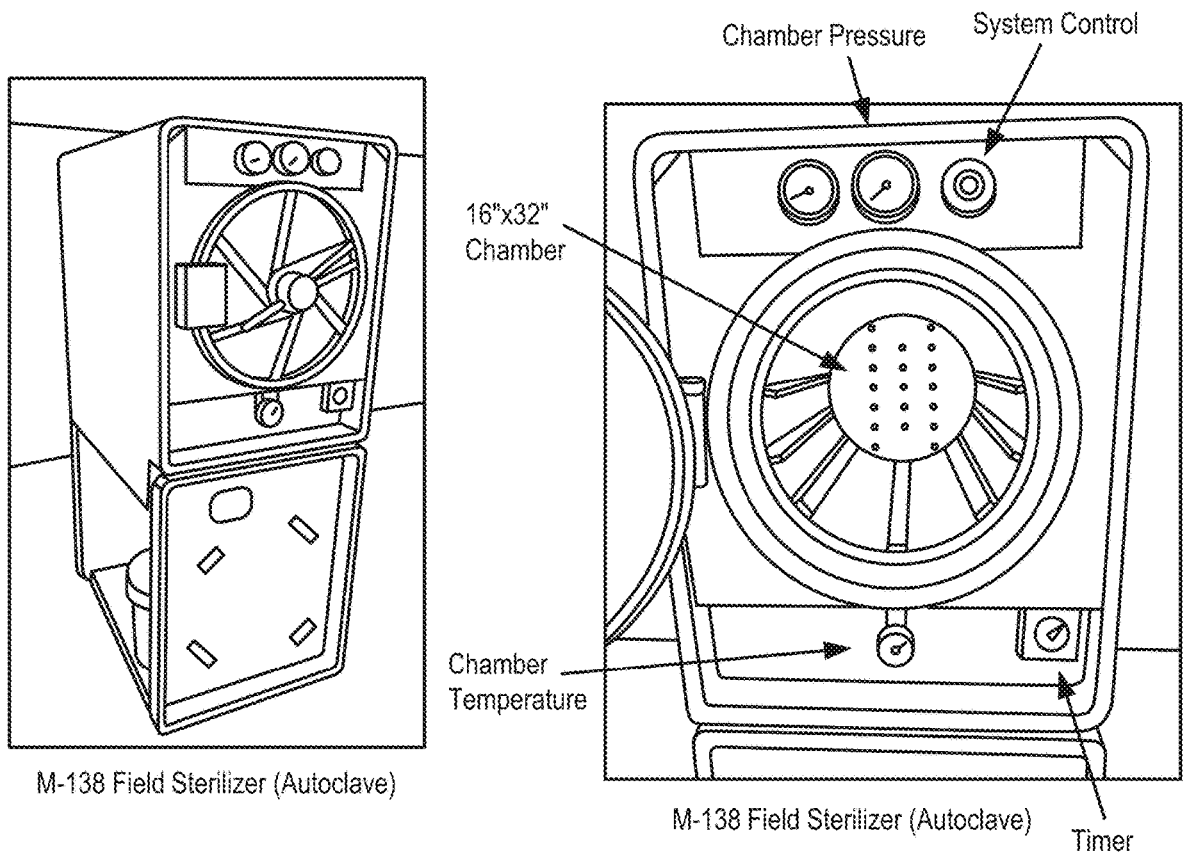
FIG. 88 includes partial perspective views and calculation for a typical system used to treat materials with wet or dry steam using an M138 autoclave and a calculation for its use.

FIG. 88 shows a typical system used to treat materials with wet or dry steam using an M138 autoclave, which is a military grade system. Autoclaves are used in many industries to sterilize and process a wide variety of materials. Here, an autoclave is used to selectively set the mold material in a 3D printed multi-material build cartridge.

FIG. 89 shows the results of the steam processing of a typical 3D printed mold. In this example, the entire build cartridge was exposed to steam for approximately 20 minutes at approximately 120 degrees Celsius. Pressure in the system was slowly released and the entire assembly was dried for approximately 5 minutes.

The mold material is quickly set using steam to penetrate the porous 3D printed powder. In this example, the negative material is zircon sand, the positive material is polyethylene powder, and the auxiliary (mold) material is zircon sand mulled with a 2% by mass sodium silicate solution. After processing in the autoclave, the negative material and the polyethylene powder remain loose and is easily removed from the, now set, mold material.

This is an example of a mold set process using steam and a sodium silicate solution to set a mold material. The advantage of this method, and any gaseous method, to bring about a reaction in the mold material, is that the processing is not limited by the poor thermal diffusivity of the as-printed bulk powder.

The example shown here uses specific materials known to react with wet and/or dry steam, but other combinations of gas and/or liquid reactants may also be used to set the mold material that is treated with the appropriate binder.

In addition, mixtures of gases may be used to set mold materials also. For example, a mixture of carbon dioxide gas and steam may be used to set the sand treated with sodium silicate solution. In addition to the silicates and hydrates that form to set the mold, sodium carbonates may also form during the gas processing, which may further strengthen the mold or shorten the processing time.

It is anticipated that higher temperatures and/or pressures may also shorten the mold set time. In general, higher temperatures and pressures tend to speed the kinetics of chemical reactions.

This mold set process is particularly important when fabricating large casting molds. Autoclaves are well known in the industry and it is not uncommon for a process chamber to be extremely large. FIG. 90 shows a few examples of large-scale industrial autoclaves that can be used for this mold set process.

To facilitate the penetration of steam, or reactant gas, into the 3D printed powder build cartridge, the side walls and bottom floor of the build cartridge can be equipped with a series of vents to allow the steam, or reactant gas, to penetrate from all sides. The vent holes can be covered with a fine mesh that allows the gas to enter, but fully supports the powders. This is most easily accomplished by fabricating the "vented" build cartridge with screens that have a mesh size well below the average particle size of the powder. For example, zircon sand has an average particle size of approximately 300 microns. If the vented build cartridge is equipped with meshed vents with a No. 170 mesh (mesh opening of 88 microns) then the zircon will not be able to pass through, but the reactant gas will easily pass through the opening.

As such, what is described is a system for making a part that includes a first hopper to hold a mold-forming material, a second hopper to hold a sacrificial material, a manufacturing system operable to form a first layer, the first layer including a first quantity of the mold-forming material from the first hopper and a first quantity of the sacrificial material from the second hopper, and to form a second layer on the first layer, the second layer including a second quantity of the mold-forming material from the first hopper and a second quantity of the sacrificial material from the second hopper, a gas generation system positioned to introduce gas into and set the mold-forming material of the first and second layers, a removal system operable to remove the sacrificial material from the first and second layers to leave a void with a shape defined by a mold structure formed by the mold-forming material of the first and second layers, and a filling system operable to fill the void with a part-forming material to form the part defined by the shape of the mold structure, the mold structure being removable from the part to free the part from the mold structure.

The mold-forming material includes a granular material and a binder, and the gas activates the binder to set the mold-forming material.

If the gas is steam, then the granular material may be zircon sand and the binder may be sodium silicate.

The sacrificial material may be removed by washing the sacrificial material out of the void with water, in which case the sacrificial material may be table salt.

The manufacturing system may be operable to form a third layer on the second layer, the third layer including a third quantity of the mold-forming material from the first hopper and a third quantity of the sacrificial material from the second hopper, and the removal system is operable to remove the sacrificial material from the third layer to leave the void with the shape defined by the mold structure third layer.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A manufacturing system comprising:
    a substrate;
    a support structure; and
    a first powder container to hold a first powder having first particles;
    a print head having a first inner nozzle for directing the first powder from the at least one powder hopper onto the substrate, the first inner nozzle having a lower surface that is sufficiently near the substrate for powder to flow out of the first inner nozzle and stop flowing out of the first inner nozzle when there is no more room below the first inner nozzle, and a first outer nozzle, the first outer nozzle positioned around the first inner nozzle, wherein the first inner nozzle is mounted to the first powder container for vertical movement between a first position and a second position;
    a print head actuator;
    a computer that is programmable to cause movement of the print head actuator for the print head actuator to move the print head relative to the support structure, causing the first powder to resume flow out of the first inner nozzle;
    a first inner nozzle actuator;
    a first connecting piece having a lower portion secured to the first inner nozzle and an upper portion located higher than the upper end of the first inner nozzle, the first inner nozzle actuator being attached to the upper portion of the first connecting piece, wherein the computer is programmable to cause movement of the first inner nozzle actuator, causing movement of the first inner nozzle and first outer nozzle relative to one another between the first position wherein the first powder flowing through the first inner nozzle does not reach the first outer nozzle and the second position wherein the first powder flowing through the first inner nozzle flows laterally and does reach the first outer nozzle and powder stops flowing out of the first outer nozzle when there is no more room below the first outer nozzle and wherein said movement of the print head relative to the support structure caused the first powder to resume flow out of the first outer nozzle; and
    a connection scheme which, when employed, connects the first particles to one another to form a part.

2. The system of claim 1, wherein center lines of the first inner nozzle and first outer nozzle are concentric.

3. The system of claim 1, wherein a center line of the first inner nozzle is offset relative to a center line of the first outer nozzle.

4. The system of claim 1, wherein the first connecting piece and the first inner nozzle are made out of a common piece of material to form a valve piece.

5. The system of claim 1, further comprising:
    a print head frame, the first inner nozzle actuator having a portion connected to the print head frame to move the first inner nozzle relative to the print head frame.

6. The system of claim 1, further comprising:
    a print head frame, the first inner nozzle actuator being connected through the print head frame to the first inner nozzle and having a portion connected to the first powder container to move the first powder container relative to the first inner nozzle.

* * * * *